(12) United States Patent
Azuolas et al.

(10) Patent No.: US 11,871,088 B2
(45) Date of Patent: Jan. 9, 2024

(54) SYSTEMS, APPARATUS, AND METHODS FOR PROVIDING EVENT VIDEO STREAMS AND SYNCHRONIZED EVENT INFORMATION VIA MULTIPLE INTERNET CHANNELS

(71) Applicant: SportsCastr, Inc., Las Vegas, NV (US)

(72) Inventors: Peter Azuolas, Las Vegas, NV (US);
Kevin April, Kenilworth, IL (US);
Brian Silston, New York, NY (US);
Philip Nicholas Schupak, Brooklyn, NY (US)

(73) Assignee: SportsCastr, Inc., Las Vegas, NV (US)

( * ) Notice: Subject to any disclaimer, the term of this patent is extended or adjusted under 35 U.S.C. 154(b) by 0 days.

(21) Appl. No.: 17/833,188

(22) Filed: Jun. 6, 2022

(65) Prior Publication Data
US 2023/0126229 A1 Apr. 27, 2023

Related U.S. Application Data

(63) Continuation of application No. 16/685,782, filed on Nov. 15, 2019, now Pat. No. 11,356,742, which is a
(Continued)

(51) Int. Cl.
*H04N 21/6437* (2011.01)
*H04N 21/2187* (2011.01)
(Continued)

(52) U.S. Cl.
CPC ......... *H04N 21/6437* (2013.01); *H04L 65/65* (2022.05); *H04L 65/764* (2022.05);
(Continued)

(58) Field of Classification Search
CPC ........... H04N 21/6437; H04N 21/2187; H04N 21/23106; H04N 21/23439; H04N 21/2368; H04L 65/65; H04L 65/764
See application file for complete search history.

(56) References Cited

U.S. PATENT DOCUMENTS 5,251,294 A 10/1993 Abelow
5,999,908 A 12/1999 Abelow
(Continued)

FOREIGN PATENT DOCUMENTS

AU 2015222869 B2 7/2019
WO 1991012583 A1 8/1991
WO 2011149558 A3 3/2012

OTHER PUBLICATIONS

Analyze & Optimize. Maestro 2020. Accessed at https://info.maestro.io/analyze-and-optimize on Apr. 21, 2021. 2 pages.
(Continued)

*Primary Examiner* — Sm A Rahman
(74) *Attorney, Agent, or Firm* — Smith Baluch LLP

(57) ABSTRACT

A broadcaster device generates a live stream including video-based commentary regarding a live event combined with an audio and/or video feed of the live event itself. A viewer device receives a copy of the integrated live event and commentator stream and synchronized event information (e.g., real-time scores), and displays the integrated stream and the event information (e.g., as a "scorebug"). Viewers of a given live event may seamlessly select amongst different broadcasters for the same live event to access different integrated live event and commentator streams respectively synchronized with the event information. A social media platform is provided in tandem with live streaming of digital content relating to live events to allow a given broadcaster and their associated viewers to communicate with one another, comment on the event and/or the broadcaster's live stream, and send digital gifts.

34 Claims, 67 Drawing Sheets

Related U.S. Application Data continuation of application No. PCT/US2018/033016, filed on May 16, 2018.

(60) Provisional application No. 62/627,859, filed on Feb. 8, 2018, provisional application No. 62/542,729, filed on Aug. 8, 2017, provisional application No. 62/507,158, filed on May 16, 2017.

(51) Int. Cl.
| | |
|---|---|
| *H04N 21/231* | (2011.01) |
| *H04L 65/75* | (2022.01) |
| *H04N 21/2343* | (2011.01) |
| *H04N 21/2368* | (2011.01) |
| *H04L 65/65* | (2022.01) |

(52) U.S. Cl.
CPC ..... *H04N 21/2187* (2013.01); *H04N 21/2368* (2013.01); *H04N 21/23106* (2013.01); *H04N 21/23439* (2013.01)

(56) References Cited

U.S. PATENT DOCUMENTS

| | | |
|---|---|---|
| 6,434,621 B1 | 8/2002 | Pezzillo et al. |
| 6,529,146 B1 | 3/2003 | Kowalski et al. |
| 6,701,383 B1 | 3/2004 | Wason et al. |
| 6,834,371 B1 | 12/2004 | Jensen et al. |
| 6,839,059 B1 | 1/2005 | Anderson et al. |
| 6,922,702 B1 | 7/2005 | Jensen et al. |
| 7,133,834 B1 | 11/2006 | Abelow |
| 7,729,940 B2 | 6/2010 | Harvey et al. |
| 8,000,993 B2 | 8/2011 | Harvey et al. |
| 8,002,618 B1 | 8/2011 | Lockton et al. |
| 8,112,301 B2 | 2/2012 | Harvey et al. |
| 8,128,503 B1 | 3/2012 | Haot et al. |
| 8,149,530 B1 | 4/2012 | Lockton et al. |
| 8,214,429 B2 | 7/2012 | Chidel et al. |
| 8,341,662 B1 | 12/2012 | Bassett et al. |
| 8,376,855 B2 | 2/2013 | Lockton et al. |
| 8,549,574 B2 | 10/2013 | Perlman et al. |
| 8,595,186 B1 | 11/2013 | Mandyam et al. |
| 8,738,694 B2 | 5/2014 | Huske et al. |
| 8,813,112 B1 | 8/2014 | Cibula et al. |
| 8,858,313 B1 | 10/2014 | Selfors |
| 8,870,639 B2 | 10/2014 | Lockton et al. |
| 8,874,778 B2 | 10/2014 | Xu et al. |
| 9,055,271 B2 | 6/2015 | Verna et al. |
| 9,106,934 B2 | 8/2015 | Horen et al. |
| 9,149,682 B2 | 10/2015 | Dornbush et al. |
| 9,251,852 B2 | 2/2016 | Burns |
| 9,288,278 B2 | 3/2016 | Panje et al. |
| 9,509,793 B2 | 11/2016 | Brown et al. |
| 9,511,287 B2 | 12/2016 | Lockton et al. |
| 9,516,390 B2 | 12/2016 | Lau et al. |
| 9,584,858 B2 | 2/2017 | Vinson et al. |
| 9,591,054 B2 | 3/2017 | Thornburgh et al. |
| 9,641,566 B1 | 5/2017 | Hiremath |
| 9,654,844 B2 | 5/2017 | Kim et al. |
| 9,692,800 B2 | 6/2017 | Gaunt et al. |
| 9,706,443 B2 | 7/2017 | Oyman et al. |
| 9,716,918 B1 | 7/2017 | Lockton et al. |
| 9,878,243 B2 | 1/2018 | Lockton et al. |
| 9,919,210 B2 | 3/2018 | Lockton |
| 9,954,646 B1 | 4/2018 | Marcin et al. |
| 10,015,224 B1 | 7/2018 | Shen et al. |
| 10,105,596 B1 | 10/2018 | Mann |
| 10,116,989 B1 | 10/2018 | Shen et al. |
| 10,129,310 B1 | 11/2018 | Brunning |
| 10,226,698 B1 | 3/2019 | Lockton et al. |
| 10,243,694 B1 | 3/2019 | Marcin et al. |
| 10,313,412 B1 | 6/2019 | Hall et al. |
| 10,326,814 B1 | 6/2019 | Hall et al. |
| 10,327,040 B1 | 6/2019 | Shen et al. |
| 10,397,291 B1 | 8/2019 | Hall et al. |
| 10,425,697 B2 | 9/2019 | April et al. |
| 10,437,551 B1 | 10/2019 | Stanek et al. |
| 10,484,730 B1 | 11/2019 | Li et al. |
| 10,484,743 B2 | 11/2019 | Cox |
| 10,554,324 B1 | 2/2020 | Lim et al. |
| 10,601,914 B2 | 3/2020 | Birrer et al. |
| 10,630,746 B1 | 4/2020 | Shen et al. |
| 10,681,398 B1 | 6/2020 | Marcin et al. |
| 10,715,860 B1 | 7/2020 | Bartlett et al. |
| 10,721,543 B2 | 7/2020 | Huske et al. |
| 10,735,783 B1 | 8/2020 | Shen et al. |
| 10,740,305 B2 | 8/2020 | Barthel et al. |
| 10,742,699 B1 | 8/2020 | Shen et al. |
| 10,805,687 B2 | 10/2020 | April et al. |
| 10,848,792 B2 | 11/2020 | Evans |
| 10,855,763 B2 | 12/2020 | Birrer et al. |
| 10,970,904 B1 | 4/2021 | Kosmiskas |
| 11,039,102 B1 | 6/2021 | Marcin et al. |
| 11,039,218 B1 | 6/2021 | April et al. |
| 11,051,049 B2 | 6/2021 | Bustamante et al. |
| 11,076,111 B1 | 7/2021 | Ni et al. |
| 11,076,188 B1 | 7/2021 | Purushe |
| 11,146,834 B1 | 10/2021 | Shen et al. |
| 11,153,581 B1 | 10/2021 | Purushe |
| 11,157,233 B1 | 10/2021 | Stanek et al. |
| 11,178,447 B1 | 11/2021 | Panter et al. |
| 11,356,742 B2 | 6/2022 | Azuolas et al. |
| 11,425,178 B1 | 8/2022 | Shen et al. |
| 11,425,219 B1 | 8/2022 | Lee et al. |
| 11,445,246 B1 | 9/2022 | Eatedali |
| 11,451,883 B2 | 9/2022 | Huske et al. |
| 11,457,245 B1 | 9/2022 | Bhatia et al. |
| 11,470,361 B2 | 10/2022 | Bustamante et al. |
| 11,490,132 B2 | 11/2022 | Bustamante et al. |
| 11,533,543 B1 | 12/2022 | Suh et al. |
| 11,658,822 B1 | 5/2023 | Engers et al. |
| 11,792,444 B2 | 10/2023 | Bustamante et al. |
| 2001/0001160 A1 | 5/2001 | Shoff et al. |
| 2001/0039209 A1 | 11/2001 | DeWeese et al. |
| 2004/0003101 A1 | 1/2004 | Roth et al. |
| 2004/0177002 A1 | 9/2004 | Abelow |
| 2007/0043632 A1 | 2/2007 | Abelow |
| 2008/0022347 A1 | 1/2008 | Cohen |
| 2008/0062318 A1 | 3/2008 | Ellis et al. |
| 2008/0168493 A1 | 7/2008 | Allen et al. |
| 2009/0144785 A1* | 6/2009 | Walker .............. H04N 5/262 725/105 |
| 2009/0222754 A1 | 9/2009 | Phillips et al. |
| 2010/0070345 A1 | 3/2010 | Abelow |
| 2010/0274848 A1* | 10/2010 | Altmaier ............ H04L 67/14 709/228 |
| 2010/0299703 A1 | 11/2010 | Altman |
| 2011/0083144 A1 | 4/2011 | Bocharov et al. |
| 2011/0086144 A1 | 4/2011 | Arampongpun et al. |
| 2011/0090960 A1 | 4/2011 | Leontaris et al. |
| 2011/0280540 A1 | 11/2011 | Woodman |
| 2012/0058808 A1 | 3/2012 | Lockton |
| 2012/0069131 A1 | 3/2012 | Abelow |
| 2012/0072845 A1 | 3/2012 | John et al. |
| 2012/0210348 A1 | 8/2012 | Verna et al. |
| 2012/0295686 A1 | 11/2012 | Lockton |
| 2013/0222597 A1 | 8/2013 | Brink et al. |
| 2013/0225285 A1 | 8/2013 | Lockton |
| 2013/0227596 A1 | 8/2013 | Pettis et al. |
| 2013/0297706 A1 | 11/2013 | Arme et al. |
| 2014/0129680 A1 | 5/2014 | Mukherjee |
| 2014/0359075 A1 | 12/2014 | Amidei et al. |
| 2015/0131845 A1 | 5/2015 | Forouhar et al. |
| 2015/0163562 A1 | 6/2015 | Leventhal et al. |
| 2016/0037215 A1 | 2/2016 | Cardona |
| 2016/0086108 A1 | 3/2016 | Abelow |
| 2016/0249108 A1 | 8/2016 | Sexton |
| 2016/0255403 A1* | 9/2016 | Gomes ............ H04N 21/47202 725/49 |
| 2016/0360261 A1 | 12/2016 | Makhlouf |
| 2017/0034237 A1 | 2/2017 | Silver |
| 2017/0099516 A1 | 4/2017 | Barbulescu et al. |
| 2017/0188054 A1 | 6/2017 | Ma et al. |
| 2017/0264961 A1 | 9/2017 | Lockton |

(56) References Cited

U.S. PATENT DOCUMENTS

| | | | |
|---|---|---|---|
| 2018/0025586 | A1 | 1/2018 | Lockton |
| 2018/0307383 | A1* | 10/2018 | Faulkner ............... H04N 7/155 |
| 2020/0021892 | A1 | 1/2020 | April et al. |
| 2020/0098228 | A1 | 3/2020 | Amaitis et al. |
| 2020/0111325 | A1 | 4/2020 | Lockton et al. |
| 2020/0162796 | A1 | 5/2020 | Azuolas et al. |
| 2021/0168462 | A1 | 6/2021 | April et al. |
| 2021/0397847 | A1 | 12/2021 | Jayaram et al. |
| 2022/0254379 | A1 | 8/2022 | Chang et al. |
| 2022/0327830 | A1 | 10/2022 | Chang et al. |
| 2022/0335720 | A1 | 10/2022 | Chang et al. |

OTHER PUBLICATIONS

Around-the-clock action for you sportsbook. BetGenius Brochure. Accessed at https://geniussports.com/sportsbook/content/streaming/ on Mar. 19, 2021. 1 page.
Betradar Live Streaming Brochure 2021. Accessed at https://www.betradar.com/wp-content/uploads/sites/4/2014/11/Betradar-Live-Streaming-Brochure.pdf on Apr. 29, 2021. 7 pages.
Betradar Product Brochure 2021. Accessed at https://www.betradar.com/wp-content/uploads/sites/4/2021/02/Betradar-Product-Brochure-2021.pdf on Apr. 29, 2021. 24 pages.
Betradar. Sportradar. Accessed at https://www.betradar.com/ on Apr. 21, 2021. 2 pages.
Customize & Control. Maestro 2020. Accessed at https://info.maestro.io/customize-and-control on Apr. 21, 2021. 2 pages.
Empson, Baseball's Digital Trifecta and How America's Pastime is Setting the Pace for Sports Online. TechCrunch Nov. 4, 2013. Accessed at https://techcrunch.com/2013/11/04/baseballs-digital-trifecta-and-how-americas-pastime-is-setting-the-pace-for-sports-online/. 10 pages.
Engage & Monetize. Maestro 2020. Accessed at https://info.maestro.io/engage-and-monetize on Apr. 21, 2021. 3 pages.
Esports—Take your fan experience to the next level and build community. Maestro 2020. Accessed at https://info.maestro.io/esports on Apr. 21, 2021. 4 pages.
Genius Sports Group Analyst Day Presentation Jan. 2021. Accessed at https://s27.q4cdn.com/552951210/files/doc_downloads/GSG_Analyst_Day_Presentation_January_2021_vFF_2.pdf on Apr. 29, 2021. 52 pages.
Genius Sports Group Investor Presentation Oct. 2020. Accessed at https://news.geniussports.com/wp-content/uploads/2020/10/GSG-Investor-Presentation.pdf on Apr. 29, 2021. 29 pages.
Ha, Major League Baseball's "At Bat" App Gets updated to Supported Expanded Instant Replay. TechCrunch Mar. 31, 2014. Accessed at https://techcrunch.com/2014/03/31/mlb-at-bat-expanded-instant-replay/. 4 pages.
Hashemizadehnaeini, Transcoding H.264 Video via FFMPEG encoder. Corso di Laurea Magistrale in Ingegneria delle Telecomunicazioni Politecnico Di Milano. Thesis, 2015, p. 1-100.
International Search Report and Written Opinion in International Patent Application No. PCT/US2017/045801 dated Oct. 30, 2019, 18 pages.
International Search Report and Written Opinion in International Patent Application No. PCT/US2018/033016 dated Aug. 6, 2018, 29 pages.
LA TechWatch, LA Startup Maestro Just Raised $3M to Broadcast eSports at Scale. LA TechWatch Sep. 19, 2017. Accessed at https://www.latechwatch.com/2017/09/la-startup-maestro-just-raised-3m-broadcast-esports-scale/. 13 pages.
MLB App. MLB 2021. Accessed at https://www.mlb.com/apps/mlb-app on Apr. 21, 2021. 1 page.
Perez, Live Video Viewing up 86% over last year in MLB's at Bat app, thanks for Addition of multitasking. TechCrunch Apr. 15, 2016. Accessed at https://techcrunch.com/2016/04/15/live-video-viewing-up-86-over-last-year-in-mlbs-at-bat-app-thanks-to-addition-of-multitasking/. 4 pages.
Perez, MLB.com at Bat and NHL are first to Launch Personalized App Icons on iOS 10.3. TechCrunch Mar. 28, 2017. Accessed at https://techcrunch.com/2017/03/28/mlb-com-at-bat-and-nhl-are-first-to-launch-personalized-app-icons-on-ios-10-3/. 5 pages.
Sports—Personalized fan-first experiences that go beyond the field. Maestro 2020. Accessed at https://info.maestro.io/sports on Apr. 21, 2021. 3 pages.
Sports Betting. Sportradar. Accessed at https://sportradar.us/betting-services/ on Apr. 21, 2021. 4 pages.
Streaming. BetGenius Product Deck. Accessed on Dec. 3, 2020. 2 pages.
Washington, Betgenius launches live streaming service for sportsbooks. Genius Sports Oct. 8, 2019. Accessed at https://news.geniussports.com/betgenius-launches-live-streaming-service-for-sportsbooks/ on Apr. 30, 2021. 5 pages.
In-Play MultiBet Unlock new in-play revenues, GeniusSports Website, Mar. 13, 2023, 4 pages.
Integration Guide—Genius Live Player, GeniusSports Drop & Play Integration Guide, Nov. 28, 2022, 1 page.
Integration Schema—Integration Process GeniusSports Wiki, May 29, 2023, 4 pages.
Integration Schema—Integration Service—Interface, GeniusSports Wiki, Dec. 16, 2020, 2 pages.
Integration Schema—Integration Service GeniusSports Wiki, Apr. 13, 2022, 16 pages.
Integration Schema—Service Reliability and Availability, GeniusSports, Mar. 29, 2023, 2 pages.
Integration Schema GeniusSports Wiki, Oct. 11, 2019, 2 pages.
International Search Report and Written Opinion dated May 13, 2022 in International application No. PCT/US2022/014999 22 pages.
Introducing Drop and Play (Medium container), BetGenius Website, Jul. 5, 2022, 3 pages.
Lemire "Sportradar Launches Real-Time Data Product for Media Companies" Sports Business Journal, Oct. 27, 2020, 1 page.
Live Sports Data Integration—API Explorer for Genius Ably Push Feeds, GeniusSports Wiki , Mar. 20, 2023, 5 pages.
Live Sports Data Integration—Authenticating against Genius Sports APIs, GeniusSports Wiki, Aug. 12, 2022, 2 pages.
Live Sports Data Integration—Match State Platform Access Control API, GeniusSports Wiki, Aug. 12, 2022, 3 pages.
Live Sports Data Integration—Statistics API, GeniusSports Wiki, Aug. 18, 2022, 6 pages.
LiveStats Version 7—Data Streaming, Dec. 5, 2020 GeniusSports Support Centre, 3 pages.
Livestream—Read—FAQs, GeniusSports Developer Center Website, Jul. 31, 2017, 4 pages.
Menmuir Betgenius Launces 'Next Level' Sportbook Streaming Service, SBCNews, Oct. 8, 2019, 2 pages.
Multibet Back-End Integration—Market Lifetime, GeniusSports Wiki, Feb. 13, 2023, 2 pages.
Multibet Back-End Integration—Multibet API, GeniusSports Wiki, Mar. 15, 2023, 10 pages.
Multibet Back-End Integration, GeniusSports Wiki, Feb. 13, 2023, 4 pages.
Multibet Back-End Integration, Multibet Sportsbook Integration (V3), GeniusSports Wiki, Feb. 13, 2023, 5 pages.
Multibet Front-End Integration—Authenticating User-SessionUsing a Proxy Service, GeniusSports Wiki, Feb. 13, 2023, 2 pages.
Multibet Front-End Integration—UI Widget Customization, GeniusSports Wiki, Feb. 13, 2023, 4 pages.
Multibet Front-End Integration, GeniusSports Wiki, Feburary 13, 2023, 2 pages.
Read-Read a stream of live game events.GeniusSports Developer Centre Website, Nov. 2, 2016, 28 pages.
References, GeniusSports Drop & Play Integration Guide, Nov. 28, 2022, 1 page.
Risk Services Integration, GeniusSports Wiki , Mar. 20, 2023, 10 pages.
SmartStream Integrations, GeniusSports Wiki, Oct. 26, 2022, 4 pages.

(56) References Cited

OTHER PUBLICATIONS

Sportradar—Data Services 2019, accessed at waybackmachine https://www.sportradar.com/rights-holder-solutions/data-services/ on Jun. 4, 2019, 3 pages.
Sportradar "Sportradar Accelerates Data and Video on AWS, Launches Simulated Reality Innovation in 11 Days" Dec. 2, 2020, accessed at https://aws.amazon.com/solutions/case-studies/sportradar-case-study/ on Dec. 20, 2020, 5 pages.
Sportradar Aspera, Live Streaming of Sports Content with FASPStream to International Online Platforms, 2017, assessed at https://www.ibm.com/aspera/pdfs/Sportradar_AsperaCS_2017.pdf on Feb. 24, 2023, 2 pages.
Sportradar Bookmaker SDK Deployment Guide, Jul. 3, 2014, 5 pages.
Sportradar Bookmaker SDK Developer Guide Sep. 7, 2015, accessed at https://sdk.sportradar.com/bookmaker/java/file?g=1aae9f9b-9e0b-40af-869b-380eede8806d on Feb. 17, 2023, 11 pages.
Sportradar brochure "Unified Odds Feed Integration Process" Oct. 15, 2021, accessed at https://iodocs.betradar.com/unifiedsdk/UOF_Integration_Process.pdf on Feb. 17, 2023, 14 pages.
Sportradar Drive Fan Behavior with Insights 2021 accessed at WaybackMachines https://sportradar.us/sports-media/insights/ on Apr. 14, 2021, 4 pages.
Sportradar Live Streaming of Sports Content with FASPStream to International Online Platforms, 2017, accessed at https://www.ibm.com/aspera/pdfs/Sportradar_AsperaCS_2017.pdf on Feb. 16, 2023, 2 pages.
Sportradar Live-Score Setup Document Apr. 2021, 8 pages.
Sportradar NFL V7 US API Portal, Feb. 7, 2023, 5 pages.
Sportradar Sports Data API Dec. 23, 2022, accessed at https://sportradar.com/sports-entertainment/content/sports-data-api/?lang=en-us on Feb. 16, 2023, 3 pages.
Sportradar Streams Live Data for Australian Open Broadcasts on Aspera, Digital Media World, accessed at WayBack Machines https://www.digitalmediaworld.tv/disrupt/2375-sportradar-streams-live-data-for-australian-open-broadcases-on-aspera on May 16, 2021, (2019) 3 pages.
Sportradar Supercharge Your OTT Solution with the Power of Data, accessed at Wayback Machine https://sportradar.us/sports-media/OTT on May 13, 2020, 3 pages.
Sportradar U.S. SEC Amendment No. 2 to Registration Statement, filed Sep. 7, 2021, Registration No. 333-258882 accessed at SEC Home » Search the Next-Generation EDGAR System» CompanySearch» on Feb. 16, 2023, 336 pages.
Streaming, Grab Attention With Video, Genius Sports Website, 2022, accessed Apr. 13, 2023, 4 pages.
Styling Genius Live Player, GeniusSports Drop & Play Integration Guide, Nov. 28, 2022, 2 pages.
Understanding Match State, GeniusSports Wiki, Mar. 24, 2023, 2 pages.
Video Integration and Player User Guide Feb. 25, 2021, Genius Sports Wiki Website, 1 page.
Video Streaming API, GeniusSports Wiki Website, Mar. 24, 2021, 1 page.
Video Streaming Genius Sports Wiki Website, Mar. 26, 2021, 1 page.
Video-Streaming-v1, Swagger, Apr. 2019, 3 pages.
Video-v2, Swagger, Apr. 2019, 4 pages.
Virtuals, GeniusSports Drop & Play Integration Guide, Nov. 28, 2022, 1 page.
Wallstreet, John, Genius Sports-Caesars NFL Betting Live Stream Validates Vision, Dec. 21, 2022, Sportico, 4 pages.
Warehouse—Read Stream API Documentation—American Football!, GeniusSports Developer Centre Website, May 12, 2021, 14 pages.
Warehouse—Read Stream API Documentation—Basketball, GeniusSports Developer Centre Website, Jul. 30, 2017, 27 pages.
56 Bit Sportradar Case Study, Sportradar Time System 2022 accessed at https://www.56bit.com/case-studies/sportradar-time-system on Feb. 16, 2023, 5 pages.
API Feed Overview and Documentation, Jan. 31, 2022, GeniusSport Support Centre, 3 pages.
Betbuilder Architecture, GeniusSports, Oct. 13, 2022, 5 pages.
BetBuilder evolves to provide the ultimate pre-match experience, GeniusSports Website Sep. 18, 2019, 3 pages.
Betbuilder Integration—Prebuilt bets GeniusSports Wiki, May 25, 2021, 2 pages.
Betbuilder Integration, GeniusSports, Oct. 13, 2022, 1 page.
Betgenius Adds Live Streaming to Tipsport Deal, Gaming Intelligence, Sep. 23, 2020, 1 page.
Betgenius Launches Live Streaming Service for Sportsbooks, Genius Sports, Oct. 8, 2019, 3 pages.
Betgenius Streaming, Bring your sportsbook to Life-Right Around the Clock, Dec. 3, 2020, 2 pages.
Betradar 10 Benefits of our New Audio Visual Player—Jul. 10, 2019, accessed at https://www.betradar.com/news-archive/the-top-10-benefits-of-our-new-audio-visual-player/ on Feb. 24, 2023, 1 page.
Betradar Audio-Visual Brochure 2022, 8 pages.
Betradar Audio-Visual Brochure 2023, 9 pages.
Betradar Brochure—MTS SDK .NET Integration Guide—Oct. 2020 accessed at https://sdk.sportradar.com/mts/net/file?g=ab6006f6-f554-482f-92db-26af416eec92 on Feb. 17, 2023, 14 pages.
Betradar Brochure Live Scouting & Live Odds Services, 24/7 Live Betting Coverage from the market leader, 2015, 12 pages.
Betradar Brochure Live-Data Service 2022 accessed at https://www.betradar.com/wp-content/uploads/sites/04/2022/11/Live-Data-Brochure-2022.pdf, 5 pages.
Betradar Brochure MTS SDK Java Integration Guide—May 2019 accessed at https://sdk.sportradar.com/mts/java/file?g=998cd241-1182-4c30-9f54-697e6cadad7b on Feb. 18, 2023, 14 pages.
Betradar CTRL User Manual, Jul. 2019 accessed at https://insidectrl.com/wp-content/uploads/2019/09/Betradar_Ctrl_Manual_17_July_2019.pdf, on Feb. 16, 2023, 88 pages.
Betradar CTRL User Manual, Mar. 2021 access at https://insidectrl.com/help-manual/ on Feb. 16, 2023, 102 pages.
Betradar Live Channel Online, Dec. 31, 2022, 3 page.
Betradar Live Channel Trading, Dec. 31, 2022, 2 page.
Betradar Live Data Service—Efficiently Operate Your Own In-running trading, Dec. 30, 2022, accessed at https://www.betradar.com/betting-services/live-data-service/ on Feb. 16, 2023, 3 page.
Betradar Live Streaming Brochure 2019, accessed at https://betradar.com/wp-content/uploads/sites/4/2015/07/Live_Channel_Brochure_2019.pdf on Feb. 24, 2023, 7 pages.
Betradar Market-leading Sports Betting Services Product Brochure 2022, 23 pages.
Betradar Product Brochure 2015, 27 pages.
Betradar Product Brochure 2016, 29 pages.
Betradar Product Brochure 2018, 15 pages.
Betradar Product Brochure 2019, 36 pages.
Betradar Top Reasons to Use the New AV API, Jul. 31, 2019, accessed at https://www.betradar.com/news-archive/61-reasons-to-use-the-new-av-api/ on Feb. 24, 2023, 2 pages.
Betradar Unified Odds Feed—Quick Start Guide, May 16, 2018, accessed at https://insidectrl.com/wp-content/uploads/2018/05/UOF-Start-Guide.pdf on Apr. 13, 2023, 5 pages.
Betradar Unified Odds Feed—Quick Start Guide, May 30, 2022, accessed at https://iodocs.betradar.com/unifiedsdk/UOF_Start_Guide.pdf on Feb. 17, 2023, 6 pages.
Betradar Unified Odds—Integration Information for Development, Mar. 27, 2019 accessed at https://iodocs.betradar.com/unifiedsdk/Betradar_Unified-Odds_Developer_Integration.pdf on Feb. 16, 2023, 137 pages.
Betradar Unified Odds—Integration Information for Development, Oct. 11, 2017 accessed at https://insidectrl.com/wp-content/uploads/2017/10/2017-10-11_Betradar_Unified-Odds_Developer_Integration-1.pdf on Feb. 16, 2023, 80 pages.
Betradar's Live Channels. Betrader Brochure 2017, 7 pages.
Boolabus, Bring it to life with Betstream, Feb. 2011, 22 pages.
Common Match State Platform APIs GeniusSports Wiki Jul. 5, 2022, 2 pages.

(56) References Cited

OTHER PUBLICATIONS

Gammastack-Betradar Integration Architecture, Dec. 29, 2022 accessed at https://www.gammastack.com/betradar-integration/ on Feb. 16, 2023, 7 pages.
GammaStack-Betradar Integration Services, Betradar Software, Dec. 29, 2022, accessed at https://www.gammastack.com/betradar-integration-services/ on Feb. 17, 2023, 6 pages.
Genius Play Integration Guide, Drop and Play, GeniusSports Wike Website, Jul. 19, 2021, 7 pages.
Genius Sports Expands Partnership with NFL to Provide Watch & Bet Video Streams for the 2022 Season, Starting with Caesars Entertainment, BusinessWire, Dec. 5, 2022, 2 pages.
Genius Sports launches In-Play Multi Bet for the next generation of same game parlay bets Genius Sports Press, Oct. 5, 2022, 3 pages.
Genius Sports Live Sports Data Integration, GeniusSports Wiki, Jul. 5, 2022, 2 pages.
Genius Sports Live Sports Data Pull APIs, GeniusSports Wiki, Jul. 5, 2022, 2 pages.
Genius Sports Live Sports Data Push API via ably, GeniusSports Wiki, Nov. 28, 2022, 7 pages.
Genius Sports slashes cost and lowers latencies for last-mile live sports data delivery, Ably, Aug. 9, 2022, 8 pages.
GenusSports, Genius Sports Agrees to Official Data, Trading & LiveStreaming Partnership with Bally's Interactive, Aug. 25, 2022, 3 pages.
GL-Video-v2, GeniusSports Explorer API Website; accessed Mar. 10, 2023, 28 pages.
GL-Video-v3, Swagger, Feb. 2023, 9 pages.
HALPIN Introducing Extensions: A Streaming Revolution, Twitch, Aug. 31, 2017, 5 pages, obtain at website: https://blog.twitch.tv/en/2017/08/31/introducing-extensions-a-streaming-revolution-c31762addcd9/ on Jun. 7, 2023, 5 pages.
How Genius Sports delivers realtime data to their customers' frontend at speed and at scale, Webinar, May 2021, Ably, 3 pages.
How to Integrate It, GeniusSports Drop & Play Integration Guide, Nov. 28, 2022, 5 pages.

\* cited by examiner

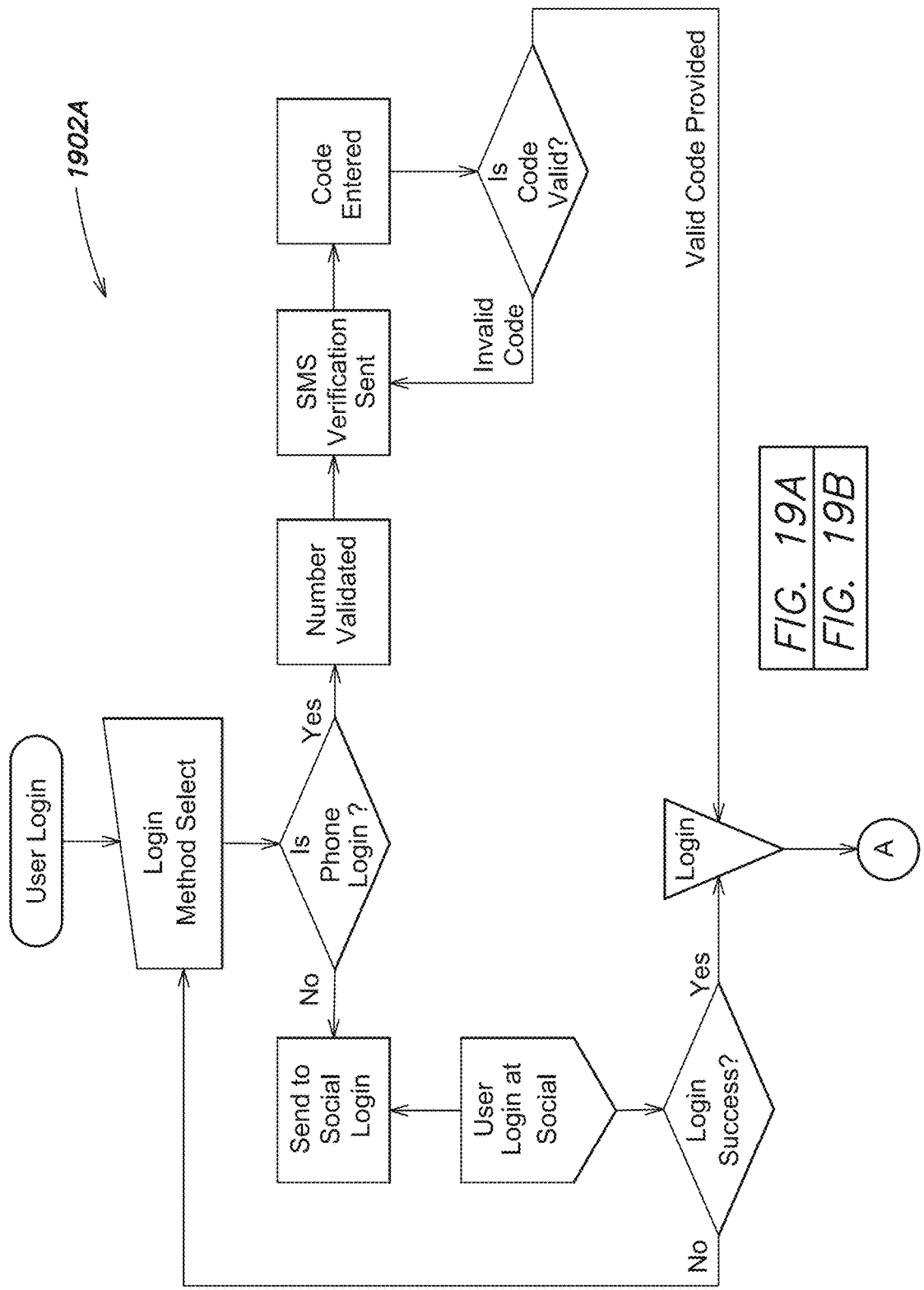

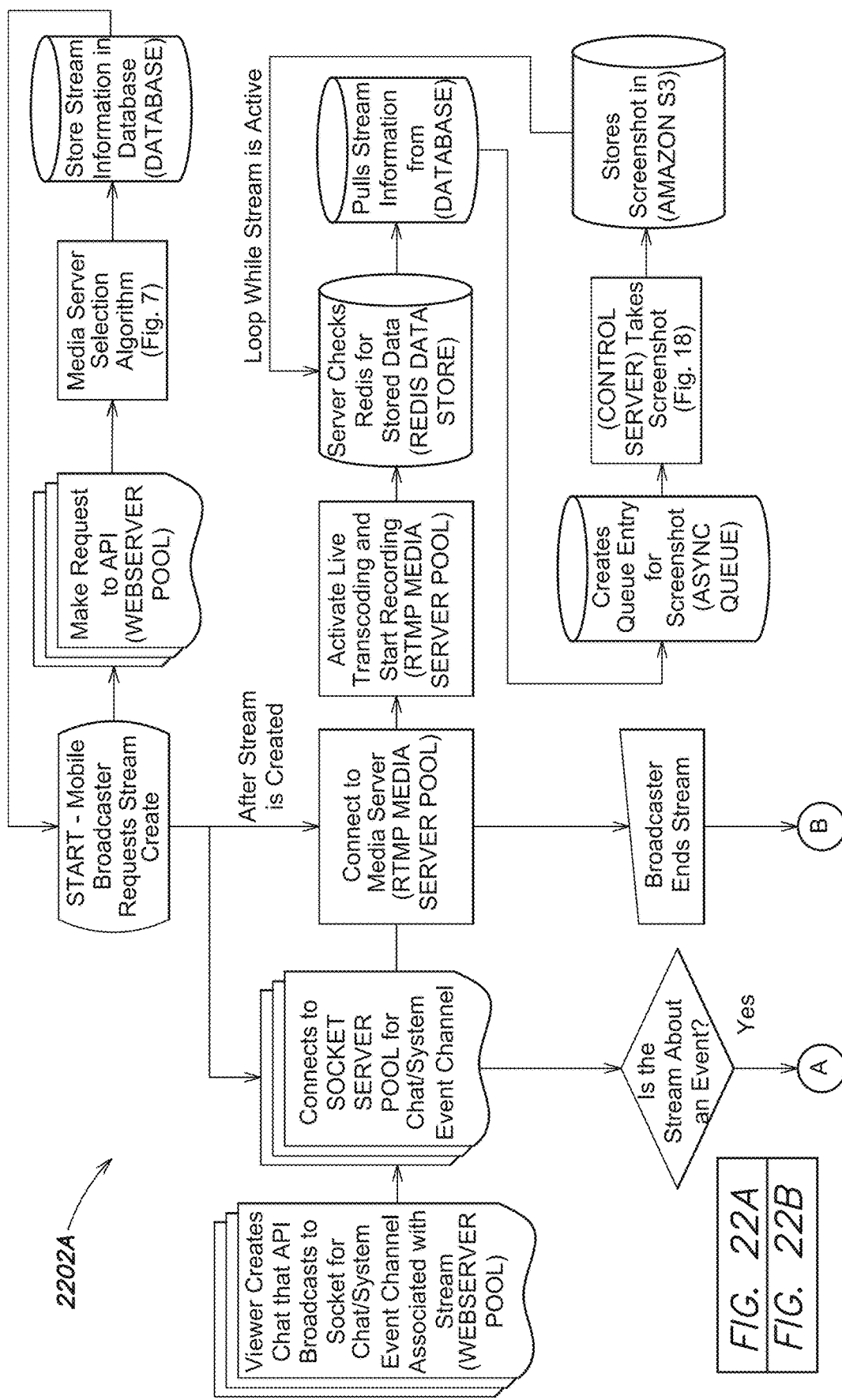

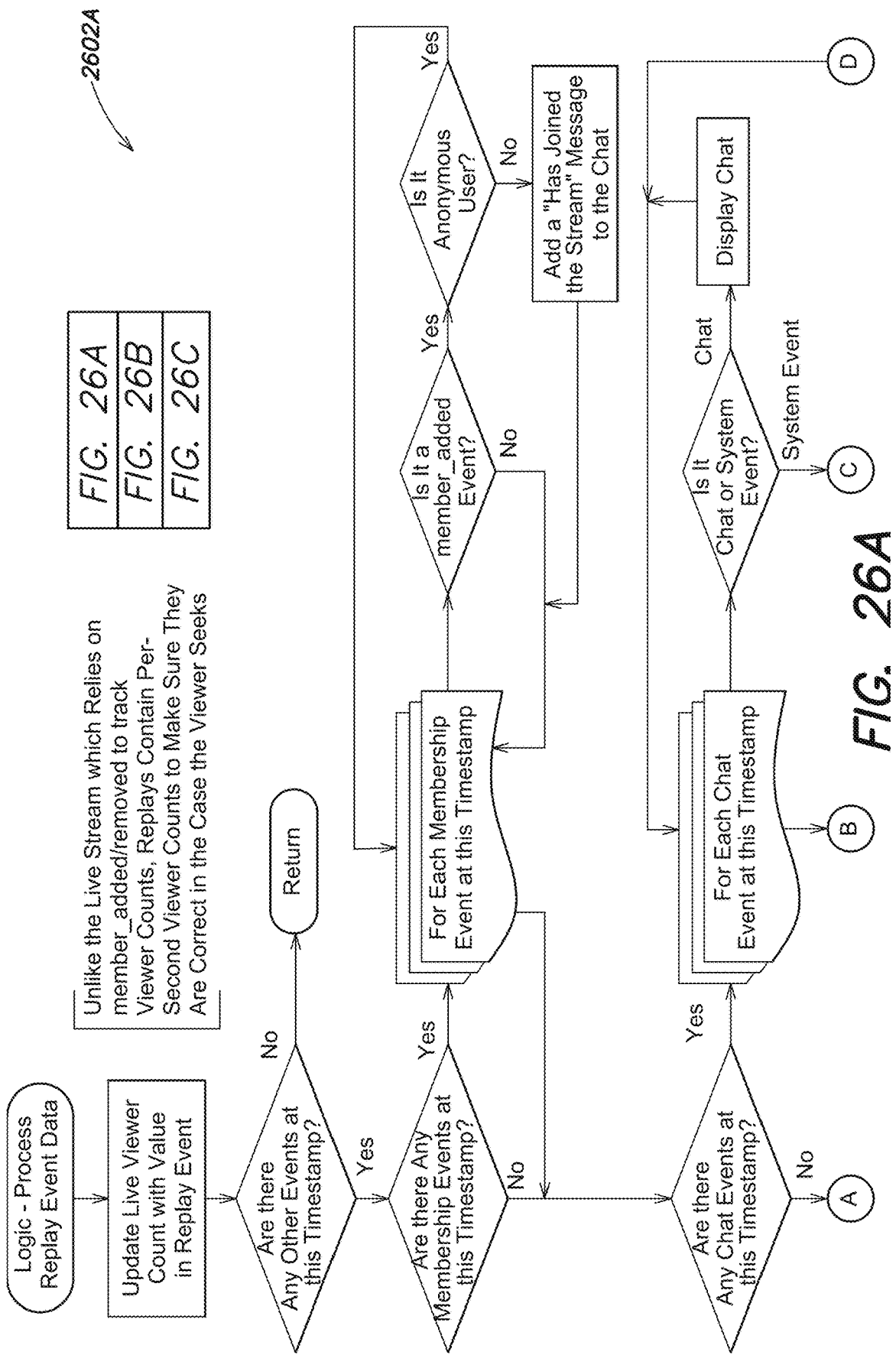

SYSTEMS, APPARATUS, AND METHODS FOR PROVIDING EVENT VIDEO STREAMS AND SYNCHRONIZED EVENT INFORMATION VIA MULTIPLE INTERNET CHANNELS

CROSS-REFERENCES TO RELATED APPLICATIONS

This application is a continuation application of U.S. non-provisional application Ser. No. 16/685,782, filed Nov. 15, 2019, entitled "Systems, Apparatus, and Methods for Scalable Low-Latency Viewing of Integrated Broadcast Commentary and Event Video Streams of Live Events, and Synchronization of Event Information with Viewed Streams via Multiple Internet Channels," which claims a priority benefit, as a bypass continuation application, to PCT Application No. PCTUS2018033016, filed May 16, 2018, entitled "Systems, Apparatus, and Methods for Scalable Low-Latency Viewing of Integrated Broadcast Commentary and Event Video Streams of Live Events, and Synchronization of Event Information with Viewed Streams via Multiple Internet Channels," which PCT application in turn claims a priority benefit to U.S. provisional application Ser. No. 62/627,859, filed Feb. 8, 2018, entitled "Systems, Apparatus, and Methods for Scalable Low-latency Viewing of Integrated Broadcast Commentary and Even Video Streams of Live Events, and Synchronization of Event Information with Viewed Streams via Multiple Internet Channels;" U.S. provisional application Ser. No. 62/542,729, filed Aug. 8, 2017, entitled "Systems, Apparatus, and Methods for Scalable Low-latency Viewing of Integrated Broadcast Commentary and Even Video Streams of Live Events, and Synchronization of Event Information with Viewed Streams via Multiple Internet Channels;" and U.S. provisional application Ser. No. 62/507,158, filed May 16, 2017, entitled "Systems, Apparatus, and Methods for Scalable Low-latency Viewing of Integrated Broadcast Commentary and Even Video Streams of Live Events, and Synchronization of Event Information with Viewed Streams via Multiple Internet Channels." Each of the foregoing applications is incorporated by reference herein in its entirety.

BACKGROUND

The public's access to the Internet, as well as the amount of bandwidth for Internet users, increased greatly in the mid-1990s to the early 2000s. The available Internet bandwidth allowed for the streaming of both recorded audio and recorded video content to a user's home. Also, additional increase of Internet access was sparked by the rise of the smartphone and the ability for smartphones to access the Internet on-the-go. In 2005, YouTube™ began to offer Internet users the ability to upload, edit, view, rate, share and comment on a wide variety of user-generated and corporate media video content. Examples of such content include video clips, television show clips, music videos, audio recordings, movie trailers, video blogs, short original videos, and educational videos. Within one year of its inception, YouTube™ reached 65 thousand daily video uploads, with 100 million daily views.

The first Internet live video streaming platform in the United States, aptly called Livestream, was launched in 2007. Livestream, as well as other nascent live video streaming platforms, were content agnostic, and over time Internet viewers desired more specialized, content-specific, and niche live video streaming platforms. To accommodate evolving viewer demand, various live video streaming platforms have launched since Livestream; examples of such more specialized platforms include Twitch.tv (a live video streaming platform for creative arts and gaming content, which launched in 2011), and musical.ly (a live video streaming platform designed for music video content, which launched in 2014).

Live video streaming platforms have also aimed to attract social network users, and social networking platforms have evolved to include live video streaming capabilities. For example, Twitch.tv includes social networking components, and in 2015 the social media platform Twitter acquired the live video streaming platform Periscope. Other social media platforms have followed suit, with both Facebook and Instagram implementing live video streaming capabilities into their mobile applications in 2016. The widespread use of smartphones enables users of these social media platforms to share live videos with their social network.

SUMMARY

In spite of the proliferation of live video streaming over the Internet, the Inventors have recognized and appreciated various technological problems in conventional techniques for transmission of digital content via the Internet that adversely impact the live video streaming viewer experience. One such technological problem relates to viewer "latency," i.e., the delay between a first user generating a live video stream for transmission via the Internet and a second user receiving a copy of the live video stream via the Internet for viewing. For example, the live video streaming platform Twitch.tv has a latency of approximately 15 seconds, and Facebook's live streaming platform has an average latency of approximately 10 seconds. Other technological challenges for live video streaming arising from shortcomings in conventional techniques, as recognized and appreciated by the Inventors, include, for example, the difficulties in providing relatively low latency copies of live video streams with relatively high quality (e.g., high definition HD and high bit rate, such as 2 to 5 megabits per second), synchronizing such low latency and high quality copies of a live video stream amongst multiple viewers (particularly as the number of viewers of a given live video stream significantly increases), and allowing for different classes or types of viewers to flexibly access copies of a live video stream via different live streaming formats (which may lead to different qualities of service).

With these various technological challenges in mind, the present disclosure relates generally to inventive systems, apparatus, and methods for facilitating one or more broadcasters to create/provide video and/or audio (also referred to herein as a "broadcast") and allow one or more viewers to consume the video and/or audio, either by receiving a copy of a live stream representing the video and/or audio essentially in real-time as created/provided by a given broadcaster, or by retrieving and playing a recording of the live stream at a later time. In the context of essentially real-time viewing of live streams, in various implementations the inventive systems, apparatus and methods discussed in detail herein address one or more technological problems relating to viewer latency, synchronization amongst different numbers of viewers, and providing scalable and flexible access to live streams to different classes/types of viewers and/or with different qualities of service.

With reference to FIG. 1A, in various implementations a given broadcaster uses a network-connected client device (e.g., a first smart phone or other personal computing device communicatively coupled to the Internet) to generate a live stream of digital content corresponding to the video and/or audio created/provided by the broadcaster, wherein the live stream is transmitted to an inventive server and memory storage architecture (additional details of the server and memory storage architecture are shown, for example, in FIGS. 2 and 3). The inventive server and memory storage architecture processes the broadcaster's live stream to generate multiple copies of the live stream which are provided to respective viewers, and also records the live stream and stores the recording for later replay. One or more viewers using different network-connected client devices (e.g., a second and third smart phone or other personal computing device communicatively coupled to the Internet) may communicatively couple to the server and memory storage architecture to receive a copy of the live stream of the digital content as a real-time or essentially real-time consumer of the broadcast created/provided by the broadcaster, or retrieve and play a recording of the live stream generated by the broadcaster client device (and recorded by the server and memory storage architecture). In some implementations, a given broadcaster themselves may view their own broadcast as a viewer on the same client device (e.g., by opening a separate tab on their client device and connecting to the server and memory storage architecture as both a broadcaster and a viewer). In one aspect, the inventive server and memory storage architecture allows any number of broadcasters to generate respective live streams of digital content, and any number of viewers to receive respective copies of a given broadcaster's live stream of digital content. In another aspect, the inventive server and memory storage architecture allows a given viewer of a first broadcaster's live stream to effectively switch in essentially real-time to view one or more other broadcasters' live streams.

In some implementations, the inventive systems, apparatus, and methods further facilitate a social platform in tandem with broadcasting video and/or audio to one or more viewers, in which a given broadcaster and their viewer(s) may communicate with one another (e.g., via chat messages) in essentially real-time during a broadcast. In one aspect, one or more chat messages, as well as various viewer-related information (e.g., name, surname, profile photo), may be displayed on respective client devices used by the broadcaster and the one or more viewers as the video and/or audio is rendered on the respective client devices.

In some implementations, the video and/or audio created/provided by one or more broadcasters is video-based commentary about a live event being observed by a given broadcaster. In various aspects, the broadcaster may take the role of a main commentator for the event, or a "color commentator" (e.g., analyst or summarizer) for the event; in a given role, the broadcaster may describe the event as it occurs (e.g., provide chronological or "play-by-play" updates to "call" the event), and/or may provide expert analysis, background or anecdotal information about the event and/or participants in the event, and/or relevant statistics regarding the event, participants in the event, or related events. FIG. 1B illustrates a display of an example client device, in which a broadcaster is providing video-based commentary about a sports game, and in which chat messages from one or more viewers, event information about the sports game, and other graphics and/or animations are displayed together with the broadcaster's video-based commentary.

Examples of various activities constituting events according to the present disclosure include, but are not limited to, a variety of sports games (e.g., professional, semi-professional, intramural, community-oriented) or sporting activities (e.g., exercise-related activities, physical training activities, fishing, hunting), musical performances, theatrical performances, other artistic or entertainment-oriented activities, speeches or presentations, political activities (e.g., election-related activities, campaign-related activities, public or "town hall" meetings, public marches or demonstrations), military activities, professional activities (e.g., meetings or conferences), academic or educational activities (e.g., academic presentations or lectures, research activities, medical or scientific procedures, ceremonies), cooking or baking activities, competitive activities (e.g., racing activities), game-related activities (e.g., online gaming, board games, chess matches, role-playing games), social activities, and news-related activities. In one aspect, the video-based commentary provided by one or more broadcasters about the event and consumed by one or more viewers may provide a "second screen" experience for the viewers; in particular, in some implementations, the viewers may consume the video-based commentary about the event on their respective client devices as they are watching the event itself on another device (e.g., a television), or watching and/or participating in the event at the event's venue.

As discussed in greater detail below, in various aspects the inventive systems, apparatus and methods described herein provide an improvement in computer network functionality by facilitating scalable and appreciably low-latency viewing of copies of multiple broadcasters' live streams of video-based commentary about an event by significant numbers of viewers as the event unfolds. Particularly in the context of a "second screen" experience relating to a live event, discernible delay between the observation of the event itself and a given broadcaster's video-based commentary would significantly undermine viewer experience. Accordingly, the inventive systems, apparatus and methods described herein specifically address multiple technological problems in conventional techniques relating to transport of digital content via the Internet by providing multiple technological solutions to ensure a low-latency viewing experience for significant numbers of viewers.

In such implementations relating to video-based commentary about events, the inventive systems, apparatus and methods disclosed herein further may facilitate display, on respective client devices used by the broadcaster and the one or more viewers, of various event information in tandem with the video-based commentary rendered on the respective client devices. For example, in connection with sports games, displayed event information may include, but is not limited to, one or more of team information (e.g., team names, abbreviations and/or logos), score information (e.g., with essentially real-time score updates synchronized with the video-based commentary), player information, venue information, game status information (e.g., on-base, at-bat, timeouts, fouls, pole position, yards-to-go, yards-to-goal, down), team statistics, player statistics and the like. In some implementations, such event information about a sports game may be rendered in the display of a client device as a "scorebug" that may include for example, team abbreviations or logos, team scores, game status (e.g., period, quarter, inning), and actual or elapsed time for the game, with updates to one or more information elements in essentially real-time as the game progresses. It should be readily appreciated that for other types of events, a wide variety of information germane to the event may be displayed as event information (e.g., with essentially real-time updates of evolving information as the event progresses) together with the rendering of the video-based commentary on respective client devices. In another aspect, various event information or other information germane to a given broadcaster's video-based commentary may be rendered on a viewer client device in a "lower third" (also sometimes referred to as a "bottom third") of a display (e.g., as an overlay to the video-based commentary).

In view of the foregoing, in other aspects the inventive systems, apparatus and methods described herein provide additional improvements in computer network functionality by facilitating scalable and appreciably low-latency synchronization of displayed event information with multiple broadcasters' live streams of video-based commentary about an event as viewed by significant numbers of viewers as the event unfolds. Particularly in the context of a "second screen" experience relating to a live event, discernible delay between the observation of the event itself and the status of event information displayed in tandem with a given broadcaster's video-based commentary would significantly undermine viewer experience. Accordingly, the inventive systems, apparatus and methods described herein specifically address multiple technological problems in conventional techniques relating to transport of digital content via the Internet by providing multiple technological solutions to ensure not only a low-latency viewing experience for significant numbers of viewers (e.g., relative to the event about which a broadcaster is providing video-based commentary), but appropriate synchronization of event information across all broadcasters of an event and their associated viewers.

In some implementations as discussed herein, these technological solutions contemplate multiple Internet communication channels to provide relevant and synchronized information to client devices (as would be readily appreciated in the relevant arts, a "communication channel" refers to a physical or logical connection over a transmission medium to convey information signals from one or more senders to one or more receivers). For example, in one implementation, a first "video" Internet communication channel (e.g., between a media server or other media source and a client device) conveys the digital content corresponding to the video-based commentary provided by the broadcaster and consumed by one or more viewers, and a second "event information" Internet communication channel (e.g., between a particular socket of a socket server and the client device) conveys the event information. In other implementations, an additional "chat/system event" Internet communication channel (e.g., between another socket of a socket server and the client device) is employed to convey chat information and other information relating to system events regarding a particular broadcaster's live stream. In one aspect, connections between client devices and a particular socket of a socket server are persistent authenticated connections, so that the number of users (broadcasters and viewers) connected to a particular socket (e.g., and currently watching a particular live stream and/or particular event) may be tracked.

In some implementations, the inventive systems, apparatus, and methods further facilitate a variety of screen animations (e.g., motion graphics), customized displays or screen backgrounds, and other special effects graphics (e.g., augmented reality) that are generally associated with the video and/or audio created by a broadcaster, and rendered by client devices in tandem with a given broadcaster's video and/or audio.

In some implementations in which the broadcaster may be creating/providing video and/or audio content about an event, one or more such screen animations, customized displays or screen backgrounds, and other special effects graphics may be related to some aspect of the event. For example, as noted above, a "scorebug" providing information about a sporting event may be presented on a viewer's display with a variety of motion or other special effects graphics. In one aspect, the information provided by such a scorebug is derived from the synchronized event information that is received by the client device on an event information Internet communication channel that is separate from the video content representing the video-based commentary. In another aspect, the scorebug and/or other special effects graphics or animations may be rendered in the display of the client device pursuant to execution of a client app or program on the client device (rather than having these display elements integrated into the broadcaster's live stream itself). In other aspects, one or more such screen animations and other special effects may be provided in a lower/bottom third of a client device's display, and may be interactive (e.g., in that a user of a client device may select or thumb-over an animation, special effect and/or scorebug to retrieve additional information and/or initiate other animations/graphics) and/or user-customizable (e.g., a broadcaster may select from one of multiple background displays so that they may appear to be in any of a variety of locations or venues, customize their video-based commentary with a broadcaster-generated lower third, and/or add create/provide introduction videos to be shown before their live stream begins).

In yet other aspects, screen animations, customized displays or screen backgrounds, and/or other special effects graphics may be related to one or more of advertising or branding (e.g., by sponsors of a broadcaster, sponsors of an event about which a broadcaster is providing commentary, participants in the event itself, etc.), premium features and digital gifts (e.g., provided by one or more viewers to one or more broadcasters or other viewers). For example, in some implementations, via a client app or software program executing on a client device, users will be able to purchase digital gifts for other users (e.g., a viewer following a particular broadcaster may purchase digital beers, various digital concession stand items, ticker tapes, penalty flags, etc.), and the digital gifts will appear in the broadcaster's profile and/or be represented on a display (e.g., as an icon or sprite) together with the broadcaster's video-based commentary. In one implementation, information regarding digital gifts may be communicated between client devices and the server and memory storage architecture via a chat/system event Internet communication channel associated with a given broadcaster's live stream of digital content.

In some implementations, the video and/or audio created/provided by one or more broadcasters may relate to various types of news, other types of current or past events, and various topics of interest about which a given broadcaster wishes to provide commentary. For example, a given broadcaster, or multiple broadcasters (which may be globally-distributed broadcasters, e.g., a first broadcaster in Europe, a second broadcaster in Africa, and a third broadcaster in Asia) may wish to broadcast about an ongoing, recent or past event (e.g., news about a bombing, a fire, an arrest, an economic development, a political or military development, or any of the other activities discussed above) or a particular topic of interest (e.g., healthy eating or dieting, gardening, religion, dating, politics, culture, art, music, playing a musical instrument, learning a language, auto repair, real estate, business, economics, legal issues, global warming, space exploration, a particular TV program or series, a particular entertainment or sports personality, video games, hobbies, etc.). As noted above, various event information regarding the ongoing, recent or past event (or particular topic of interest) may be provided to respective viewer devices, in tandem with the video-based commentary, in a variety of form factors and in a manner that ensures appropriate synchronization of event information across all broadcasters of an event and their associated viewers.

In yet other implementations, inventive systems, apparatus, and methods according to the present disclosure facilitate one or more broadcasters in providing video-based commentary regarding a live event, and combine the broadcaster's video-based commentary with an audio/video feed of the live event itself so as to generate an integrated live event and commentator stream. Multiple viewers interested in a particular broadcaster's commentary may receive synchronized copies of the integrated live event and commentator stream via a content delivery network that accesses the copy of live stream from a first media server endpoint corresponding to the live stream (e.g., according to a first live stream Internet URL). Respective viewer devices receiving copies of this live stream also connect to an event socket of a socket server (e.g., according to a first event socket Internet URL) to receive synchronized event information (e.g., real time scores) relating to the event. Based on the received copy of the integrated live event and commentator stream and the synchronized event information, a given viewer device displays the broadcaster's video-based commentary together with the audio/video of the live event itself, as well as the event information (e.g., as a "scorebug"), to provide a "single screen experience."

In some implementations relating to such a single screen experience, the event socket also may provide event broadcaster information relating to different broadcasters offering video-based commentary about the same live event. Respective viewers of the same live event may select amongst different broadcasters for the event, based on the event broadcaster information provided by the event socket, to access a different but synchronized integrated live event and commentator stream (e.g., according to a second live stream Internet URL associated with a different broadcaster). Thus, the event broadcaster information provides a seamless transition to a different broadcaster's commentary integrated with the audio/video of the live event. The viewer device may remain connected to the event socket to continue to receive the synchronized event information which is displayed together with the different broadcaster's commentary and the audio/video of the live event, as well as ongoing updates to event broadcaster information to keep abreast of different broadcasters that are providing video-based commentary about the event.

Thus, in various examples discussed in greater detail below, systems, apparatus, and methods are disclosed for obtaining, substantially in real time, via at least one communication interface over at least one network, an audio and/or visual feed generated by a broadcaster client device during at least one live event, wherein the audio and/or visual feed includes commentary associated with the at least one live event, and a separate event data feed including real time information associated with the at least one live event. The commentary and the real time information associated with the at least one live event are transmitted via at least one processor communicatively coupled to the at least one communication interface, so as to provide, substantially in real time, streaming content via the at least one communication interface over the at least one network to at least one display device for concurrent display of the commentary and a graphical ticker based on the real time information associated with the event. The disclosed systems, apparatus, and methods are enhanced tools for real-time broadcasting of user-generated content associated with one or more live events and community engagement that are unavailable from existing video hosting websites.

Glossary

USER: a person who interfaces, via a mobile app or web portal accessed on a client device communicatively coupled to the Internet, with one or more of the various servers and corresponding server functionality described herein.

REGISTERED USER: A user that provides profile information and validation credentials to establish a user account so as to access, via a login process using the validation credentials, the one or more of the various servers and corresponding server functionality described herein.

ANONYMOUS USER: A non-registered user that has access, without requiring a login process, to a limited feature set based on the server functionality described herein.

BROADCASTER: A registered user that creates/provides video and/or audio (also referred to herein in some instances as "video-based commentary") for consumption by one or more viewers.

EVENT: An activity about which a broadcaster may create/provide video and/or audio as the activity occurs (i.e., in "real-time"). Examples of activities constituting events according to the present disclosure include, but are not limited to, a variety of sports games (e.g., professional, semi-professional, intramural, community-oriented) or sporting activities (e.g., exercise-related activities, physical training activities, fishing, hunting), musical performances, theatrical performances, other artistic or entertainment-oriented activities, speeches or presentations, political activities (e.g., election-related activities, campaign-related activities, public or "town hall" meetings, public marches or demonstrations), military activities, professional activities (e.g., meetings or conferences), academic or educational activities (e.g., academic presentations or lectures, research activities, medical or scientific procedures, ceremonies), cooking or baking activities, competitive activities (e.g., racing activities), game-related activities (e.g., online gaming, board games, chess matches, role playing games), social activities, and news-related activities. Video and/or audio created/provided by a broadcaster about an event may be referred to herein as "video-based commentary." In some implementations, the video and/or audio created/provided by one or more broadcasters may relate to various types of news, other types of current, recent or past events, and various topics of interest about which a given broadcaster wishes to provide commentary (e.g., news about a bombing, a fire, an arrest, an economic development, a political or military development, or any of the other activities discussed above, healthy eating or dieting, gardening, religion, dating, politics, culture, art, music, playing a musical instrument, learning a language, auto repair, real estate, business, economics, legal issues, global warming, space exploration, a particular TV program or series, a particular entertainment or sports personality, video games, hobbies, etc.).

VIEWER: A registered user or anonymous user that consumes video and/or audio created/provided by a broadcaster, via essentially real-time access to a live stream of digital content representing the video and/or audio, or via retrieval and playing of a recording of the live stream of digital content.

LIVE STREAM: Digital content (e.g., digital video and/or digital audio) that is transferred between at least two network-connected devices in real-time or essentially realtime as the corresponding video and/or audio codified as the digital content is created/provided by a broadcaster. Thus, a network-connected client device used by the broadcaster may generate a live stream of digital content corresponding to the video and/or audio created/provided by the broadcaster, and a viewer using a different network-connected client device may receive a copy of a live stream of the digital content as a real-time or essentially real-time consumer of the video and/or audio created/provided by the broadcaster. In some implementations, the video and/or audio created/provided by the broadcaster and represented in a live stream may be video-based commentary relating to an event. A live stream of digital content may have a variety of data formats (e.g., H.264 MPEG-4 Advanced Video Coding video compression; VP8 video compression) and transmission protocols, including persistent/continuous streaming transmission protocols (e.g., real time streaming protocol "RTSP;" real time messaging protocol "RTMP;" web real-time communication "WebRTC"), as well as segmented and/or adaptive bitrate (ABR) protocols (e.g., Apple's HTTP Live Streaming "HLS;" Microsoft's HTTP Smooth Streaming "MSS;" Adobe's HTTP Dynamic Streaming "HDS;" standards-based ABR protocol "MPEG-DASH").

FOLLOWER: A registered user who is notified when a particular broadcaster is online.

SUBSCRIBER: A follower of a particular broadcaster that has paid for access to additional features and/or content not available to a follower (e.g., subscriber-specific chat channels).

VIP MEMBER: an admin-designated registered user that has additional access rights and high priority access to live stream media servers.

MEDIA MEMBER: an admin-designated registered user that is a media professional. In some implementations, the media member designation is used during some live streams to facilitate filtering and prioritization of comments/chat message for response by the broadcaster of the live stream.

ADMIN USER: a staff account flagged with administrative powers.

PRIVATE PROFILE: a profile for a user that has designated their content as private, only allowing direct link access to live/replay streams and archive access to broadcasters that the user has followed.

RAW VIDEO: A recording made by a media server of a live stream generated by a broadcaster. In one example implementation in which a broadcaster client device generates a video stream in H.264/AAC format and the media server is a Real Time Messaging Protocol (RTMP) media server, the raw video is produced by the RTMP media server by recording the broadcaster's live stream directly (to provide a 720p high definition feed or even higher definition feed). In another example in which a broadcaster client device generates a video stream in VP8/WebRTC format and the media server is a WebRTC media server, the WebRTC media server first transcodes the live stream from the broadcaster into a H.264 720p high definition (or even higher definition feed) and then records the transcoded feed to provide the raw video.

APPENDIX A includes a YAML file associated with an Application Program Interface (API) employed in connection with at least some of the inventive implementations disclosed herein.

It should be appreciated that all combinations of the foregoing concepts and additional concepts discussed in greater detail below (provided such concepts are not mutually inconsistent) are contemplated as being part of the inventive subject matter disclosed herein. In particular, all combinations of any claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 19A and 19B show a process flow diagram illustrating a user login process according to one inventive implementation, which in some examples may be performed by a client device and facilitated by one or more web servers shown in FIGS. 2 and 3.

FIGS. 22A and 22B show a communication flow diagram illustrating process flow elements and the server and/or memory storage devices involved in the communication flow for the processes shown in FIGS. 20A and 20B, and FIGS. 21A-21E, according to one inventive implementation.

FIGS. 26A, 26B, and 26C show a process flow illustrating an event data replay process called in the method of FIGS. 25A, 25B and 25C, according to one inventive implementation.

DETAILED DESCRIPTION

Figure 1A:
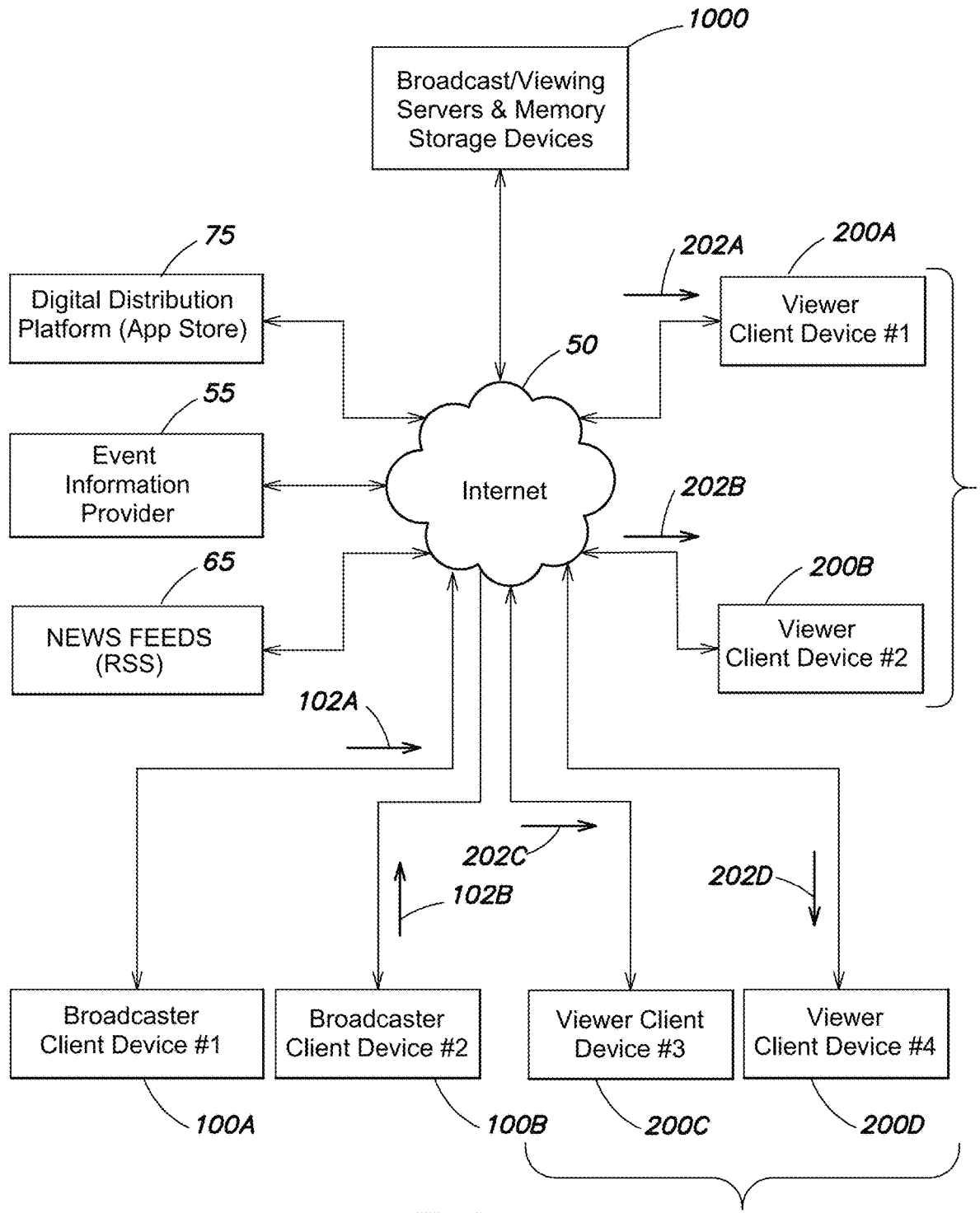
FIG. 1A is a block diagram showing respective elements of a system to facilitate live streaming of digital content (video and/or audio) from multiple broadcasters to multiple viewers, according to some inventive implementations.

Following below are more detailed descriptions of various concepts related to, and implementations of, inventive systems, methods and apparatus for scalable low-latency viewing of broadcast digital content streams of live events (including integrated broadcast commentary and event audio/video streams of the live event itself), and synchronization of event information with viewed streams, via multiple Internet channels. It should be appreciated that various concepts introduced above and discussed in greater detail below may be implemented in various manners, and that examples of specific implementations and applications are provided primarily for illustrative purposes.

I. Overview

The present disclosure describes inventive systems, apparatus, and methods for connecting followers of live events (e.g., sports, performances, speeches, etc.), including commentators, spectators, and/or participants in live events (e.g., athletes, performers, politicians, etc.). In some example implementations, the inventive systems, apparatus and methods further provide a social platform for sharing and contributing multimedia associated with live events.

Live streaming is used herein to refer to delivery and/or receipt of content in real-time, as events happen, or substantially in real time, as opposed to recording content to a file before being able to upload the file to a media server, or downloading the entire file to a device before being able to watch and/or listen to the content. Streaming media is used herein to refer to multimedia (e.g., digital video and/or audio media) that is delivered between two or more network-connected devices in real time or substantially in real time. Streaming may apply to continuously updated media content other than video and audio including, but not limited to, a live ticker, closed captioning, and real-time text. An end-user (e.g., a viewer) may watch and/or listen to media streamed over a network (e.g., the Internet) using a user output interface such as a display and/or over a speaker communicatively coupled with, for example, a desktop computer, notebook or laptop computer, smart television, set-top box, Blu-ray™ player, game console, digital media player, smartphone (e.g., iOS or Android), or another network-connected interactive device.

In some implementations, a network platform receives and provides multimedia (e.g., digital video content and/or digital audio content) associated with a live event. The multimedia may be captured by one or more broadcasters present at the live event. A broadcaster present at the live event may stream video and/or audio content to the network platform in real time or substantially in real time during the live event. For example, a broadcaster may capture video of a sporting event, such as a local high school football game, using a video camera, smartphone camera, etc. The video may include audio and/or visual commentary from the broadcaster. One or more viewers (either present or not present at the event) may stream video and/or audio of the event to watch and/or listen in real time or substantially in real time during the live event to the broadcaster's commentary. Alternatively, a broadcaster present at the live event may record video and/or audio content for delayed streaming or uploading to the network platform during or after the live event, and a viewer may download the broadcaster's recording of the live event and the video and/or audio commentary for delayed viewing and/or listening.

In some implementations, a broadcaster may or may not be present at a live event to still generate multimedia content (broadcaster commentary) associated with the event during the event. For example, a broadcaster may generate audio or visual content about the event while simultaneously following the event via a live broadcast by a third party (e.g., television, radio, Internet, etc.). The multimedia content may or may not include or be integrated with video and/or audio from the event itself.

In some implementations, a network platform is capable of integrating user-generated (broadcaster-generated) multimedia with real-time data (e.g., "event information") collected by the user or a third party. For example, a live competitive event may be integrated with scores for the event. Other real-time data may include but is not limited to alerts, statistics, trivia, polls, news, broadcaster and/or viewer messages, and/or advertising associated with or relevant to the event, a participant in the event, a location of the event, a date/time of the event, etc. In one implementation, a network platform allows a user to select content, for example, news articles, and create onscreen elements for simultaneous viewing of the content.

Audio and/or visual indications and content may be integrated with user-generated multimedia for simultaneous presentation. The presentation may be in real-time or substantially in real-time. For example, audio indications may be presented with digital video media, and/or visual content may be presented with digital audio media. In some implementations, audio and/or visual indications and content are presented simultaneously with digital audio and/or video media using multiple tracks and/or display frames or overlays. For example, digital video media of a basketball game or of a broadcaster providing play-by-play audio commentary for the game may be displayed with an overlay of a real-time scoreboard and/or ticker. Alternatively, the real-time scoreboard and/or ticker may be presented in a separate frame.

Audio and/or visual indications and content may be modifiable and/or interactive. For example, traditional news and sports broadcasting may insert audio and/or visual indications and content into an outgoing digital audio and/or video media stream. The receiving client devices have been assumed to be "dumb," that is, only capable of displaying the audio and/or video media as received. In contrast, in inventive implementations disclosed herein "smart" client devices allow audio and/or visual indications and content to be rendered on the client side, which allows for real-time modification and interaction with viewers and/or listeners. That is, client-side rendering allows for interactivity with elements and enhanced features not available to traditional broadcasting.

FIG. 1A is a block diagram of a system according to one inventive implementation, including multiple client devices (e.g., broadcaster client devices 100A and 100B, viewer client devices 200A, 200B, 200C and 200D), broadcast/viewing servers and memory storage devices 1000 (e.g., serving as the network platform noted above), an event information provider 55, one or more news feeds (RSS feeds) 65, and a digital distribution platform (app store) 75 all communicatively coupled via the Internet 50. Each of the client devices 100A, 100B, 200A, 200B, 200C, 200D may download from the digital distribution platform 75 an app or software program that becomes resident on the client device (i.e., a client app) and performs at least some of the various broadcaster and viewer functionality described herein in connection with broadcasting live streams of digital content and viewing copies of broadcasted live streams, exchanging chat messages amongst broadcasters and one or more viewers, logging system events and providing system event messages to broadcasters and viewers, collecting and maintaining/updating event information and providing event information to broadcasters and viewers in a synchronized manner, providing and updating various animation and special effects graphics, and replaying of recorded streams.

Although FIG. 1A illustrates two broadcaster client devices and four viewer client devices, it should be appreciated that various numbers of client devices (broadcaster client devices and viewer client devices) are contemplated by the systems, apparatus and methods disclosed herein, and those shown in FIG. 1A are for purposes of illustration. More specifically, a given broadcaster may have virtually any number of viewers using respective viewer client devices to receive copies of the broadcaster's live stream of digital content via the servers and memory storage devices 1000; similarly, the system may accommodate virtually any number of broadcasters providing live streams of digital content to the servers and memory storage devices 1000, wherein each broadcaster has multiple viewers receiving copies of the broadcaster's live stream of digital content. In the example shown in FIG. 1A, a first broadcaster client device 100A provides a first live stream of digital content 102A, and a first plurality of viewer client devices 200A and 200B (grouped by a first bracket) receive respective copies 202A and 202B of the first broadcaster's live stream of digital content. Similarly, a second broadcaster client device 100B provides a second live stream of digital content 102B, and a second plurality of viewer client devices 200C and 200D (grouped by a second bracket) receive respective copies 202C and 202D of the second broadcaster's live stream of digital content. With respect to events or news that may be germane to a given broadcaster's live stream of digital content, the broadcast/viewing servers and memory storage devices 1000 may retrieve various event information from the event information provider 55 (e.g., STATS LLC), and various news from news feeds (RSS) 65, and in turn convey various event information and/or news to one or more client devices.

As discussed in further detail below, a variety of digital content format and transmission protocols are contemplated herein for the broadcaster live streams 102A and 102B output by the broadcaster client devices 100A and 100B respectively, as well as the copies of the live streams 202A, 202B, 202C and 202D received by respective viewer client devices 200A, 200B, 200C and 200D. For example, the first broadcaster client device 100A may be a mobile broadcaster client device (e.g., a smartphone) and output a live stream of digital content 102A having an H.264 MPEG-4 Advanced Video Coding (AVC) video compression standard format, via real time messaging protocol (RTMP) transport for continuous streaming over the Internet (e.g., via a persistent connection to a first media server of the servers and memory storage devices 1000). The second broadcaster client device 100B may be a web-based device (e.g., a desktop computer) and output a live stream of digital content 102B having a VP8 video compression format, transmitted via the web real-time communication (WebRTC) protocol for continuous streaming over the Internet (e.g., via a persistent connection to a second media server of the servers and memory storage devices 1000). The copies of the live streams 202A, 202B, 202C and 202D may be transmitted by the servers and memory storage devices 1000 as continuous streams using RTMP or WebRTC, or using segmented and/or adaptive bitrate (ABR) protocols (e.g., Apple's HTTP Live Streaming "HLS;" Microsoft's HTTP Smooth Streaming "MSS;" Adobe's HTTP Dynamic Streaming "HDS;" standards-based ABR protocol "MPEG-DASH").

Figure 1B:
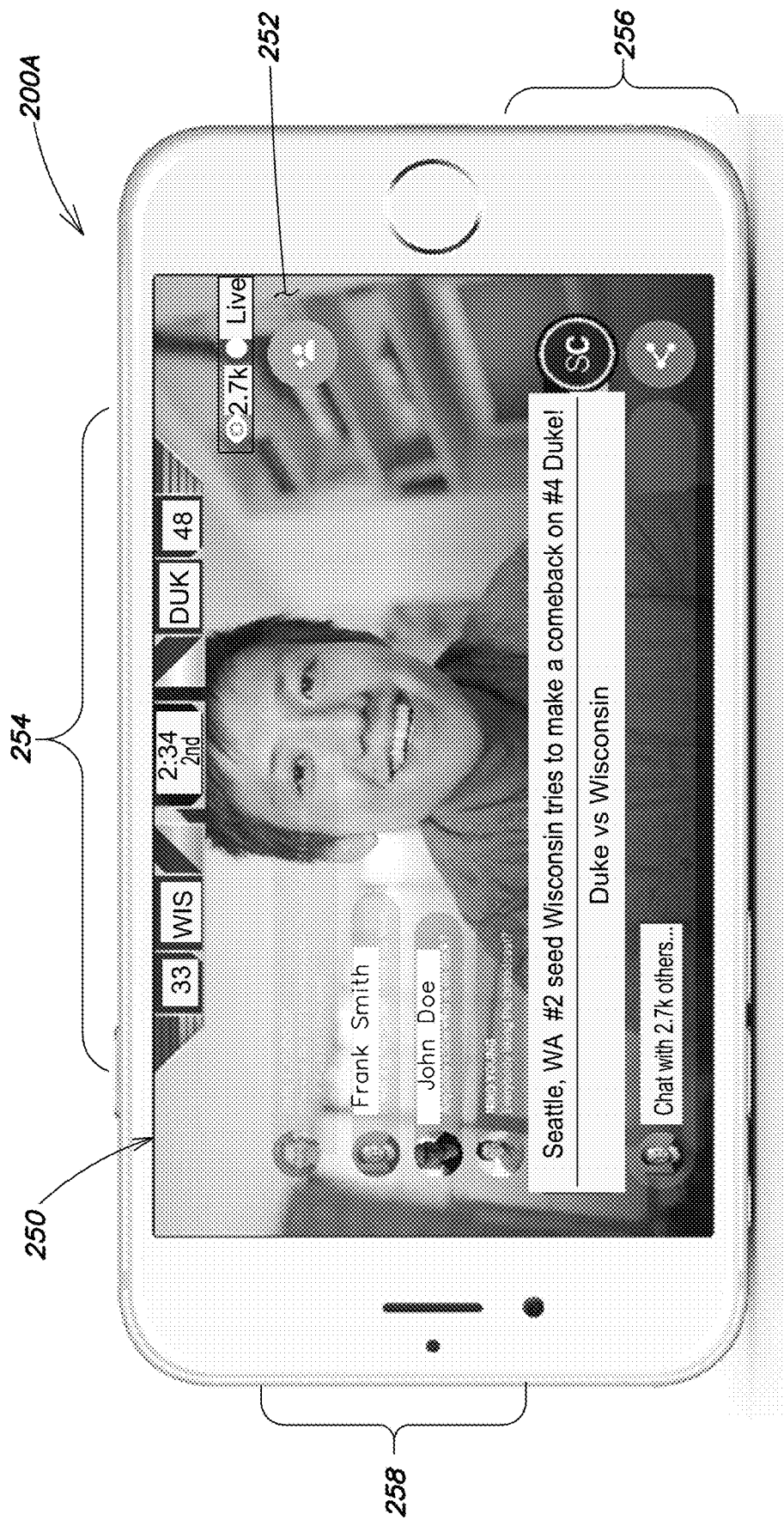
FIG. 1B illustrates a display of an example client device in the system of FIG. 1A, showing various displayed content according to some inventive implementations.

FIG. 1B illustrates a display 250 of an example viewer client device 200A in the system of FIG. 1A, showing various displayed content according to some inventive implementations. It should be appreciated that one or more elements of the various content discussed in connection with FIG. 1B similarly may be provided on the display of a broadcaster client device. In the example of FIG. 1B, a broadcaster is providing video-based commentary relating to a live sporting event, and the display 250 of the viewer client device 200A includes various content elements including the broadcaster's video-based commentary 252, event information 254 relating to the live sporting event about which the broadcaster is providing the video-based commentary, chat messages 258 from one or more viewers consuming the broadcaster's video-based commentary, and various graphics, special effects and/or animation elements 256 (e.g., some of which are rendered in a "lower third" of the display 250).

More specifically, as shown in FIG. 1B, the client device 200A renders in the display 250 (pursuant to execution of a client app or software program) a first broadcaster's video-based commentary 252. As discussed above in connection with FIG. 1A, the first broadcaster's video-based commentary 252 is codified in a live stream of digital content 102A provided by the first broadcaster client device 100A to the servers and memory storage devices 1000, and a copy 202A of the first broadcaster's live stream is received by the viewer client device 200A from the servers and memory storage devices 1000. The display also includes event information 254 in the form of a "scorebug," wherein the scorebug includes indicators for the teams participating in the live sporting event, score information for the live sporting event, and event status (e.g., time clock, period or quarter, etc.). In various implementations discussed in further detail below, the scorebug may be animated, may include one or more special effects graphics elements, and/or may be interactive (e.g., the viewer may press or thumb-over one or more portions of the scorebug to launch further graphics or animations, receive additional information about the live sporting event, or navigate to another Internet location to receive additional information relating to the live sporting event).

The display 250 in FIG. 1B also includes lower-third content 256 comprising additional graphics, special effects and/or animation elements which similarly may be interactive; such elements may include a broadcaster-selected title for the broadcast, as well as text commentary from the broadcaster or event-related news. Additionally, as shown in the left portion of the display 250, the display may include one or more chat messages 258 from different viewers of the broadcaster's video-based commentary, including responses from the broadcaster themselves; as seen in FIG. 1B, the chat messages 258 may include the name of the viewer, a viewer photo, and the chat message content itself.

In some implementations, the network platform provided by the servers and memory storage devices 1000 maintains user profiles for broadcasters and viewers. Each user profile may be associated with, for example, a user email address, user device, or other unique identifier. Each user profile interface (e.g., "page" such as a webpage) may include and/or be customized with content (e.g., a profile photo, descriptive text, user-generated multimedia, favorite team imagery, etc.). In some implementations, the network platform further allows for the creation of "team" profiles; for example, event participants (e.g., individuals, groups, parties, teams, bands, schools, etc.) may share a "team" profile, wherein the team profile interface (e.g., "page" such as a webpage) may aggregate relevant content (e.g., news or current events about a particular event or team, such as polls, trivia, photo galleries, etc.) and provide further opportunities for users to contribute and connect with each other. The network platform may provide user preference options to further define a team profile interface with recommendations and/or alerts specific to a particular user (e.g., to prominently feature recent activity of a particular user).

With respect to social media-related features, as noted above the network platform provides chat capabilities such that users may engage in live public and/or private chat sessions. For example, in some implementations, users may request permission (or be allowed) to send each other private and/or public messages (e.g., direct messages). Furthermore, users may be able to purchase private and/or public virtual gifts (e.g., digital images of beers, penalty flags, etc., or profile/content enhancements like ticker tape) or provide "sponsorships" for other users. Public gifts received by a user may be displayed on the user's profile and/or with his or her content.

In some implementations, users are able to publicly and/or privately comment on, rate, "like," or otherwise indicate their opinions on live events, event-associated topics, user profiles, team profiles, and user-generated content. Users may be able to use # hashtags within their messages, chat sessions, comments, and/or other activity to link to messages, chat sessions, comments, and/or other activity happening among other users and/or teams. Users may be able to use @ symbols within their messages, chat sessions, comments, and/or other activity to tag other users, event participants, and teams.

In some implementations, a network platform provides a directory of live events. The directory interface may be presented as a listing, drop-down menu, keyword search bar, etc. The directory interface may include and/or distinguish between different categories of events. For example, the directory interface may include and/or distinguish between events that are scheduled, underway, and/or completed. The directory interface also may include and/or distinguish between different or particular types of events (e.g., live sports versus live music, baseball versus hockey, professional versus collegiate, National League versus American League, etc.); different or particular participants in the events (e.g., team, coach, athlete, owner, school, etc.); and/or different or particular locations of the events (e.g., country, region, state, county, town, district, etc.). As discussed in greater detail below, in one implementation a dedicated control server of the network platform periodically retrieves a variety of event information from one or more event information providers (e.g., for sports events, ESPN, STATS LLC), and populates a database of the network platform with information on available events so as to provide the directory of live events to a user.

In some implementations, the network platform may provide user preference options to further define an event directory interface with recommendations and/or alerts specific to a particular user. The network platform may request the location of a user or permission to access the geolocation of the user's device in order to recommend events nearby. The network platform may track and interpret patterns in the user's use of the platform to predict and recommend events specific to the user.

In some implementations, after a user selects an event, the network platform provides a directory of other users who are present at the event and/or generating media associated with the event. The directory interface may be presented as a listing, drop-down menu, keyword search bar, etc. Selection of another user from the event-specific directory allows connection to, communication with, and/or access to media generated by that user. Thus, a user is able to discover and connect with similar users. The network platform may provide user preference options to further define a user directory interface with recommendations and/or alerts specific to a particular user. For example, in some implementations, users can discover other users based in part on one or more of the location of respective users, an event about which the broadcaster is providing commentary, a title of a broadcaster's live stream, and topics or other users that have been identified (e.g., in chat messages relating to a given broadcaster's live stream and/or a particular user's profile, using # hashtags or @ symbols).

In some implementations, the popularity of an event and/or broadcaster is monitored, displayed, and/or used in real-time or substantially in real-time. For example, a number of video servers may be scaled based on demand and/or usage by client devices, including broadcasters and/or viewers. Worker servers may be used for distributed monitoring and capturing screenshots/thumbnails of video streams. In another example, client media source selection of live stream copies, such as Real-Time Messaging Protocol (RTMP) versus HTTP Live Streaming (HLS), may be based on demand and/or usage levels (e.g., number of viewers requesting copies of a given broadcaster's live stream, capacity of media servers and/or content delivery network).

II. Servers and Memory Storage Devices

Figure 2:
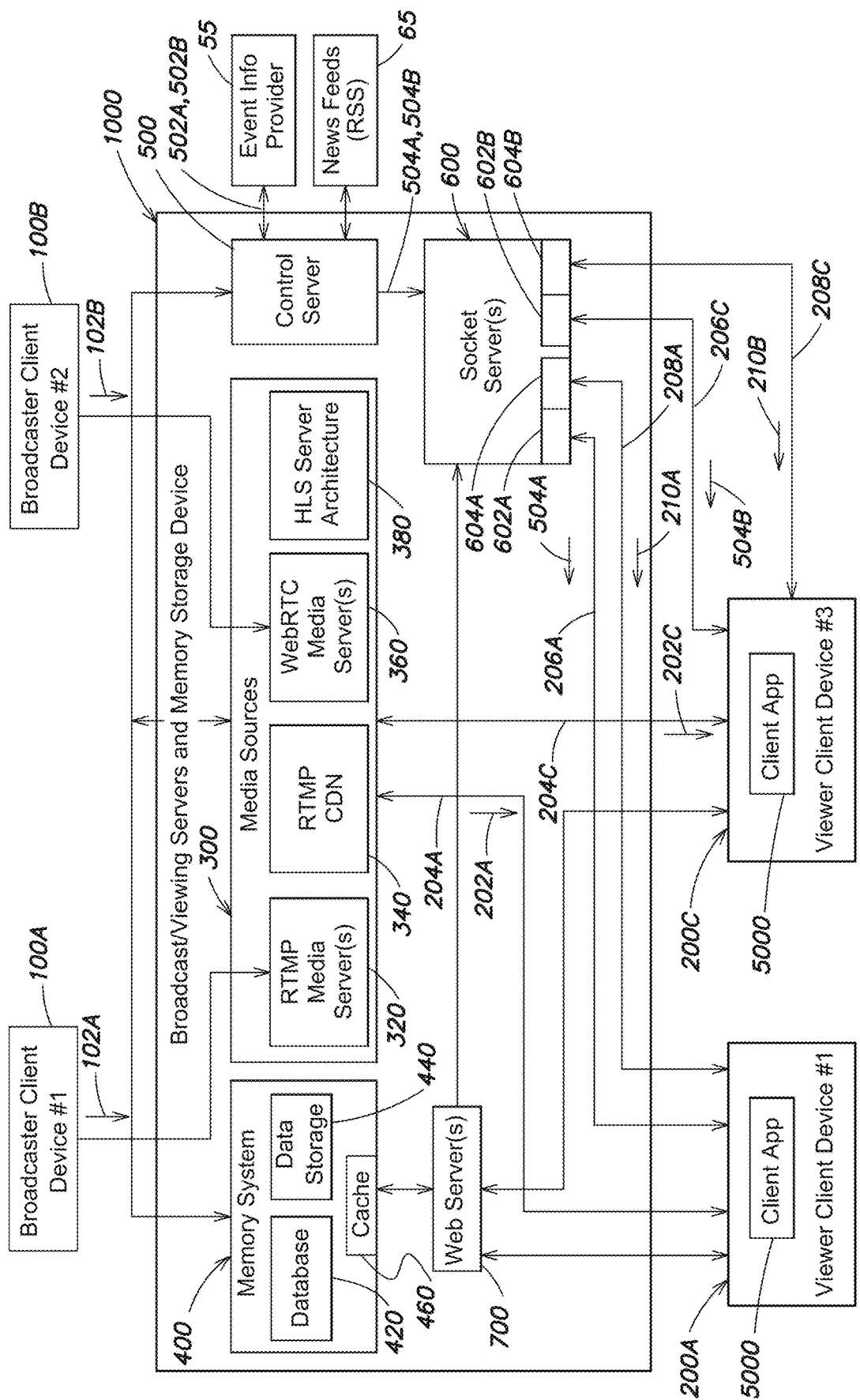
FIG. 2 is a block diagram of the broadcast/viewing servers and memory storage devices shown in FIG. 1A according to some inventive implementations.

Having provided an overview of the information flow and general functionality enabled by the various elements shown in FIG. 1A, additional details of the servers and memory storage devices 1000 are now discussed, with reference initially to FIG. 2.

In particular, FIG. 2 is a block diagram providing another perspective of the system shown in FIG. 1A, showing example communication connections between the broadcaster client devices 100A and 100B and the servers and memory storage devices 1000, example connections between the servers and memory storage devices 1000 and the viewer client devices 200A and 200C, and some structural details of the servers and memory storage devices 1000. Some of the broadcaster/viewer client devices that are mobile devices (e.g., smartphones) have downloaded a client app 5000 (e.g., from the digital distribution platform or app store 75 shown in FIG. 1A) which is resident in memory of the client device and executed by a processor of the client device. For purposes of simplifying the illustration, only the viewer client devices 200A and 200C explicitly show the client app 5000 resident on the client devices; it should be appreciated, however, that one or more mobile broadcaster client devices also have the client app 5000 installed thereon.

As shown in FIG. 2, in one inventive implementation the servers/memory storage devices 1000 include one or more web servers 700 (also referred to herein as a "web server pool") that support an Applications Programming Interface (API) to facilitate communications between the servers/memory storage devices 1000 and one or more mobile broadcaster/viewer client device executing the client app 5000, and also facilitate communications to and from web-based client devices (that access the web server(s) via a web portal at a particular URL). In this role, as discussed in further detail below, much of the instructive communication between the client devices and the servers/memory storage devices 1000 occurs via the web server(s) 700. For example, it is via the web server(s) 700 that client devices create new live streams for broadcast and get access to media servers, receive access to view other broadcasters' live streams via one of multiple different media sources, receive event information associated with broadcasters' live streams and send and receive chat messages, log on and create or update user profiles (or other profiles such as team profiles), and access other social media-related functionality (e.g., digital gift giving) to interact with other users. The web server(s) 700 are communicatively coupled to a memory system 400 that includes a database 420, data storage 440, and one or more memory caches 460 to store various information (e.g., user profile information, stream information, event information, recorded live streams, etc.) germane to the operation of the servers and memory storage devices 1000 and the various client devices.

The servers/memory storage devices 1000 further comprise a plurality of media sources 300 (e.g., computer servers including one or more processors, memory, and one or more communication interfaces) that receive a live stream of video-based commentary from a given broadcaster client device, and provide copies of the live stream of video-based commentary to one or more viewer client devices. As shown in FIG. 2, in one implementation the media sources 300 are communicatively coupled to the memory system 400, and may comprise one or more Real Time Messaging Protocol (RTMP) media servers 320, an RTMP Content Delivery Network (CDN) 340 (which itself includes a plurality of content delivery network servers), one or more WebRTC media servers 360, and an inventive HTTP Live Streaming (HLS) caching and amplifying server architecture 380. Additional details of the media sources 300 are discussed below in connection with FIGS. 3 through 6, and particular details of media server processes (performed by the RTMP media servers 320 and the WebRTC media servers 360) are discussed below in connection with FIGS. 5A, 5B and 5C. As also discussed below, in one implementation the web server(s) 700 select a particular media server of the media sources 300 to which a given broadcaster connects to provide the broadcaster's live stream of digital content, and the web server(s) 700 also select a particular media source of the media sources 300 to which a given viewer connects to receive a copy of a given broadcaster's live stream; further details of a broadcast media server selection algorithm and a viewer stream source selection algorithm implemented by the web server(s) 700 are provided below in connection with FIGS. 6 and 7.

The servers/memory storage devices 1000 shown in FIG. 2 further comprise a control server 500 coupled to the memory system 400, the event information provider 55, and the news feeds (RSS) 65 (e.g., via the Internet). In one aspect, the control server 500 periodically retrieves various event information from the event information provider 55 and/or news from the news feeds 65 that is germane to respective broadcasters' video-based commentary. In another aspect, the control system 500 may store at least some portion of retrieved event information and/or news in the memory system 400. More generally, as discussed below in connection with FIG. 10, the control server 500 implements a number of services/processes that govern functionality of other servers and devices in the servers/memory storage devices 1000; examples of such control system services/processes include, but are not limited to: an RTMP media server scaling process to add or remove servers from the one or more RTMP media servers 320 of the media sources 300 (see FIG. 11); an RTMP CDN server scaling process to add or remove servers from the RTMP CDN 340 of the media sources 300 (see FIG. 12); a live stream and media server watchdog process (see FIGS. 13-14); an event data ingress process (see FIG. 15); a live event data monitor process (see FIG. 16); an asynchronous task processor (see FIG. 17); and a live stream thumbnail/screenshot acquisition process (see FIG. 18).

With reference again to FIG. 2, the servers/memory storage devices 1000 further comprise one or more socket servers 600 communicatively coupled to the web server(s) 700 and the control server 500. In one aspect, the socket server(s) 600 facilitate communication, to one or more broadcaster client devices and one or more viewer client devices, of synchronized event information retrieved by the control server 500 and associated with video-based commentary relating to a particular event. In particular, one or more sockets of the socket server(s) dedicated to the particular event allow respective client devices to establish an event information channel with the socket server(s), such that the event information (e.g., in the form of "event messages") is shared in a synchronized manner by all broadcasters/viewers following the particular event.

In FIG. 2, the socket server(s) 600 also facilitate communication, between a given broadcaster of a live stream of video-based commentary and corresponding viewers of copies of the live stream, of chat messages and/or system event information (also referred to collectively simply as "chat information") relating to the broadcaster's live stream. In particular, one or more sockets of the socket server(s) 600 dedicated to the particular broadcaster's live stream allow respective client devices used by the broadcaster and their viewers to establish a chat/system event channel with the socket server(s), such that chat messages/system event information is shared in a synchronized manner by the broadcaster of the live stream and corresponding viewers of copies of the live stream. Chat messages sent on a given chat/system event channel may be displayed as text on all broadcaster/viewer client devices connected to the socket(s) dedicated to the particular broadcaster's live stream, whereas system event information may be received (but not necessarily displayed itself) by all client devices connected to the socket(s) dedicated to the particular broadcaster's live stream, and provide the client device with relevant data or instructions to take some action. As discussed further below, examples of the types of system event information or "system messages" that may be broadcast by the socket(s) dedicated to the particular broadcaster's live stream include, but are not limited to, indications of viewers joining or leaving a broadcast, an indication of a new follower of a broadcaster, indications relating to the purchase of digital gifts and types of digital gifts (which may cause some display or audio event on the client device), indications relating to "likes" (e.g., cheers, handclaps, or applause icons, or audio of crowds cheering), and other data/instructions relating to various social networking functionality.

In one aspect, connections between a given client device and a particular socket of a socket server are persistent authenticated connections (e.g., with IP-based fingerprint identifiers for anonymous users). The authenticated connection allows the servers and media storage devices 1000 to track how many users are connected to a particular socket at any given time (and hence how many users are viewing a copy of a particular broadcaster's live stream, and/or how many users are viewing a copy of a live stream relating to a particular event). In another aspect, the various "messages" (e.g., event messages, chat messages, system messages) that are carried on the respective channels between a given client device and corresponding sockets of the socket server(s) are data packets including various event information, chat to be displayed, or system events (e.g., "new viewer," "disconnected viewer," "stream muted, "stream ended").

With reference again for the moment to FIG. 1A, recall that in the example arrangement depicted in FIG. 1A a first broadcaster client device 100A provides a first live stream of digital content 102A, and a first plurality of viewer client devices 200A and 200B (grouped by a first bracket) receive respective copies 202A and 202B of the first broadcaster's live stream of digital content. Similarly, a second broadcaster client device 100B provides a second live stream of digital content 102B, and a second plurality of viewer client devices 200C and 200D (grouped by a second bracket) receive respective copies 202C and 202D of the second broadcaster's live stream of digital content. Turning now again to FIG. 2, and taking only the viewer client devices 200A and 200C into consideration for purposes of illustration, the example implementation shown in FIG. 2 contemplates that the first broadcaster is providing video-based commentary about a first live sporting event, and the second broadcaster is providing video-based commentary about a second (different) live sporting event, such that the first viewer client device 200A receives the copy 202A of the first broadcaster's live stream of digital content 102A relating to the first sporting event (and provided by the first broadcaster client device 100A), and that the second viewer client device 200C receives the copy 202C of the second broadcaster's live stream of digital content 102B relating to the second sporting event (and provided by the second broadcaster client device 100B). Also, in the example of FIG. 2, the first broadcaster's live stream 102A is an RTMP stream received by the RTMP media server(s) 320, and the second broadcaster's live stream 102B is a WebRTC stream received by the WebRTC media server(s) 360. The media sources 300 provide the copy 202A of the first broadcaster's live stream 102A to the first viewer client device 200A via a first video Internet communication channel 204A, and provide the copy 202C of the second broadcaster's live stream 102B to the second viewer client device 200C via a second video Internet communication channel 204C (further details of the role of the web server(s) 700 in selecting a particular media source of the media sources 300 to which each viewer client device connects to establish a video Internet communication channel are discussed below in connection with FIGS. 6 and 7).

In the example of FIG. 2, as noted above the control server 500 periodically retrieves, via the Internet and from the event information provider 55, first event information 502A germane to the first live sporting event, wherein the first event information includes at least first score information 504A for the first live sporting event. The control server further retrieves second event information 502B germane to the second live sporting event, wherein the second event information includes at least second score information 504B for the second live sporting event. The control server passes at least the first score information 504A and the second score information 504B to the socket server(s) 600. In turn, the socket server(s) 600 establish one or more first event sockets 602A dedicated to the first event information and one or more second event sockets 602B dedicated to the second event information.

As discussed further below, the web server(s) 700 provide to the first viewer client device 200A a first event identifier (a first EventID) that corresponds to the first event socket 602A; the web server(s) 700 also provide to the second viewer client device 200C a second event identifier (a second EventID) that corresponds to the second event socket 602B. The first viewer client device 200A uses the first EventID to connect to the first event socket 602A (e.g., via a first URL including the first EventID in a path of the URL), and the second viewer client device 200C uses the second EventID to connect to the second event socket 602B (e.g., via a second URL including the second EventID in a path of the URL). The first score information 504A is then transmitted to the first viewer client device 200A via a first event information Internet communication channel 206A between the first event socket 602A and the first viewer client device 200A, and the second score information 504B is transmitted to the second viewer client device 200C via a second event information Internet communication channel 206C between the second event socket 602B and the second viewer client device 200C.

In a manner similar to that described above in connection with the first and second event information, in the example of FIG. 2 chat messages and other system event information ("chat information") may be distributed to viewers of each broadcaster via respective dedicated sockets of the socket server(s) 600. In particular, the socket server(s) 600 similarly establish one or more first chat/system event sockets 604A dedicated to the first broadcaster's live stream of digital content 102A and one or more second chat/system event sockets 642B dedicated to the second broadcaster's live stream of digital content 102B. The web server(s) 700 provide to the first viewer client device 200A a first stream identifier (a first StreamID) that corresponds to the first chat/system event socket 604A; the web server(s) 700 also provide to the second viewer client device 200C a second stream identifier (a second StreamID) that corresponds to the second chat/system event socket 604B. The first viewer client device 200A uses the first StreamID to connect to the first chat/system event socket 604A (e.g., via a first URL including the first StreamID in a path of the URL), and the second viewer client device 200C uses the second StreamID to connect to the second chat/system event socket 604B (e.g., via a second URL including the second StreamID in a path of the URL). The first chat information 210A is then transmitted to the first viewer client device 200A via a first chat/system event Internet communication channel 208A between the first chat/system event socket 604A and the first viewer client device 200A, and the second chat information 210B is transmitted to the second viewer client device 200C via a second chat/system event Internet communication channel 208C between the second chat/system event socket 604B and the second viewer client device 200C.

For purposes of simplifying the illustration in FIG. 2, the broadcaster client devices 100A and 100B are shown only providing respective live streams 102A and 102B directly to different media servers 320 and 360; however, it should be appreciated that the broadcaster client devices 100A and 100B have additional communication connections to the socket server(s) 600 and the web server(s) 700, similar to those shown in FIG. 2 between the example viewer client devices 200A and 200C and the socket server(s) 600 and web server(s) 700, so that the broadcaster client devices may similarly receive event information and chat information on different communication channels respectively dedicated to the event information and chat information.

In view of the foregoing, it may be appreciated from FIG. 2 that, in one example implementation, there are three different communication channels between a given broadcaster/viewer client device and the broadcast/viewing servers and media storage devices 1000, namely: 1) a video communication channel (e.g., 204A, 204C) between the client device and the media sources 300 to receive a copy of a broadcaster's live stream of digital content; 2) an event information communication channel (e.g., 206A, 206C) between the client device and one or more particular sockets of the socket server(s) 600 dedicated to a particular event; and 3) a chat/system event communication channel (e.g., 208A, 208C) between the client device and one or more particular sockets of the socket server(s) 600 dedicated to a particular broadcaster's live stream of digital content.

In the example of FIG. 2, the first and second broadcasters provide to their respective viewing audiences video-based commentary regarding different live sporting events. However, as discussed elsewhere in this disclosure, it should be appreciated that the events about which the broadcasters provide video-based commentary are not limited to live sporting events, but may relate to a wide variety of other events, news, and/or particular topics of interest. Additionally, it should be appreciated that the first and second broadcasters (and additional broadcasters) may provide to their respective viewing audiences video-based commentary about the same live event; in this case, the servers and media storage devices 1000 provide the appropriate connectivity such that viewers of the same live event may effectively switch between different broadcasters' video-based commentary about the event, participate in different chat information exchanges associated with each broadcaster's live stream, and all share the same event information in a synchronized manner.

In particular, with reference again to the example of FIG. 2, consider an implementation in which both the first broadcaster's live stream of digital content 102A and the second broadcaster's live stream of digital content 102B include the broadcasters' respective video-based commentary about the first live sporting event. In this situation, the web server(s) 700 would provide to both the first viewer client device 200A and the second viewer client device 200C the first event identifier (the first EventID) that corresponds to the one or more first event sockets 602A of the socket server(s) 600, and both of the first viewer client device 200A and the second viewer client device 200B would use the first EventID to connect to the one or more first event sockets 602A (e.g., via a first URL including the first EventID in a path of the URL). In this manner, the first score information 504A would then be transmitted to both the first viewer client device 200A via the first event information Internet communication channel 206A between the one or more first event sockets 602A and the first viewer client device 200A, and to the second viewer client device 200C via a second event information Internet communication channel 206C between the one or more first event sockets 602A and the second viewer client device 200C. Thus, both of the viewer client devices in this scenario would receive the same event/score information for the first live sporting event in a synchronized manner from the socket server(s).

At the same time, however, the respective viewer client devices 200A and 200C would be connected to different chat/system event sockets of the socket server(s) corresponding to the different broadcasters' live streams; in particular, the web server(s) 700 would provide to the first viewer client device 200A the first stream identifier (the first StreamID) that corresponds to the first chat/system event socket 604A and provide to the second viewer client device 200C the second stream identifier (the second StreamID) that corresponds to the second chat/system event socket 604B. As discussed in the previous example, the first viewer client device 200A would use the first StreamID to connect to the first chat/system event socket 604A (e.g., via a first URL including the first StreamID in a path of the URL), and the second viewer client device 200C would use the second StreamID to connect to the second chat/system event socket 604B (e.g., via a second URL including the second StreamID in a path of the URL). The first chat information 210A would then be transmitted to the first viewer client device 200A via a first chat/system event Internet communication channel 208A between the first chat/system event socket 604A and the first viewer client device 200A, and the second chat information 210B would be transmitted to the second viewer client device 200C via a second chat/system event Internet communication channel 208C between the second chat/system event socket 604B and the second viewer client device 200C.

Figure 3:
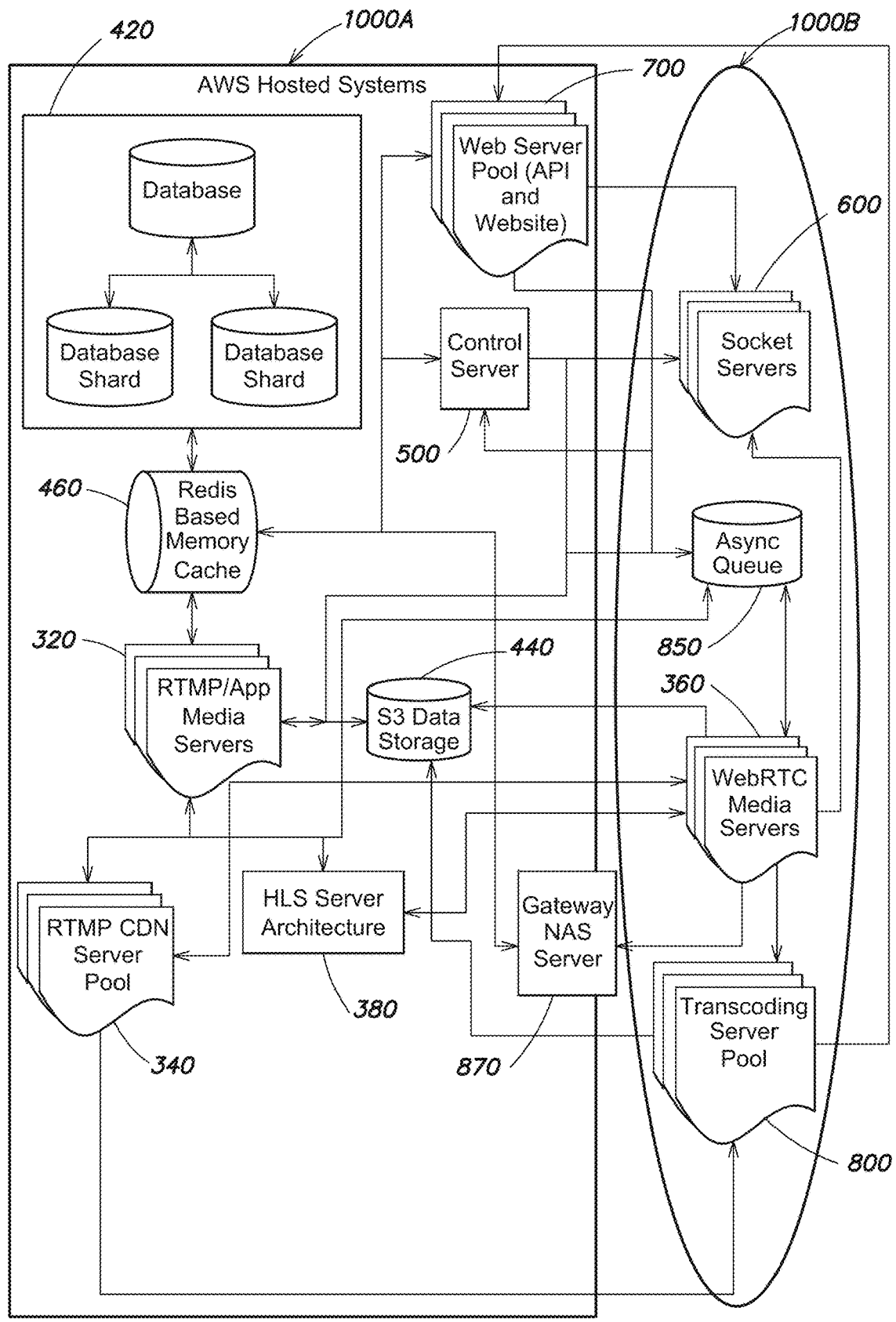
FIG. 3 is a block diagram showing additional details of the various interconnections between the respective components of the servers and memory storage devices shown in FIG. 2, according to some inventive implementations.

FIG. 3 is a block diagram showing additional details of various interconnections between the respective components of the servers and memory storage devices 1000 shown in FIG. 2, according to some inventive implementations. In the example of FIG. 3, some of the components of the servers and memory storage devices (e.g., 1000A) are hosted by a first web hosting service (e.g., Amazon Web Services AWS), while one or more other components of the servers and memory storage devices (1000B) may be hosted by a different web hosting service and/or generally accessible via the Internet. In yet other implementations, a single web hosting service may host all of the servers and memory storage devices. In addition to the various components shown in the example of FIG. 2, FIG. 3 also shows that the servers and memory storage devices 1000 may further include a transcoder server pool 800 (e.g., that may be employed for transcoding of recordings of a given broadcaster's live stream of digital content, for later replay via adaptive bitrate protocols), an asynchronous queue 850 (e.g., for queuing of various messages and instructions to be acted upon by an asynchronous task processor implemented by the control server 500), and a gateway NAS server 870 (e.g., to facilitate communications between a WebRTC media server pool and other elements of the servers and memory storage devices 1000A that may be hosted by the first web hosting service). Additionally, FIG. 3 illustrates that the database 420 may include a main database and multiple database shards, in which portions of data are placed in relatively smaller shards, and the main database acts as a directory for the database shards (in some implementations, the main database also stores some de-normalized data, for example, to facilitate cross-server searching).

III. Technological Solutions to Improve Computer Network Functionality, Increase Computer Processing Efficiency and Reduce Computer Memory Requirements In developing the inventive systems, apparatus and methods disclosed herein, including the servers and memory storage devices 1000 shown in FIGS. 2 and 3 as well as the client app 5000 executed by mobile client devices, the Inventors recognized and appreciated multiple technological problems with conventional techniques for transmission of digital content via the Internet. As introduced above and discussed in further detail below, the Inventors have addressed and overcome these technological problems with innovative technological solutions to effectively realize the various technical features described herein. Examples of these technological solutions include, but are not limited to, improving computer network functionality (e.g., improving the speed of content transfer from broadcaster devices to viewer devices and synchronization of various content amongst multiple client devices), and improving processing efficiency of broadcaster and viewer client devices via execution of the client app 5000, while at the same time reducing memory storage requirements for the client app 5000 on the client devices.

More specifically, examples of the technological problems addressed by the inventive solutions provided by the servers and memory storage devices 1000 and client app 5000 include, but are not limited to: 1) how to provide relatively low latency copies of live streams of broadcaster digital content to multiple viewers of each of multiple broadcasters (e.g., broadcaster-to-viewer delay time on the order of ten seconds or less, or on the order of two-to-three seconds or less), and with relatively high quality and reliability (e.g., high definition HD and high bit rate, such as 2 to 5 megabits per second); 2) how to synchronize such low latency and high quality copies of broadcaster live streams of digital content with event information associated with the digital content (as well as chat information associated with a given broadcaster) amongst the multiple viewers of each broadcaster, irrespective of the number of viewers (e.g., 10 viewers, 1,000 viewers, or 10,000 viewers); 3) how to allow different classes/types of viewers (e.g., VIP users, premium subscribers, media professionals, registered users, anonymous users, web/desktop users, mobile users), and increasing numbers of viewers, to flexibly access each broadcaster's content with different live streaming formats (e.g., continuous streaming protocols such as real time messaging protocol or "RTMP," web real-time communication or "WebRTC;" segmented protocols such as HTTP live streaming or "HLS," HTTP Smooth Streaming or "MSS," HTTP Dynamic Streaming or "HDS," standards-based ABR protocol "MPEG-DASH") and with different qualities of service; 4) how to effectively render "studio-quality" screen animations and special effects graphics (e.g., including "scorebugs" for sporting events) on displays of mobile client devices via a client app with a small memory footprint (e.g., less than 100 megabytes, such that the client app is downloadable via cellular networks); and 5) how to provide for viewing of a recording of a broadcaster's live stream as if the viewer was watching the live stream in essentially real-time (e.g., while recreating chat messages and event information updates). Various aspects of the technological solutions to these respective technological problems are discussed in turn below.

1) Latency Considerations

With respect to latency considerations, the inventive systems, methods and apparatus disclosed herein contemplate particular parameters for the generation of a live stream of digital content by a broadcaster client device so as to induce only relatively low "client side" latency. To this end, in example implementations the client app 5000 installed and executing on a given client device selects an appropriate keyframe interval (e.g., 30 frames) for generating a broadcaster's live stream of digital content to ensure relatively low client side-induced end-to-end digital content latency.

In other aspects relating to reducing latency, particular parameters and techniques for handling live streams are contemplated for the servers and memory storage devices 1000 disclosed herein (e.g., adjusting buffer sizes and transcoder settings in media servers; employing hardware-accelerated transcoding of broadcaster live streams via graphic card processing to provide for adaptive bitrate copies of live streams). Furthermore, in some example implementations, the RTMP CDN 340 shown in FIGS. 2 and 3 comprises an innovative auto-scaling RTMP CDN server pool, coupled to a media server pool that receives live streams from respective broadcasters (e.g., either RTMP or WebRTC), to facilitate delivery of low-latency live streams to a larger number of multiple viewers. Additionally, for RTMP broadcasters, the RTMP media server(s) 320 in some implementations is/are on the same network as the RTMP CDN 340 (e.g., the RTMP media server(s) are communicatively coupled to the RMTP CDN servers as a virtual private network (VPN), see VPN 330 in FIG. 6) so as to facilitate low latency communications. For WebRTC broadcasters, although in some implementations the WebRTC media server(s) 360 may not be hosted by the same service as the RTMP CDN 340 (e.g., see FIG. 3), the WebRTC media server(s) are coupled to the RTMP CDN via high speed/low latency connections. The RTMP CDN servers essentially make further copies of transcoded live streams received from the media server (e.g., without any other processing or alteration) and pass on the respective further copies to multiple viewers ("direct pass-through amplification"). In this manner, the RTMP CDN servers introduce appreciably low latency (e.g., on the order of less than 150 milliseconds) and facilitate a significantly greater number of viewers than could be otherwise served by the media server itself. These exemplary aspects (as well as other aspects discussed in further detail below) provide for appreciably low latency introduced by the media servers and RTMP CDN (e.g., on the order of about 500 milliseconds or even less) and client-introduced digital content latency (e.g., on the order of about one-to-two seconds for continuous streaming consumers).

2) Synchronization of Live Streams and Event Information

Yet another technical implementation challenge overcome by the inventive concepts disclosed herein relates to the display of event information updates (if present, e.g., if the broadcast is associated with an event), as well as screen animations and other special effects graphics that may be generally associated with the video and/or audio associated with a live stream, in a manner that is synchronized across multiple live streams with appreciably low latency. This is a particularly relevant consideration given that the systems, apparatus and methods disclosed herein are contemplated in some implementations as supporting multiple broadcasters providing video-based commentary for the same event, and each of these broadcasters may have multiple viewers of their broadcast—and thus, the technical challenge is to provide the same event information, and periodic updates to this event information, in a synchronized and low-latency manner to all of these broadcasters and viewers interested in following the same event. In exemplary implementations (e.g., as discussed above in connection with FIG. 2), this technical challenge is overcome with technological solutions implemented on both the client devices and the server architecture to which the client devices are communicatively coupled involving the use of multiple communication channels respectively dedicated to video/audio content from a given broadcaster, event information germane to an event about which any broadcaster may be providing video-based commentary, and chat information (chat messages and/or system event messages) shared amongst the broadcaster and their associated viewers.

In various inventive implementations disclosed herein (e.g., as introduced above in connection with FIG. 2), event information and updates to event information are provided to broadcaster client devices and viewer client devices via a socket-based "event information channel" dedicated to the event, and separate from the copy of the live stream of video-based commentary provided on a "video channel." Thus, all viewers (and broadcasters) of the event, regardless of which live stream they may be generating or watching, connect to one or more sockets of a socket server that is/are dedicated to the event, such that all live streams relating to the event are similarly synchronized to event information and updates to same. Notably, if a viewer switches amongst different broadcasters of the same event (the viewer originally watches a first live stream from a first broadcaster of the event, and later selects a second live stream from a second broadcaster of the same event), the event information and updates to same (and any screen animations and special effects graphics that incorporate the event information) remain synchronized with all live streams from the different broadcasters, providing for a smooth second-screen experience across multiple broadcasters and viewers.

The technical challenge of displaying event information and updates to same in a synchronized and low-latency manner amongst multiple viewers is also addressed in part by using a single control server 500 in the server and memory storage devices 500 to gather and parse live event information captured in real-time. For example, for sporting events, game information may be obtained by the single control server from a dedicated third-party provider (e.g., STATS LLC, which is a sports statistics, technology, data, and content company that provides content to multimedia platforms, television broadcasters, leagues and teams, fantasy providers, and players). This single point of entry of event information into the server architecture, as provided by the control server, prevents synchronization errors inherent in network communications. Once a change in event status has been detected (e.g., if a play clock updates), the control server provides these changes to the one or more sockets dedicated to the event (to which all viewers and broadcasters of video-based commentary regarding the event are communicatively coupled), resulting in a single synchronized update to all client devices and thereby significantly mitigating client-by-client latency and/or synchronization issues.

3) Flexible and Scalable Access to Broadcaster Content by Multiple Classes/Types of Viewers The inventive systems, methods and apparatus disclosed herein and shown in FIGS. 2 and 3 further contemplate the ability to flexibly select the source of a copy of a broadcaster's live stream to be provided to respective multiple viewers from one of a number of possible media sources 300, namely: 1) the media server receiving the live stream in the first instance from a broadcaster (e.g., an RMTP media server 320 or a WebRTC media server 360); 2) an autoscaling RTMP CDN server pool 340; or 3) an innovative HTTP Live Streaming (HLS) server architecture 360. Thus, multiple live stream transmission formats, protocols, and access endpoints are contemplated for different types and numbers of viewers that may receive copies of broadcasters' live streams at different bitrates and with different qualities of service. As noted above, in some implementations the web server(s) 700 implement a viewer stream source selection algorithm which selects an appropriate media source for a given viewer based on, for example, the type of user (e.g., VIP users, premium subscribers, media professionals) and the number of viewers of a particular broadcaster's live stream. Further details of viewer stream source selection for respective viewer client devices are discussed further below in connection with FIGS. 6 and 7.

Another salient element of the flexibility and scale-ability provided by the media sources 300 of the servers and memory storage devices 1000 shown in FIGS. 2 and 3 relates to the HLS caching and amplifying server architecture 360. Conventionally, as would be readily appreciated by those of skill in the relevant arts, HLS is not designed to be cacheable at the server level, and hence synchronization issues arise in connection with providing multiple HLS copies of a live stream to respective viewers. In particular, in conventional implementations, each HLS copy of the live stream is somewhere in a "window" of time (an HLS "buffer length") relative to the original live stream (e.g., delayed from the original stream by some amount of time within an overall time window). This uncertainty results in the possibility of a first viewer of a first HLS copy of a live stream actually seeing the video content some time earlier than or later than a second viewer receiving a second HLS copy of the live stream, i.e., the respective viewers are not synchronized.

In exemplary implementations described herein, this technical problem is solved by employing an inventive HLS caching and amplifying server architecture 360, which is discussed in further detail below in connection with FIGS. 8, 9A, 9B, 9C and 9D. The HLS server architecture includes a "mother" server and one or more "child" servers, disposed between a media server and a content delivery network (CDN), in which the HLS mother server acts as a single "virtual viewer" from a given media server's perspective. Based on a single copy of an HLS file suite for a given broadcaster's live stream as provided by a media server and received by a mother caching server of the HLS server architecture, the mother server caches and passes on copies of the elements of the file suite (as requested) to one or more child servers, which in turn cache and pass on copies of the elements of the file suite to one or more geographically-distributed servers of a conventional (e.g., global) CDN (serving as an HLS CDN in tandem with the mother-child server architecture). In this manner, the mother and child servers of the HLS architecture act as caching and amplifying servers, so that identical HLS streams may be served from the HLS CDN server pool to multiple viewers of a given broadcast in a significantly narrower synchronization window than conventionally possible. In particular, in one example implementation discussed in greater detail below in connection with FIGS. 6A, 6B, 6C, and 6D, all HLS viewers receiving a copy of a broadcaster's live stream via the HLS server architecture including a mother caching server and one or more child caching servers are at most less than one HLS file segment duration out of synchronization with each other; this phenomenon is referred to herein as "viewer segment concurrency." Based on the viewer segment concurrency provided by the inventive HLS server architecture, respective viewers of a given broadcast may be out of synchronization with one another by less than approximately one or two seconds at most.

4) Client-Side Rendering of On-Screen Interactive Animations, Special Effects and/or Event Information By way of background, in conventional sports broadcasting, game information (also sometimes referred to as a "scorebug"), as well as screen animations and other special effects graphics, are hard-embedded into the live stream of the game broadcast itself that is received by viewers. Unlike conventional scorebugs, screen animations, and/or other special effects graphics that are hard-embedded into live streams of a sports broadcast, in various inventive implementations disclosed herein graphics and effects are generated by the client device itself, separate from a given broadcaster's video-based commentary, and then integrated with (e.g., superimposed or overlaid on) the broadcaster's video-based commentary when rendered on the display of the client device. As shown for example in FIG. 1B, various graphics may be rendered on different portions of the display, for example, along a top or side of the display or in a "lower third" of the display.

For mobile client devices, the client app 5000 executing on the device is particularly configured to render a variety of "studio-quality" graphics while nonetheless maintaining a small file size for the client app (e.g., less than 100 megabytes, and in some instances from approximately 60-70 megabytes); this affords an exciting and dynamic broadcaster and viewer experience on mobile client devices, while still allowing the modestly-sized client app to be readily downloaded (e.g., from a digital distribution platform or "app store" 75) to a client device via a cellular network. In some implementations, maintaining a modest file size for the client app while providing high-quality graphics, animations and other special effects is accomplished in part by designing animated graphics and special effects as a series of individual frames (still-frame images) that are hard-coded in the client app, and rendering the series of individual frames on the display in a "stop-motion" style according to an animation timer set in the client device (e.g., 15 frames per second). In some implementations, "sprite sheets" may be used for graphics elements; in yet other implementations, the transparency of individual frames may be set on a pixel-by-pixel basis as may be required in some applications to provide for suitable overlay on the broadcaster's video-based commentary.

In another aspect, client-side rendering of screen animations and/or other special effects graphics allows such animations and graphics to be user-interactive; for example, a user (broadcaster or viewer) on a client device may "select" a screen animation/special effect graphic (e.g., via a touch-sensitive display screen of the client device) and launch additional graphics or initiate some other functionality on the client device.

For example, as discussed above with respect to live events about which a given broadcaster may be providing video-based commentary, event information and updates to event information are provided to broadcaster client devices and viewer client devices via a socket-based "event information channel" dedicated to the event, and separate from the copy of the live stream of video-based commentary provided on a "video channel." Providing one or more sockets dedicated to the event information and separate from the live stream of video-based commentary provides for user-interactive features in connection with the event information, and/or the screen animations/special effects graphics incorporating the event information; for example, the user may select (e.g., thumb-over) the screen animation/special effect graphic including the event information and obtain access to additional (and in some cases more detailed) information relating to the event (e.g., a drill down on more granular event information, or a redirect to a web site or other app related to the particular event).

5) Replay of Recorded Broadcaster Live Streams with Recreated Chat Messages and Event Information Updates Another technical implementation challenge addressed by the technological solutions disclosed herein relates to the ability of a viewer to watch a recording of a live stream generated by a broadcaster client device (also referred to herein as a "video replay" of the live stream, or simply "replay") as if the viewer was watching the live stream in essentially real-time (as it was being generated by the broadcaster client device), while also allowing the viewer to "seek" to different points in the video replay. In one aspect of video replay, the broadcaster themselves may assume the role of a post-broadcast viewer of the recorded broadcast.

In exemplary implementations, a technological solution for overcoming the technical implementation challenge of replaying a recorded live stream and also recreating various chat messages and event information updates (if present) as they occurred during the originally broadcast live stream is based, at least in part, on having the socket-based communication techniques act in a "fully-authenticated" fashion, for example, by dynamically creating "anonymous accounts" for non-registered or "anonymous" users. By creating such accounts for anonymous users, a replay log may be created that logs when any given viewer (as a registered user or anonymous user) joins and leaves a particular broadcast. Additionally, the replay log may include additional information, such as user-generated chat information, system messages, and event information updates, respectively synchronized with timestamps associated with the live stream as originally generated by the broadcaster client device.

During replay of a recording of the live stream, the viewer client device requests a segment of this replay log and, using the timestamps in the recording of the live stream, replays not only the digital content in the live stream but also recreates chat messages, system-related messages and event information updates (if present) in the same order and relative time of occurrence as if the viewer were watching the live stream in essentially real-time when originally broadcasted by the broadcaster. As the replay advances, the viewer client device requests additional segments of the log, keeping an in-memory buffer to smooth out any possible Internet connectivity issues. Such a replay log also allows for "seeking," i.e., when a viewer fast forwards or rewinds; under these seeking circumstances, the viewer client device may retrieve the appropriate segment(s) of the replay log for the new viewing point, and continue to not only replay the recording of the live stream from the new viewing point but also recreate (in the same order and relative time) chat messages, system-related messages and event information updates (if present) as if the viewer were watching the live stream in essentially real-time.

Having outlined some of the various technological solutions provided by the inventive systems, apparatus and methods disclosed herein to technological problems with conventional approaches to live streaming of digital content, the discussion now turns to additional details of respective components of the servers and memory storage devices 1000 shown in FIGS. 1A, 2 and 3, as well as the functionality of the client app 5000 executed by client devices.

IV. Broadcaster Media Server Selection

Figure 4A:
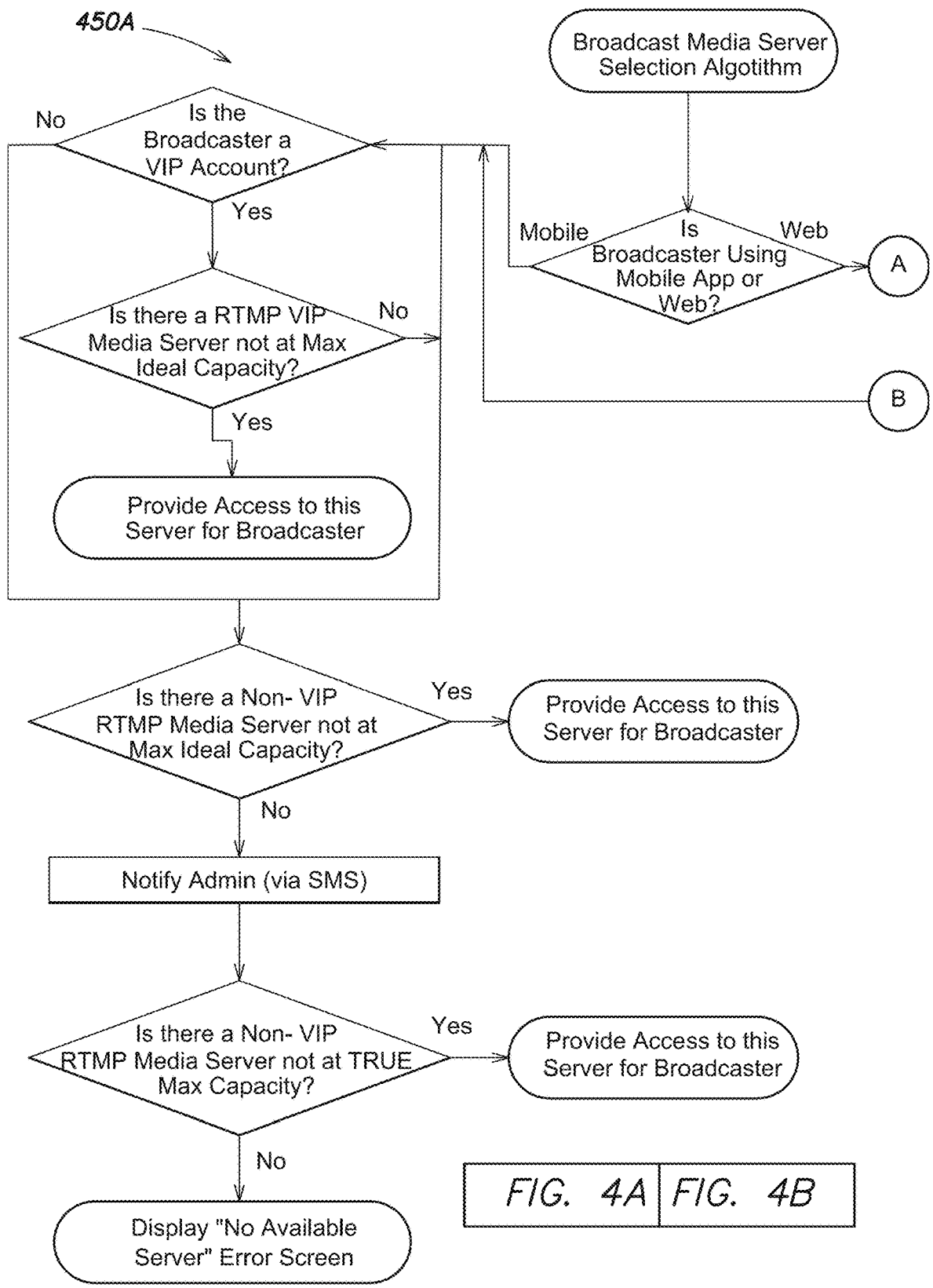
FIGS. 4A and 4B show a process flow diagram illustrating a broadcast media server selection algorithm according to one inventive implementation, which in some examples may be performed by one or more web servers shown in FIGS. 2 and 3.
Figure 4B:
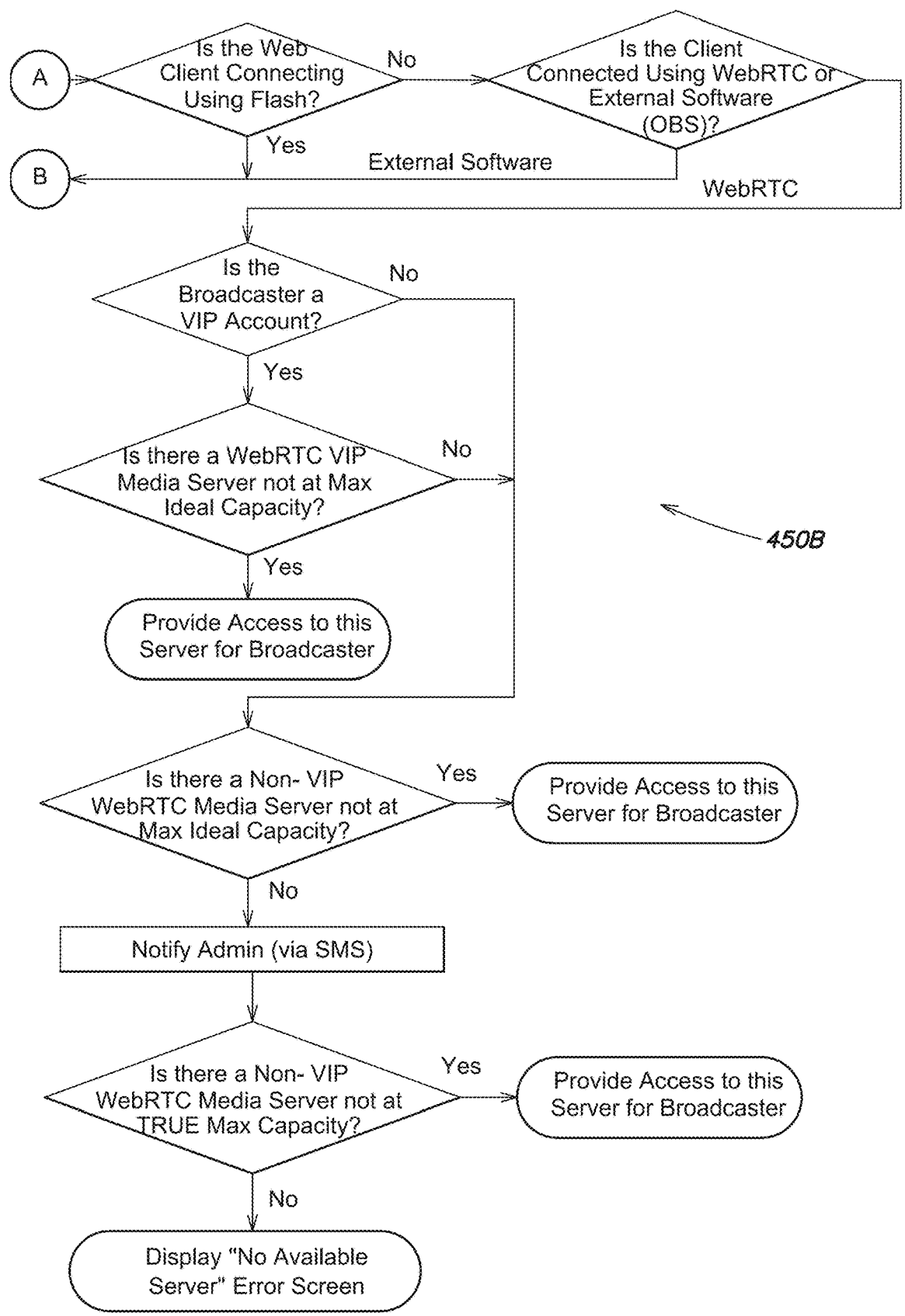

FIGS. 4A and 4B show a process flow diagram 450A and 450B illustrating a broadcast media server selection algorithm according to one inventive implementation, which in some examples may be performed by the web server(s) 700 shown in FIGS. 2 and 3. As noted above, in one implementation a mobile broadcaster client device (e.g., a smartphone) outputs a live stream of digital content having an H.264 MPEG-4 Advanced Video Coding (AVC) video compression standard format, via real time messaging protocol (RTMP) transport for continuous streaming over the Internet, whereas a web-based broadcaster client device (e.g., a desktop computer) outputs a live stream of digital content 102B having a VP8 video compression format, transmitted via the web real-time communication (WebRTC) protocol for continuous streaming over the Internet.

In the process shown in FIGS. 4A and 4B, the web server(s) 700 know whether the broadcaster client device requesting access to a media server is a mobile client (H.264/RTMP) or a web-based client (VP8/WebRTC) based on header information in the communications to the web server from the client device. For mobile clients, the web server provides access to (e.g., provides the address of an endpoint for) one of the RTMP media servers 320 of the media sources 300, and for web-based clients generating VP8/WebRTC live streams of digital content, the web server provides access to one of the WebRTC media servers 360 of the media sources 300. If a web-based client is connecting via Adobe Flash or other external software, the client may be treated similarly to the process for mobile clients.

In some implementations, multiple media servers of the RTMP media servers 320 are segregated into at least one VIP media server and at least one non-VIP media server; similarly, some of the WebRTC media servers 360 are segregated into at least one VIP media server and at least one non-VIP media server. A given broadcaster may be directed to a VIP or non-VIP media server based on their user status (e.g., as a VIP user), and/or the availability of a particular server (e.g., based on available server capacity, in terms of total utilized connection bandwidth to the media server). In one aspect, to allow for some headroom in media server capacity, the "ideal capacity" of the server may be taken as approximately 60% of the true maximum capacity of the media server. If all non-VIP media servers exceed ideal capacity (but are at less than true maximum capacity), the process may send an internal administrative message (e.g., via SMS or email) to a system administrator to warn of a significant broadcaster load. In the event that no non-VIP servers are available to a given broadcaster (because all non-VIP servers are at true maximum capacity), the process displays "No Available Server" as an error message on the display of the broadcaster client device.

V. Media Server Process

Figure 5A:
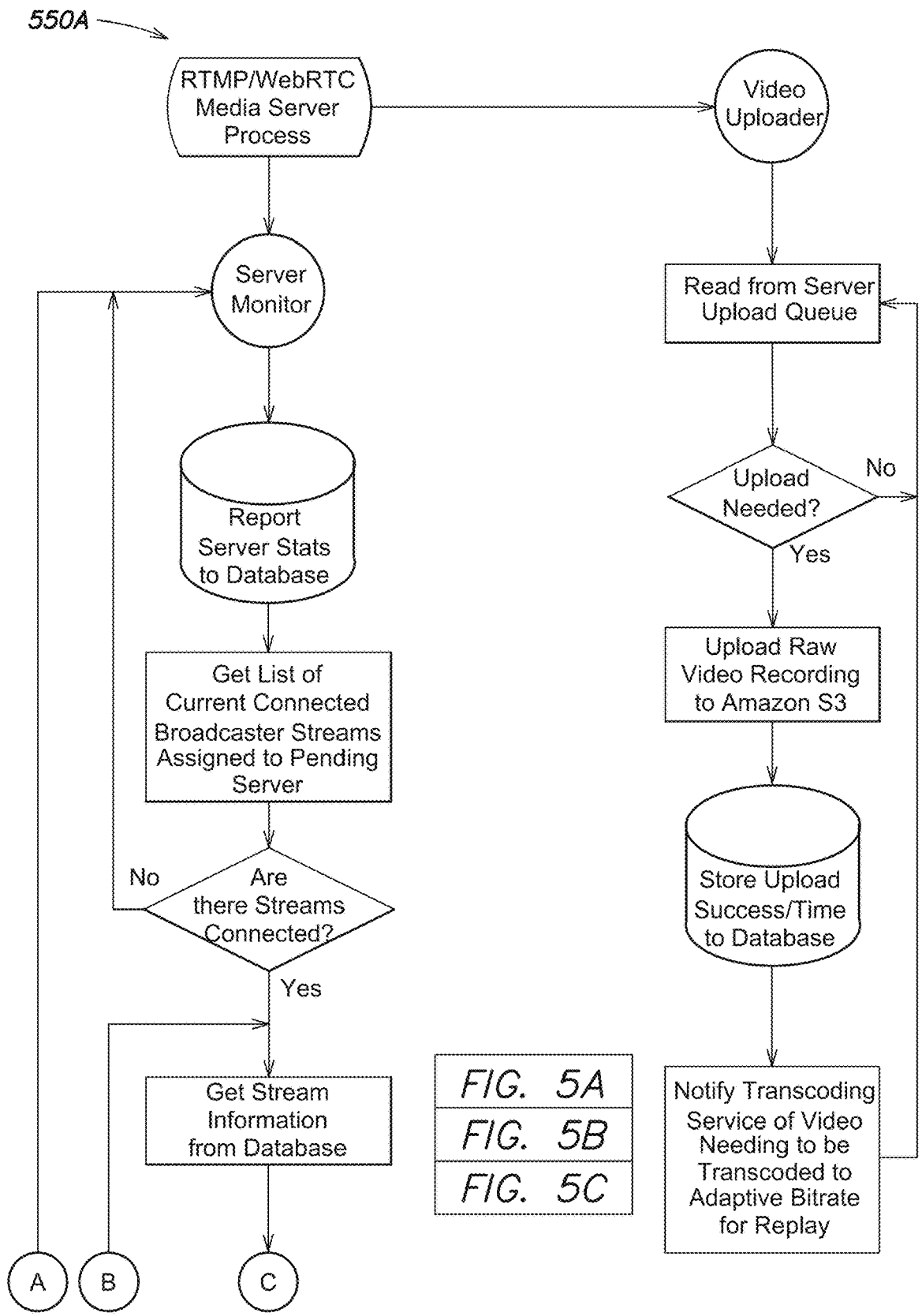
FIGS. 5A through 5C show a process flow illustrating a media server process for the media servers shown in FIGS. 2 and 3, according to one inventive implementation.
Figure 5B:
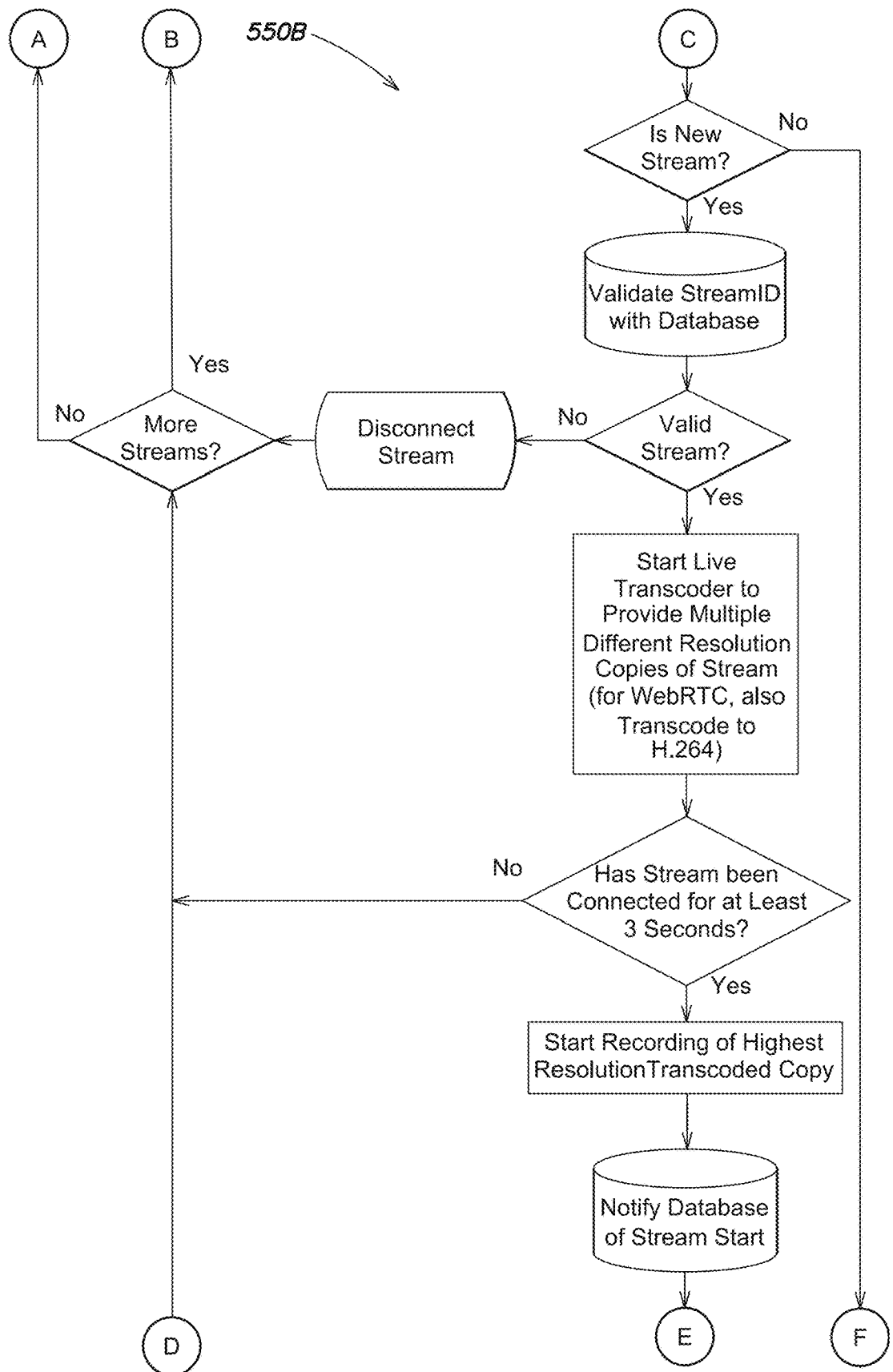
Figure 5C:
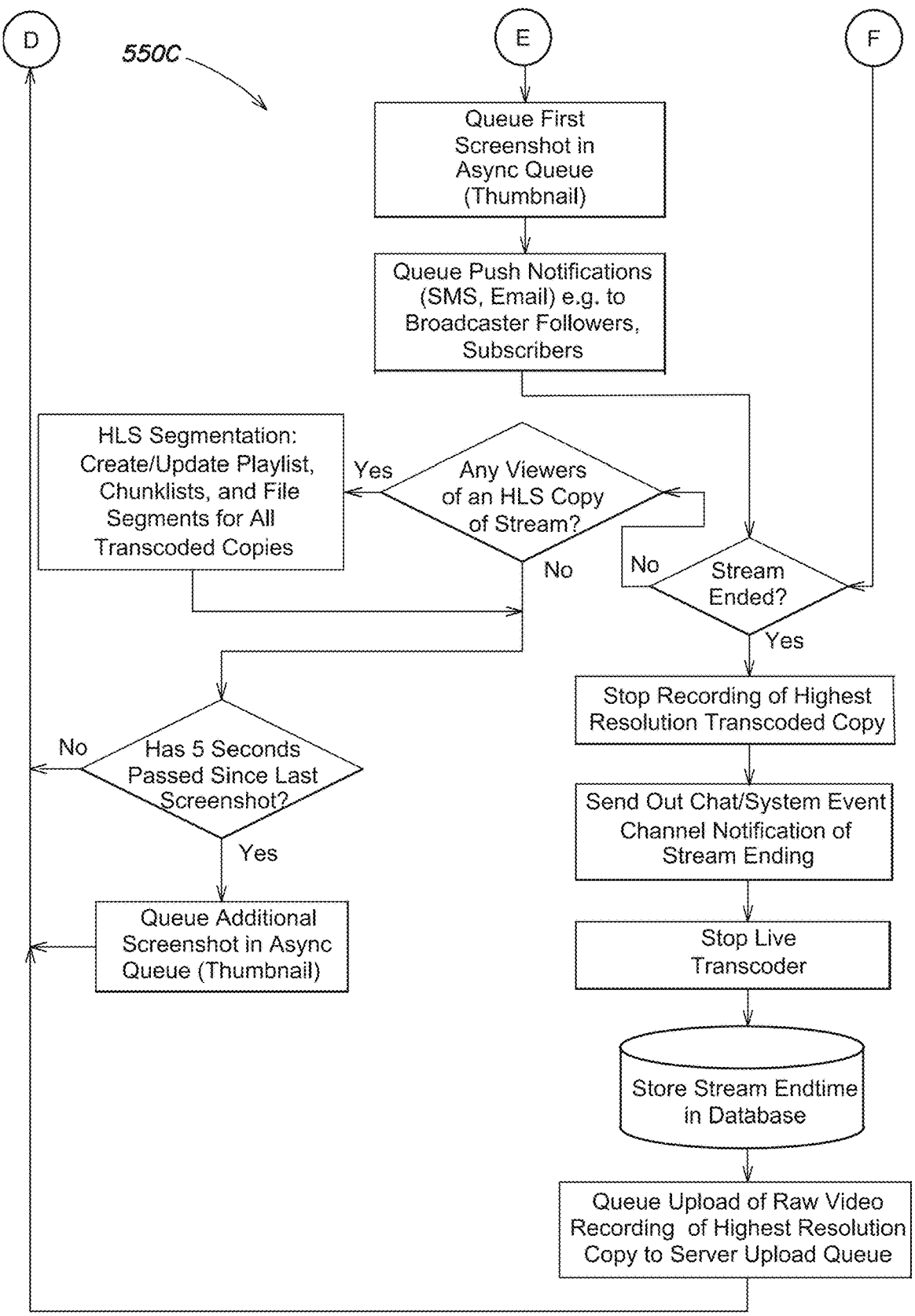

FIGS. 5A through 5C show a process flow 550A, 550B, 550C, and 550D illustrating a media server process for the RTMP and WebRTC media servers 320 and 360 shown in FIGS. 2 and 3, according to one inventive implementation. These process flows include a "server monitor" process and a "video uploader" process that each of the RTMP and WebRTC media servers implements as they receive and process live streams from various broadcasters.

Regarding the "server monitor" process, a given media server periodically reports server statistics to be stored in the database 420, and queries the database to obtain a list of broadcaster streams that have been assigned to, and are connected to, the media server. For newly connected streams, the media server validates the stream information (e.g., StreamID), with the database, and if the stream is valid the media server starts a live transcoding process to provide different resolution copies of the live stream (e.g., 720p, 360p and 240p transcoded copies); in the case of a WebRTC media server, the media server also transcodes the VP8/WebRTC live stream to H.264 before providing the different resolution transcoded copies. In some implementations, the media server employs hardware-accelerated transcoding of the broadcaster's live stream (e.g., via graphic card processing) to ensure low latency of viewed transcoded copies of the live stream. The media then starts recording the highest resolution transcoded copy (e.g., 720p in the illustrated example) to provide a "raw video" recording, and notifies the database that the live stream has started and is available for viewing. Thereafter, the media server queues a first screenshot (thumbnail) for the live stream in the asynchronous queue (e.g., see 850 in FIG. 3) for processing by the control server 500 (see FIGS. 18A and 18B), and also queues push notifications to notify subscribers and followers of the broadcaster that the broadcaster is online with a live stream (e.g., by providing a StreamID to the followers/subscribers).

Thereafter, while the broadcaster continues to provide a live stream, and if there are any HLS viewers (discussed further below in connection with FIGS. 8 and 9A through 9D), the media server begins an HLS segmentation process to create and update an HLS file suite comprising an HLS playlist, HLS chunklists, and HLS file segments for each of the transcoded different resolution copies of the broadcaster's live stream. The media server process also periodically queues in the asynchronous queue (e.g., every five seconds or so) additional screenshots/thumbnails of the live stream. Once the broadcaster has ended the live stream, the media server process stops the recording of the highest resolution transcoded copy, sends out a system message on the chat/system event socket(s) corresponding to the broadcaster's live stream that the stream has ended, stops the live transcoding process, and stores the stream end time in the database 420. The media server process then also queues the upload of the "raw video" recording (the recording of the highest resolution transcoded copy) to the media server upload queue.

The video uploader process shown in FIG. 5A reads from the media server upload queue and, if there are any entries in the queue, uploads the corresponding raw video recording of the broadcaster's live stream to data storage 440 (e.g., Amazon S3) and stores the upload time to the database 420. The video uploader process also may notify a third-party transcoding service (e.g., see the transcoding server pool 800 in FIG. 3) to provide transcoded different resolution copies of the recorded video to facilitate adaptive bitrate replay for one or more viewers.

VI. Viewer Stream Source Selection

Figure 6:
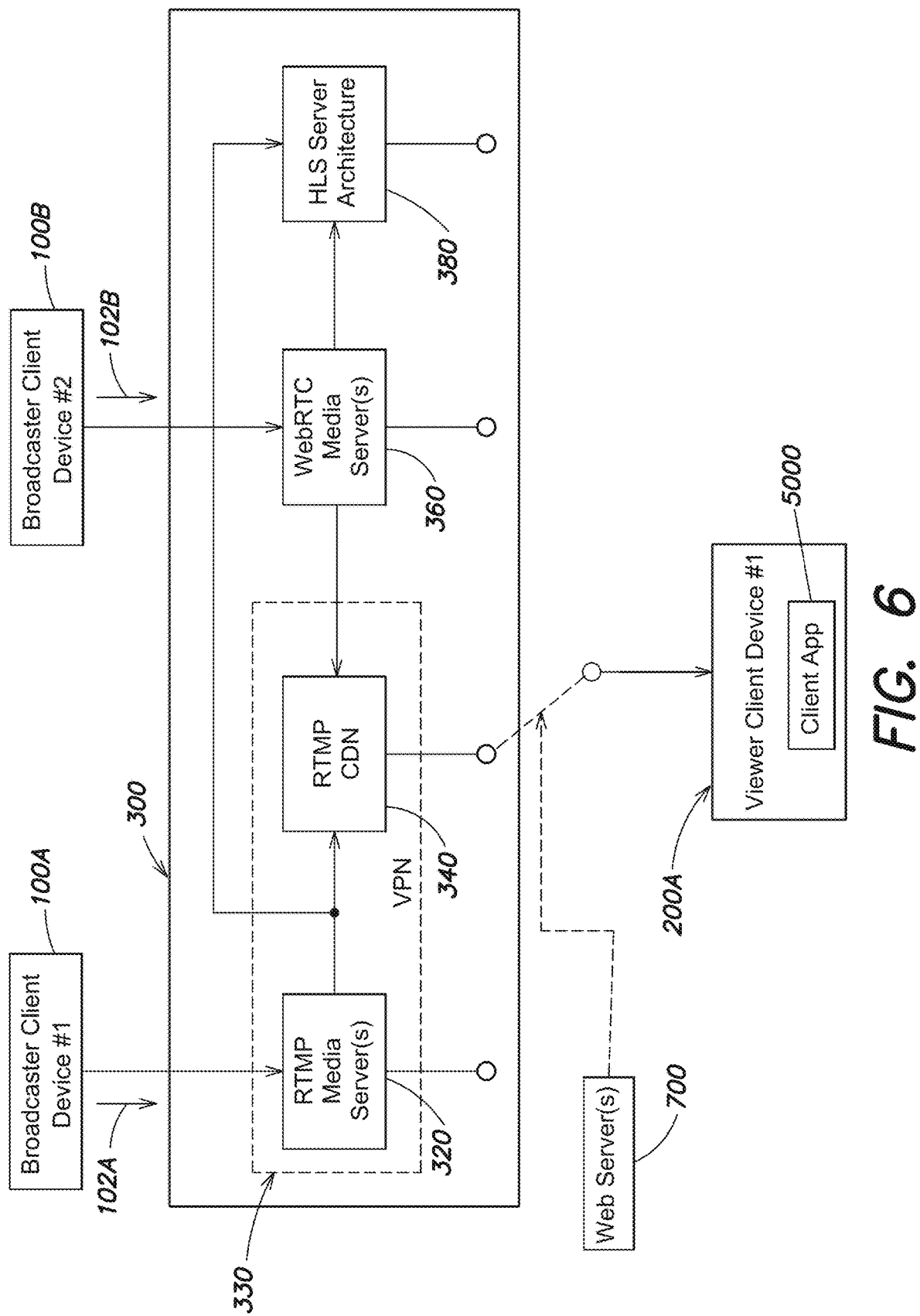
FIG. 6 is a block diagram illustrating the selective coupling of an example viewer client device to one of the media sources of the servers and memory storage devices shown in FIGS. 2 and 3, according to some inventive implementations.

FIG. 6 is a block diagram illustrating the media sources 300 and the web server(s) 700 of the servers and memory storage devices 1000 shown in FIGS. 2 and 3, as well as the first and second broadcaster client devices 100A and 100B and one of the viewer client devices 200A, to facilitate a discussion of the selective coupling of an example viewer client device to one of the media sources, according to some inventive implementations. In tandem with FIG. 6, FIG. 7 is a process flow diagram illustrating a viewer stream source selection algorithm 702 according to one inventive implementation, which in some examples may be performed by the web server(s) 700.

As depicted representationally in FIG. 6, in one aspect the web server(s) 700 essentially serve as a controllable switch to couple the viewer client device 200A to one of an RTMP media server 320, the RTMP CDN 340 (which is communicatively coupled to the RTMP media server(s) in a virtual private network 330), a WebRTC media server 360 and the HLS serve architecture 360 to receive a copy of broadcaster's live stream of digital content. In the example of FIG. 6, the web server(s) 700 has facilitated a connection between the viewer client device 200A and the RTMP CDN 340 (as shown by the dashed line in FIG. 6). However, as discussed below, the web server(s) 700 may facilitate a connection between the viewer client device 200A and any one of the media sources 300 based at least in part on a number of viewers already receiving copies of the broadcaster's live stream. In one implementation, the database 420 stores user profiles for broadcasters and viewers, in which the user profile may include a user type (e.g., registered user, anonymous user, subscriber of one or more broadcasters, VIP user, media professional or media member, etc.); in this instance, the web server(s) 700 may facilitate a connection between the viewer client device 200A and one of the media servers 300 based at least in part on a type or status of a user of the viewer client device 200A and/or the number of viewers already receiving copies of the live stream.

Figure 7:
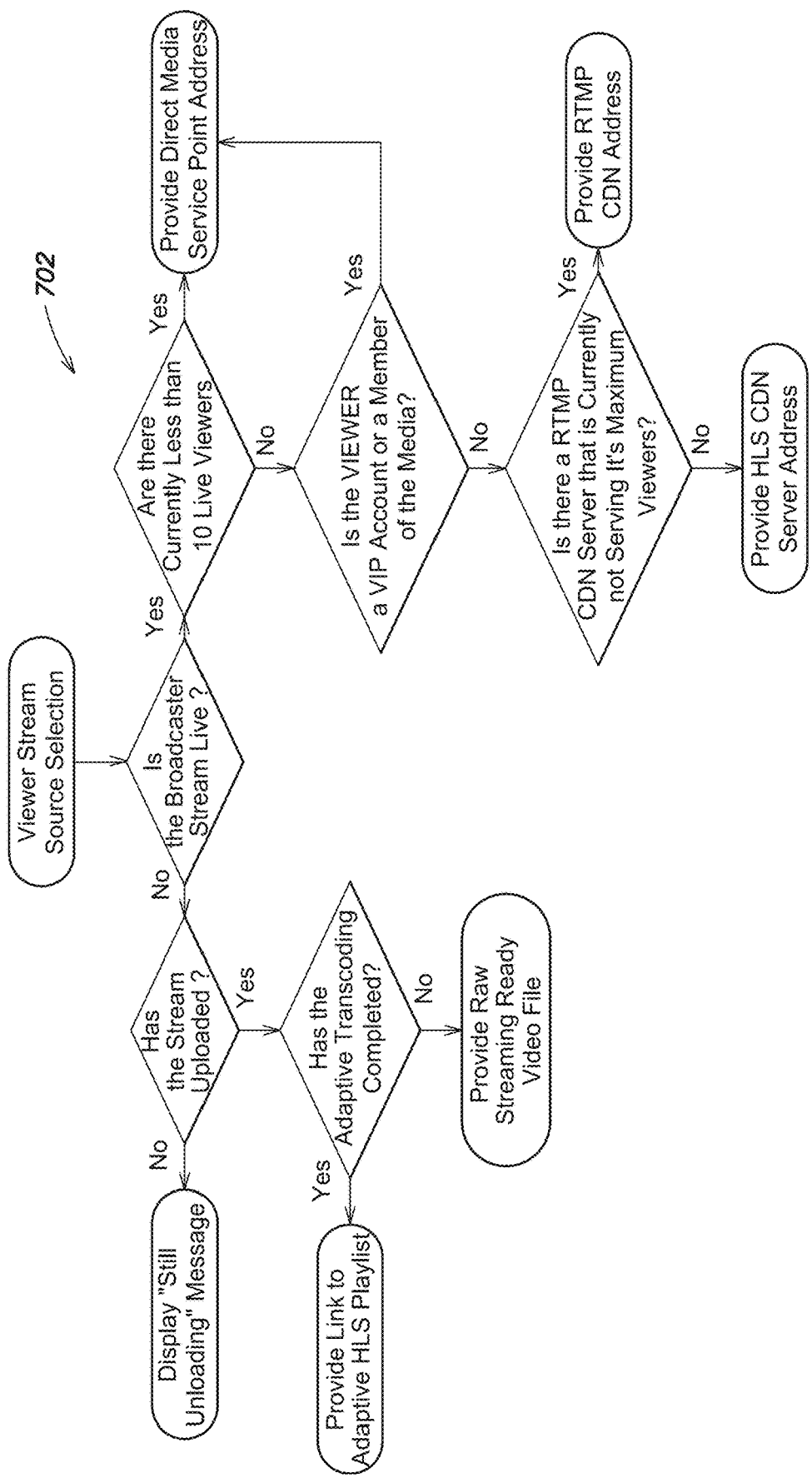
FIG. 7 is a process flow diagram illustrating a viewer stream source selection algorithm according to one inventive implementation, which in some examples may be performed by the one or more web servers shown in FIGS. 2, 3 and 6.

More specifically, as shown in the process of FIG. 7, if the viewer client device sends a request to the web server(s) 700 to view a copy of a given broadcaster's live stream (e.g., based on a StreamID for the live stream that the viewer client device received in a push notification), and the web server(s) 700 determine that there are fewer than a first number (e.g., 10) of viewers already receiving copies of the live stream (e.g., based on a viewing count for the stream maintained in the database 420), the web server(s) provide to the viewer client device an address to connect directly to one of the RTMP media servers 320 or one of the WebRTC media servers 360 that is processing the broadcaster's live stream (depending on whether the broadcaster client device is a mobile H.264 or web-based VP8 client device). Irrespective of the number of viewers, the web server(s) 700 also provide an address to the viewer client device to connect directly to one of the media servers if a user of the viewer client device is a VIP subscriber or media professional. If however the user is not a VIP subscriber or media professional, and there are more than a first number of viewers already receiving copies of the live stream, the web server(s) provide to the viewer client device an address to connect to one of the CDN servers of the RTMP CDN 340. However, if all CDN servers of the RTMP CDN 340 are at their maximum capacity (e.g., as reflected in server statistics stored in the database), the web server(s) 700 provide an address to the viewer client device to connect to the HLS server architecture 360.

VII. HTTP Live Streaming (HLS) Server Architecture

Figure 8:
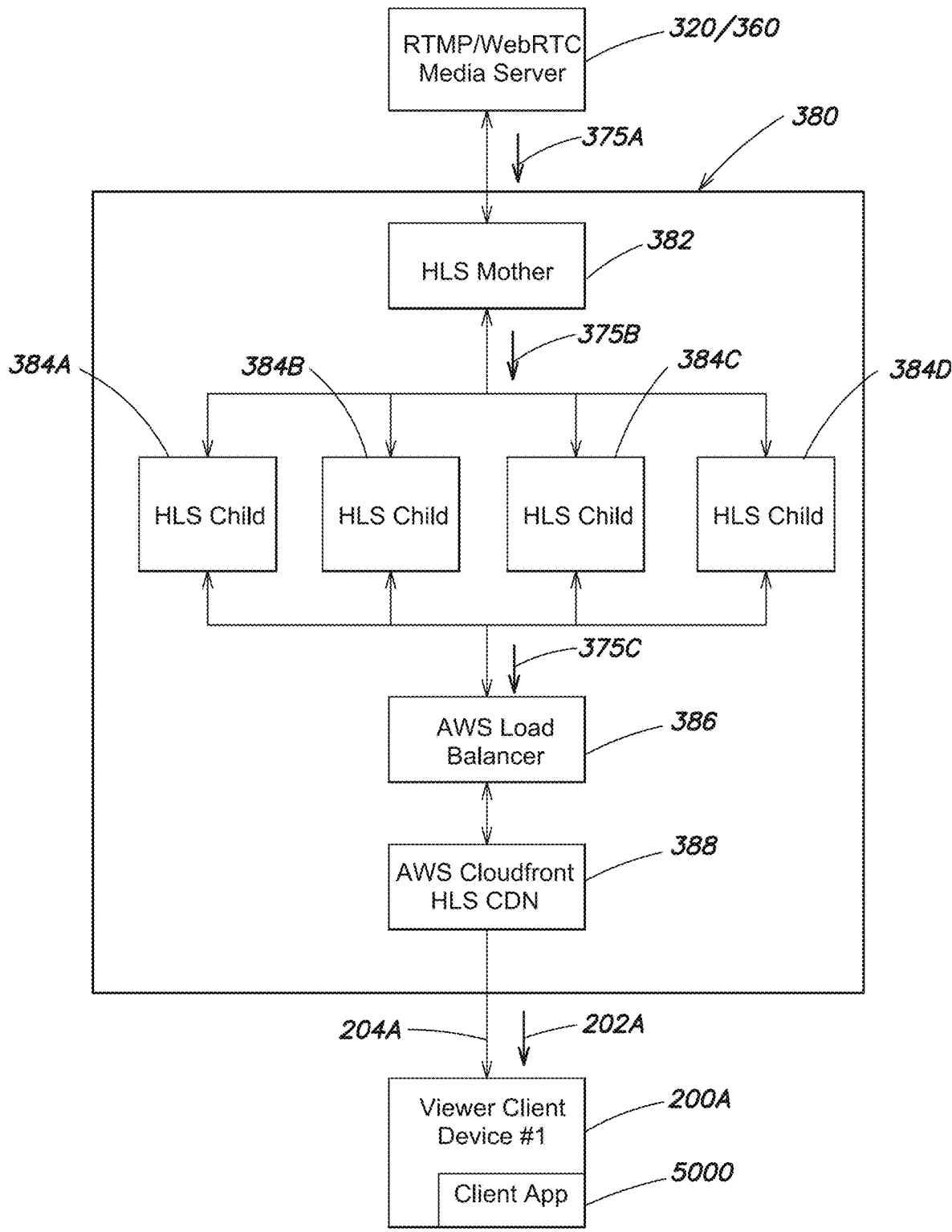
FIG. 8 is a block diagram showing additional details of the HLS server architecture of the servers and memory storage devices shown in FIGS. 2, 3 and 6, according to some inventive implementations.

FIG. 8 is a block diagram showing additional details of the HLS server architecture 380 of the servers and memory storage devices 1000 shown in FIGS. 2, 3 and 6, according to some inventive implementations. FIGS. 9A through 9D show a process flow illustrating an HLS stream viewing process 902A, 902B, 902C and 902D performed by the HLS server architecture 380 shown in FIG. 8, according to one inventive implementation. As some of the discussion of the HLS server architecture 380 relates to processing of a live stream at a media server, reference is made again to the media server process discussed above in connection with FIGS. 5A, 5B, and 5C.

HTTP Live Streaming (HLS) is a conventional HTTP-based media streaming communications protocol, in which a live media stream (e.g., video and accompanying audio) is divided up or "segmented" by an HLS media server into a sequence of small files that may be downloaded to a viewer client device via HTTP communications with the HLS media server, wherein each downloaded file represents one short segment or "chunk" of a copy of the live stream. As respective chunks of the copy of the live stream are downloaded and played by the viewer client device, the client device may select from multiple different alternate streams containing the same video/audio material transcoded by the media server at a variety of data rates (e.g., at different resolutions), allowing the HLS streaming session to adapt to the available data bit rate/bandwidth of the client device's connection to the HLS server. HLS connections are, by definition, not persistent connections between the HLS media server and the viewer client device, since requests for and delivery of HLS content uses only standard HTTP transactions. This also allows HLS content to be delivered to multiple viewer client devices over widely available HTTP-based content delivery networks (CDNs).

With reference again to the media server process in FIGS. 5A, 5B, and 5C, as a broadcaster's live stream is received by a media server it is cached for some amount of time (e.g., 10 to 30 seconds). The broadcaster's live stream typically includes a succession of frames at some frame rate (e.g., 30 frames/sec), and the succession of frames includes multiple "keyframes" associated with video encoding/compression. Such keyframes include the "full" content of an instant of the video, and these keyframes reset the basis of calculation (compression/estimation) for ensuing video information; in conventional video encoding/compression techniques, compressed frames between keyframes essentially include only information representing what has changed in the content between respective frames, and not the entire visual content for corresponding instants of the video. Increasing the frequency of keyframes in the stream of video frames reduces any errors that may be introduced in the compression process, as such errors would have a shorter lifespan (there would be fewer numbers of compressed frames between keyframes).

As indicated in FIG. 5B, an incoming live stream from a broadcaster and received by a media server (e.g., incoming H.264 from an RTMP broadcaster client, or VP8 from a WebRTC broadcaster client that has been transcoded to H.264) is transcoded (e.g., by the media server) to provide different resolution copies of the live stream at corresponding different bitrates (e.g., to facilitate adaptive bitrate streaming, as noted above). For example, the broadcaster's live stream may be transcoded to provide 720p, 360p and 240p different resolution copies of the live stream. As part of the transcoding process, the media server may be configured such that the keyframe interval for each transcoded copy is a predetermined value, and the keyframe interval for the transcoded copies may be the same as or different than a keyframe interval associated with the broadcaster's incoming live stream. Conventional examples of keyframe intervals that may be configured at a media server for transcoded copies of the live stream range from about 60 frames to 300 frames of video, and in some instances as high as 600 frames (at an exemplary frame rate of 30 frames/second, the associated time durations for such keyframe intervals range from two seconds for a keyframe interval of 60 frames to 10 seconds for a keyframe interval of 300 frames, and in some instances as high as 20 seconds for a keyframe interval of 600 frames).

As discussed above in connection with FIG. 5C, to implement HLS each of these different resolution copies is divided into small segments of video based in part on the keyframe interval of the copies. More specifically, the media server may be configured to set a target segment length (duration) of each segment into which the transcoded copy of the live stream is divided. An example of a conventional target segment duration for HLS is 10 seconds; however, as discussed below, in some implementations the media server is particular configured to have a significantly lower target segment duration to facilitate the functionality of the HLS server architecture 380 in processing copies of segmented live streams.

With reference again to FIG. 5C, the media server ultimately divides each copy of the live stream into respective video segments having a duration that is as close as possible to the target segment duration, with the proviso that a segment must start on and include a keyframe but may include one or more keyframes (i.e., the segment duration in practice is based on the target duration configured in the media server, some multiple of keyframes, and the frame rate of the transcoded copy). For purposes of illustration, and taking a conventional target segment duration of 10 seconds, a frame rate of 30 frames/second, and a keyframe interval of from 60 to 300 frames, each conventional 10 second HLS segment may have 1 keyframe (given a keyframe interval of 300 frames) or up to 5 keyframes (given a keyframe interval of 60 frames).

For each transcoded different resolution copy of the broadcaster's live stream, the HLS segments of the copy are stored as small files (referred to in HLS as .ts files). Thus, in an example in which there are 720p, 360p and 240p transcoded copies of the live stream, there are three sets of .ts files being generated and stored in memory at the media server as each of the copies are segmented by the media server. For each set of .ts files corresponding to a different resolution copy of the live stream, a "chunklist" is created and maintained by the media server that includes a list of pointers (e.g., relative URLs) to corresponding .ts files stored in memory; accordingly, in the example of three different resolution copies, there would be three different corresponding chunklists.

The number of pointers in a given chunklist may be referred to as the "HLS window" or "HLS buffer length," and this HLS window/buffer length may be set as a configuration parameter for the media server. One conventional example of an HLS window/buffer length is 10 pointers to corresponding .ts files. The number of pointers in the chunklist multiplied by the duration of the HLS segment represented by each .ts file is referred to as the "HLS latency," because a viewing client that requests an HLS copy (i.e., succession of .ts files) typically does not start downloading a first .ts file representing a video segment until the chunklist is completely populated with the set number of pointers to corresponding .ts files (the HLS window/buffer length). Given the example above of a conventional target segment duration of 10 seconds, this results in a conventional HLS latency on the order of 100 seconds. This HLS latency also may be viewed as a "buffer time" that provides for stability of the HLS stream in the event of communications issues or interruptions in network connectivity; the latency arising from the segment duration and HLS window/buffer length provides for the overall download and playback time of the .ts file segments before another chunklist is downloaded by a viewer client device, thereby mitigating potential connectivity issues that may occur between the client device and a CDN server during this buffer time (presuming that, under normal circumstances, it is quicker for the client to download a .ts file segment than it is for the client to play the segment). As new .ts files get created in the segmenting process for a given resolution copy of the live stream, the media server puts a new pointer to the newest .ts file into the corresponding chunklist and, once the chunklist is filled the first time with the set number of pointers corresponding to the buffer length, the oldest pointer gets "bumped out" of the chunklist when a new segment/pointer is generated, in a first-in-first-out (FIFO) manner.

Below is an example of a chunklist that includes six pointers to corresponding .ts files representing HLS video segments:

```
==> curl -v https://we109.media.castr.live/t1/ngrp:397965_all/chunklist_w1844413579_b2096000.m3u8
* Trying 198.204.252.202...
* TCP_NODELAY set
* Connected to we109.media.castr.live (198.204.252.202) port 443 (#0)
* TLS 1.2 connection using TLS_ECDHE_RSA_WITH_AES_128_GCM_SHA256
* Server certificate: *.media.castr.live
* Server certificate: Go Daddy Secure Certificate Authority - G2
* Server certificate: Go Daddy Root Certificate Authority - G2
> Get /t1/ngrp:397965_all/chunklist_w1844413579_b2096000.m3u8 HTTP/1.1
> Host: we109.media.castr.live
> User-Agent: curl/7.51.0
> Accept: */*
>
< HTTP/1.1 200 OK
< Accept-Ranges: bytes
< Server: WowzaStreaming Engine/4.7.0.01
< Cache-Control: no-cache
< Access-Control-Allow-Origin: *
< Access-Control-allow-Credentials: true
< Access-Control-Allow-Methods: OPTIONS, GET, POST HEAD
< Access-Control-Allow-Headers: Content-Type, User-Agent, If-Modified-Since, Cache-Control, Range
< Date: Thu, 08 Jun 207 21:10:47 GMT
< Content-Type: application/vnd.apple.mpegurl
< Content-Length: 368
<
#EXTM3U
#EXT-X-VERSION:3
#EXT-X-TARGETDURATION: 4
#EXT-X-MEDIA-SEQUENCE:349
#EXTINF:2.352,
media_w1844413579_b2096000_349.ts
#EXTINF:2.04,
media_w1844413579_b2096000_350.ts
#EXTINF:2.002,
media_w1844413579_b2096000_351.ts
#EXTINF:2.001,
media_w1844413579_b2096000_352.ts
#EXTINF:2.001,
media_w1844413579_b2096000_353.ts
#EXTINF:2.001,
media_w1844413579_b2096000_354.ts
```

In addition to a chunklist for every different resolution copy of the broadcaster's live stream, the media server also creates an HLS "playlist" file (e.g., having a file extension .m3u8) corresponding to the broadcaster's live stream. The HLS playlist includes a list of the transcoded different resolution copies of the live stream, and for each item in the list the playlist also includes a corresponding bandwidth/bitrate, one or more codecs for encoding the copy of the stream, and a pointer (e.g., relative address or URL) to the corresponding chunklist:

720p copy-bitrate-codec(s)-relative URL1 for chunklist1
360p copy-bitrate-codec(s)-relative URL2 for chunklist2
240p copy-bitrate-codec(s)-relative URL3 for chunklist3

An example of an HLS playlist file is provided below:

```
==> curl -v https://we109.media.castr.live/t1/ngrp:397965_all/playlist.m3u8
* Trying 198.204.252.202...
* TCP_NODELAY set
* Connected to we109.media.castr.live (198.204.252.202) port 443 (#0)
* TLS 1.2 connection using TLS_ECDHE_RSA_WITH_AES_128_GCM_SHA256
* Server certificate : *.media.castr.live
* Server certificate: Go Daddy Secure Certificate Authority - G2
* Server certificate: Go Daddy Root Certificate Authority - G2
> Get /t1/ngrp:397965_all/playlist.m3u8 HTTP/1.1
> Host: we109.media.castr.live
> User-Agent: curl/7.51.0
> Accept: */*
>
< HTTP/1.1 200 OK
< Accept-Ranges: bytes
< Access-Control-Expose-Headers: Date, Server, Content-Type, Content-Length
< Server: WowzaStreaming Engine/4.7.0.01
< Cache-Control: no-cache
< Access-Control-Allow-Origin: *
< Access-Control-allow-Credentials: true
< Access-Control-Allow-Methods: OPTIONS, GET, POST, HEAD
< Access-Control-Allow-Headers: Content-Type, User-Agent, If-Modified-Since, Cache-Control, Range
< Date: Thu, 08 Jun 207 21:07:51 GMT
< Content-Type: application/vnd.apple.mpegurl
< Content-Length: 368
<
#EXTM3U
#EXT-X-VERSION:3
#EXT-X-STREAM-INF:BANDWIDTH=2296000,CODECS="avc1.77.41,mp4a.40.2",RESOLUTION=1280x720
chunklist_w1844413579_b2096000.m3u8
#EXT-X-STREAM-INF:BANDWIDTH=1031000,CODECS="avc1.77.31,mp4a.40.2",RESOLUTION=640x360
chunklist_w1844413579_b946000.m3u8
#EXT-X-STREAM-INF:BANDWIDTH=449000,CODECS="avc1.66.30,mp4a.40.2",RESOLUTION=426x240
chunklist_w1844413579_b414000.m3u8
* Curl_http_done: called premature == 0
* Connection #0 to host we109.media.castr.live left intact
```

Thus, the HLS "file suite" corresponding to a broadcaster's live stream includes:
- A playlist of different resolution copies with corresponding pointers to chunklists
- The chunklists, each containing a set of pointers to corresponding .ts files
- The .ts files pointed to in the chunklist for each different resolution copy To play an HLS copy of a live stream, the viewer client device first requests a copy of the corresponding HLS playlist file from the media server. Based on the available bandwidth between the viewer client device and the media server at any given time, once the playlist is received the viewer client device selects the most appropriate resolution copy from the playlist having a bit rate that may be accommodated by the available bandwidth; this provides for adaptive bit rate streaming in that, from time to time, the viewer client device may select a different resolution/different bitrate copy of the live stream from the list of copies in the HLS playlist based on changes in the available bandwidth (e.g., quality of connection) between the viewer client device and the media server. Once the desired copy is selected from the playlist based on available bandwidth, the viewer client device then requests from the media server the current chunklist associated with the selected copy of the live stream, based on the corresponding pointer to the chunklist that is present in the playlist. As noted above, the chunklist for each copy of the live stream is continuously updated by the media server (FIFO) as new .ts files are created by the media server. Once the viewer client device retrieves the chunklist, it can then in turn begin retrieving the respective .ts files pointed to in the chunklist (e.g., via corresponding relative URLs) and playing the video segments represented in the .ts files. The viewer client device repeatedly requests the appropriate chunklist from the media server (e.g., after every video segment is played) to retrieve a current version of the chunklist. In the foregoing manner, as noted earlier, data/files are transmitted from the media server to the viewer client device upon request pursuant to HTTP, as opposed to streaming data continuously between the media server and the viewer client device via a persistent data connection.

Conventionally, for every request from a viewer that a media server receives for an HLS copy of a live stream, the media server creates a new HLS file suite for the requester, including an HLS playlist, associated chunklists, and sets of .ts files. Typically, such requests for an HLS copy of a live stream would arrive at the media server from respective (e.g., geographically distributed) servers of a CDN that are in turn communicating with respective (e.g., geographically distributed) viewer client devices. As HLS viewer demand increases for copies of a particular broadcaster's live stream, the load (e.g., CPU demand) on the media server increases based on the media server's process for generating a new HLS file suite for each new HLS requester.

Moreover, given that different viewer client devices may be requesting (via corresponding different CDN servers) an HLS copy of the live stream at different points in time, the Inventors have recognized and appreciated that significant synchronization issues arise amongst respective viewers based at least in part on the media server's process for generating a new HLS file suite for each new request. More specifically, because the media server creates different HLS file suites at different times for different requesters, a first requester viewing a first copy of the live stream likely sees the video content some time earlier than or later than a second requester viewing a second copy of the live stream, because at any given time the respective requesters may be downloading and playing different video segments from their respective chunklists. For conventional HLS applications, this lack of synchronization amongst respective viewers typically would not pose any problems in viewer experience.

However, the Inventors have recognized and appreciated that in the example context of multiple viewers viewing respective copies of a broadcaster's live stream of video-based commentary regarding a live event, and also receiving and displaying event information as real-time updates about the event, this lack of synchronization amongst respective HLS viewers may significantly and adversely impact viewer experience. For example, particularly in the context of a "second screen experience," two different HLS viewers watching the same event on a first screen and watching the same broadcaster's live video-based commentary on a second screen may see the broadcaster's video-based commentary significantly out of synchronization with the live event on the first screen, and may receive and display event information (e.g., event score updates) on the second screen that are noticeably out of synchronization with the live event and/or the broadcaster's video-based commentary. Furthermore, if both of the viewers happen to be watching the same event together at the event venue on the same first screen (e.g., together in the same room at a gathering or party), they may find that their respective copies of the broadcaster's video-based commentary are noticeably out of synchronization on their respective viewer client devices.

In view of the foregoing technical problems relating to HLS viewer synchronization and media server loading, the Inventors have implemented an inventive technical solution via an HLS server architecture 380 that provides caching and amplifying functionality to address the above-noted technical problems. An example of such an HLS server architecture is shown in FIG. 8 and discussed in detail below, and FIGS. 9A through 9D illustrate flow diagrams that outline the process by which a given viewer client device requests and receives an HLS copy of a broadcaster's live stream via the HLS server architecture shown in FIG. 8.

In considering the various HLS multiple-viewer synchronization issues that are addressed by the HLS server architecture shown in FIG. 8 and the processes outlined in FIGS. 9A through 9D, the Inventors also have considered and addressed the overall latency implications of conventional HLS stream delivery in light of the inventive HLS server architecture disclosed herein. To this end, the Inventors have considered unconventional settings (e.g., at the media server) for various parameters relating to HLS streams such as keyframe interval, target segment duration, and HLS window/buffer length for chunklists. Recall in the discussion above that conventional examples of these parameters respectively include a keyframe interval of from 60 to 300 frames, a target segment duration of 10 seconds, and an HLS window/buffer length of 10 .ts files or "chunks," giving rise to a conventional HLS latency on the order of 100 seconds. Such a latency is practically untenable in the example context of multiple viewers viewing the live event itself in person or on a first screen, viewing respective HLS copies of a broadcaster's live stream of video-based commentary regarding the live event as a second screen experience (which would be 100 seconds out of synchronization with the live event/first screen), and also receiving and displaying on the second screen event information as real-time updates about the event (which would be 100 seconds out of synchronization with the video-based commentary on the second screen).

The Inventors have recognized and appreciated that the above-mentioned parameters may be specifically selected (e.g., via configuration of the media server) to significantly reduce latency while sufficiently maintaining stability of HLS content delivery. To this end, in one example inventive implementation, the keyframe interval for transcoded copies of the live stream may be set to 30 frames (i.e., significantly fewer than 60 to 300 frames), the target video segment duration may be set to two seconds (i.e., significantly lower than 10 seconds, and such that the succession of HLS segments respectively have two keyframes each at a frame rate of 30 frames/second), and the HLS window/buffer length may be set to from four to six segments in a chunklist (as opposed to 10 chunks in a chunklist as suggested conventionally). These parameters result in a significantly reduced HLS latency of approximately 8 to 12 seconds, as compared to a conventional HLS latency on the order of 100 seconds As shown in FIG. 8, in one implementation an HLS caching and amplifying server architecture 380 includes a "mother" server 382 and may also include one or more "child" servers 384A through 384D, disposed between a media server and an HLS CDN server pool 388, in which the HLS mother server acts as a single "virtual viewer" from a given media server's perspective. While FIG. 8 shows multiple child servers, it should be appreciated that in various inventive implementations the HLS server architecture need not have any child servers, or may only have one child server; however, the inclusion of one or more child servers in the inventive HLS server architecture facilitates enhanced scaling and reduced loading (e.g., CPU usage/bandwidth) on the mother server.

In example implementations, the HLS mother server, as well as one or more child servers, may be implemented as a customized NGINX-based caching server. Based on a single copy of an HLS file suite 375A (e.g., single playlist, associated chunklist(s), and associated .ts file segments) for a given broadcaster's live stream as provided by a media server 320/360 and received by the mother server 382 of the HLS server architecture, the mother server caches and passes on copies 375B of the elements of the file suite (as requested) to one or more child servers, which in turn cache and pass on copies 375C of the elements of the file suite to one or more geographically-distributed servers of a conventional (e.g., global) CDN (serving as an HLS CDN in tandem with the mother-child server architecture). In this manner, the mother and child servers of the HLS architecture act as caching and amplifying servers, so that identical HLS streams may be served from the HLS CDN server pool to multiple viewers of a given broadcast in a significantly narrower synchronization window than conventionally possible. In particular, in one example implementation, all HLS viewers receiving a copy of a broadcaster's live stream via the HLS server architecture shown in FIG. 8 are at most less than one HLS file segment duration out of synchronization with each other (referred to herein as "viewer segment concurrency").

As noted above, in conventional HLS, a viewer client device does not maintain a persistent connection with an HLS media server; similarly, by default, HLS media servers do not allow caching of HLS files (e.g., playlists, chunklists and .ts files). In particular, as illustrated above in the examples of a conventional HLS chunklist and a playlist, these files respectively include an explicit instruction that prevents caching (i.e., "Cache-control: no-cache"). For different types of files, cache-control conventionally may be set for some time period that allows a file to be temporarily stored (i.e., cached) by a requesting server, after which a fresh copy of the file needs to be requested from its origin server by the requesting server; as noted above, however, caching is conventionally prohibited for HLS files by an explicit instruction in the files.

Unlike conventional HLS, in inventive implementations of the HLS server architecture shown in FIG. 8, when a first requester requests a copy of a given broadcaster's live stream the HLS mother server establishes and maintains a persistent connection to the media server (e.g., the RTMP or WebRTC media server receiving the broadcaster's incoming live stream). In this manner, as long as the broadcaster is generating the live stream, at least one requester is requesting a copy of the live stream, and no matter how many requests may be made by globally-distributed CDN servers for copies of the live stream on behalf of requesting viewer client devices, the media server only sees the load of one requester (i.e., the HLS mother server). In this capacity, the HLS media server does not have to make copies of the HLS file suite to provide for additional requesters of the broadcaster's live stream as would be required in conventional HLS; instead, the HLS mother server requests and receives a single copy of the playlist file from the media server. As discussed further below in connection with FIGS. 9A through 9D, the HLS mother server requests the single copy of the playlist file from the media server in response to a request for the playlist file made by one of the HLS child servers to the mother server. The HLS child server makes such a request to the mother server in response to a request for the playlist file made by a CDN server to the child server on behalf of a requesting viewer client device. In a manner similar to that noted above, an HLS child also may open up and maintain a persistent connection with the HLS mother.

In an example implementation, when the HLS mother server requests and receives the HLS playlist file from the media server, the HLS mother server re-writes the caching rule in the received playlist file to allow the playlist to be cached for some period of time for which a broadcaster may be expected to provide the live stream (e.g., some number of hours up to 24 hours or 86,400 seconds); in particular, the HLS mother server strips the "Cache-control: no-cache" setting from the received playlist file and replaces it with a new cache-control command having some duration of caching time. The HLS mother server then caches the revised playlist file (for the duration of the new caching time) and typically the playlist file need not be requested again from the media server. A copy of this revised playlist file with a re-written caching rule in turn is provided upon request to one or more of the HLS child servers, which in turn cached the revised playlist file and pass additional copies of the revised playlist file to one or more CDN servers so that the playlist file is ultimately provided to one or more requesting viewer client devices. Based on the re-written caching rule, each of the involved servers may store a copy of the revised playlist file for the duration of the broadcaster's live stream and need not request it again; and again, as noted above, the media server only "sees" one requesting viewer and provides one playlist, no matter how many actual viewers may be requesting a copy of the broadcaster's live stream.

Figure 9A:
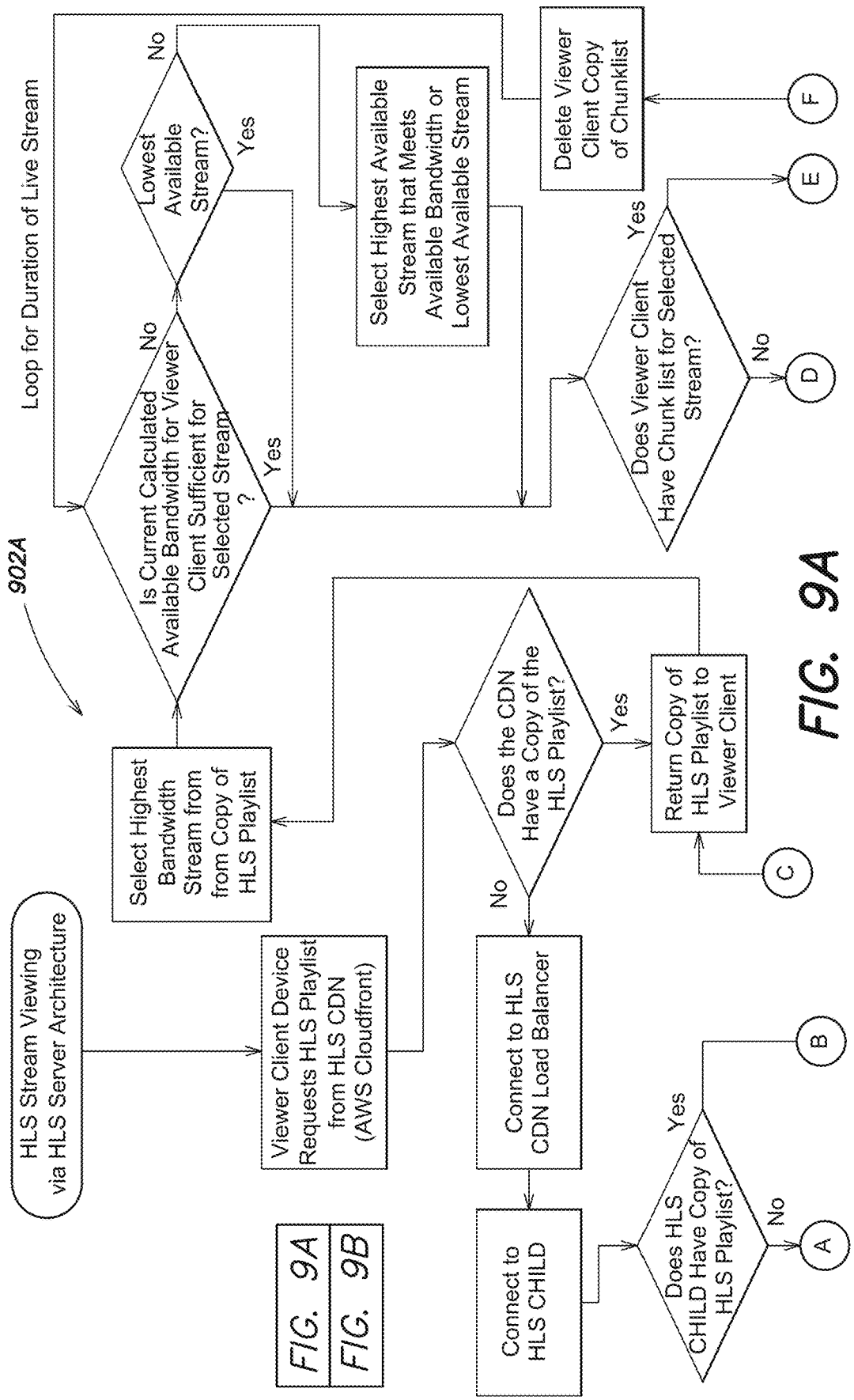
FIGS. 9A through 9D show a process flow illustrating an HLS stream viewing process performed by the HLS server architecture shown in FIG. 8, according to one inventive implementation.
Figure 9B:
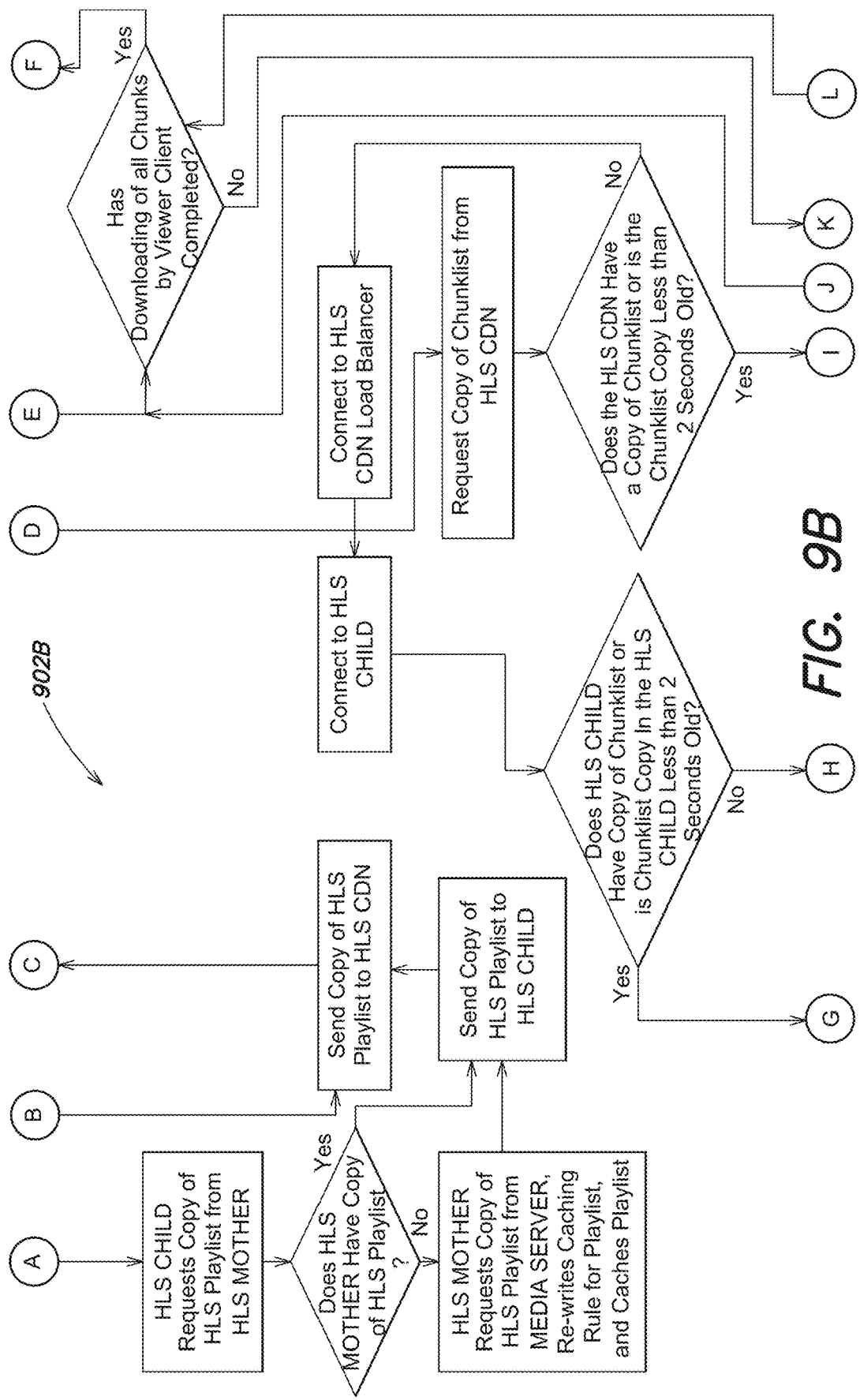
Figure 9C:
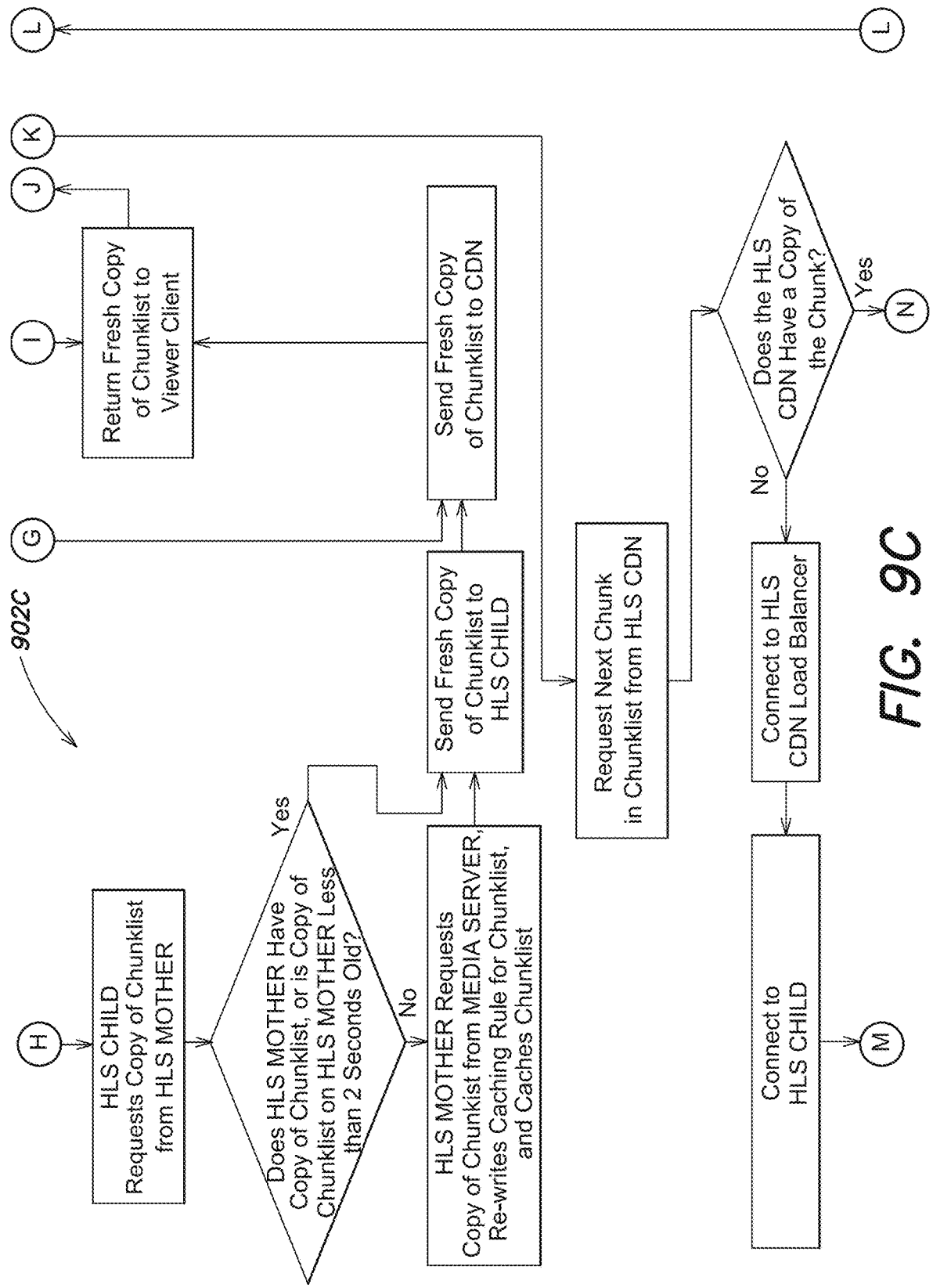
Figure 9D:
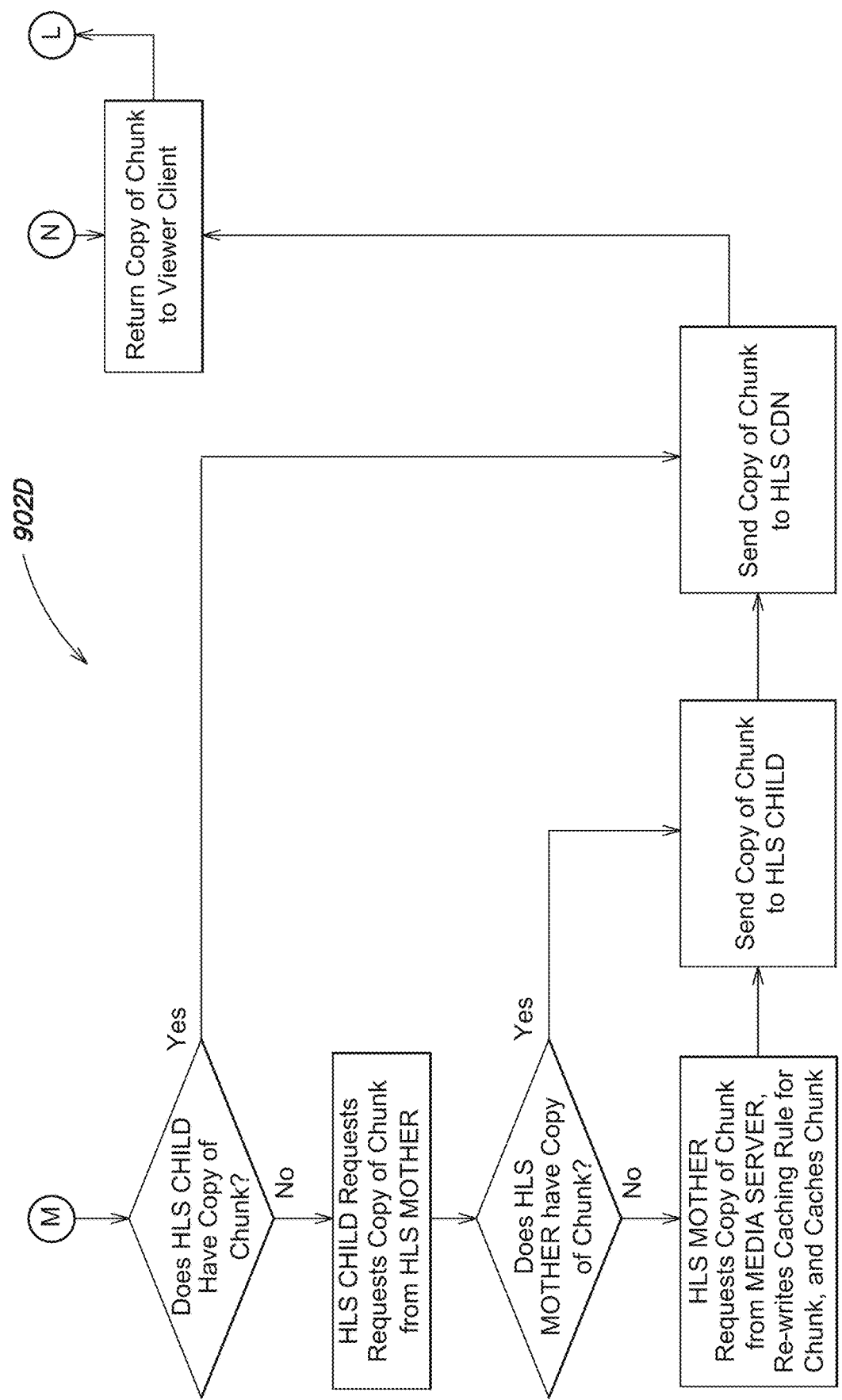

More specifically, as shown in FIG. 9A, when a given viewing client device wishes to receive a copy of a broadcaster's live stream, the client device first queries a CDN server for a copy of the HLS playlist file corresponding to the broadcaster's live stream. If the CDN server has a copy of the playlist (e.g., based on a previous request from another viewer client device), the CDN server returns the playlist to the currently requesting client device. If however the CDN server does not have a copy of the revised playlist, the CDN server connects to a CDN load balancer 386 and in turn requests a copy of the revised playlist from one of the HLS child servers as determined by the load balancer.

If the HLS child server has a copy of the revised playlist (e.g., based on a previous request from a CDN server), the HLS child server returns the revised playlist to the currently requesting CDN server (which in turn passes the playlist on to the requesting viewer client device). If however the HLS child server does not have a copy of the revised playlist, the HLS child server requests a copy of the revised playlist from the HLS mother server.

If the HLS mother has a copy of the revised playlist (e.g., based on a previous request from one of the HLS child servers), the HLS mother server returns the revised playlist to the currently requesting HLS child server. If however the HLS mother server does not have a copy of the playlist (e.g., because this is the first request for a copy of the broadcaster's live stream), the HLS mother server establishes a persistent connection with the appropriate media server (e.g., based on the relative URL for the HLS copy of the stream at a given media server), requests a copy of the playlist, and re-writes the caching rule for the playlist as discussed above. The HLS mother then caches the revised playlist, returns the revised playlist to the currently requesting HLS child server. The child server in turn caches the revised playlist and passes the revised playlist on to the requesting CDN server, which in turn also caches the revised playlist and passes the revised playlist on to the requesting viewer client device.

As shown in FIGS. 9A through 9D, once the viewer client device has the playlist, it selects from the playlist the appropriate resolution copy of the live stream based on the associated bitrate of the copy and the available bandwidth between the viewer client device and the CDN server. Based on the selected copy of the live stream, the viewer client device then requests from the CDN server the corresponding chunklist. In a manner similar to the request for the HLS playlist, each of the CDN server, an HLS child server, and the HLS mother server may be queried in turn for a copy of the corresponding chunklist.

However, an important distinction between the playlist and a requested chunklist relates to the "freshness" of the chunklist and the re-writing of the chunklist's caching rule by the HLS mother server. In particular, whenever the HLS mother server requests a given chunklist from the media server, the mother server re-writes the caching rule in the received chunklist file to allow the chunklist to be cached for some period of time, for example, the segment duration corresponding to a single .ts file (e.g., two seconds). In particular, the HLS mother server strips the "Cache-control: no-cache" setting from the chunklist file and replaces it with a new cache-control command having some duration of caching time (e.g., corresponding to a segment duration). In one aspect, a caching time corresponding to a segment duration is contemplated given that the chunklist does not change during this duration (and thus, any requests for the chunklist during this duration are generally unnecessary). The HLS mother server then caches the revised chunklist file (for the duration of the new caching time) and a copy of this revised chunklist file with a re-written caching rule in turn is provided upon request to one of the HLS child servers, which in turn also caches the revised chunklist and passes a copy of the revised chunklist file to a CDN server so that the chunklist file is ultimately provided to the requesting viewer client devices. Based on the re-written caching rule, each of the involved servers may cache a copy of the updated chunklist file for up to but no more than the specified caching time, which ensures that each copy of the chunklist stored on a given server is "fresh" (e.g., within one segment duration) for downloading to the requesting viewer client device, while also mitigating unnecessary resources spent on attending to requests for chunklists during a time period in which there are no changes to the chunklist. In an alternate implementation, a given child server may again re-write the caching rule for a chunklist file to prevent caching of the chunklist by a requesting CDN server (and thereby cause the CDN server to request the chunklist from the child server every time the chunklist is requested from the CDN server by a viewer client device, even if respective requests come from one or more viewer client devices within a segment duration).

Referring again to FIGS. 9A through 9D, and considering a non-limiting example implementation in which the segment duration corresponding to a .ts file is two seconds and the CDN servers maintain the same revised caching rules as the HLS mother and child servers, FIGS. 9A through 9D illustrates that when a requesting viewer client device does not have a chunklist, it requests the chunklist from a CDN server. If the CDN server does not have the chunklist, or if the chunklist cached on the CDN server is more than two seconds old (i.e., exceeds the cache time), the CDN server requests the chunklist from an HLS child server; otherwise, the CDN server returns a "fresh copy" of the chunklist to the requesting client. A similar process is repeated for the HLS child server and the HLS mother server, i.e., if the HLS child server does not have the chunklist, or if the chunklist cached on the child server is more than two second old, the child server requests the chunklist from the mother server; otherwise the child server returns a fresh copy of the chunklist to the requesting CDN server. If the HLS mother server does not have the chunklist, or if the chunklist cached on the mother server is more than two seconds old, the mother server requests the chunklist from the media server, re-writes the caching rule in the chunklist file, caches the revised chunklist file, and returns a fresh copy of the chunklist to the requesting child server (which in turn passes the fresh copy of the chunklist to the requesting CDN server and the requesting client device).

Once the requesting viewer client device has a fresh copy of the chunklist, the viewer client device begins requesting the respective .ts files or "chunks" pointed to in the chunklist. In some respects, as shown in FIGS. 9A through 9D, this process is similar to the processes outlined above for requesting the playlist and requesting one of the chunklists pointed to in the playlist. For example, the requesting viewer client device requests a chunk from a CDN server and, if the CDN server has the requested chunk (e.g., because another requesting viewer previously requested the same chunk from the same CDN server and the CDN server already has the chunk cached), the CDN server returns the chunk to the client device for playing the video segment represented in the chunk. If however the CDN server does not have the chunk cached, it requests the chunk from an HLS child server (e.g., via the CDN load balancer). A similar process is repeated for the HLS child server and the HLS mother server. If ultimately the mother server does not have the chunk cached and needs to request the chunk from the media server (e.g., because this is the first viewer request for this chunk), the mother server requests the chunk from the media server, re-writes the caching rule in the chunk file (e.g., to change the caching rule from "no-cache" to some period of time, for example one hour), caches the revised chunk, and returns a copy of the chunk to the requesting child server (which in turn passes the copy of the chunk to the requesting CDN server and the requesting client device).

Once the viewer client device has downloaded all chunks pointed to in the chunklist, it plays them in turn, deletes the current copy of the chunklist that the viewer client device has cached, and then again determines the appropriate resolution copy of the live stream to request based on the associated bitrates of the different resolution copies and the available bandwidth between the viewer client device and the CDN server. Typically, it takes less time for a client to download a chunk then to play it; accordingly, if there are network issues, the copy of the stream can keep playing on the viewer client device while it downloads new chunks. For example, if the client successfully downloaded three chunks (six seconds of video) in two seconds of wall clock time, there remains a four second buffer of video at the client device in case the fourth chunk has a delay in retrieval.

The foregoing process of requesting and receiving an appropriate fresh chunklist based on available bandwidth, and downloading and playing the chunks pointed to in the chunklist, is repeated for the duration of the broadcaster's live stream. For example, if the media server stops receiving the broadcaster's live stream, the media server may provide a message to the HLS mother server (e.g., in response to a request from the mother server for a fresh chunklist) that the live stream has been terminated; alternatively, the media server may provide an empty chunklist to the HLS media server, which essentially would ultimately terminate the iterative requesting process and the connection between the media server and the mother server would time out.

In other aspects, the HLS mother server shown in FIG. 8 monitors the current pool of media servers that may be servicing different broadcasters' live streams (e.g., as indicated in the database of the servers/memory storage devices 1000), and self-configures to provide for custom routing (e.g., via relative URLs) between a requesting CDN server and a particular media server to appropriately retrieve a requested HLS copy of a given broadcaster's live stream (i.e., via the appropriate playlist and associated chunklists and .ts files). For example, custom routing functionality of the mother server may allow the targeting of specific media servers via a single entry URL (e.g., https://hls.media.castr.live/we90/t1/ngrp:123456_all/playlist.m3u8 requests retrieval of the adaptive HLS playlist from server "we90" for stream 123456, which the mother server internally translates to https://we90.media.castr.live/t1/mgrp:123456_all/playlist.m3u8 and thereby requests the playlist from the appropriate server, for which, when received, the mother server re-writes the caching rule, caches the revised playlist, and passes on the revised playlist to a requesting child server).

As noted earlier, in some implementations the HLS CDN shown in FIG. 8 that makes requests to one or more HLS child servers may be provided as the Amazon Cloudfront CDN. In any event, the geographically-distributed servers of the CDN cache to the various elements of the HLS file suite and can serve these from a variety of geographic locations to provide a virtually infinite number of HLS viewers using only a relatively small HLS CDN pool; and, irrespective of the number of CDN servers requesting content on behalf of respective viewers, the CDN serves the content quickly, and the media server sees only a single virtual viewer as the HLS mother server. In one aspect, the different "layers" of servers in the HLS server architecture introduce some degree of latency between a given broadcaster's live stream and the viewer client devices; however, as noted above, all viewer client devices have "viewer segment concurrency," and the overall average latency for all viewers is nonetheless significantly reduced (e.g., as compared to conventional HLS). For example, given an example chunk segment duration of two seconds, and an example HLS window/buffer length of four segments, there may be up to eight seconds of latency introduced by the HLS segmenting process and another approximately two seconds of latency introduced by the transfer of files through the HLS server architecture.

It should be appreciated that the various concepts discussed herein relating to the HLS server architecture are similarly applicable to other segmented live video streaming protocols (e.g., MSS, HDS, MPEG-DASH) for which inventive server architectures are contemplated by the present disclosure.

VIII. Control Server and Associated Services/Processes

Figure 10:
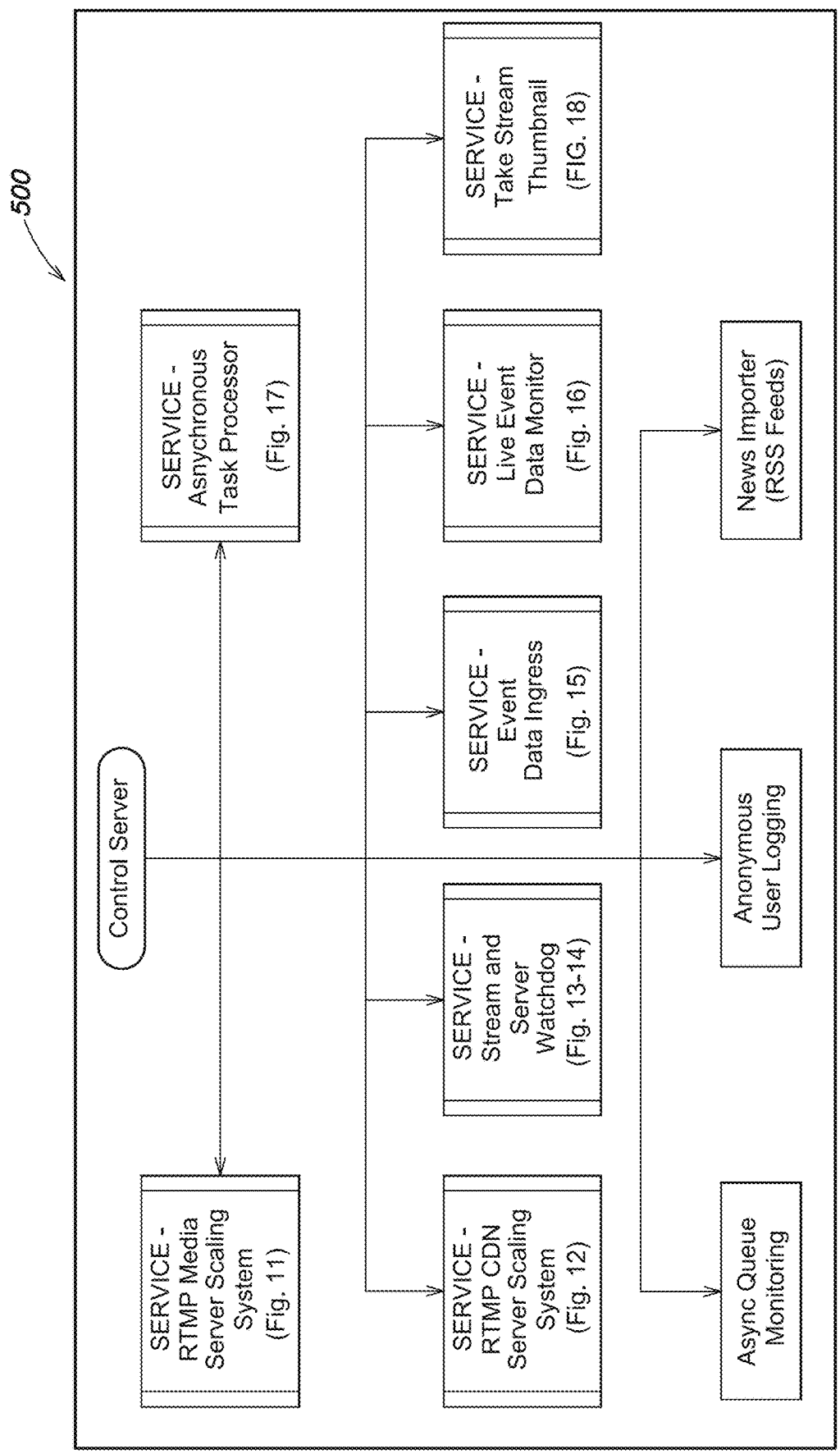
FIG. 10 illustrates some of the functionality (e.g., services and other processes) performed by the control server shown in FIGS. 2 and 3, according to one inventive implementation.

FIG. 10 illustrates some of the functionality (e.g., services and other processes) performed by the control server 500 shown in FIGS. 2 and 3, according to one inventive implementation. As noted above, the control server 500 is coupled to the memory system 400, one or more event information providers 55, one or more news feeds (RSS) 65 or other news sources, and the socket server(s) 600. In one aspect, the control server 500 periodically retrieves various event information from the event information provider 55 and/or news from the news feeds 65 that is germane to respective broadcasters' video-based commentary. In another aspect, the control system 500 may store at least some portion of retrieved event information and/or news in the memory system 400. More generally, the control server 500 implements a number of services/processes that govern functionality of other servers and devices in the servers/memory storage devices 1000; examples of such control system services/processes include, but are not limited to: an RTMP media server scaling process to add or remove servers from the one or more RTMP media servers 320 of the media sources 300 (see FIG. 11); an RTMP CDN server scaling process to add or remove servers from the RTMP CDN 340 of the media sources 300 (see FIG. 12); a live stream and media server watchdog process (see FIGS. 13-14); an event data ingress process (see FIG. 15); a live event data monitor process (see FIG. 16); an asynchronous task processor (see FIG. 17); and a live stream thumbnail/screenshot acquisition process (see FIG. 18).

1) Server Auto-Scaling Systems and Watchdogs

Figure 11A:
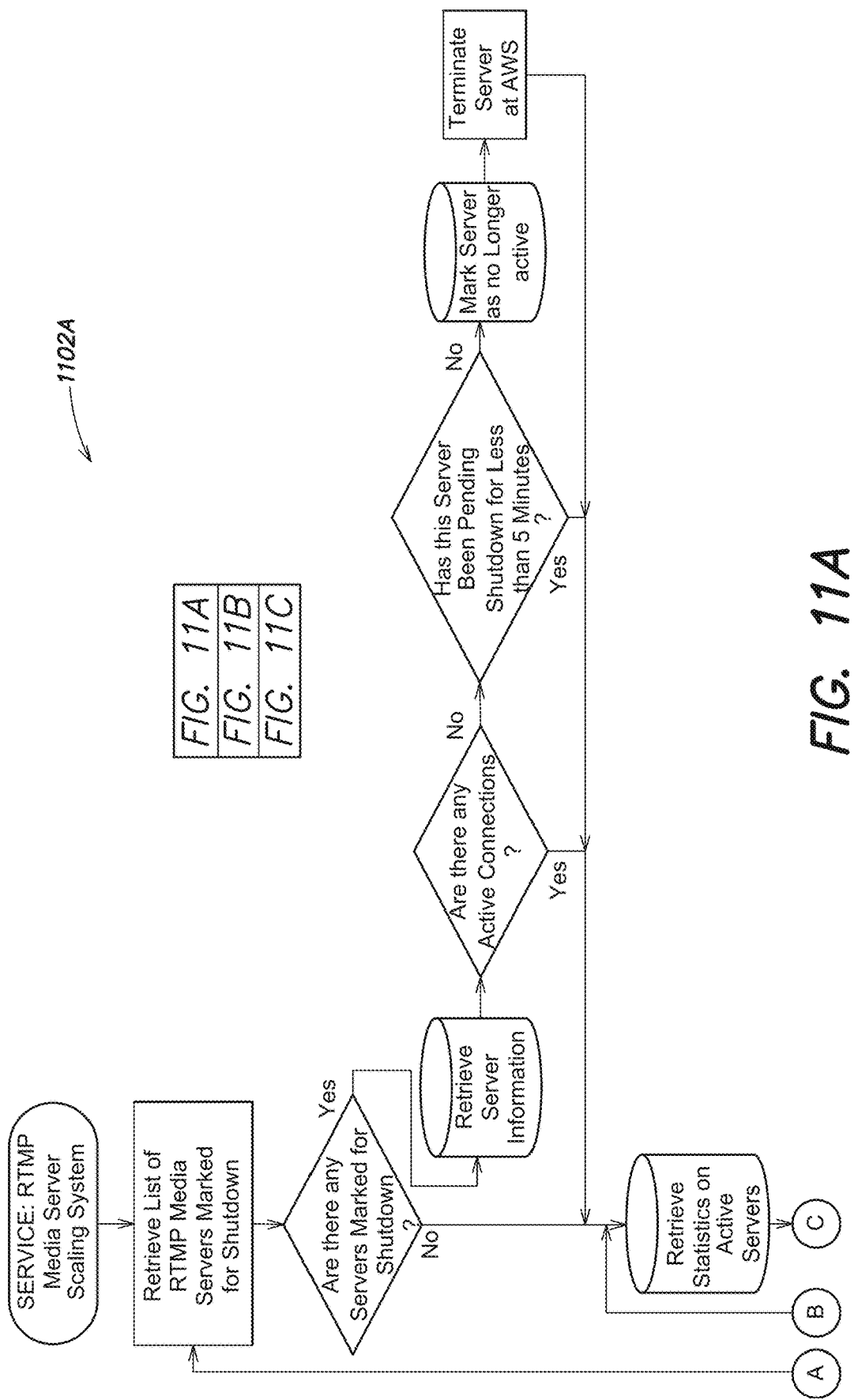
FIGS. 11A through 11C show a process flow diagram illustrating an RTMP media server scaling system service method performed by the control server of FIG. 10, according to one inventive implementation.
Figure 11B:
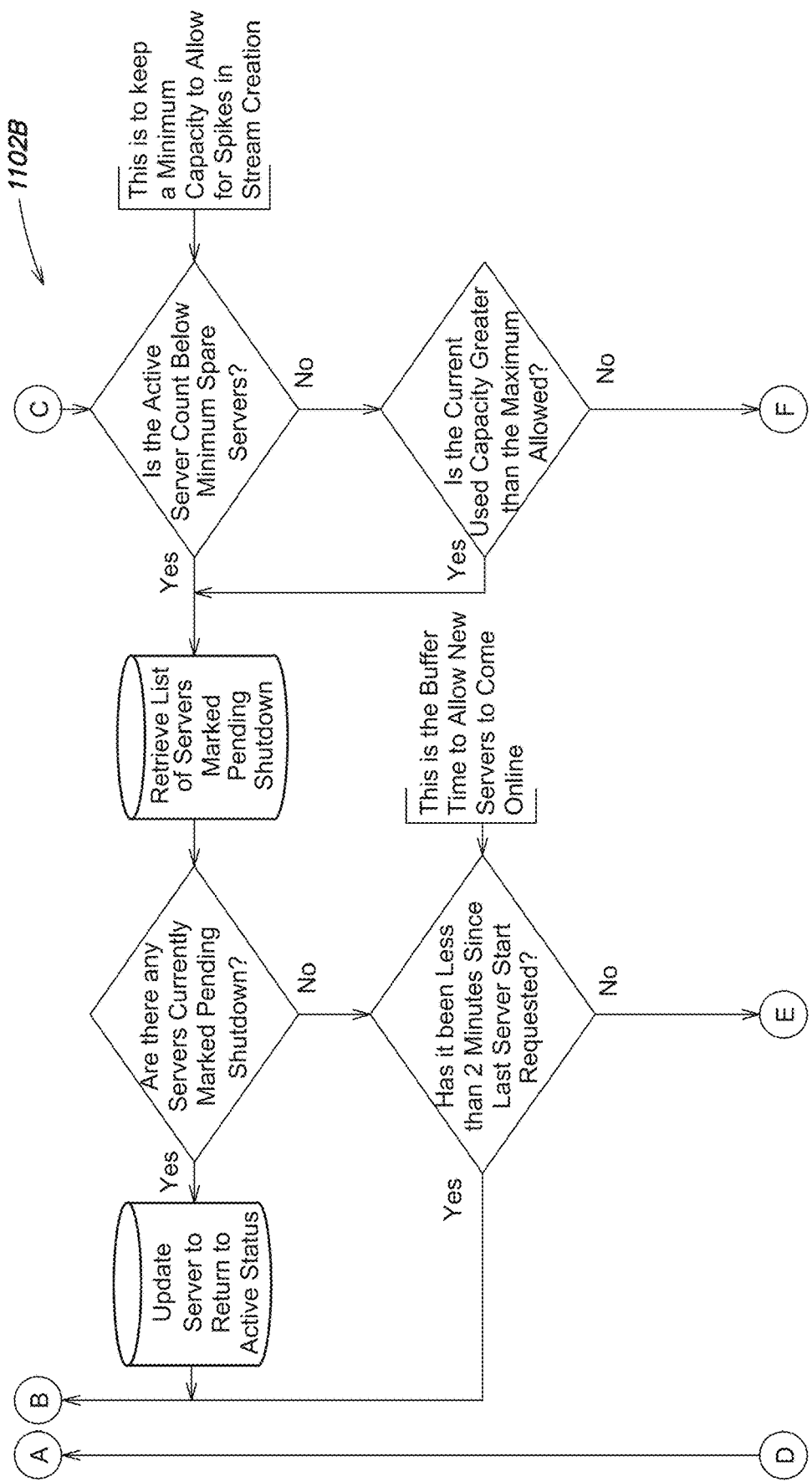
Figure 11C:
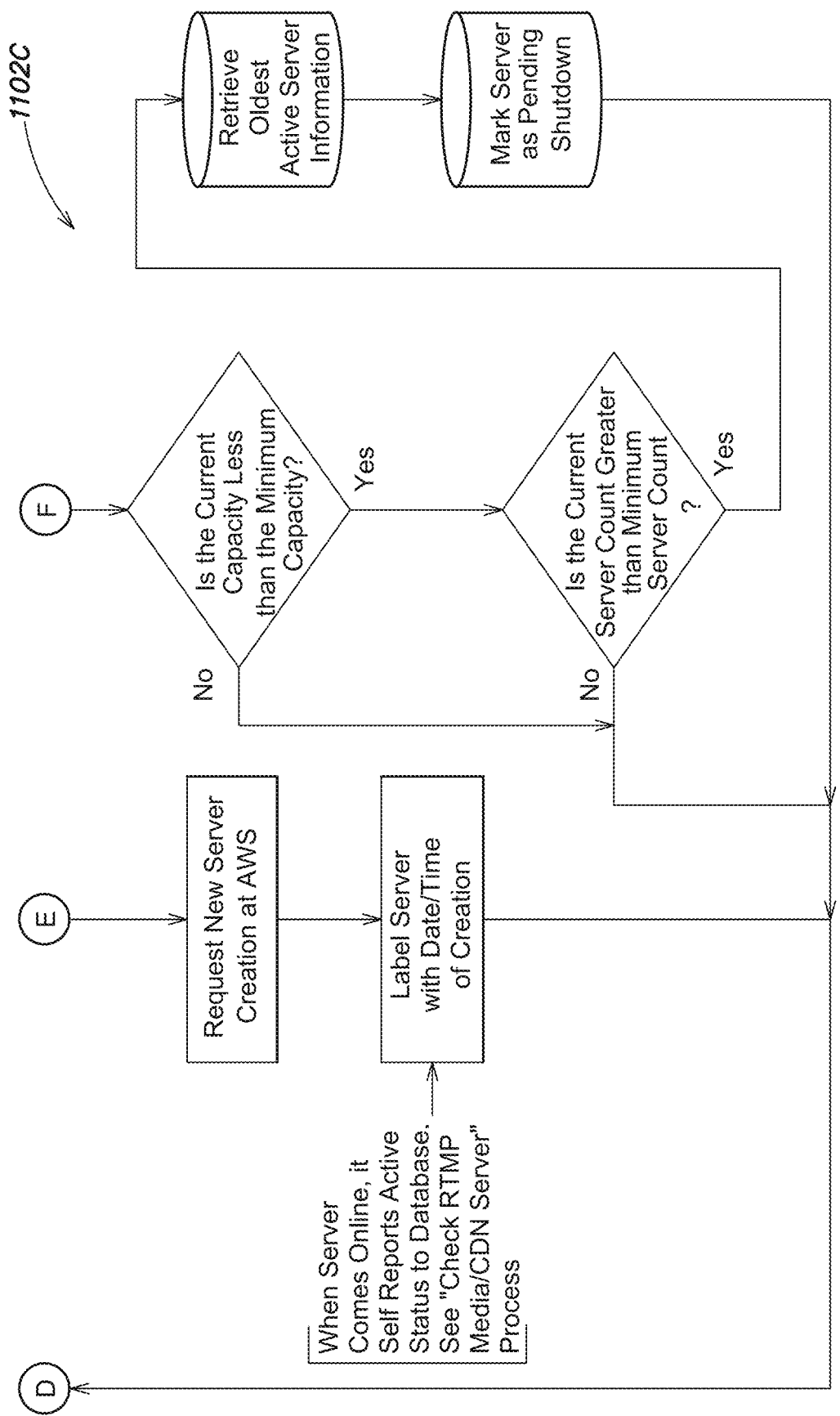
Figure 12A:
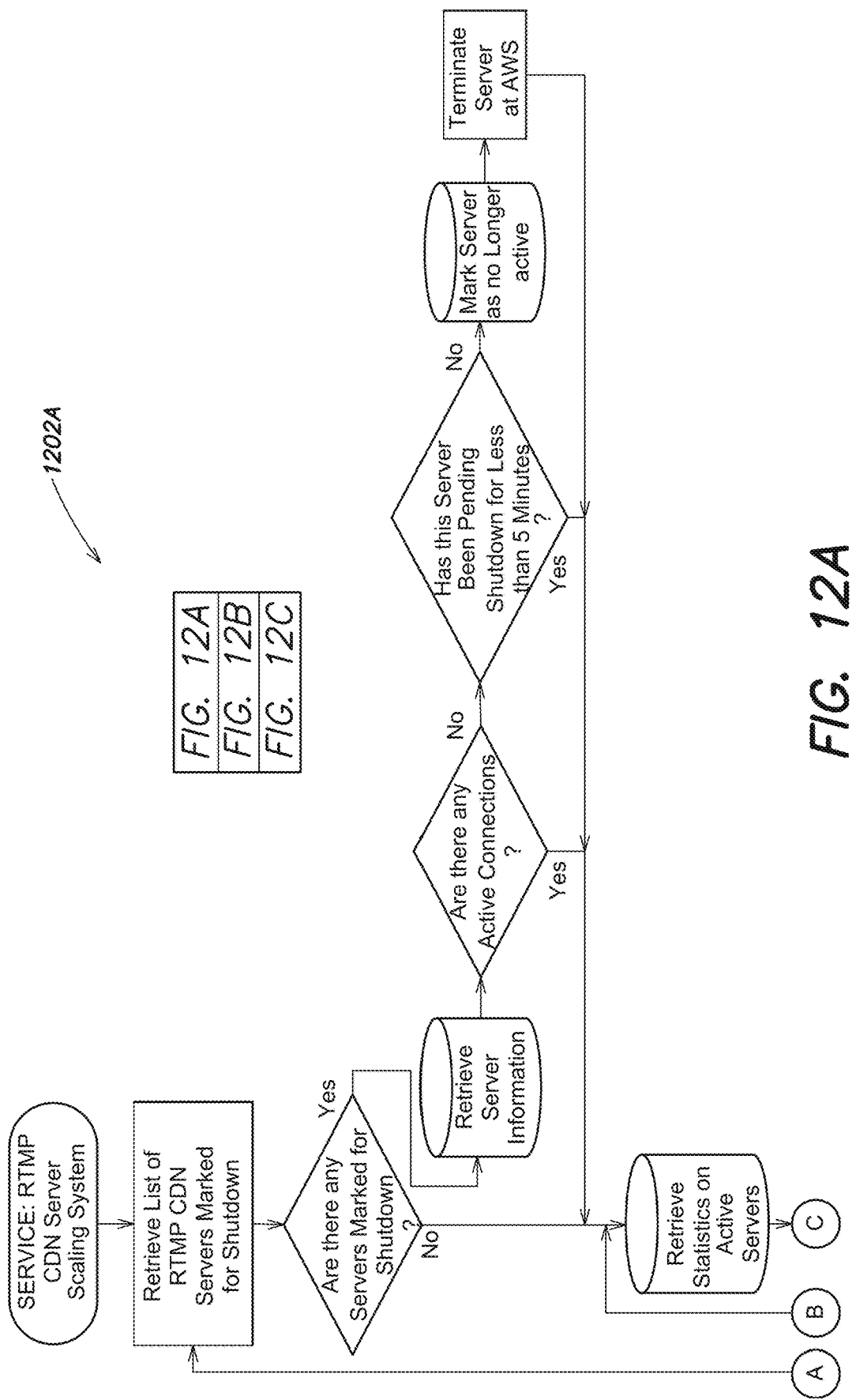
FIGS. 12A through 12C show a process flow diagram illustrating an RTMP CDN server scaling system service method performed by the control server of FIG. 10, according to one inventive implementation.
Figure 12B:
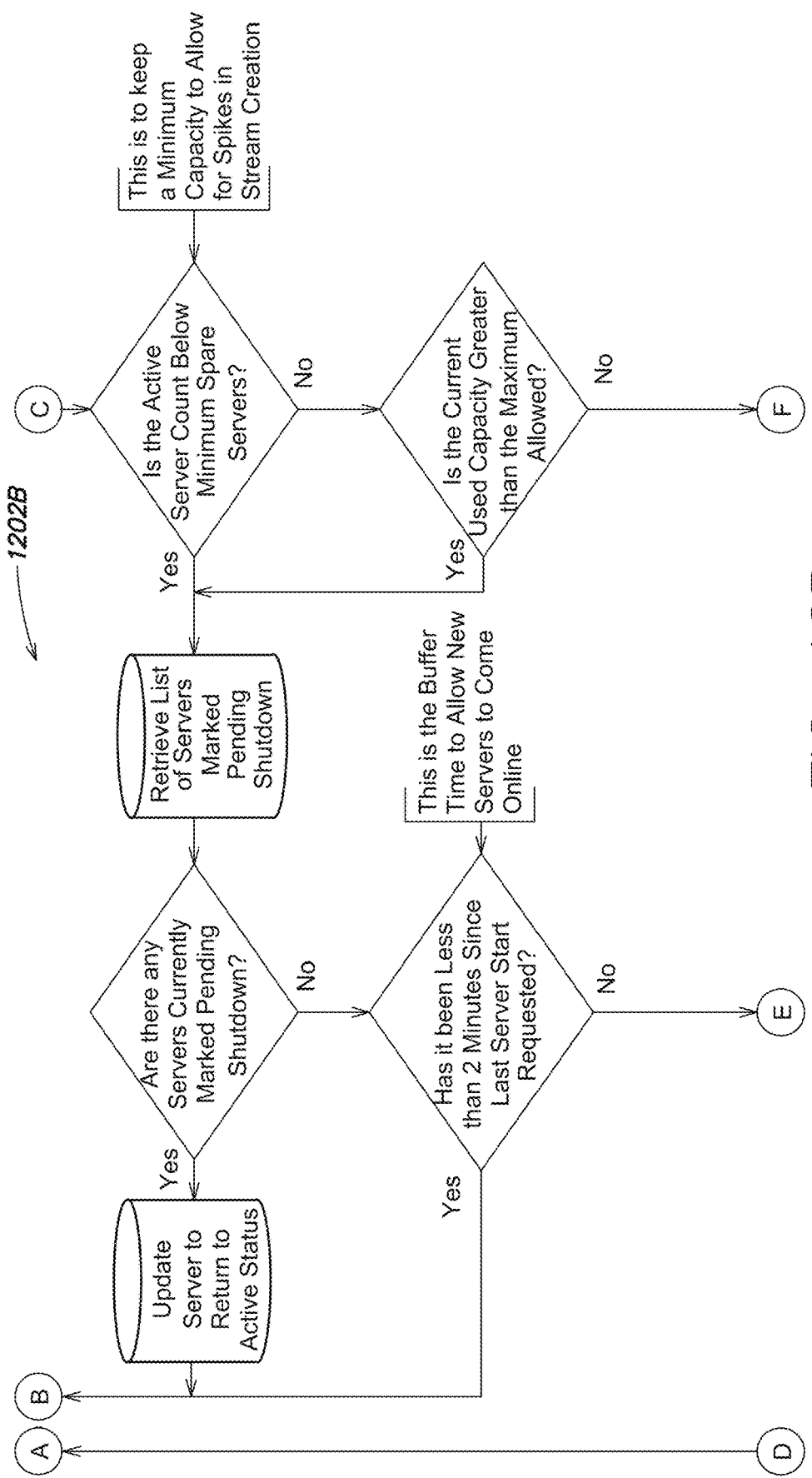
Figure 12C:
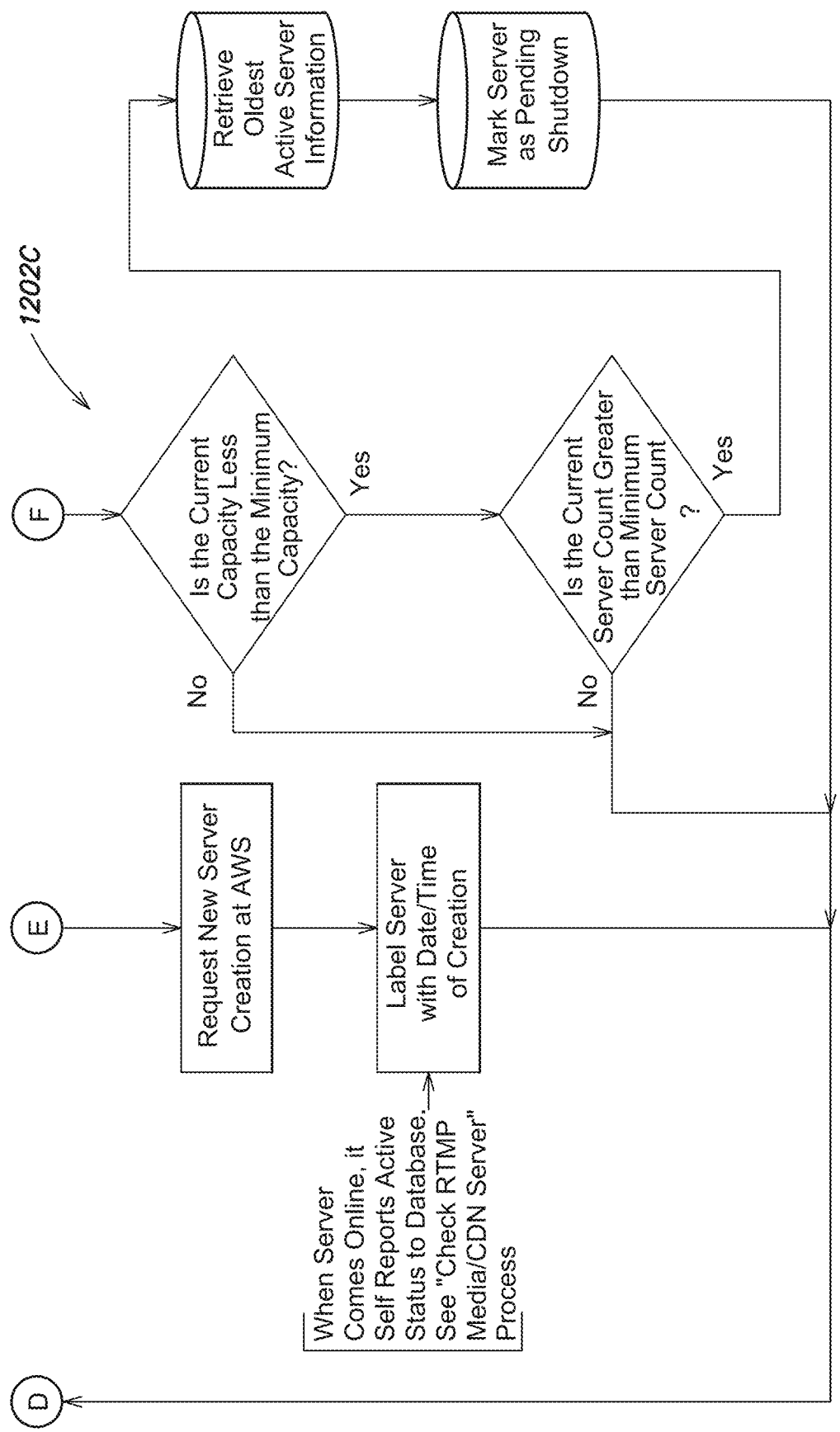

FIGS. 11A through 11C show a process flow diagram illustrating an RTMP media server scaling system service method 1102A, 1102B and 1102C performed by the control server of FIG. 10, according to one inventive implementation. In the method shown in these figures, the control servers automatically scale the number of RTMP media servers 320 of the media sources that are available for broadcasters based in part on the capacity demand for the servers (e.g., number of broadcasters providing live streams). The control server monitors various media server statistics that are maintained in the database 420 (e.g., number of active servers in the RTMP media server pool; servers marked for shutdown; individual server information such as server status active/shutdown, numbers of active connections to live streams, current capacity, date/time of when server first came online for availability, etc.) and brings servers in and out of the RTMP media server pool based at least in part on the server statistics. In various aspects, the control server maintains a minimum number of servers (e.g., at least two, or a minimum capacity corresponding to approximately double the cumulative traffic at a particular time) in the RTMP media server pool to allow for spikes in stream creation, and also provides for various buffering times to allow new servers to come online. FIGS. 12A through 12C show a process flow diagram illustrating an RTMP CDN server scaling system service method 1202A, 1202B, and 1202C performed by the control server of FIG. 10, according to one inventive implementation, that is similar in many respects to the method 1102A, 1102B and 1102C performed for the media server scaling service.

Figure 13A:
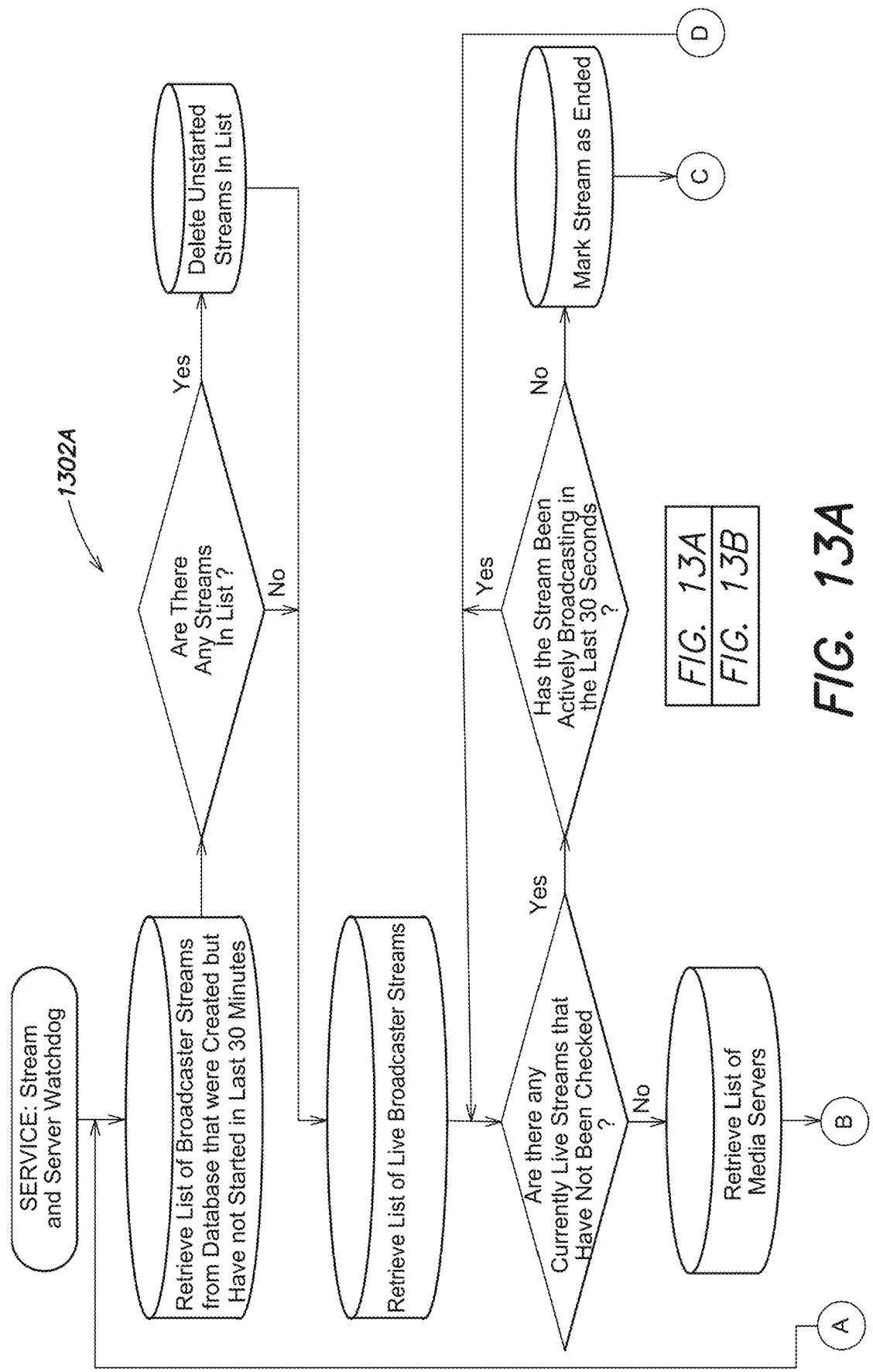
FIGS. 13A and 13B show a process flow diagram illustrating a stream and server watchdog service method performed by the control server of FIG. 10, according to one inventive implementation.
Figure 13B:
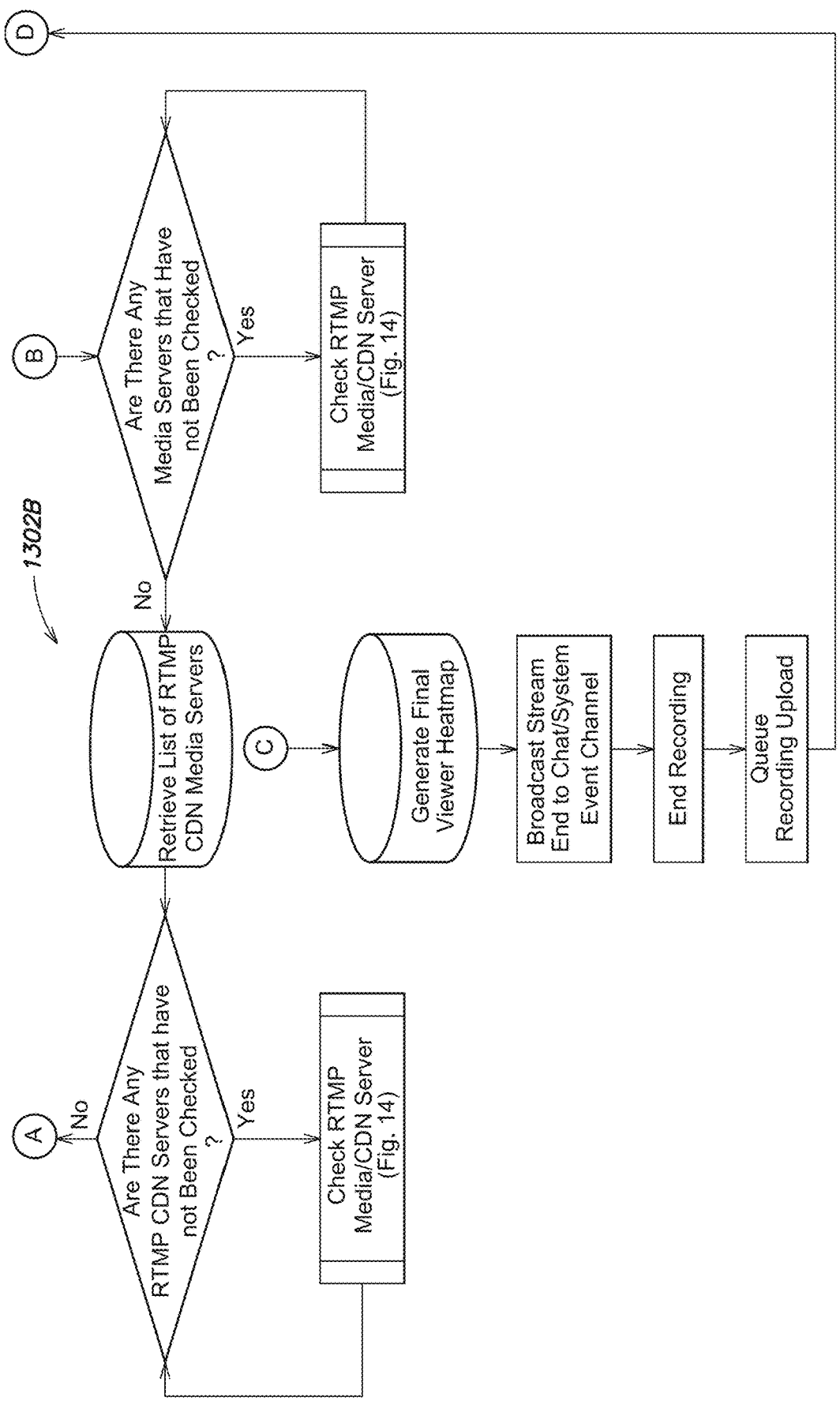
Figure 14A:
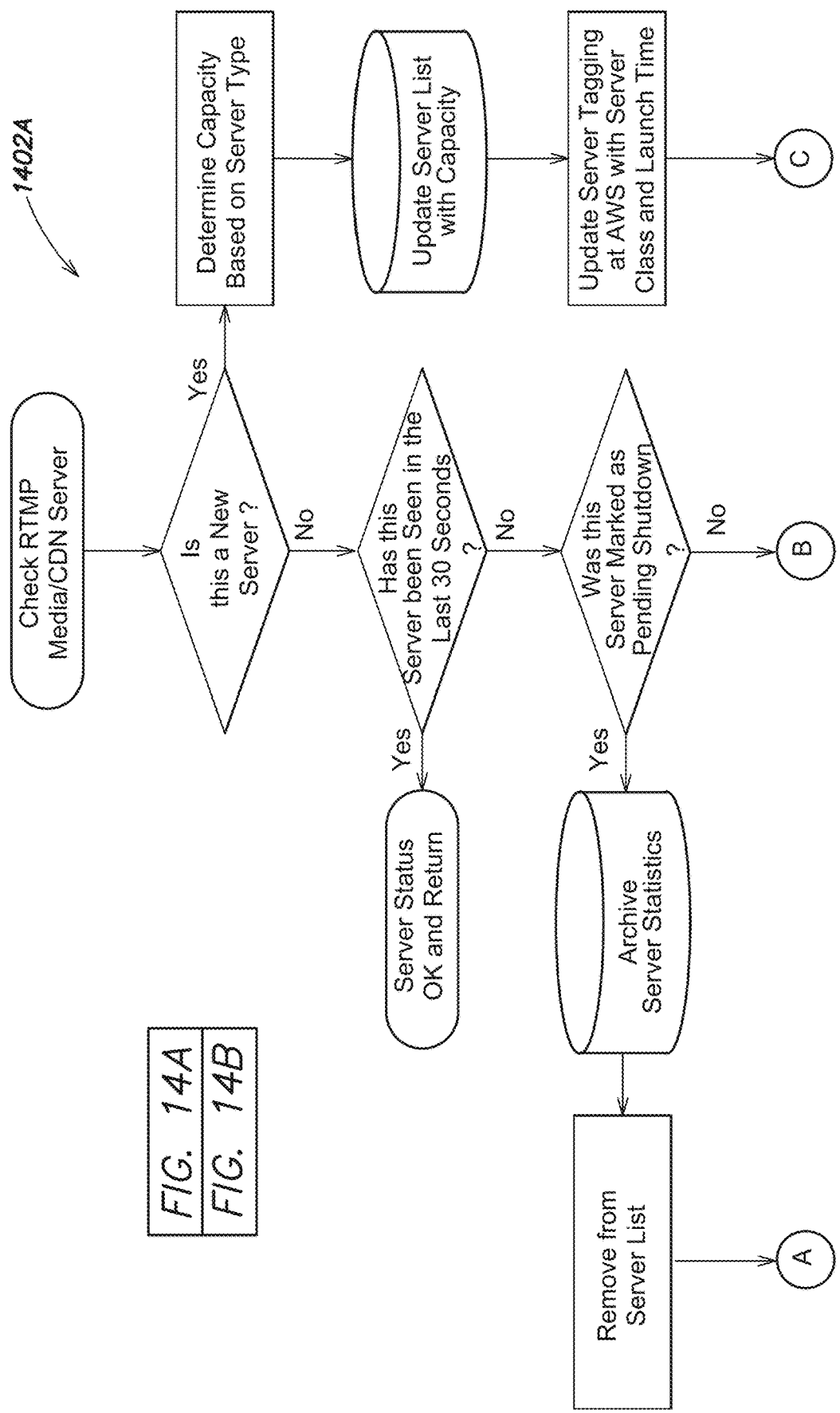
FIGS. 14A and 14B show a process flow diagram illustrating a check RTMP media/CDN server method performed by the control server of FIG. 10 (e.g., as part of the method shown in FIGS. 13A and 13B), according to one inventive implementation.
Figure 14B:
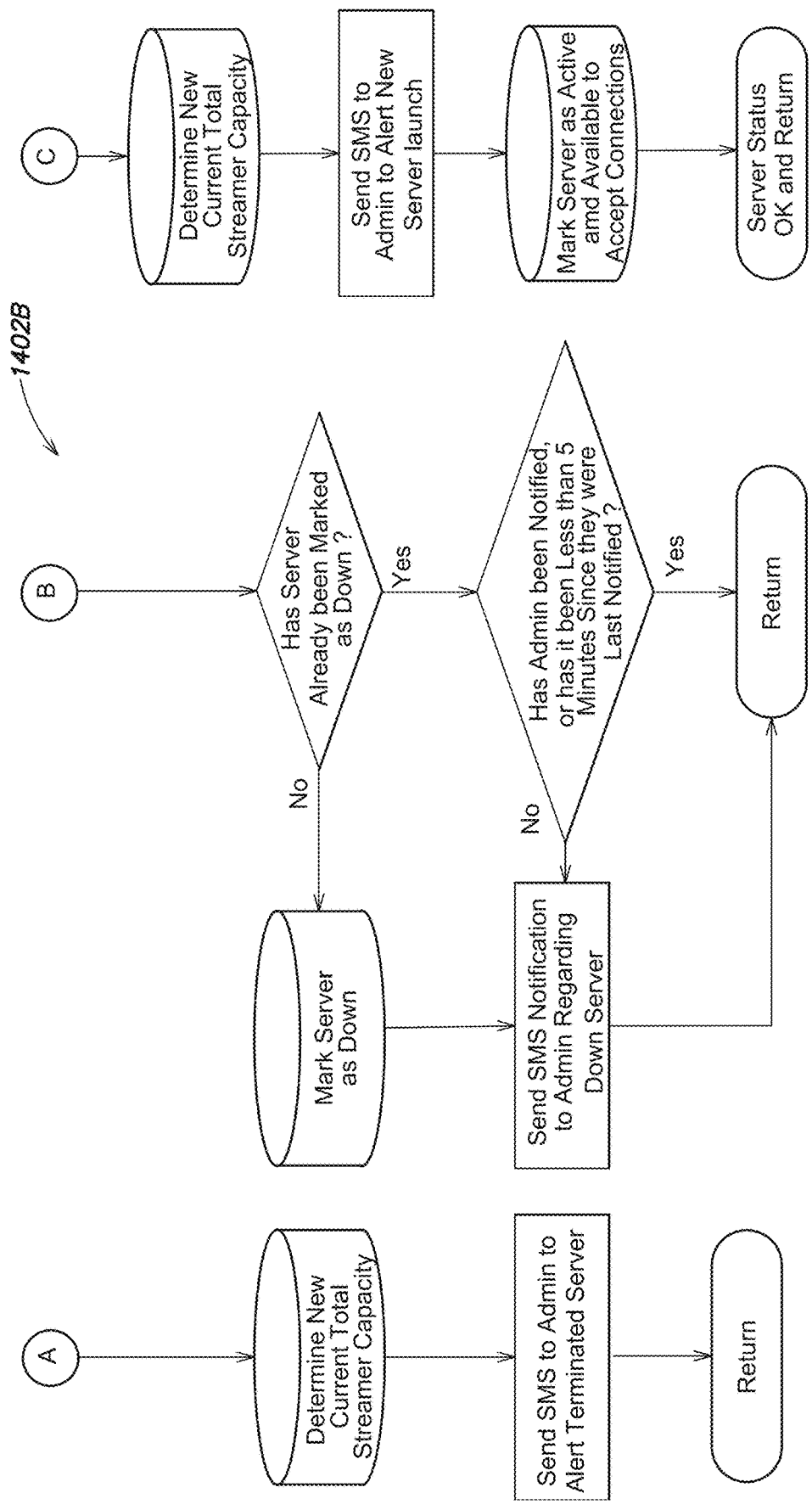

FIGS. 13A and 13B show a process flow diagram illustrating a stream and server watchdog service method 1302A, 1302B performed by the control server of FIG. 10, according to one inventive implementation. The stream watchdog performed by the control server essentially ensures that new streams created by broadcasters are valid and deletes streams that were created but not started, or that have been inactive for some period of time (e.g., 30 seconds). When streams are ended, the method generates final viewer statistics (e.g., stream duration, average number of viewers, maximum number of viewers, number of simultaneous viewers, viewers added, viewers left, etc.), broadcasts a "stream ended" system event message to the chat/system event socket(s) of the socket server(s) dedicated to the broadcaster's live stream, ends the recording of the live stream by the media server, and queues the recording to the video uploader queue of the media server process. The server watchdog portion of the method 1302A, 1302B monitors the RTMP media servers and the servers of the RTMP CDN and invokes the check RTMP Media/CDN server method 1402A, 1402B shown in FIGS. 14A and 14B. As part of the server watchdog process, for new servers the control server determines a capacity of the server (e.g., based on server type), and updates the database 420 with the capacity of respective servers, server class, launch time, status update (e.g., active and available for connections) and determines a total user/streamer capacity based on newly added servers. For servers that are already online, the server watchdog ensures that servers remain active for certain intervals (e.g., 30 second intervals), automatically removes inactive servers from the pool, and reports active server status back to the database. If servers are marked for shutdown, the server watchdog archives server statistics, removes the server from the active server list stored in the database, and determines an updated total user/streamer capacity based on the removal of the server from the active list.

2) Event Information Ingress and Live Event Monitoring

In some inventive implementations, another significant role of the control server 500 shown in FIGS. 2, 3 and 10 relates to collecting of event information and/or news (e.g., from external Internet providers), maintaining relevant event information and/or news in the database 420 (e.g., to facilitate selection of broadcasters to follow, and/or particular broadcaster live streams to view), and distributing the collected information to multiple broadcaster and viewer client devices in a relatively low-latency and synchronized manner with respect to broadcasters' video-based commentary.

In some implementations, the technical challenge of displaying event information and updates to same in a synchronized and low-latency manner amongst multiple client devices is addressed in part by using a single control server 500 to gather and parse live event information captured in real-time. For example, for sporting events, game information may be obtained by the single control server from a dedicated third-party provider (e.g., STATS LLC). This single point of entry of event information prevents synchronization errors inherent in network communications. Once a change in event status has been detected (e.g., if a play clock updates), the control server provides these changes to the one or more sockets dedicated to the event (to which all viewers and broadcasters of video-based commentary regarding the event are communicatively coupled), resulting in a single synchronized update to all client devices and thereby significantly mitigating client-by-client latency and/or synchronization issues.

In some example implementations, the control server 500 implements two service methods relating to event information, namely, an event data ingress service and a live event data monitor service. The event data ingress service is performed with a first periodicity (e.g., once or twice a day) to maintain and update an event list in the database 420. The live event data monitor service is performed with a second and more frequent periodicity (e.g., once a minute) to check for any events that are in progress and, if found, to retrieve fresh data about an in-progress event from the event information provider (e.g., at an even greater frequency, for example once a second). Similar services may be implemented by the control server 500 to ingest news on particular topics, trending threads, etc.

Figure 15:
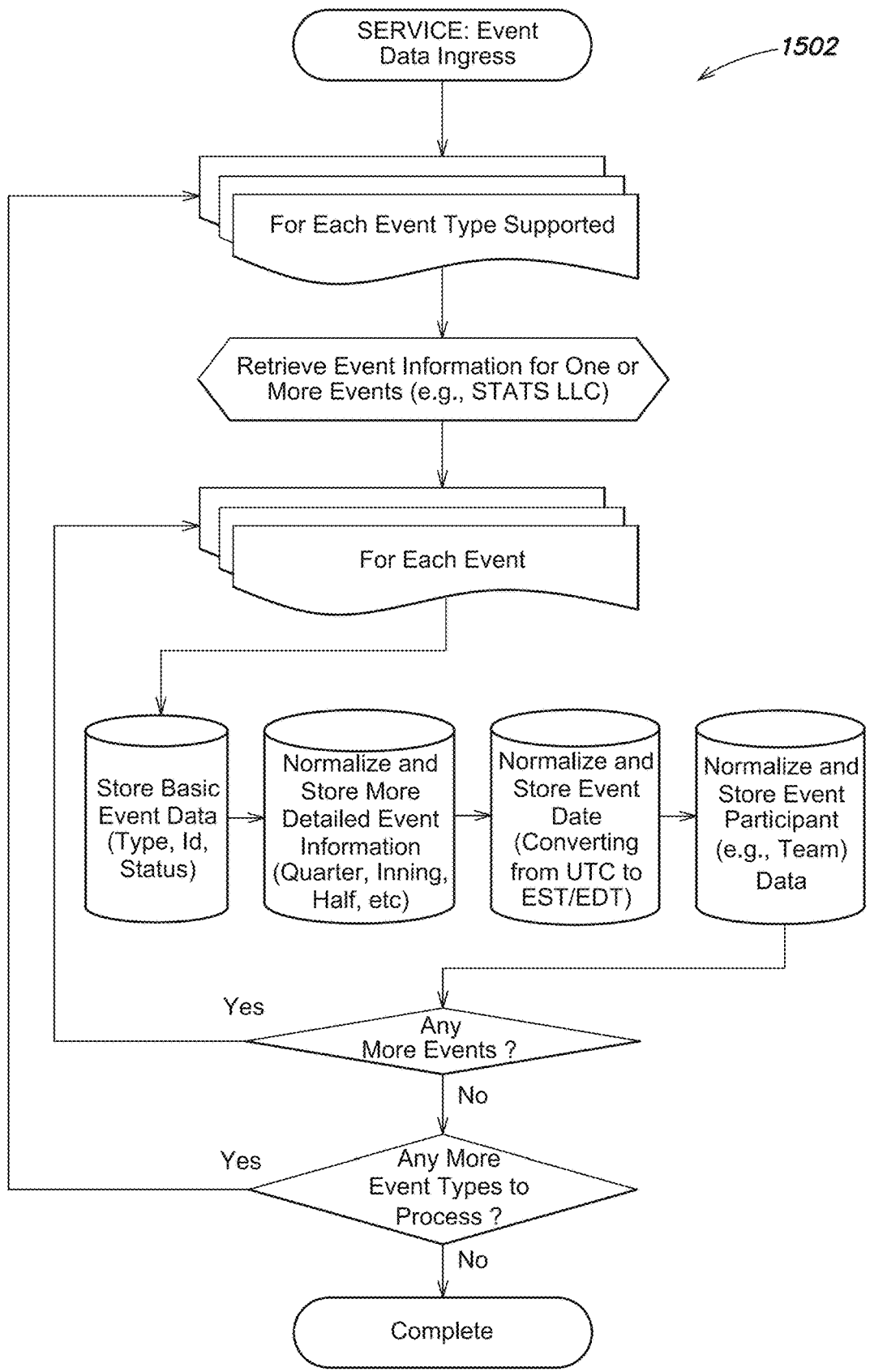
FIG. 15 shows a process flow diagram illustrating an event data ingress service method performed by the control server of FIG. 10, according to one inventive implementation.
Figure 16A:
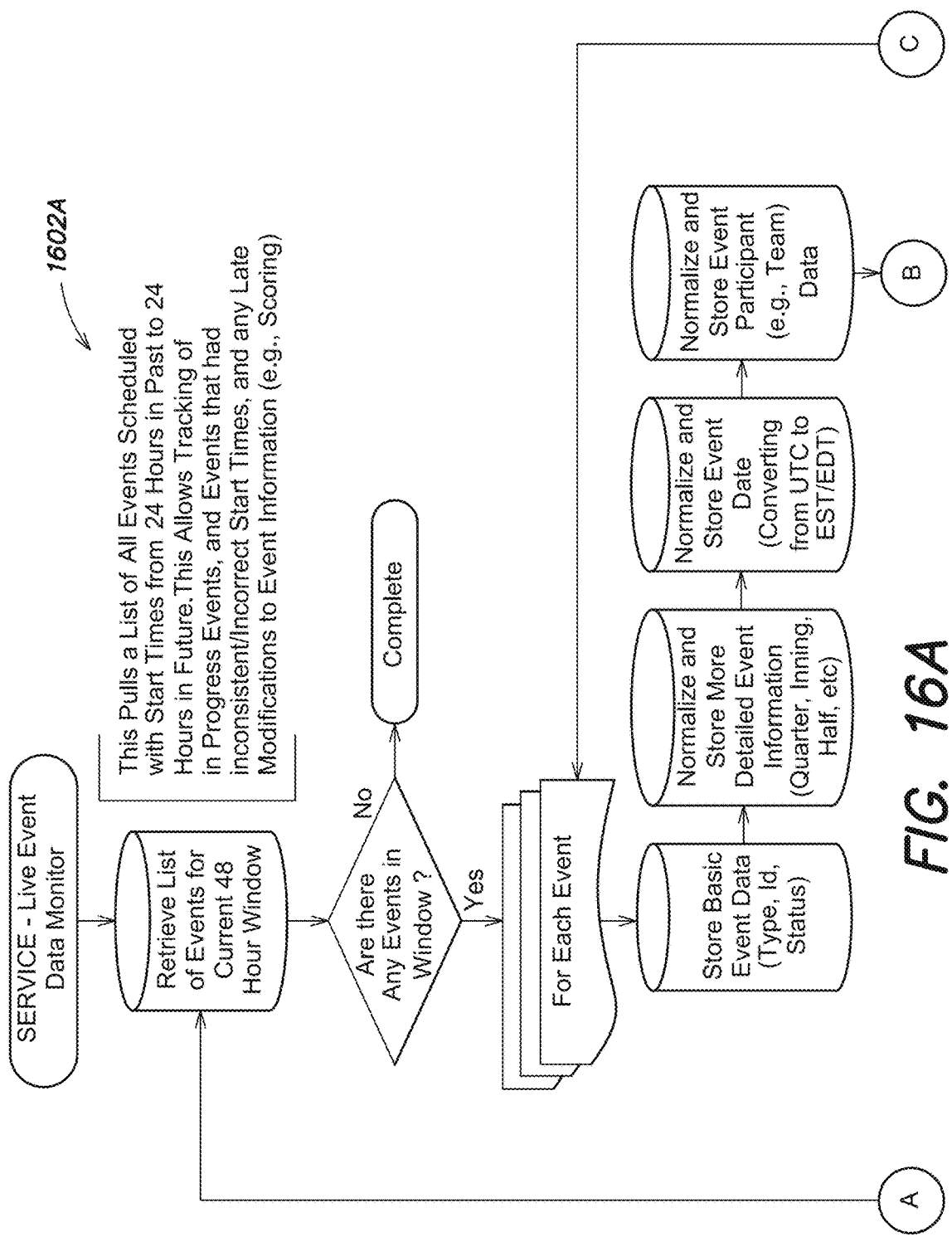
FIGS. 16A and 16B show a process flow diagram illustrating a live event data monitor service method performed by the control server of FIG. 10, according to one inventive implementation.
Figure 16B:
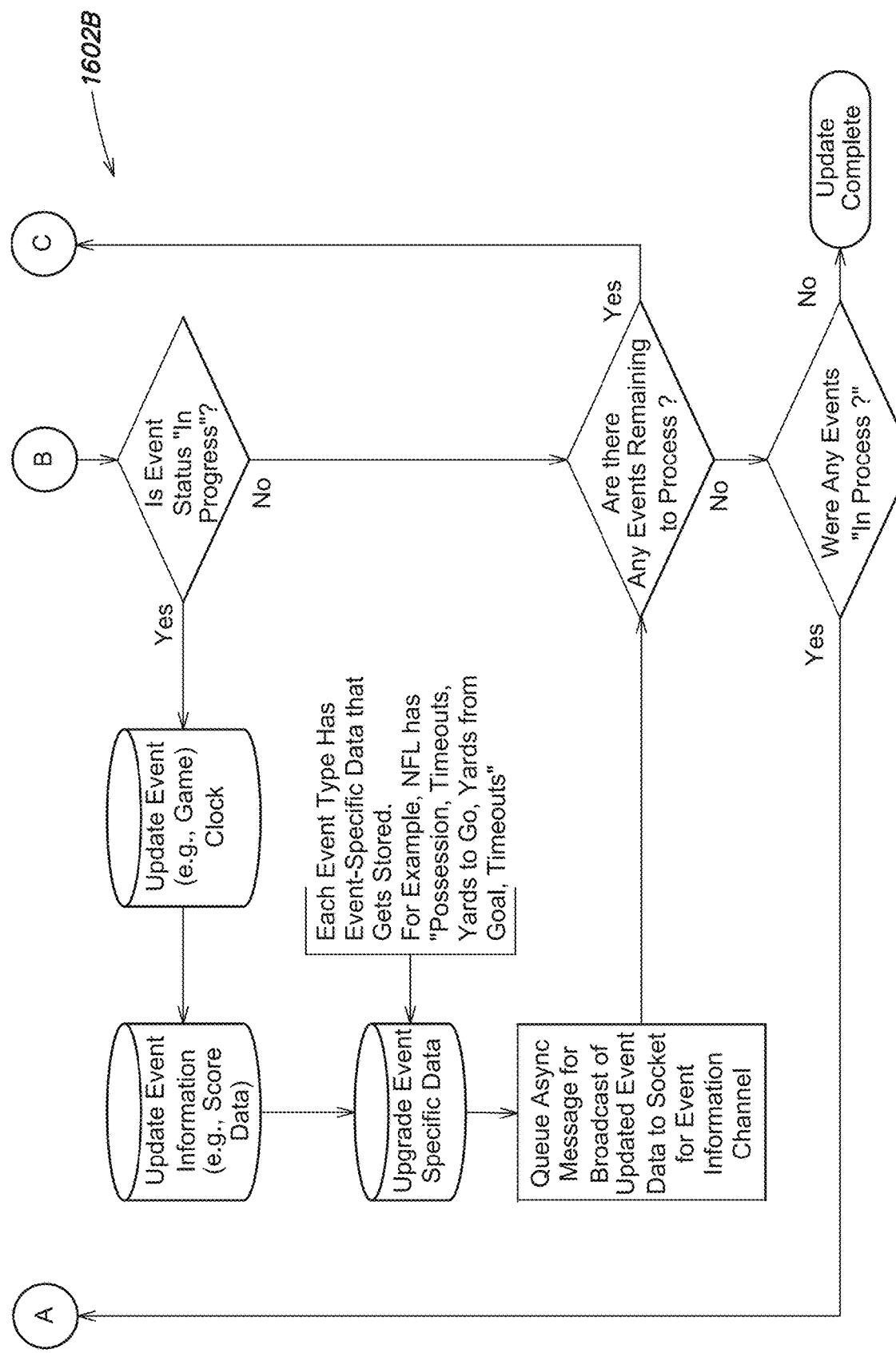

FIG. 15 shows a process flow diagram illustrating an event data ingress service method 1502 performed by the control server of FIG. 10, according to one inventive implementation, and FIGS. 16A and 16B show a process flow diagram illustrating a live event data monitor service method 1602A, 1602B performed by the control server of FIG. 10, according to one inventive implementation. In these methods, an event information provider is contemplated as supporting multiple different types of events for furnishing information (various types of sporting events such as basketball, football, baseball, hockey, etc.), and providing information for each instance of an event of a given event type (e.g., information for each of multiple basketball games, each of multiple football games, each of multiple baseball games).

For each event, the control server retrieves the raw information provided by the event information provider, and in some instances converts and/or compresses the raw information to provide a standardized format of essential data elements for storing in the database 420 and/or distribution to client devices (e.g., via broadcast of event messages having the standardized format to one or more dedicated sockets of the socket server(s) 600). Examples of data elements for event information include, but are not limited to, a type of the event, an identifier for the event (EventID), a status of the event (e.g., pre-game, in-progress, final), score information for the event, team information for the event, a progress indicator or progress details for the event (e.g., quarter, period, inning, half-time; for baseball—balls, strikes, base information; for football—possession, down, yards to go; for basketball—timeouts, fouls), an event date and/or time of the event (e.g., actual or elapsed time information), and event participant data regarding participants in the event. In some examples, the control server further normalizes the event date and/or time to a particular reference frame (e.g., converting from UTC to EST/EDT).

In the process 1602A and 1602B shown in FIGS. 16A and 16B, the control server particularly queries the event information provider for a list of all events in a particular window around the current time (e.g., a 48 hour window, for events with start times 24 hours in the past through 24 hours in the future), to allow tracking of in-progress events (or identify any events that had inconsistent or incorrect start times or late modifications to event information). For each in-progress event, an event clock and other event information (e.g., score information, other more detailed information about the event) are updated frequently (e.g., once a second) to provide regular updates of event information messages that are broadcast to one or more dedicated event information sockets of the socket server(s) 600.

3) Asynchronous Task Processing

Figure 17A:
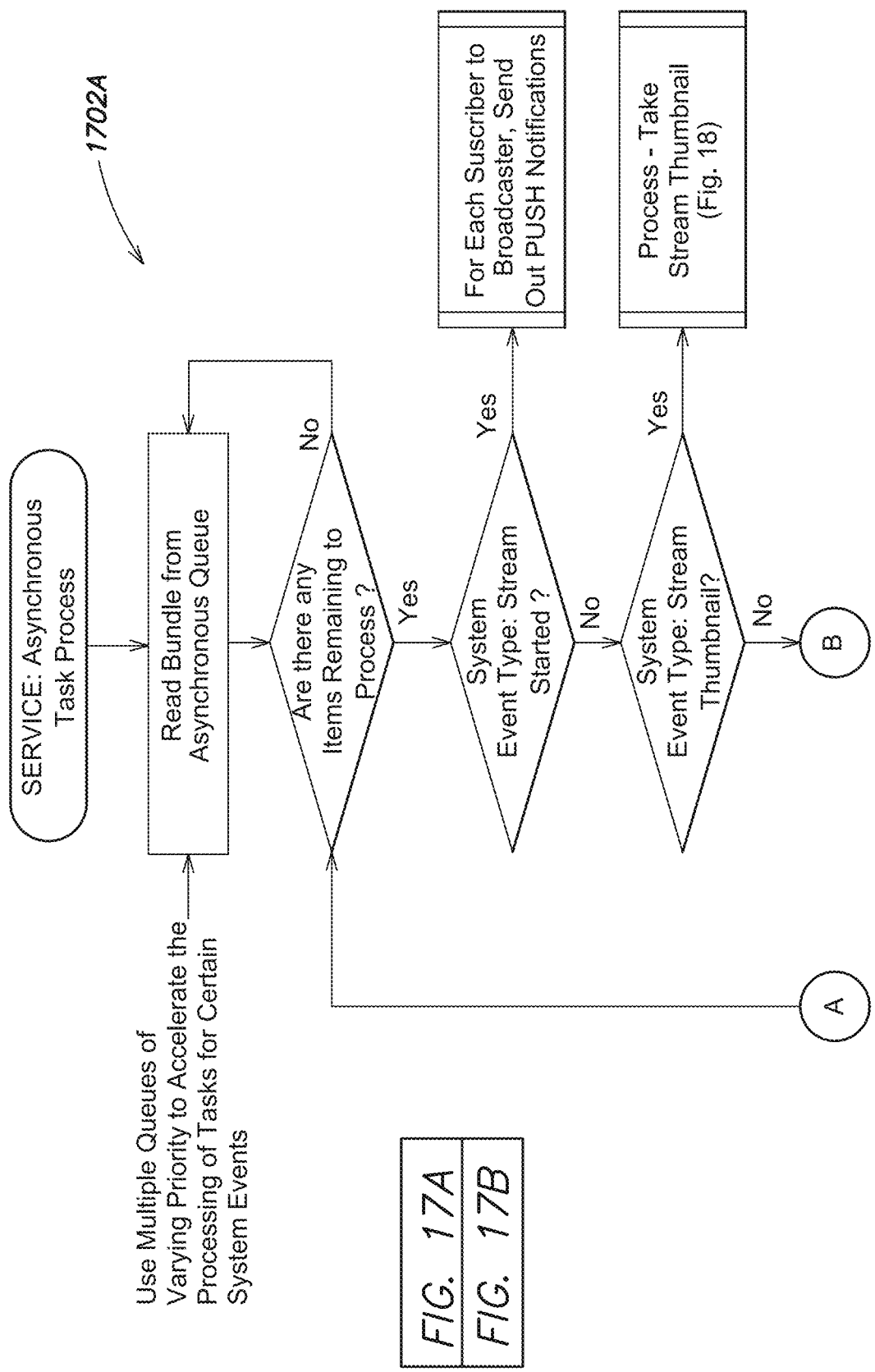
FIGS. 17A and 17B show a process flow diagram illustrating an asynchronous task service method performed by the control server of FIG. 10, according to one inventive implementation.
Figure 17B:
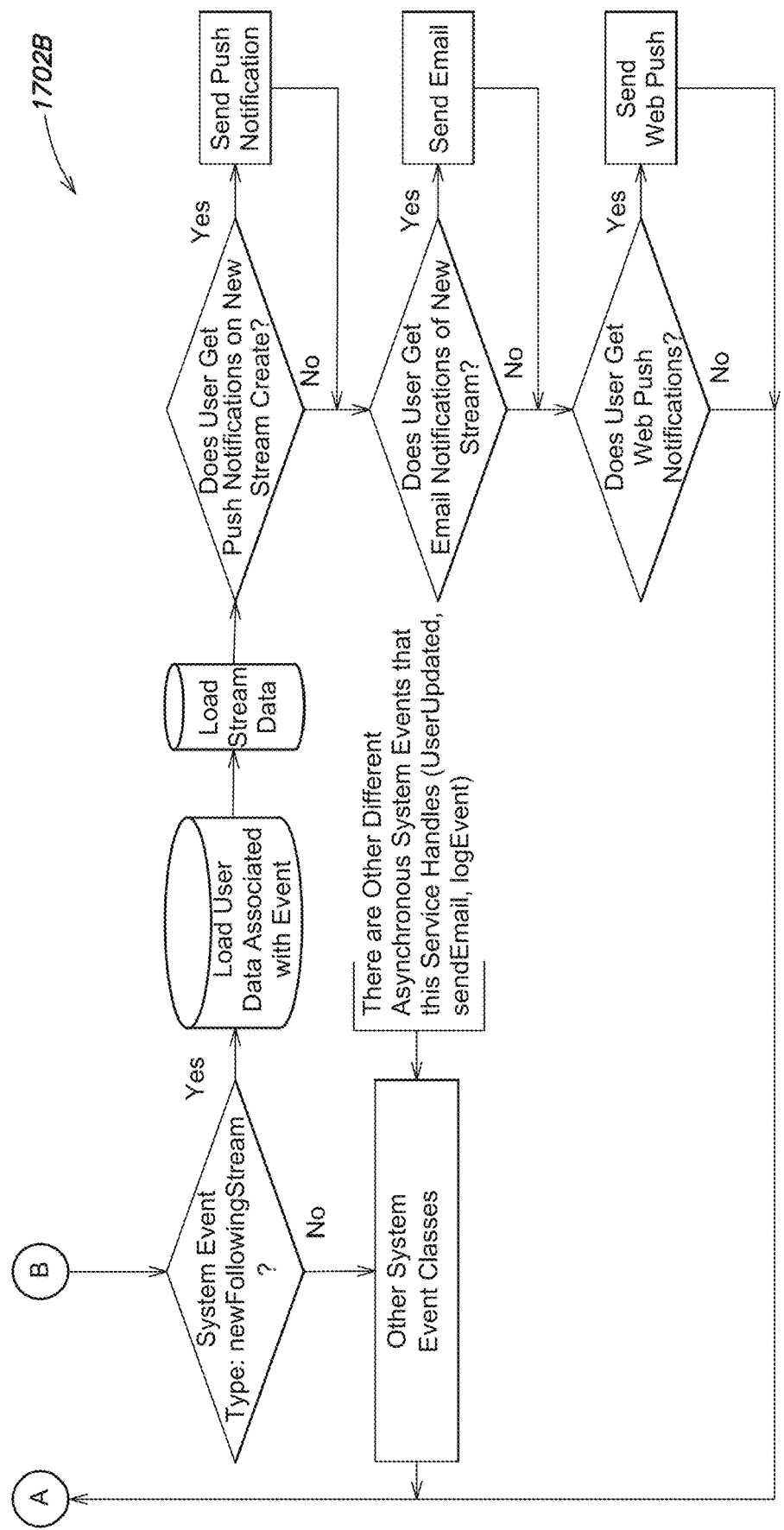

FIGS. 17A and 17B show a process flow diagram illustrating an asynchronous task service method 1702A, 1702B performed by the control server of FIG. 10, according to one inventive implementation. The control server periodically reads a task or task bundle from the asynchronous queue to initiate various other actions or processes in connection with the serves and memory storage devices 1000. A number of different asynchronous system events may be implemented by this process, only some examples of which are illustrated in FIGS. 17A and 17B. For example, if an entry in the queue relates to a "Stream Started" system event, the asynchronous task processing sends out push notifications (including a StreamID) to followers and subscribers of the stream's broadcaster. Another system event processed by the asynchronous task process is when there is a new follower of a broadcaster's stream ("newFollowingStream"), for which the process loads user data and stream data, and attends to various user notifications as appropriate (e.g., email notifications, web push notifications). The asynchronous task processor is also responsible, in some implementations, for taking periodic screenshots/thumbnails of a live stream (as discussed below in connection with FIGS. 18A and 18B).

With respect to various push notifications handled by the control server 500 and/or the web server(s) 700 (or other servers of the architecture 1000), it should be appreciated that specific apps on mobile client devices need not be open for a push notification to be received on the client device. Thus the client device may receive and display social media or text message alerts even when the device's screen is locked, and/or when the app pushing the notification is closed. For iOS devices, for example, the Apple Push Notification Service API may be employed to enable the client app 5000 to receive various push notifications.

With reference again to FIG. 10, the async queue monitoring is an application that runs on the control server and that looks at the current size of the asynchronous queue and will notify an administrator. Typically, the queue of tasks to process is small (e.g., at any given second it may be between 0-10 items), and if the queue grows to a larger size (e.g., 1000 items) the async queue monitor indicates to a system administrator that there is a problem in the asynchronous task processing (e.g., additional processing resources are required, or a looping event is getting processed and re-added to the queue instead of being removed).

4) Acquiring Screenshots/Thumbnails

Figure 18A:
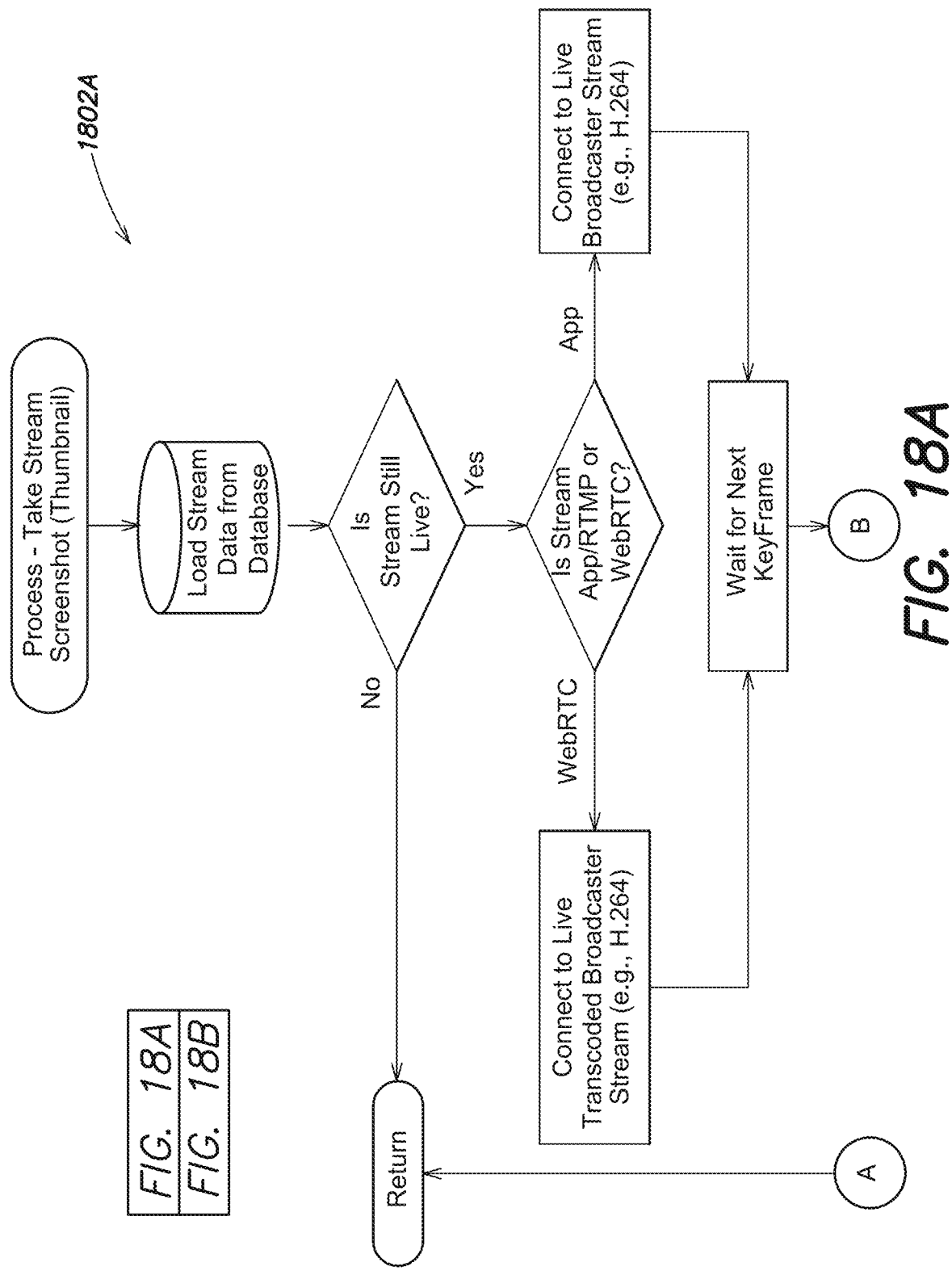
FIGS. 18A and 18B show a process flow diagram illustrating a process for taking a screenshot (thumbnail) of a live stream, performed by the control server of FIG. 10, according to one inventive implementation.
Figure 18B:
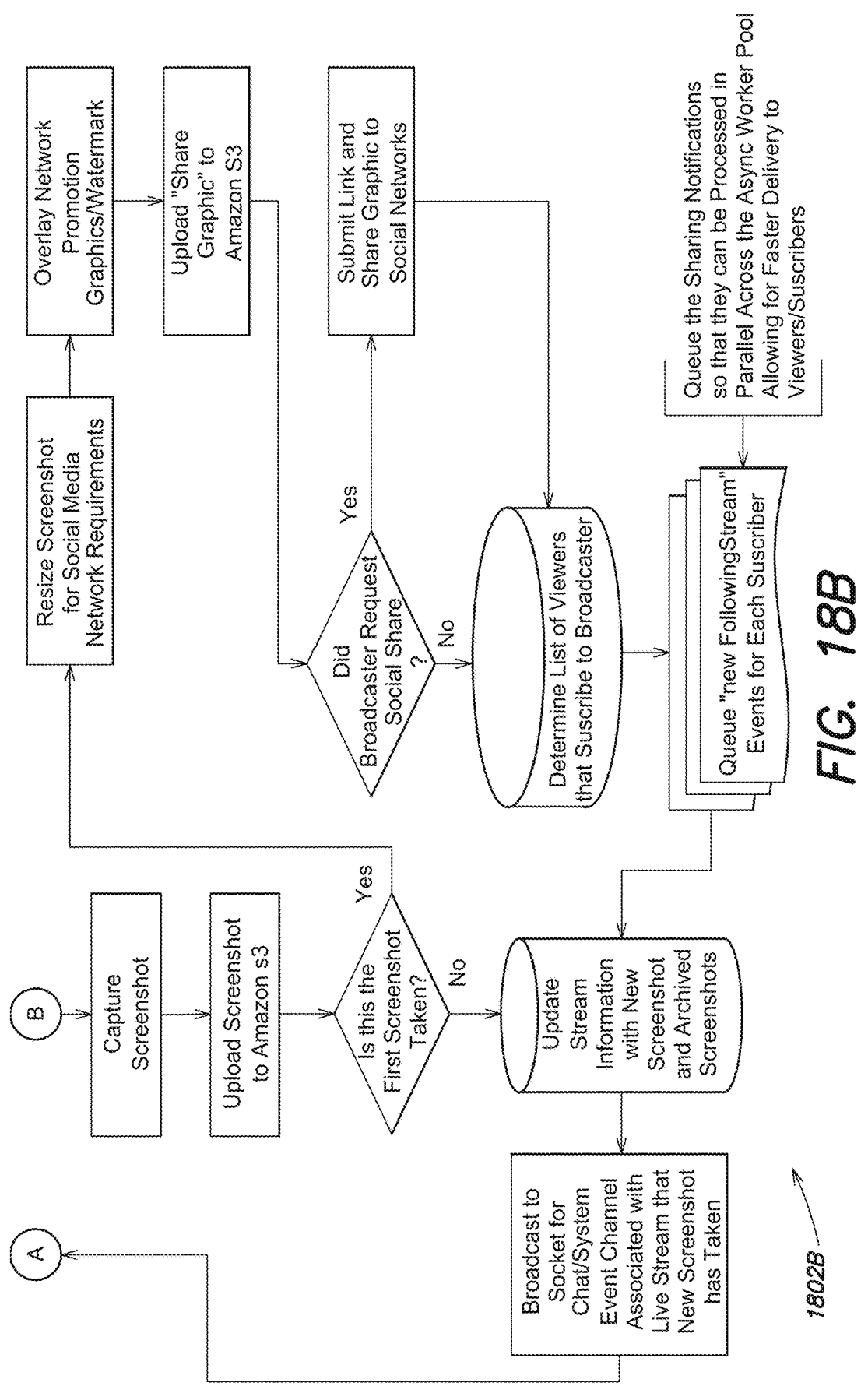

FIGS. 18A and 18B show a process flow diagram illustrating a process 1802A, 1802B for taking a screenshot (thumbnail) of a live stream, performed by the control server of FIG. 10, according to one inventive implementation (in other implementations, the web server(s) 700 of other servers of the architecture 1000 may perform the process of taking thumbnails of live streams pursuant to the general technique outlined in FIGS. 18A and 18B).

With reference again to FIG. 5C and the media server process, the media server process queues to the asynchronous queue a first screenshot for a new live stream, and periodic updates to screenshots (e.g., every five seconds or so) during the duration of the live stream. These screenshot tasks are read by the asynchronous task process 1702A and 1702B discussed above in connection with FIGS. 17A and 17B and implemented by the process shown in FIGS. 18A and 18B.

In the process 1802A, 1802B, in one implementation screenshots are taken based on a broadcaster's live stream in H.264 (or transcoded to H.284 if the live stream is VP8/WebRTC from a web broadcaster). Screenshots are taken on the next available keyframe after the process is invoked. If the screenshot is not the first one taken, the stream information (e.g., in the database 420) is updated with information relating to the newest screenshot, and the screenshot is added to archived screenshots (e.g., in the data storage 440). The screenshot is then broadcast to the chat/system event socket of the socket server(s) 600 dedicated to the broadcaster's live stream.

Whenever a screenshot is taken of the broadcaster's live stream (particularly if it is the first screenshot), it may be resized for social media network requirements, and overlaid with graphics, watermarks, or promotional material. If the broadcaster requested for social share in creating the new stream (see discussion below regarding creation of new broadcaster streams), the process submits a link to the resized screenshot (e.g., an address or URL) to the indicated social network platform (e.g., Facebook, Instagram, Twitter, etc.), in some instances together with a "share graphic." In any case, the process determines the list of users that follow/subscribe to the broadcaster, and queues a system event message (e.g., "new FollowingStream") event for each subscriber to broadcast the first screenshot of the new live stream. As above, the stream information (e.g., in the database 420) is updated with information relating to the screenshot, and the screenshot is archived (e.g., in the data storage 440) and broadcast to the chat/system event socket of the socket server(s) 600 dedicated to the broadcaster's live stream.

With respect to sharing screenshots with social networks if elected by the broadcaster, in another implementation (not shown in FIGS. 18A and 18B), all screenshots of the broadcaster's live stream that are taken as of a given time are processed by a facial recognition algorithm to provide one of multiple options (e.g., the best of three screenshots) for selection by the broadcaster. For example, the process acquires a screenshot at 1, 3 and 5 seconds, and then every 5 seconds thereafter. The facial recognition algorithm detects candidate screenshots on rolling basis based on, for example, the clarity of the image, the quality of the face that is visible, and if the user is smiling. More specifically, every acquired screenshot is analyzed and then the "best three" are selected and presented as options to the broadcaster/viewer during social share. The broadcaster/viewer selects their preferred image, and the social share endpoint that is ultimately provided by the process to the selected social media platform(s) includes a link (e.g., address or URL) to the screenshot selected by the broadcaster.

IX. Client-Side Features (e.g., Functionality of the Client App)

Having provided various details of the servers and memory storage devices 1000 shown in FIGS. 2 and 3, attention now turns to the functionality of the client devices relating to establishing user profiles (e.g., upon login), creating broadcaster stream sessions and providing live streams from broadcaster client devices to a media server, receiving copies of a live stream at a viewer client device (e.g., from a media server, the RTMP CDN, or the HLS server architecture), providing special effects graphics and animations (including animated real-time "scorebugs") on displays of client devices, and replaying copies of a recorded live stream from a broadcaster.

As noted earlier, unlike conventional scorebugs, screen animations, and/or other special effects graphics that are hard-embedded into live streams of a sports broadcast, in various inventive implementations disclosed herein graphics and effects are generated by the client device itself, separate from a given broadcaster's video-based commentary, and then integrated with (e.g., superimposed or overlaid on) the broadcaster's video-based commentary when rendered on the display of the client device. For mobile client devices, the client app 5000 executing on the device is particularly configured to render a variety of "studio-quality" graphics while nonetheless maintaining a small file size for the client app (e.g., less than 100 megabytes, and in some instances from approximately 60-70 megabytes); this allows the modestly-sized client app to be readily downloaded to a client device via a cellular network. In other aspects, client-side rendering of screen animations and/or other special effects graphics allows such animations and graphics to be user-interactive and/or user-customizable.

Figure 19B:
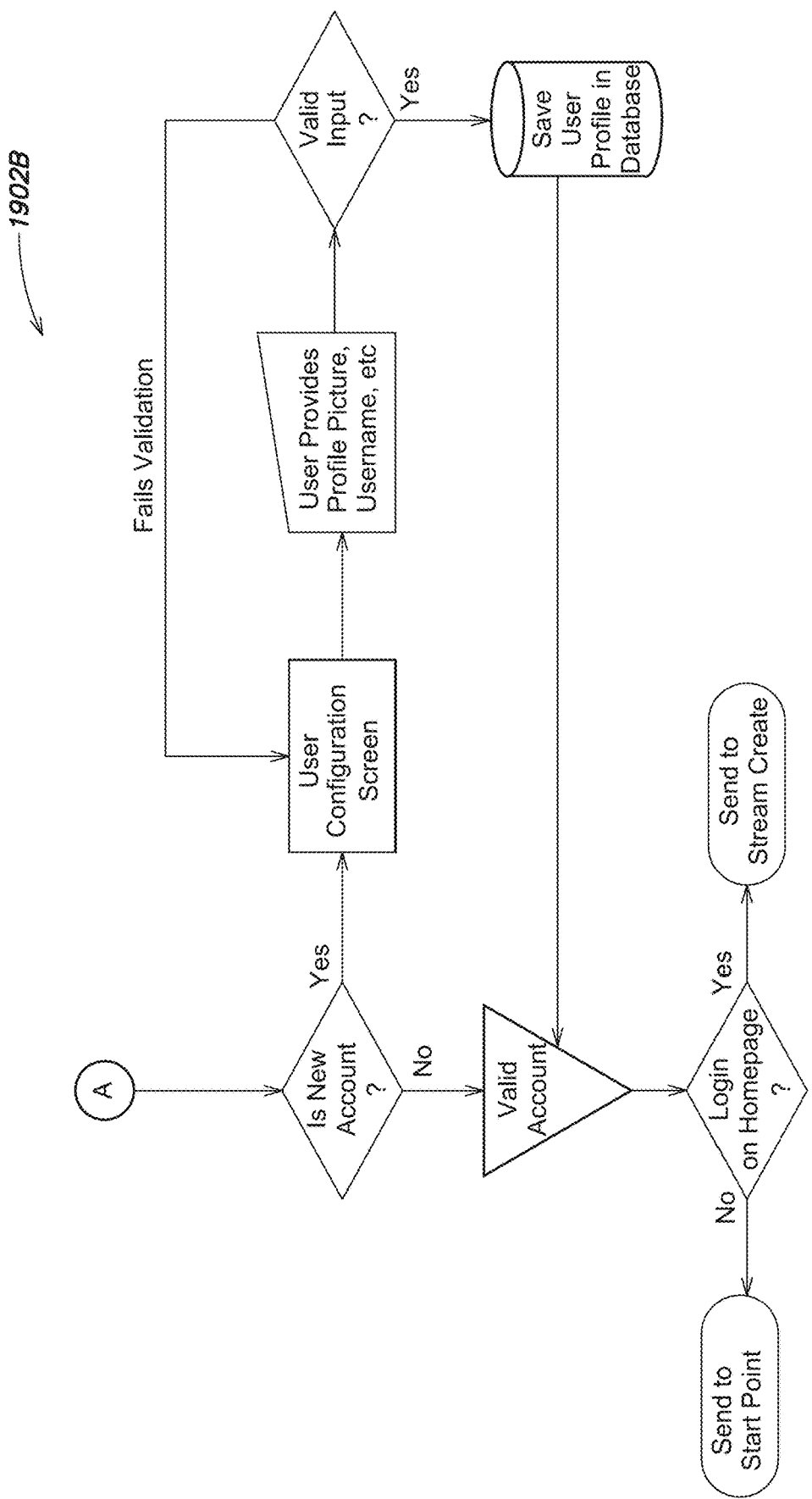

FIGS. 19A and 19B show a process flow diagram illustrating a user login process according to one inventive implementation, which in some examples may be performed by a client device and facilitated by one or more web servers 700 shown in FIGS. 2 and 3. As illustrated, a login process may be implemented by phone (via SMS message with code sent to phone, and code validation), of via a social media network platform login process (e.g., Facebook, Twitter, Instagram). For new user accounts, a user may establish a user profile that is stored in the database 420 and that may be referenced by a UserID after creation, and include a user name, profile picture, and a user status or user "type" for the user (e.g., a VIP user or member, a media professional or member of the media).

1) Broadcaster Processes

Figure 20A:
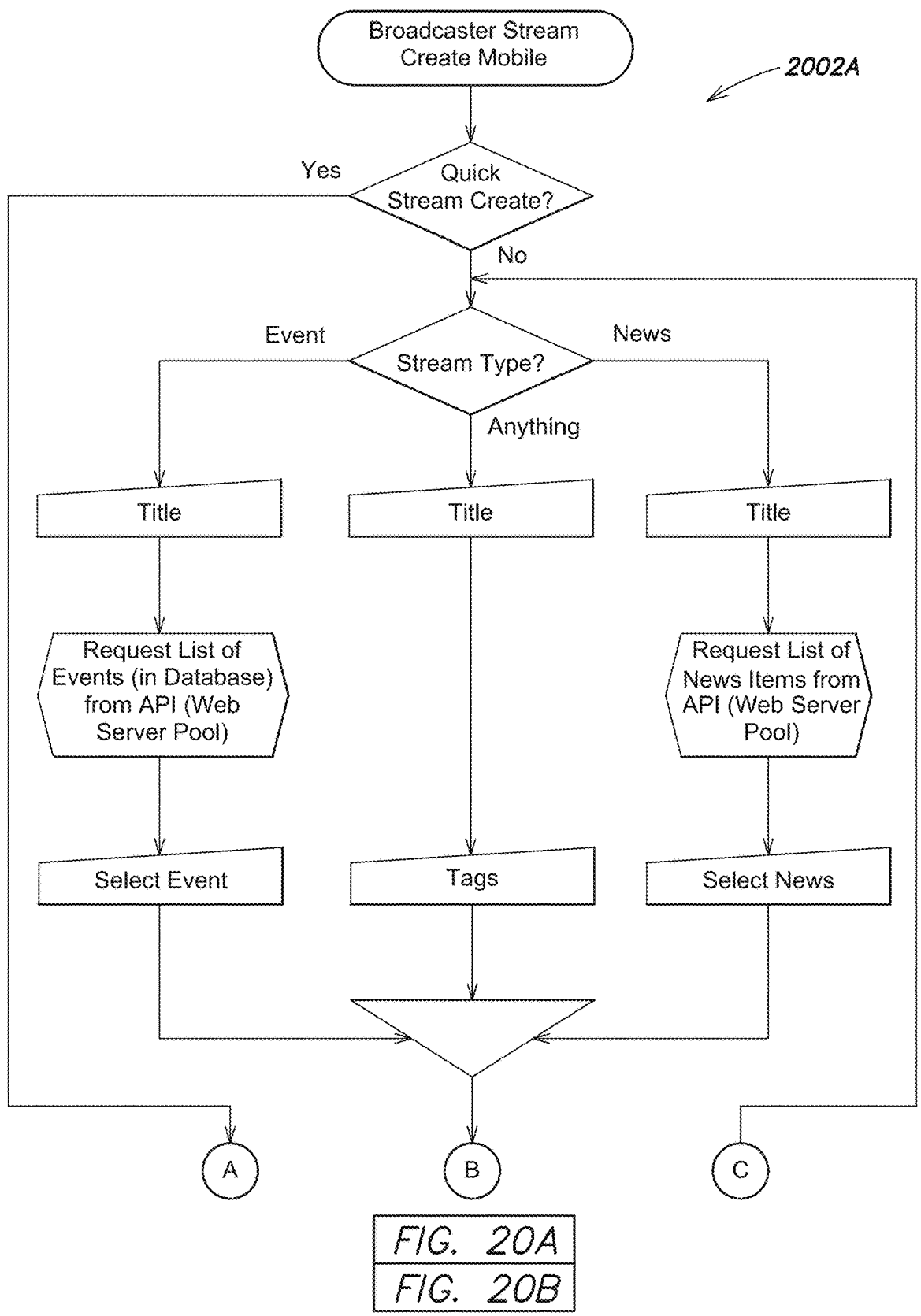
FIGS. 20A and 20B show a process flow diagram illustrating a mobile broadcaster stream create process according to one inventive implementation, which in some examples may be performed by a broadcaster client device shown in FIG. 1A and facilitated by one or more web servers shown in FIGS. 2 and 3.
Figure 20B:
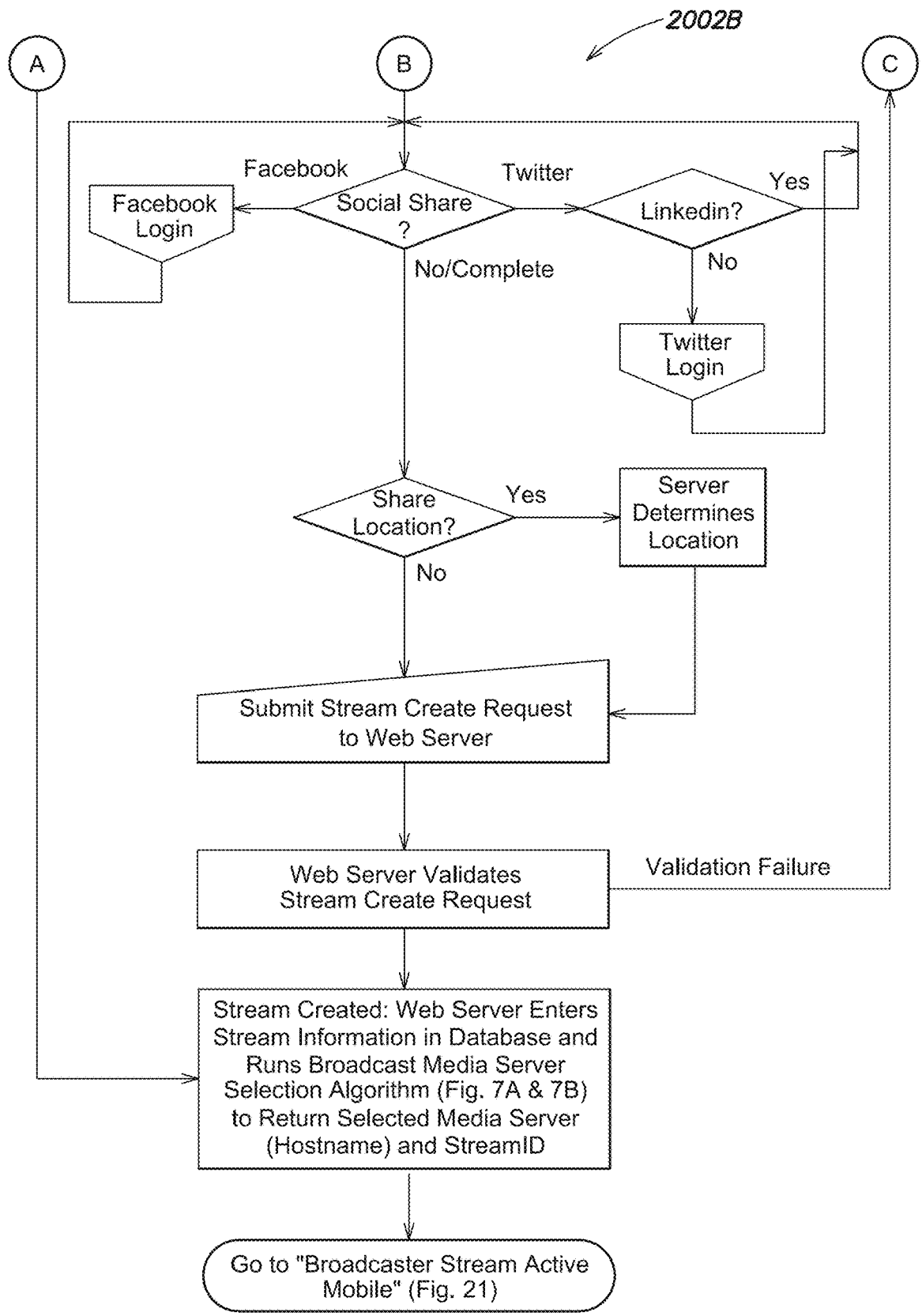

FIGS. 20A and 20B show a process flow diagram illustrating a mobile broadcaster stream create process according to one inventive implementation, which in some examples may be performed by a broadcaster client device (pursuant to execution of the client app 5000) and facilitated by one or more web servers (700) shown in FIGS. 2 and 3. While much of the discussion above relates to an example in which a broadcaster wishes to provide a live stream of digital content including video-based commentary about a particular event, in other implementations the broadcaster may desire to create a live stream about a particular topic of interest (e.g., "anything"), or a news story, for example. For each of these options, the broadcaster may enter a title for the live stream, and the client device may request (e.g., from the web server(s) 700) a list of events or news items for selection by the broadcaster, as well as a pre-populated list of tags (as noted above, event information and/or news may be ingressed by the control server 500, and some event information and/or news may already be cached in the data cache 460 or stored in the database 420).

The broadcaster may also enter tags to be associated with the live stream to facilitate searching and various social media functionality (e.g., to allow other users to search for and find the live stream based on various criteria represented by the tags). The broadcaster may also elect other options in the stream creation process, examples of which include, but are not limited to, sharing an announcement of the stream starting on a social network platform, and enabling sharing of their location to other users (e.g., to facilitate viewing of the broadcaster's live stream by viewers based on the location of the broadcaster).

The broadcaster stream create process then submits a "stream create" request to the web server(s) 700. If the broadcaster selected a particular event from the list of events about which to broadcast, an EventID associated with the event is included in the stream create request. Other contents of the stream create request includes, but is not limited to, an API key (to authenticate the user), the title of the stream, any tags selected, newsID (if news was selected), the broadcasters social network sharing options, and broadcaster location data (if permitted by the broadcaster). The web server(s) 700 in turn validates the API key, assigns a StreamID to the newly created live stream, runs the broadcast media server selection algorithm (e.g., see FIGS. 4A and 4B) to select a media server to which the broadcaster client device connects, and returns to the broadcaster client device the StreamID and the host name ("hostname") for the selected media server. The web server(s) 700 store in the database 420 a variety of stream information for the new live stream, which may include, but is not limited to, the StreamID, the UserID, the EventID, the DBshard, type of stream (RTMP/WebRTC), create time, hostname, title, tags, social notify options and social media platforms, location share option, location (if selected as an option) and, if the stream is associated with an EventID, an archived copy of event information at the stream create time.

FIGS. 21A, 21B, 21C, 21D, and 21E show a process flow illustrating a mobile broadcaster active stream process 2102A, 2102B, 2102C, 2102D and 2102E according to one inventive implementation, which in some examples may be performed at least in part by a broadcaster client device. In particular, the broadcaster client device accesses the media server selected by the web server(s) 700 via a particular URL (e.g., including the hostname in a path of the URL), as discussed below in connection with FIGS. 21A through 21E. The broadcaster client device then connects to a particular socket of the socket servers dedicated to the broadcaster's live stream, based in part on the StreamID provided by the web server(s), to establish a chat/system event channel. As noted above, in one aspect connections between client devices and a particular socket of a socket server are persistent authenticated connections, so that the number of users (broadcasters and viewers) connected to a particular socket (e.g., and currently watching a particular live stream and/or particular event) may be tracked. If the broadcaster's live stream is about an event, the broadcaster's client device also connects to a particular socket of the socket servers dedicated to the event, based on the EventID, to establish an event information channel.

Figure 21A:
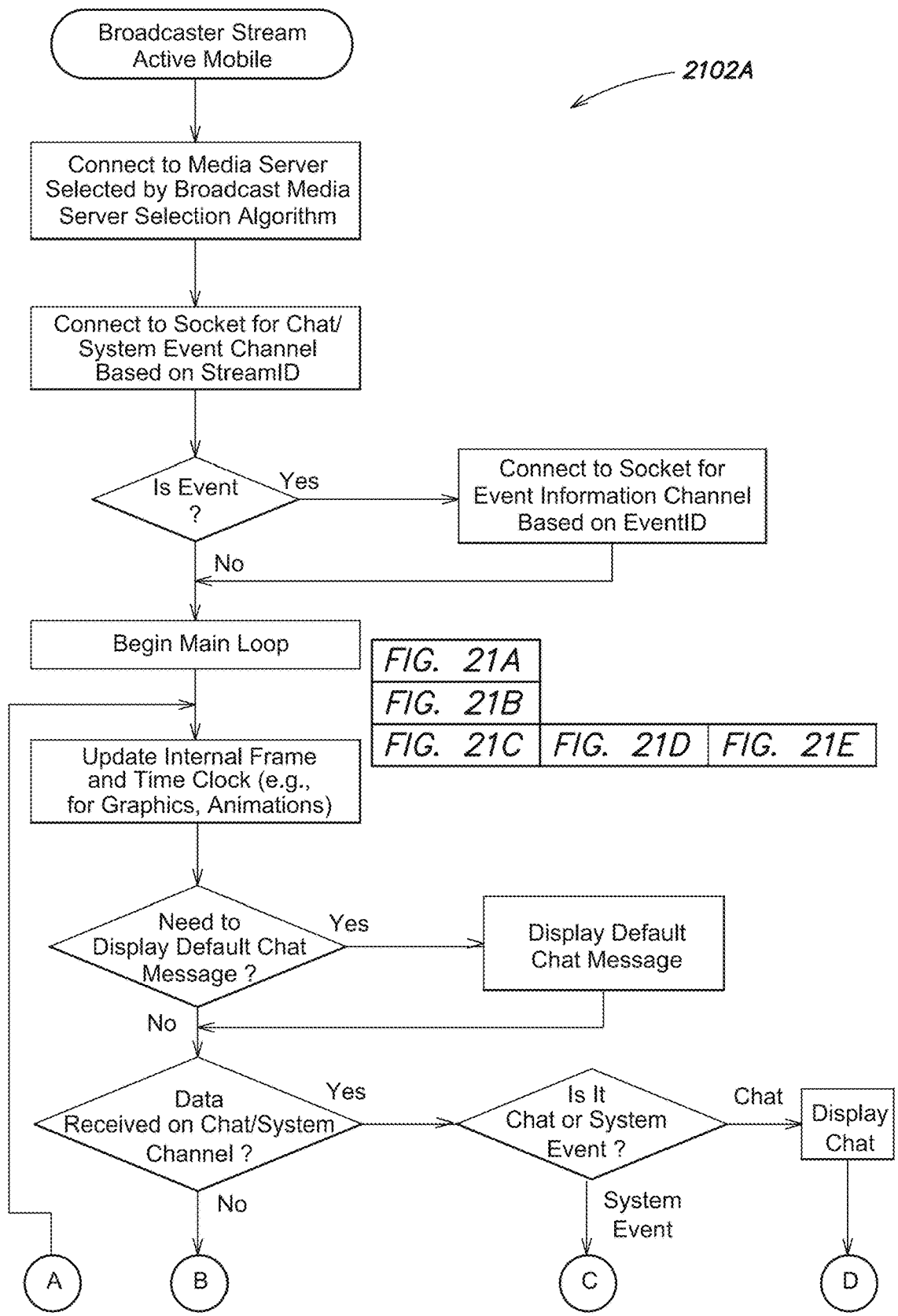
FIGS. 21A, 21B, 21C, 21D, and 21E show a process flow illustrating a mobile broadcaster active stream process according to one inventive implementation, which in some examples may be performed at least in part by a broadcaster client device shown in FIG. 1A.
Figure 21B:
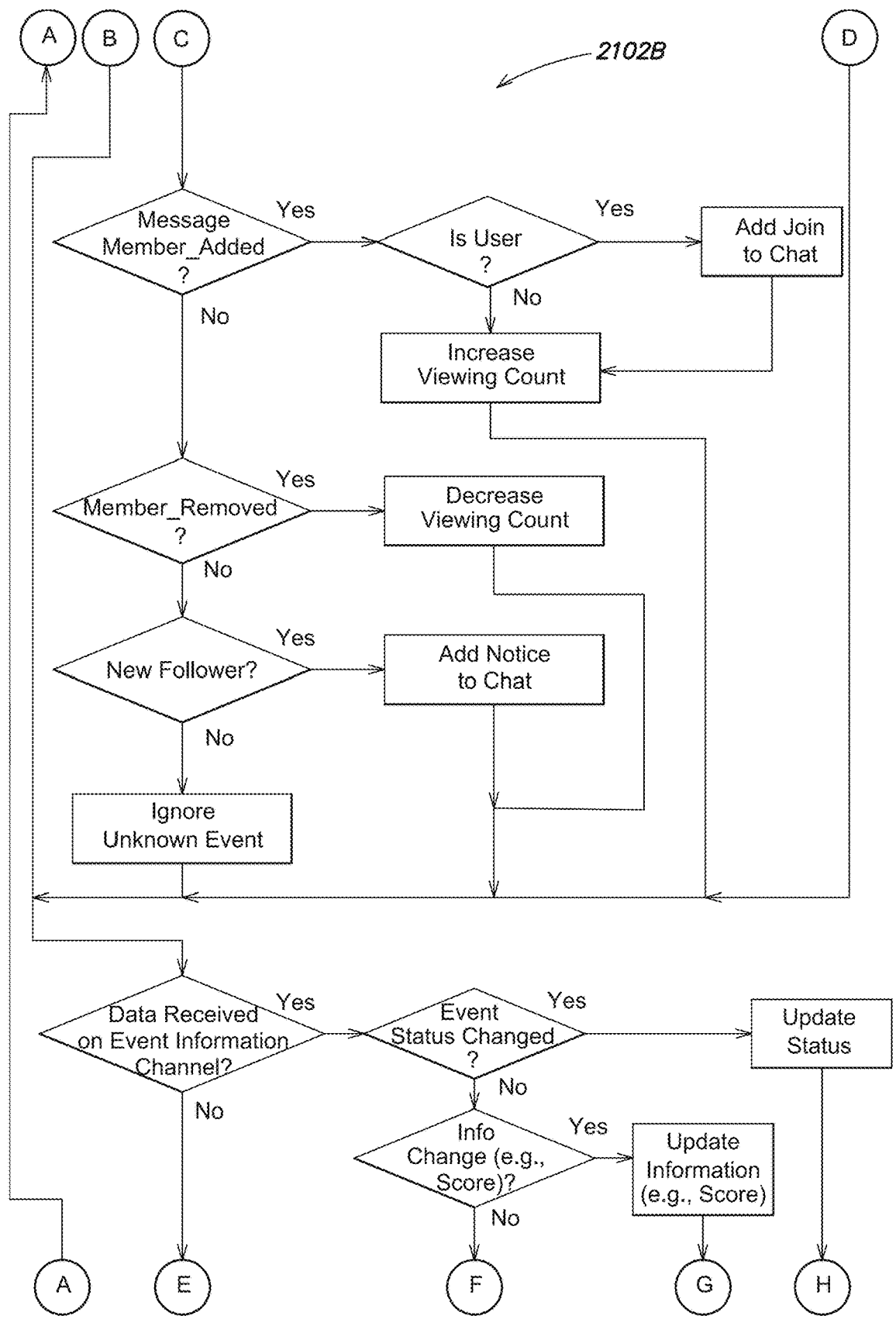

In a "main loop" of the broadcaster client device stream active process (which for mobile clients is executed by the client app 5000), an internal frame and time clock is periodically updated, and is used for animations and special effects graphics and synchronizing of some system messages that are received via the chat/system event socket (e.g., a default chat message displayed on the client device at the beginning of each new stream that says "keep it family friendly!"). The client device then checks to see if any further system messages or chat messages are received on the chat/system event channel, and displays chat messages and/or takes other actions in response to system messages such as "member_added" (increase viewing count), "member_removed" (decrease viewing count), "new follower" (add notice to chat). Although only three system messages and corresponding actions are shown in FIG. 21B, it should be appreciated that additional and/or other types of system messages may be received on the chat/system event channel (e.g., relating to other social networking functionality, and/or digital gifts) and initiate corresponding actions as part of the stream active process.

The client device next checks to see if any event messages or data is received on the event information channel (e.g., updates to event status, event score information, event clock, other event information). The client device then captures a camera frame for the live stream and sends the frame to the media server. The client device then checks the internal frame and time clock to see if any updates are needed to animations or special effects graphics (e.g., scorebugs) to be rendered on the display of the client device ("graphics/animation layers"). In some implementations, graphics and animations are updated at a rate of between 15-25 frames/second based on the internal frame and time clock. As noted above, in some implementations for mobile client devices, animated graphics and special effects are hard-coded in the client app as a series of individual frames (still-frame images), and rendered on the display in a "stop-motion" style according to the internal frame and time clock.

Figure 21C:
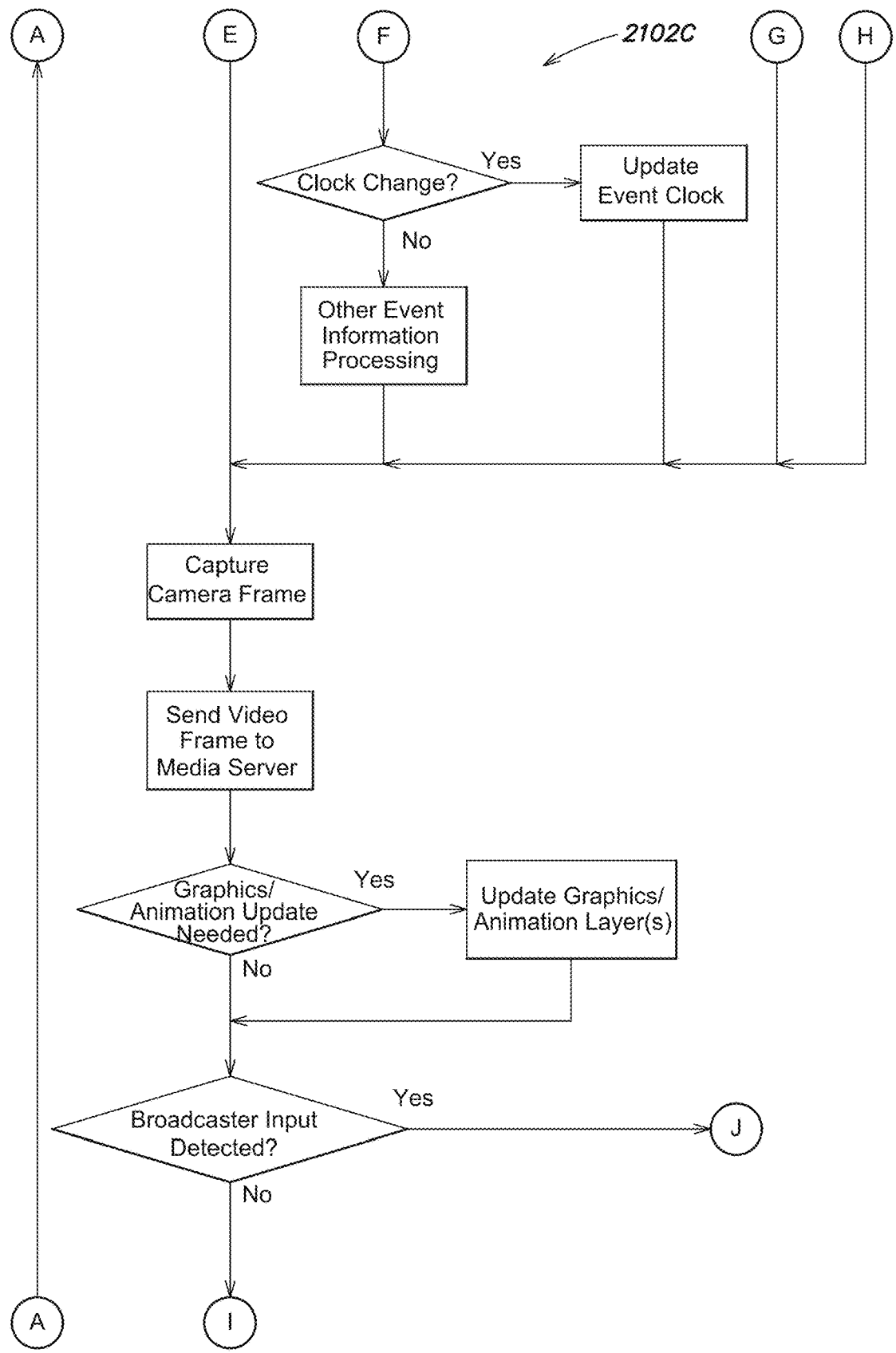

In the stream active process shown in FIG. 21C, the process further queries for broadcaster input, examples of which include a request to end the stream, a request to share the stream, a request to view a list of viewers of copies of the live stream, interaction with the graphics/animations (e.g., "bottom third"), and a request to flip the camera. As also noted above, rendering graphics and animation layers on the client-side provides for user-interaction with the displayed graphics and animation layers. While not shown explicitly in FIG. 21C, as discussed above interactions with graphics/animations ("set animation state to transition to open") may in some implementations launch a variety of other processes including, but not limited to, launching further graphics or animations, receiving additional information about the live sporting event (e.g., by thumbing-over a scorebug), or navigating to another Internet location to receive additional information relating to a live event.

Figure 21D:
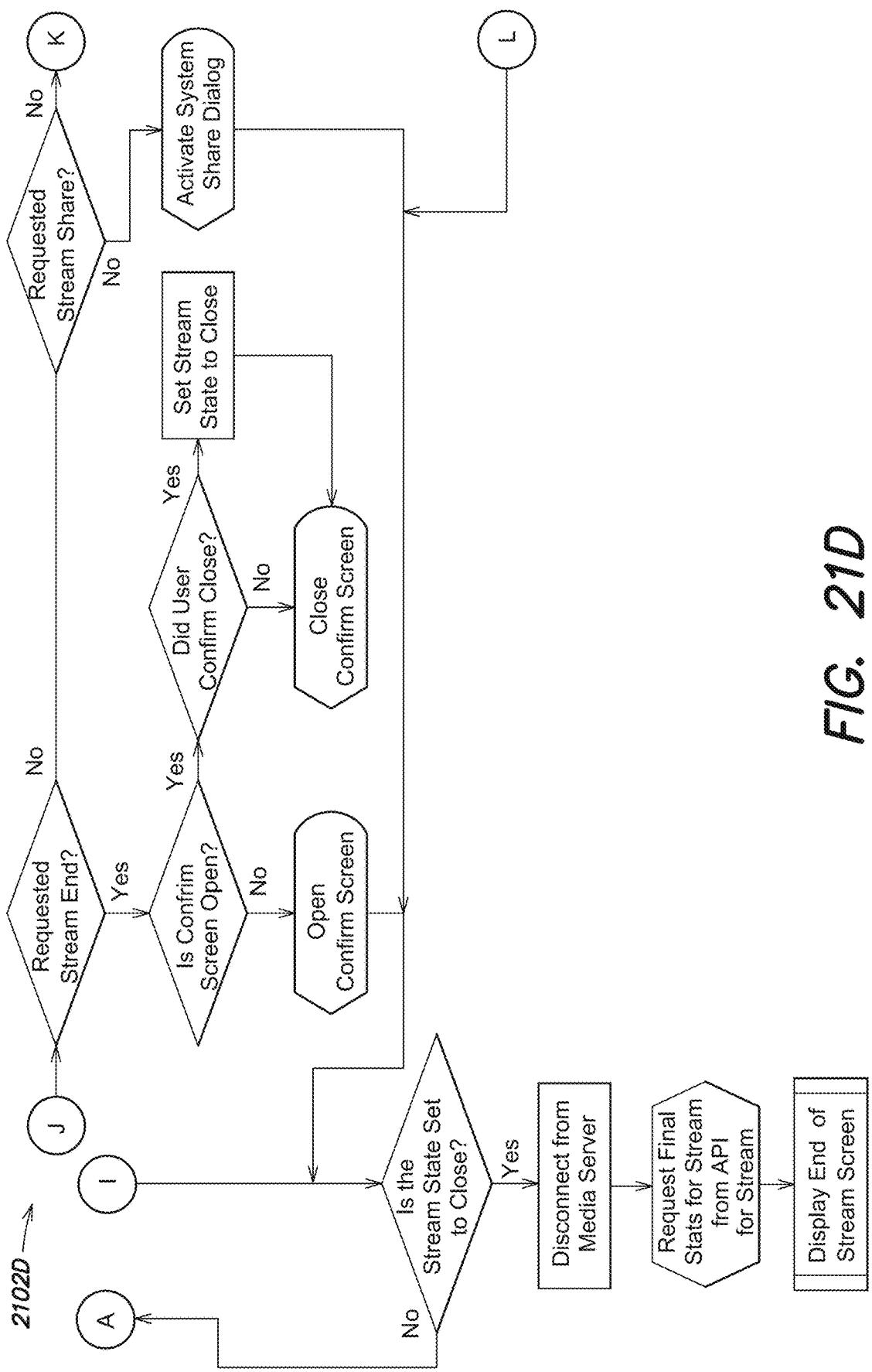
Figure 21E:
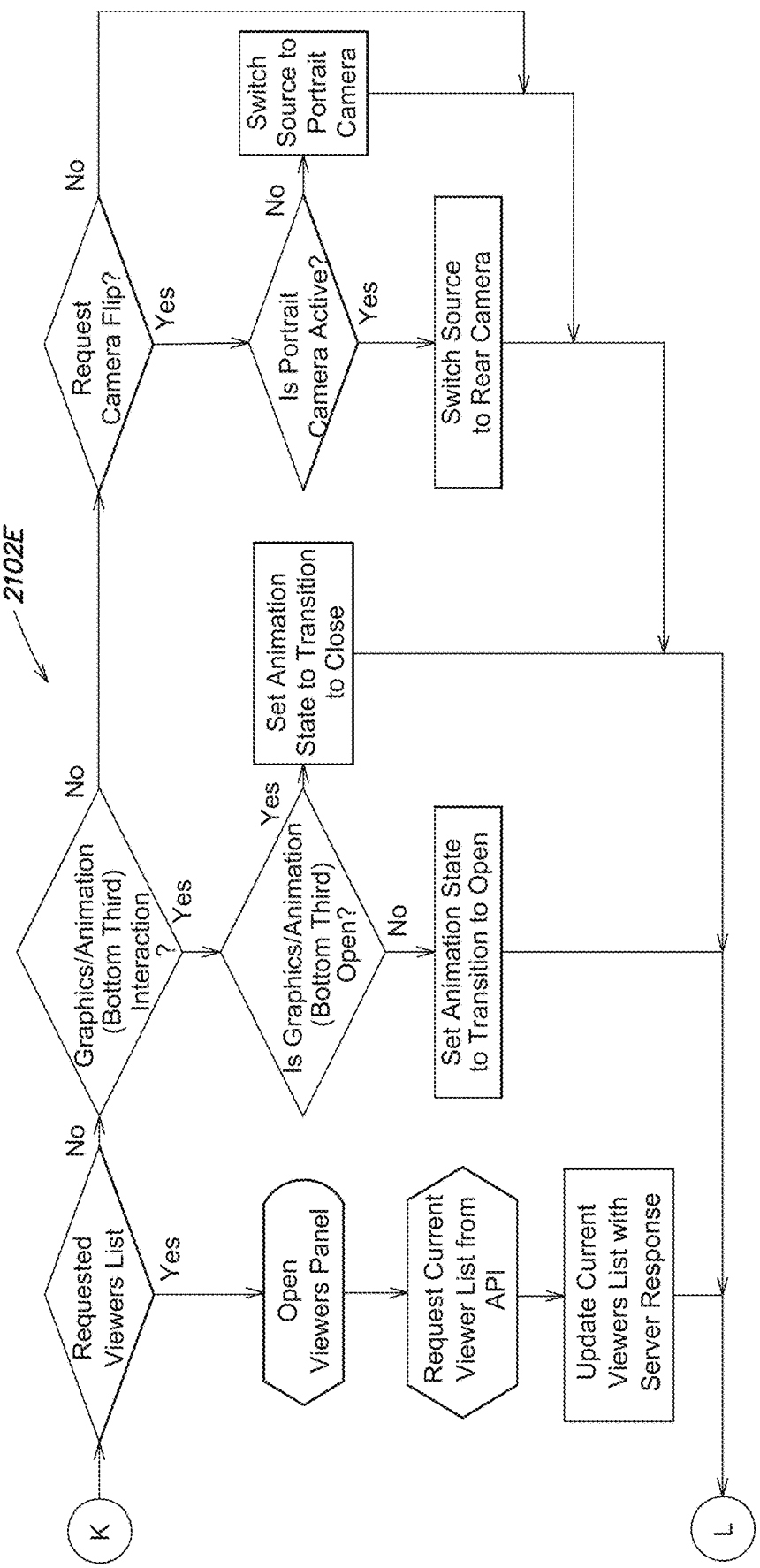

In FIG. 21D, the stream active process then queries if the stream state is set to close (e.g., in response to a broadcaster's request to end the stream, discussed immediately above). If not, the process returns to updating the internal frame and time clock. If the stream state is set to close, the client device disconnects from the media server, requests final stream statistics from the chat/system event channel, and displays an end of stream screen on the display of the client device.

Figure 22B:
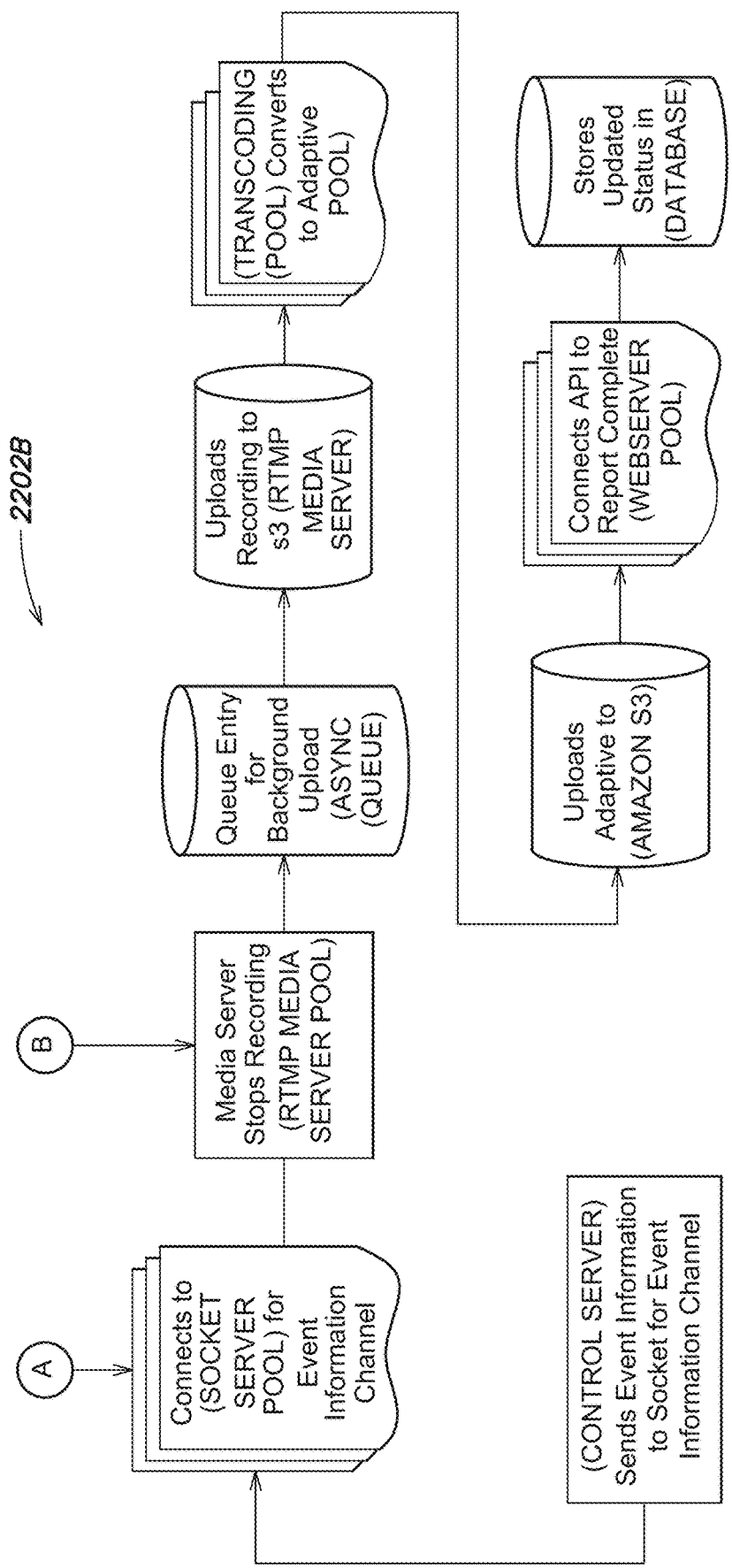

FIGS. 22A and 22B show a communication flow diagram illustrating process flow elements and the server and/or memory storage devices involved in the communication flow for the processes shown in FIGS. 20A and 20B, and FIGS. 21A-21E, as well as the media server processes shown in FIGS. 5A, 5B and 5C, according to one inventive implementation. In essence, FIGS. 22A and 22B provide another perspective and summarize the various process flows and corresponding devices involved in the creation and provision of a live stream of digital content by a broadcaster to a media server, and the processing of the live stream by the media server. Although FIGS. 22A and 22B are directed primarily to the overall process flow for a mobile broadcaster, the functionality and devices shown in these figures applies similarly to web-based broadcasters as well.

2) Viewer Processes

Figure 23A:
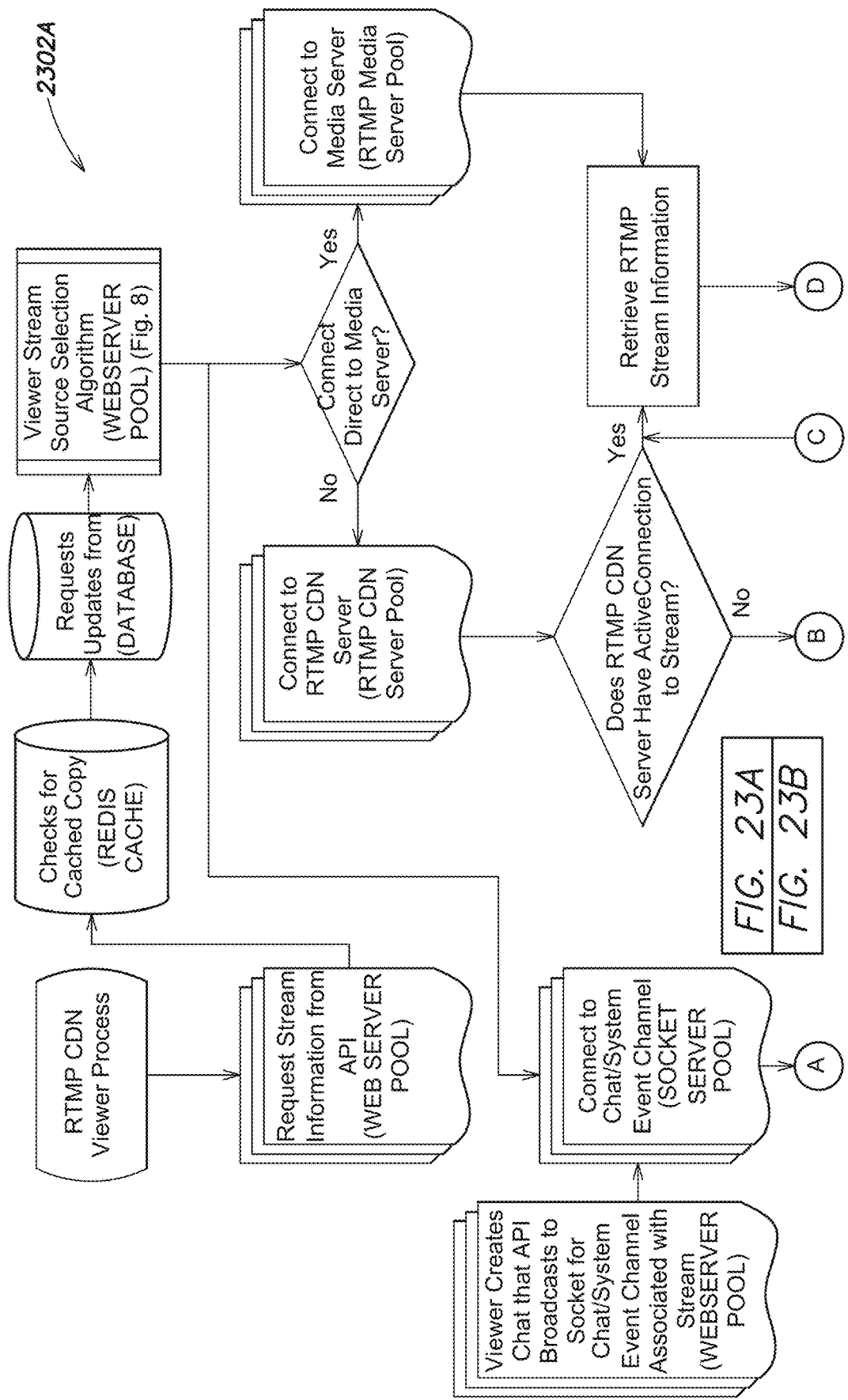
FIGS. 23A and 23B show a communication flow diagram illustrating process flow elements and the server and/or memory storage devices involved in the communication flow for a live stream RTMP media server or RTMP CDN viewer, according to one inventive implementation.
Figure 23B:
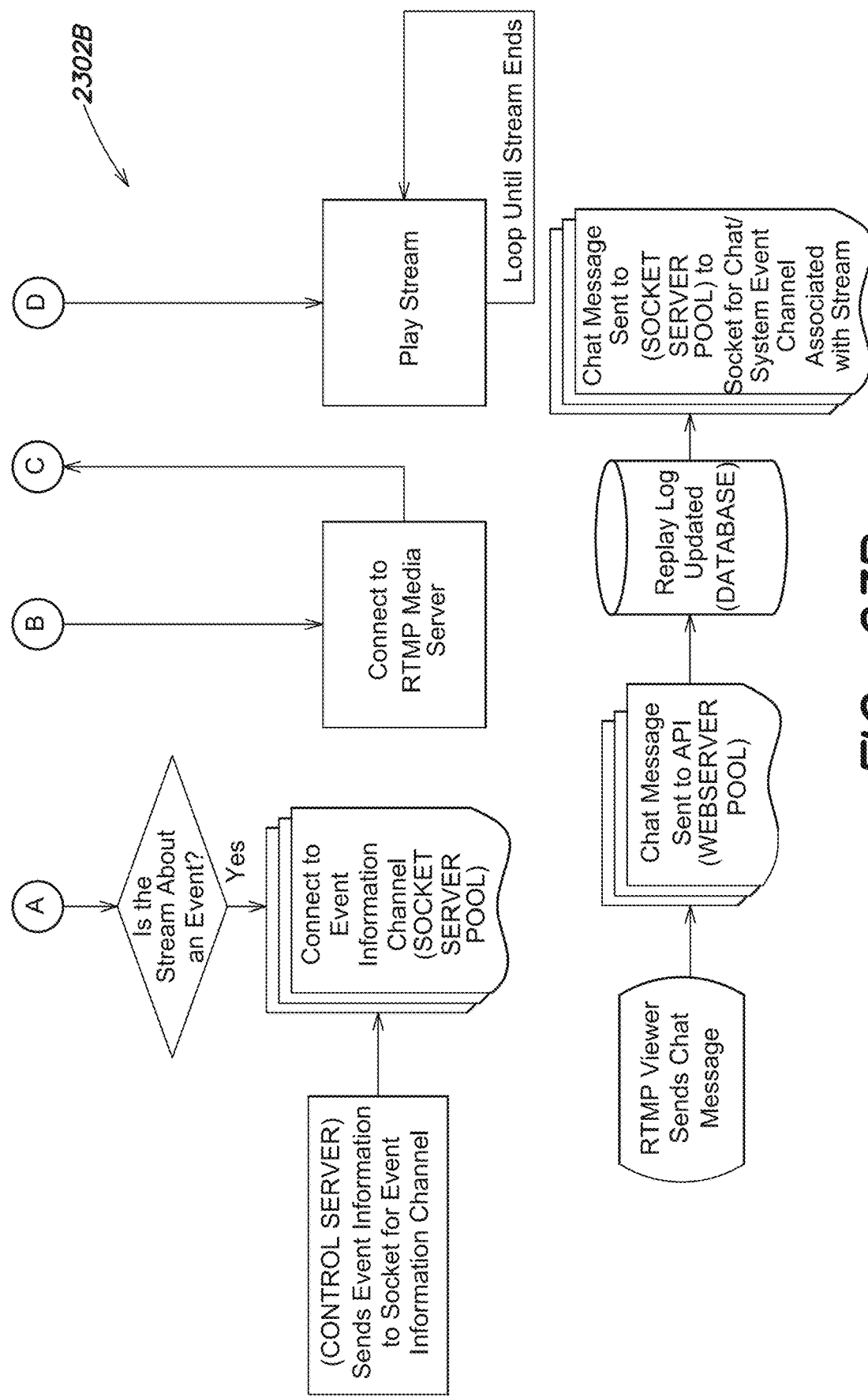

FIGS. 23A and 23B show a communication flow diagram illustrating process flow elements and the server and/or memory storage devices involved in the communication flow for a live stream RTMP media server or RTMP CDN viewer, according to one inventive implementation. A viewer who is a registered or anonymous user, but has received a StreamID for a particular broadcaster's live stream (e.g., via a push notification) to their viewer client device, may send a request to the web server(s) 700 (via the API) to receive a copy of the broadcaster's live stream. The web server(s) first checks the memory cache 460 for, or requests from the database 420, various stream information corresponding to the StreamID provided by the requesting viewer. The web server(s) then perform(s) the viewer stream source selection algorithm discussed above in connection with FIG. 7 to provide an endpoint to the viewer client device for the appropriate media source from which to obtain a copy of the live stream. In the process shown in FIGS. 23A and 23B, the viewer stream source selection algorithm provides an endpoint (e.g., address or URL) to the viewer client device to establish a video communication channel with either a particular media server of the RTMP media server pool 320, or a particular server of the RTMP CDN 340.

The viewer client device also connects to the appropriate socket of the socket server(s) dedicated to the live stream to establish a chat/system event channel and thereby receive chat messages and system messages. If the live stream relates to an event, the viewer client device also connects to the appropriate socket of the socket server(s) dedicated to the event to establish an event information channel and thereby receive event messages containing various event information. The viewer using the viewer client device also may send chat messages to the web server API, which the web server directs to the appropriate socket of the socket server(s) dedicated to the live stream for broadcast to other viewers connected to the socket as well as the broadcaster. The web server also updates a replay log with the chat message from the viewer, so that the chat may be recreated if a recording of the broadcaster's live stream is replayed by a viewer at a later time (discussed further below).

Figure 24A:
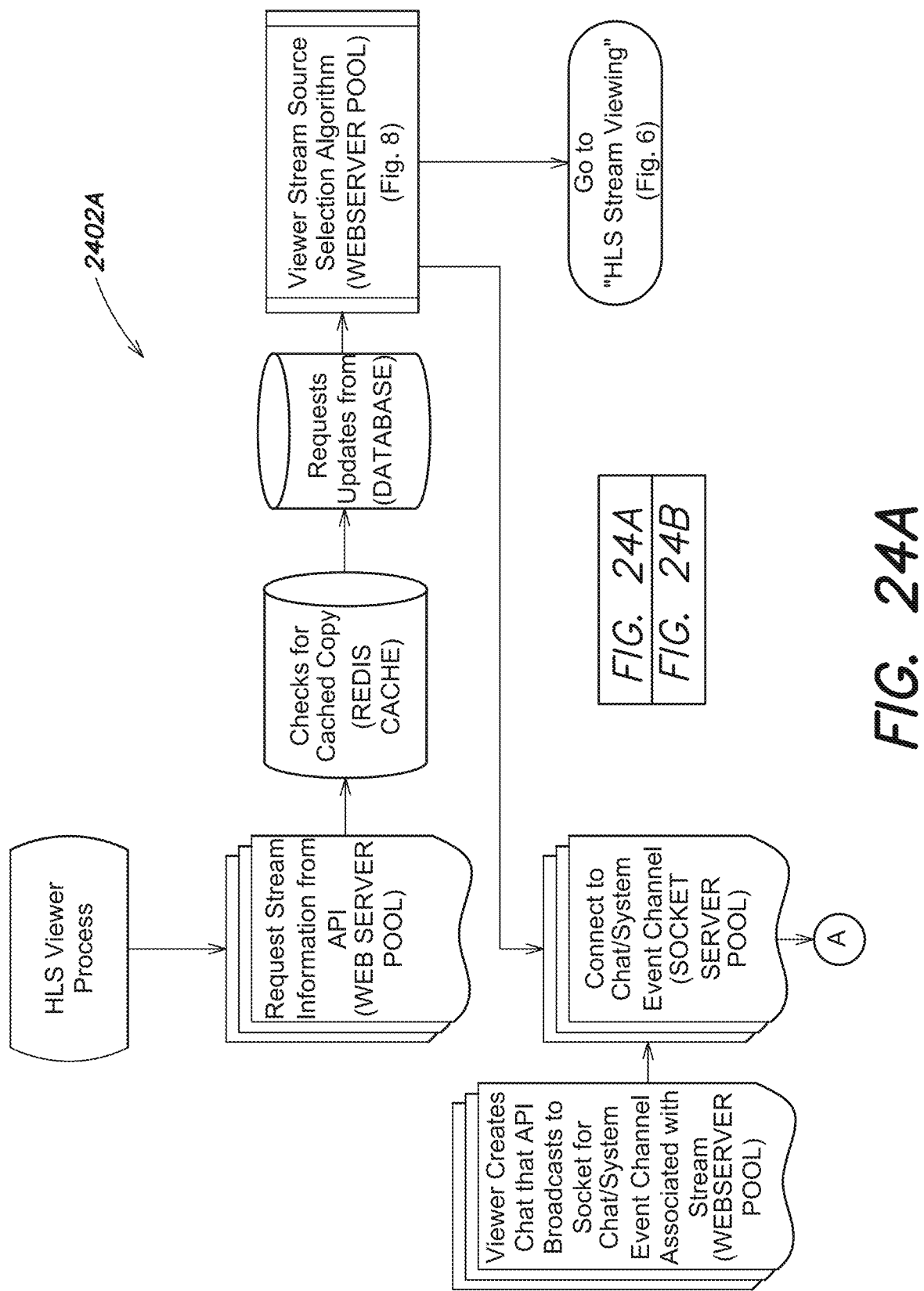
FIGS. 24A and 24B show a communication flow diagram illustrating process flow elements and the server and/or memory storage devices involved in the communication flow for a live stream HLS viewer, according to one inventive implementation.
Figure 24B:
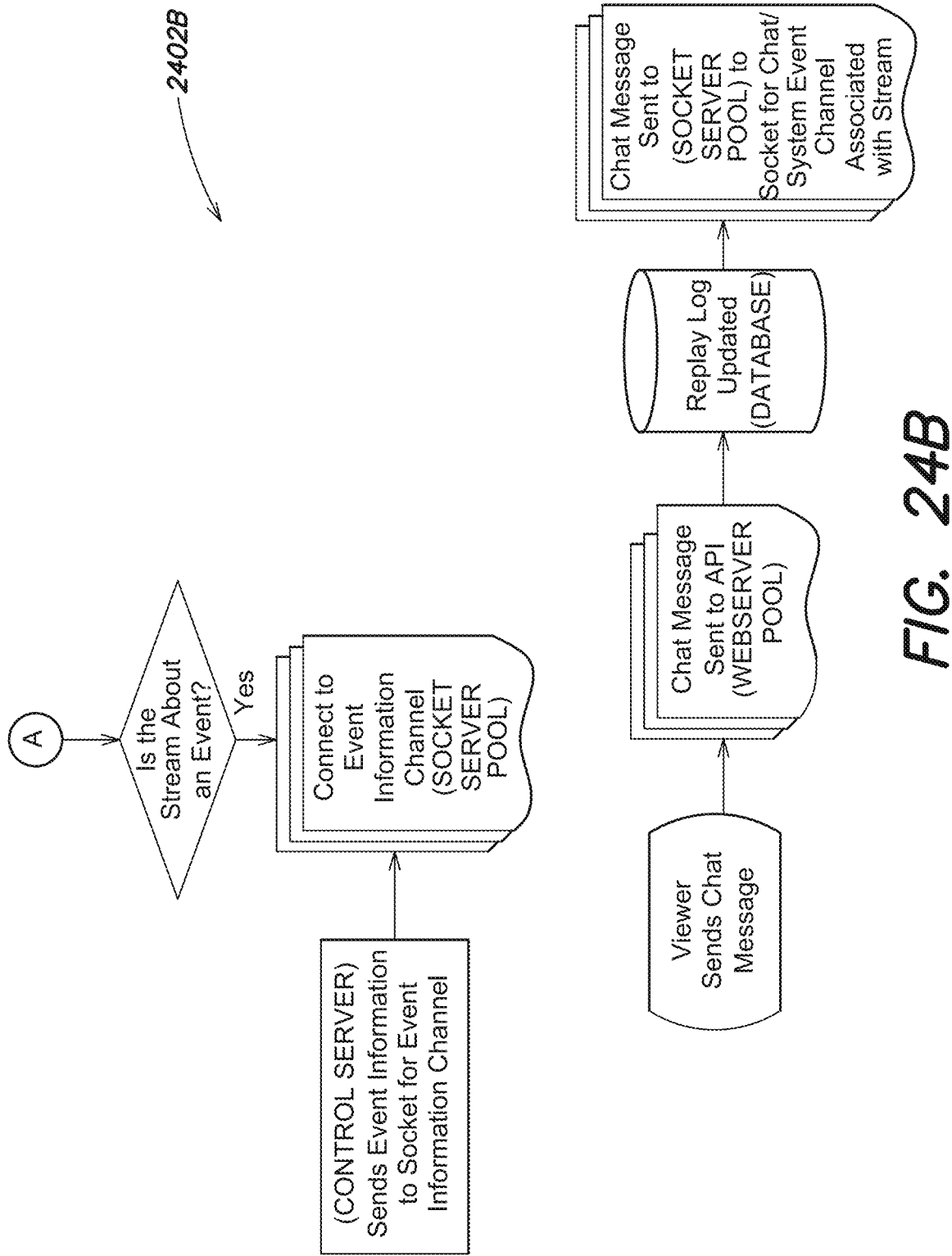

FIGS. 24A and 24B show a communication flow diagram illustrating process flow elements and the server and/or memory storage devices involved in the communication flow for a live stream HLS viewer, according to one inventive implementation. The process shown in these figures is substantially similar to that outlined above in connection with FIGS. 23A and 23B; the primary difference is that, as a result of the web server(s) performing the viewer stream source selection algorithm (see FIG. 7), the web server(s) return(s) to the viewer client device an endpoint (e.g., address or URL) to establish a video channel with the HLS server architecture 380 rather than a server of the RTMP media server pool 320 or the RTMP CDN 340.

Figure 25A:
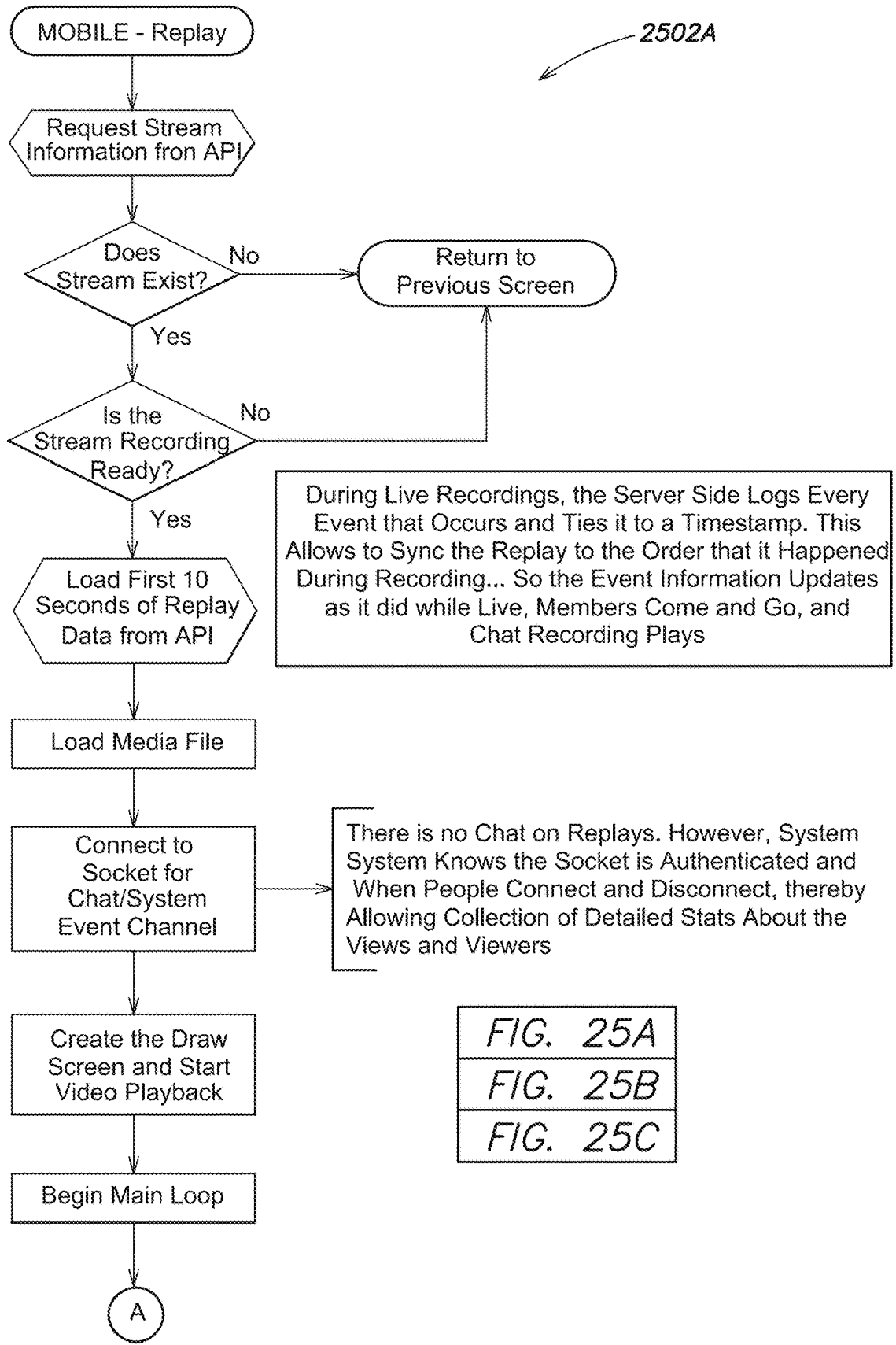
FIGS. 25A, 25B, and 25C show a process flow illustrating a mobile client live stream replay method, according to one inventive implementation.
Figure 25B:
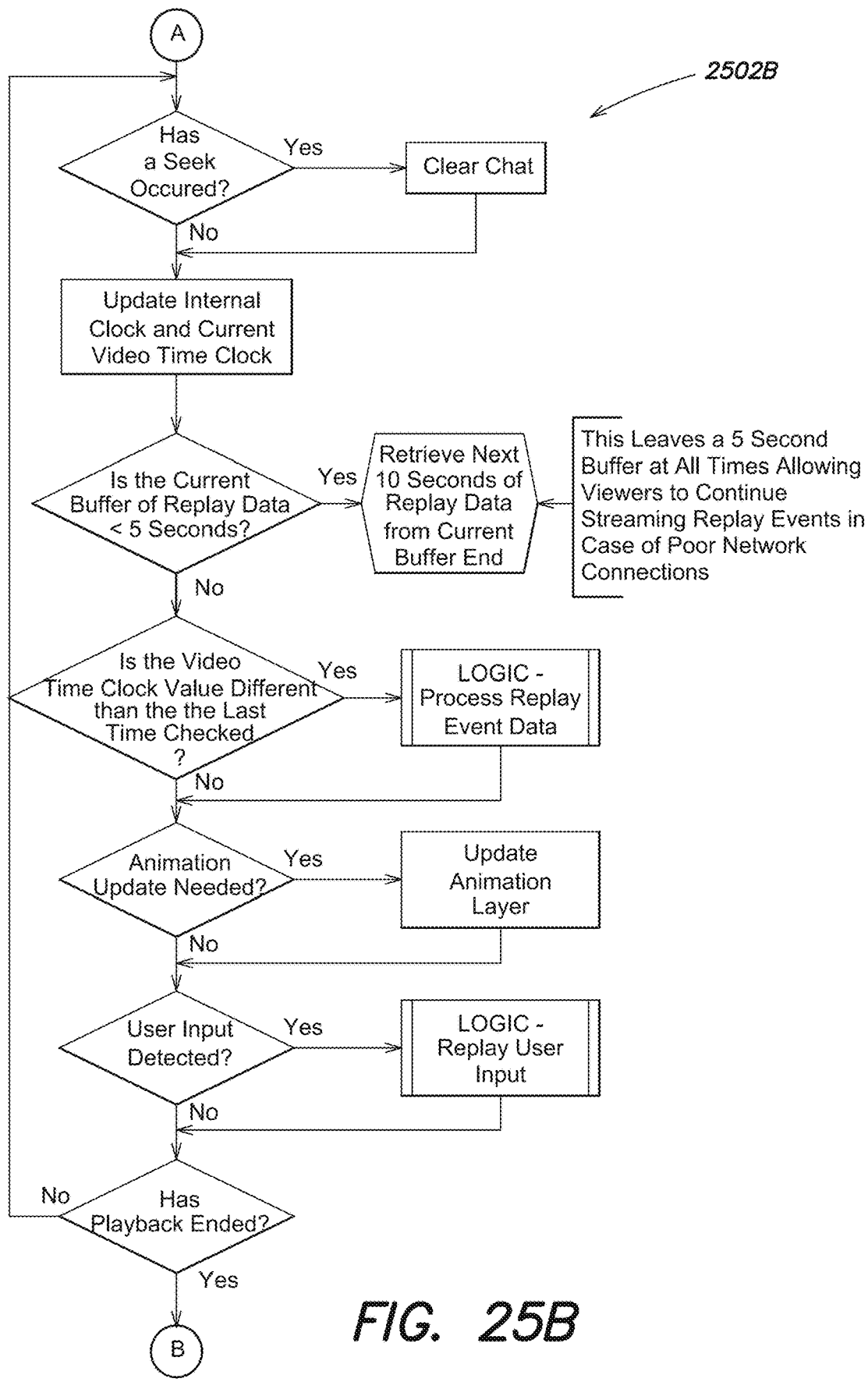
Figure 25C:
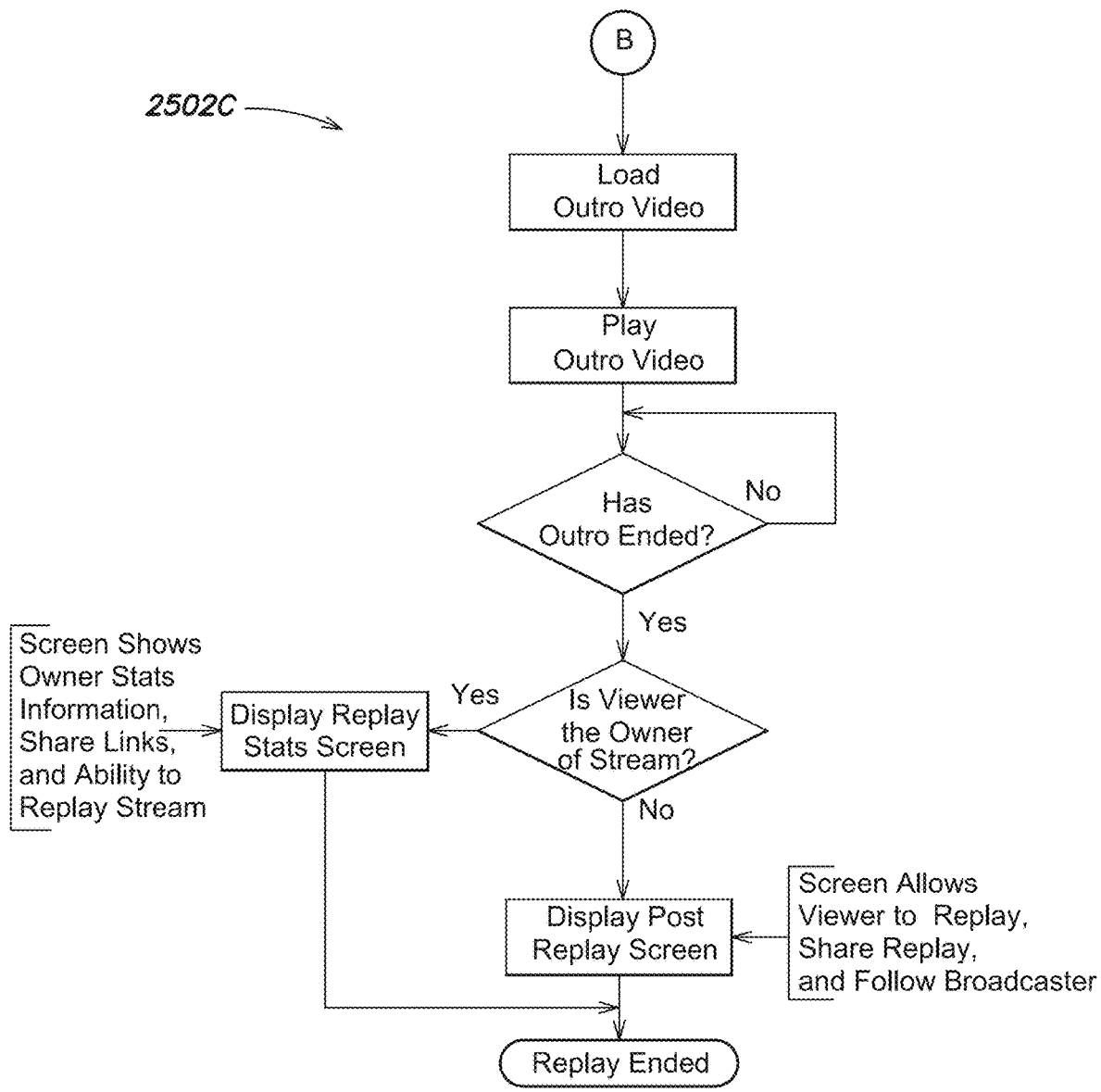

FIGS. 25A, 25B, and 25C show a process flow illustrating a mobile client live stream replay method, according to one inventive implementation. For replay of a recording of a broadcaster's live stream, the servers and memory storage devices 1000 log all events that occur in connection with a live stream (e.g., chat messages and system event messages, as well as event message) and tie them to a timestamp. This allows synchronization of all events to the replay in the same order that the events occurred during the live stream, as if the viewer were not watching a recording of the live stream but actually watching a copy of the live stream in real time.

Figure 26B:
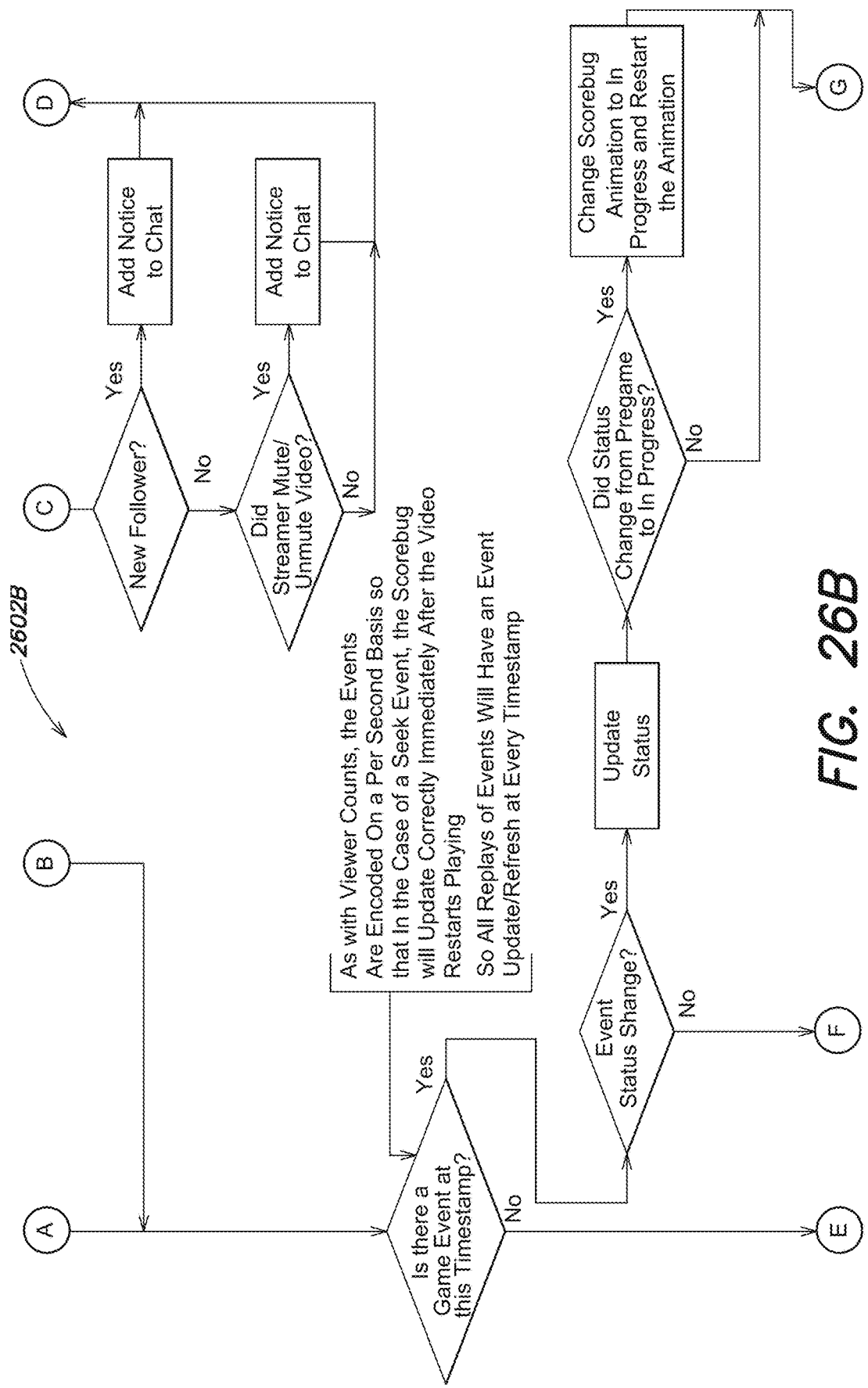
Figure 26C:
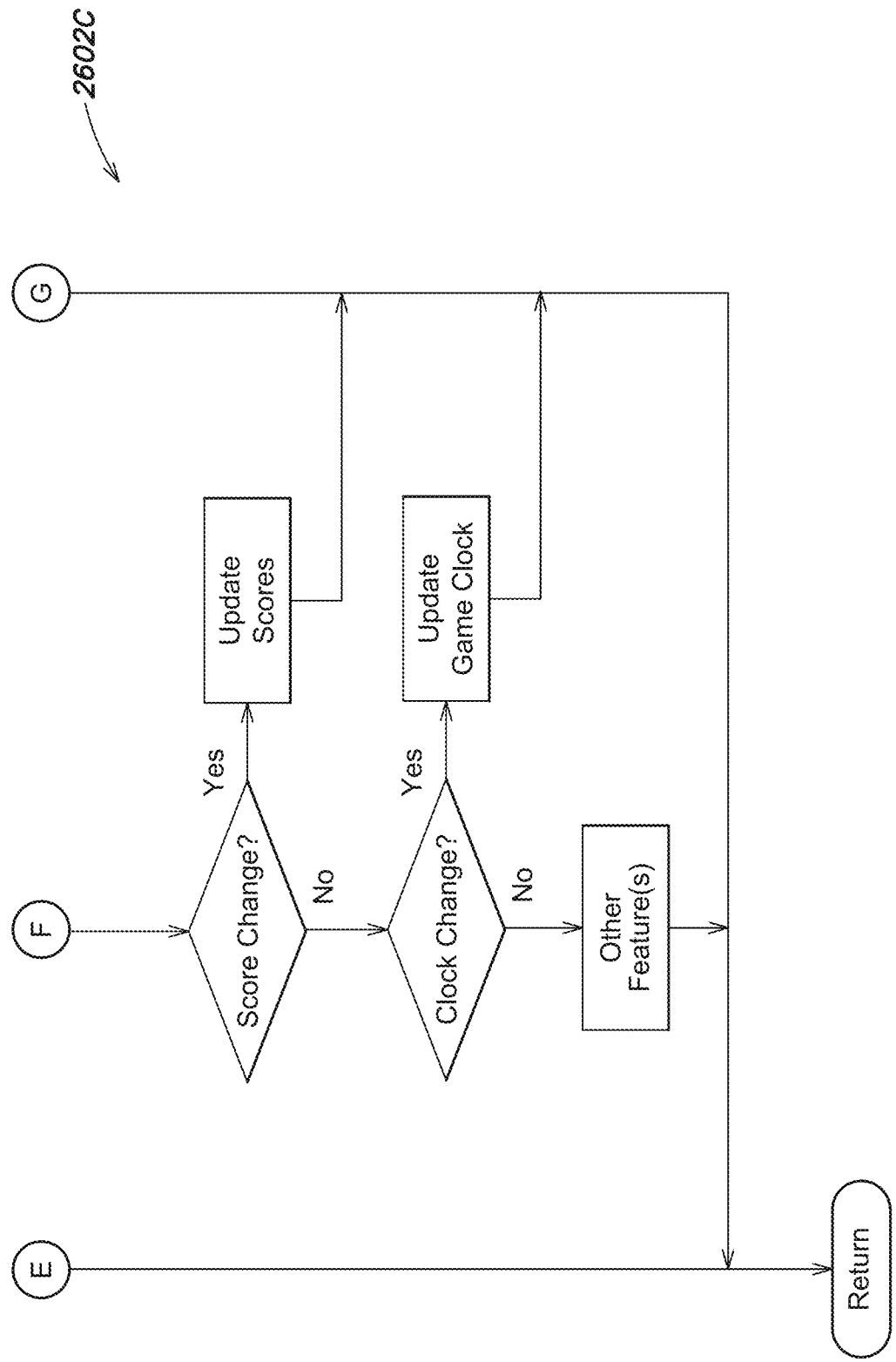
Figure 27:
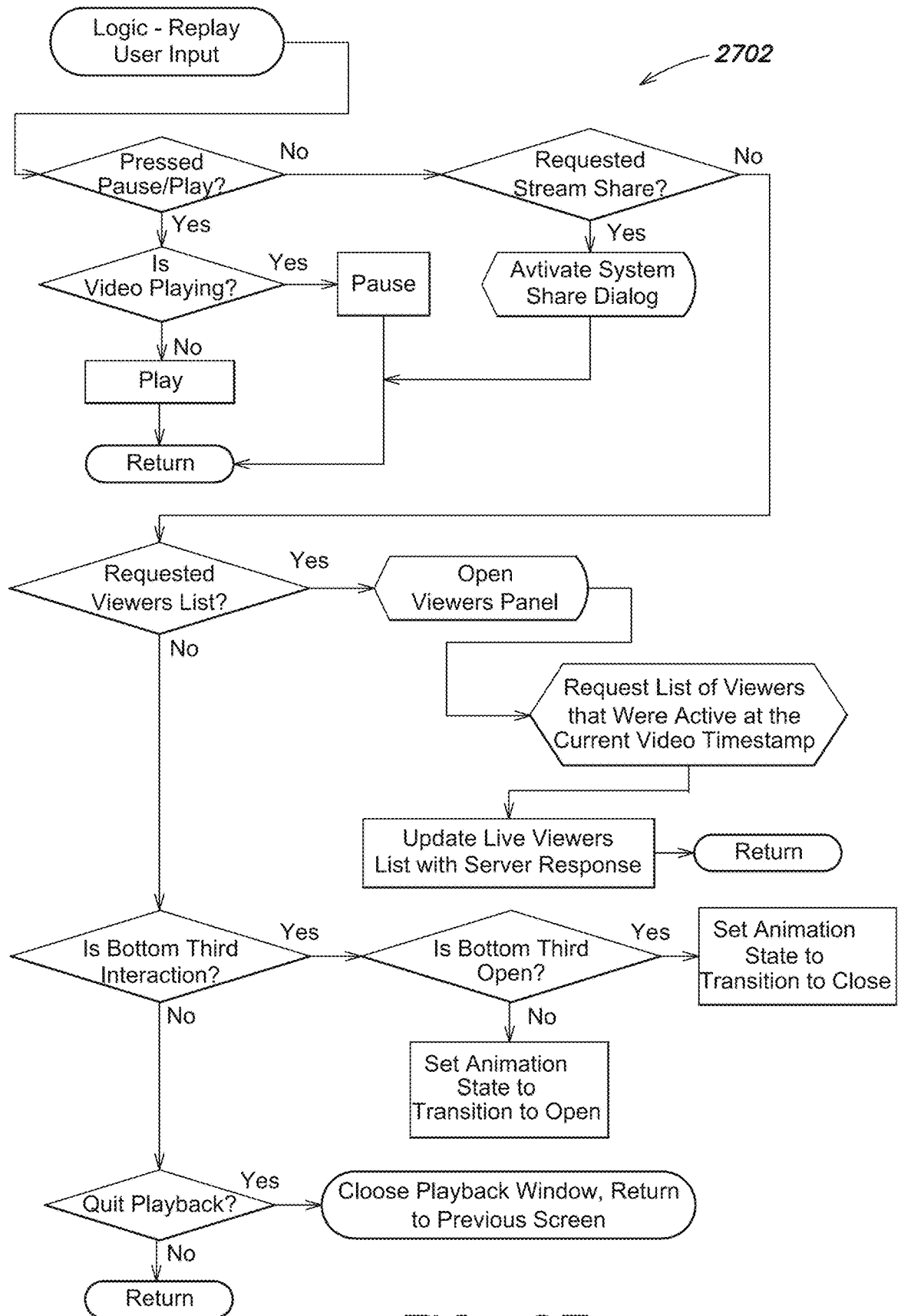
FIG. 27 shows a process flow illustrating a user input replay process called in the method of FIGS. 25A, 25B and 25C, according to one inventive implementation.

As shown in the figures, the viewer client device couples to the web server(s) via the API to request stream information and, if the stream recording is ready, loads the initial replay data from the API and then loads the media file of the recording. The viewer client device also connects to the chat/system event socket corresponding to the live stream (via a persistent authenticated connection), not to receive chat messages or system event messages (these messages are not present on replay), but rather so that the system knows of the viewer's presence and connection. Playback of the video is then started, and then the internal clock and the current video time clock are updated to provide for appropriate buffering of the video data. As the recording is played back, event data (e.g., chat messages, system messages, event information messages) is processed in one implementation according to FIGS. 26A and 26B, and user inputs are processed in one implementation according to FIG. 27.

X. Single Screen Experience

The inventive HLS server architecture 380 discussed above (e.g., in connection with FIGS. 8, 9A, 9B, 9C and 9D) also may be effectively employed to implement a "single screen experience" in which a broadcaster's video-based commentary about an event may be integrated with audio and/or video of the event itself. Synchronized event information also may be displayed together with the broadcaster's video-based commentary and the audio/video of the event itself on respective viewing devices of multiple viewers.

Figure 28:
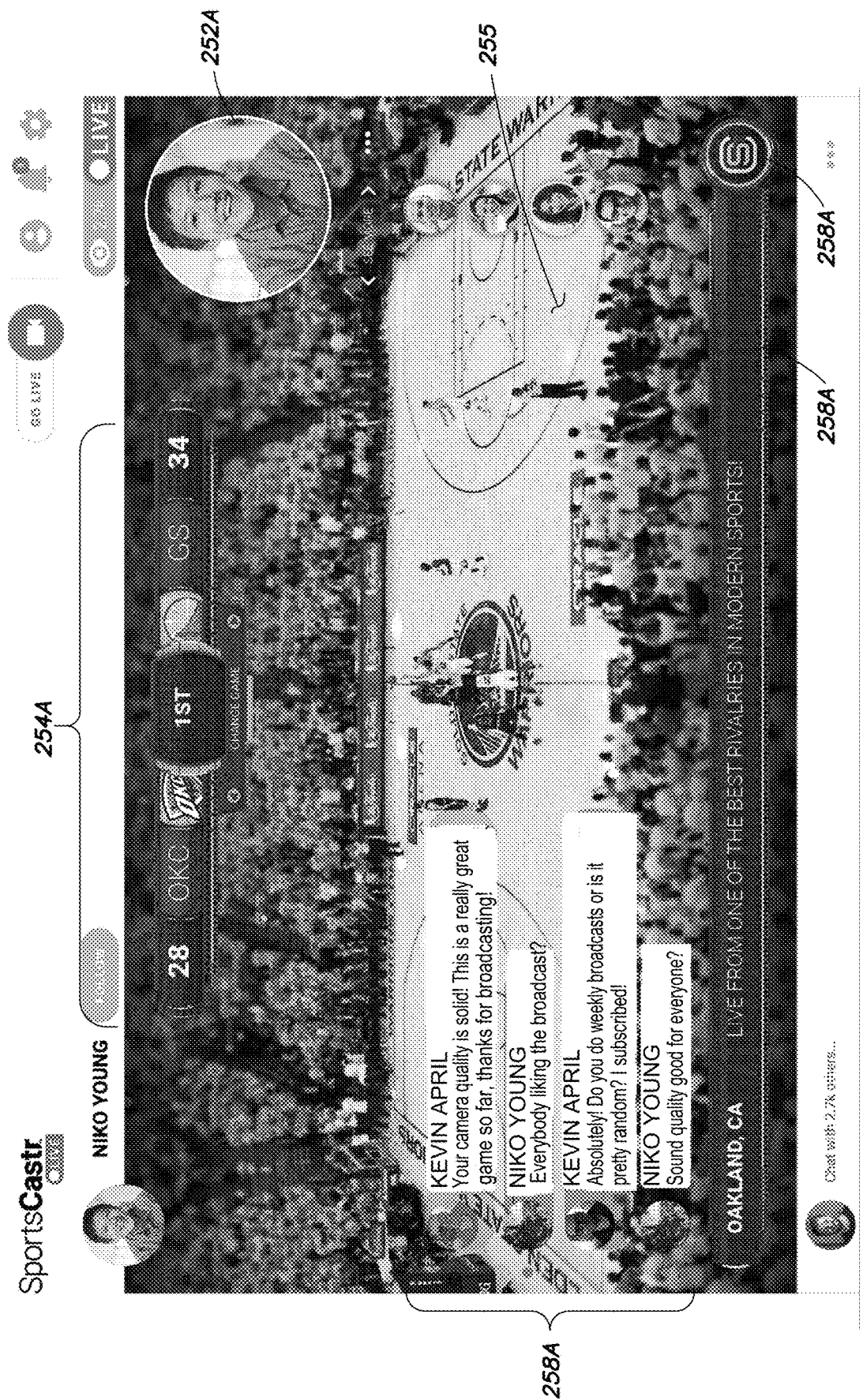
FIG. 28 illustrates a viewing display screen of broadcaster video-based commentary integrated with audio/video of a live event and event information (e.g., in the form of a scorebug) to provide a single screen experience for viewing the broadcaster video-based commentary together with video the live event, according to one inventive implementation.

For example, in a manner similar to that shown in FIG. 1B and discussed above in connection with same, FIG. 28 illustrates a display 250A of an example client device, in which a first broadcaster is providing video-based commentary 252A about a live event (e.g., a sports game such as a basketball match), and a video 255 of the live event itself is also shown in the display of the client device to provide a single screen experience (integrated event video and broadcaster commentary). Additionally, chat messages 258A from one or more viewers, event information 254A about the live event, and other graphics and/or animations 258A are displayed together with the broadcaster's video-based commentary 252A and the video 255 of the live event itself. As also shown along the right hand side of FIG. 28, multiple broadcasters may be providing respective video-based commentaries regarding the same live event, and any one of the available commentaries from different broadcasters may be selected at will by a given viewer. As discussed above in connection with FIG. 1B, it should be appreciated that one or more elements of the various content discussed in connection with FIG. 28 similarly may be provided on the display of a given broadcaster client device and a given viewer client device.

One technological problem that is addressed by inventive methods, apparatus and systems for single screen implementations is that different broadcaster's video-based commentaries relating to the same event all need to be synchronized with an audio/video feed of the live event. Because a given viewer is seeing both the audio/video of the event and a given broadcaster's video-based commentary at the same time on their viewer client device, the latency of the broadcaster's video-based commentary relative to the live event itself is less of a consideration; instead, the salient technical considerations to address include: 1) the synchronization of a given broadcaster's video-based commentary with an audio/video feed of the live event or a copy of the audio/video feed (rather than the live event itself); 2) the synchronization of one viewer of a first copy of a given broadcaster's integrated live stream of the event with another viewer of a second copy of the given broadcaster's integrated live stream of the event; and 3) the appropriate synchronization of event information and real-time updates to event information for all viewers of copies of any broadcaster's integrated live stream of the live event.

In view of the foregoing, to achieve appropriate synchronization of the broadcaster's video-based commentary and the audio/video of the live event in one inventive implementation, each broadcaster's client device first ingests a copy of an audio/video feed of the live event and displays the live event to the broadcaster on their client device based on the audio/video feed. As the broadcaster watches the displayed video of the live event on their client device, they provide their video-based commentary based on the video of the live event as displayed on their device. The broadcaster's client device creates a composite outgoing stream of the audio/video feed of the live event and the broadcaster's video-based commentary (an "integrated live event and commentary stream"), and transmits this integrated live event and commentary stream to a media server. The media server (or other constituent of the media sources 300) in turn provides one or more copies of the integrated live event and commentary stream for distribution to one or more viewer client devices. In one example implementation in which the audio/video feed of the live event already includes commentary (e.g., from a network source) and/or other undesirable audio content, the original event audio may be filtered or omitted from the integrated live event and commentary stream (e.g., only the video portion of the copy of the audio/video feed of the live event is utilized) to mitigate or significantly reduce undesirable audio content that may otherwise obfuscate or interfere with the broadcaster's commentary.

In one aspect, a quality of the video that a viewer sees (both of the event and the broadcaster's commentary) based on a copy of the integrated live event and commentary stream is dependent at least in part on the quality of the broadcaster's network connection (e.g., if the broadcaster is on a low bandwidth connection, the resulting footage as seen by the viewer will be relatively low quality, irrespective of a quality of the original audio/video feed of the live event). Additionally, another technical consideration is that the effective network bandwidth required by the broadcaster is significantly increased (e.g., doubled), as not only is the broadcaster client device outputting a live stream to a media server for distribution, but it is also ingesting the original audio/video feed of the live event to provide a basis for the broadcaster's video-based commentary.

In some inventive embodiments, to mitigate potential broadcaster network connection issues (e.g., resulting in poor viewer video quality), the copy of the audio/video feed for the live event is provided to broadcaster client devices by one of the media sources 300 in the servers and memory storage devices 1000 shown in FIGS. 2 and 3. More specifically, in one implementation, an audio/video feed of a live event from a broadcast source is input to one of the RTMP media servers 320, a first HLS copy of the audio/video feed is provided by the RTMP media server 320 to the HLS server architecture 380, and then one or more additional copies of the audio/video feed for the live event are provided to respective broadcaster client devices by the HLS server architecture 380. As mentioned above, the latency between the actual live event and the broadcaster commentary isn't necessarily a salient consideration, since any viewer of a copy of the broadcaster's integrated live event and commentary stream views both the live event and the broadcaster's commentary from the single copy of the integrated stream. Accordingly, any latency arising from the HLS server architecture 380 does not give rise to adverse consequences on viewer experience in single screen implementations.

Figure 29:
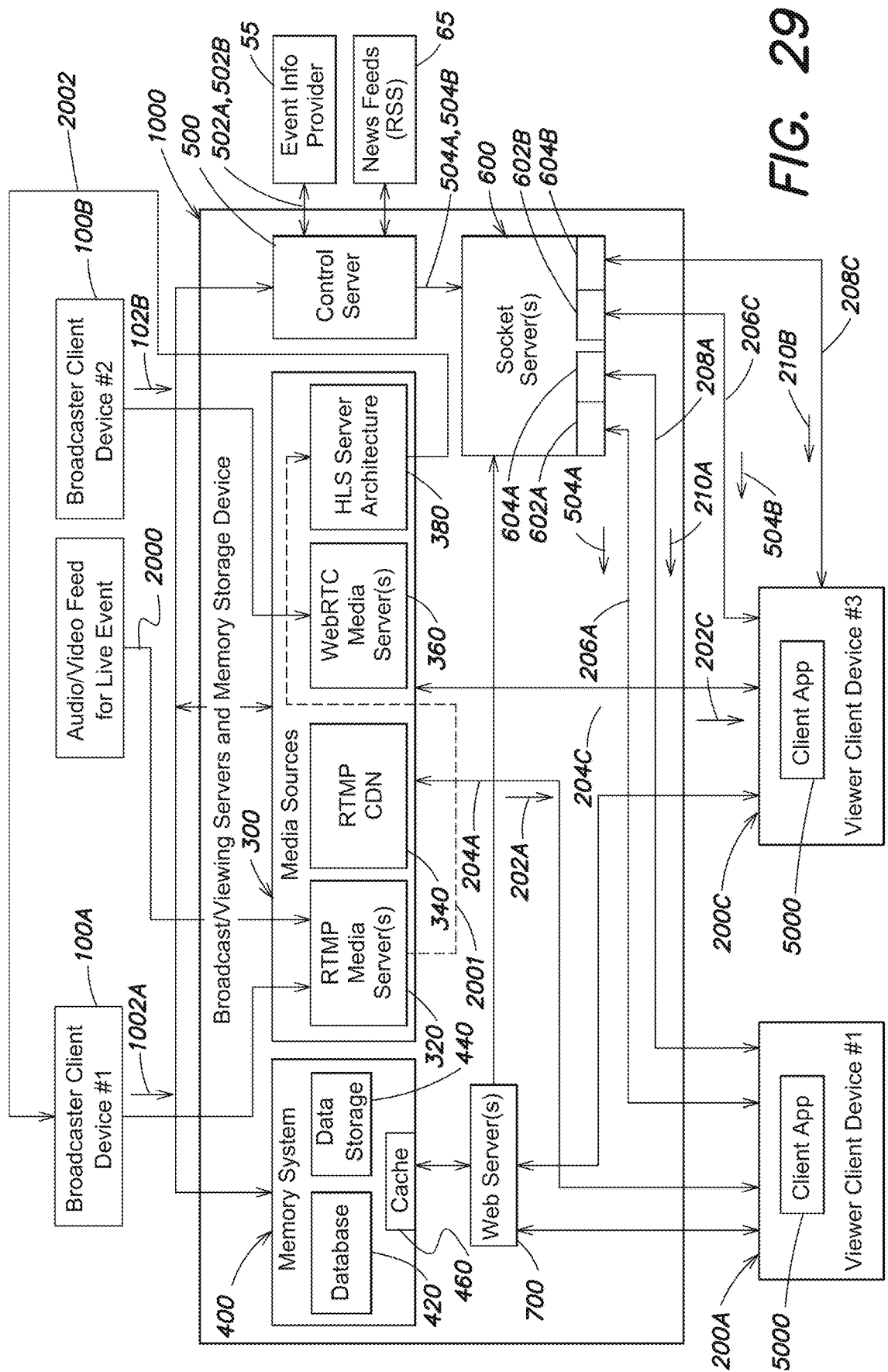
FIG. 29 is a block diagram of the broadcast/viewing servers and memory storage devices and associated client devices, similar to that shown in FIG. 2, illustrating some of the particular features germane to one example of a single screen implementation.

FIG. 29 is a block diagram of the broadcast/viewing servers and memory storage devices 1000 and associated client devices, similar to that shown in FIG. 2, illustrating some of the particular features germane to one example of a single screen implementation involving the RTMP media servers 320 and the HLS server architecture 380 of media sources 300 to process an audio/video feed of a live event. As shown in FIG. 29, a designated one of the RTMP media servers 320 receives an audio/video feed 2000 for a live event (e.g., as provided by Leaguepass, MLB networks, EPL live feeds, etc.), and provides a first HLS copy 2001 of the audio/video feed to the HLS server architecture 380 (see "HLS Segmentation" shown in FIG. 5C and discussed above in connection with same). The HLS server architecture then provides one or more additional HLS copies 2002 of the first copy 2001 of the audio/video feed to one or more broadcaster client devices (e.g., see the broadcaster client device 100A in FIG. 29); to this end, the HLS server architecture 380 may implement, at least in part, the process discussed above in connection with FIGS. 8 and 9A through 9D. As discussed further below, a given broadcaster client device then combines the HLS copy 2002 of the audio/video feed received from the HLS server architecture 380 with video-based commentary provided by the broadcaster to generate an integrated live event and commentary stream 1002A, which is transmitted to one or more of the media sources 300 (e.g., RTMP media server 320 or WebRTC media server 360).

Figure 30:
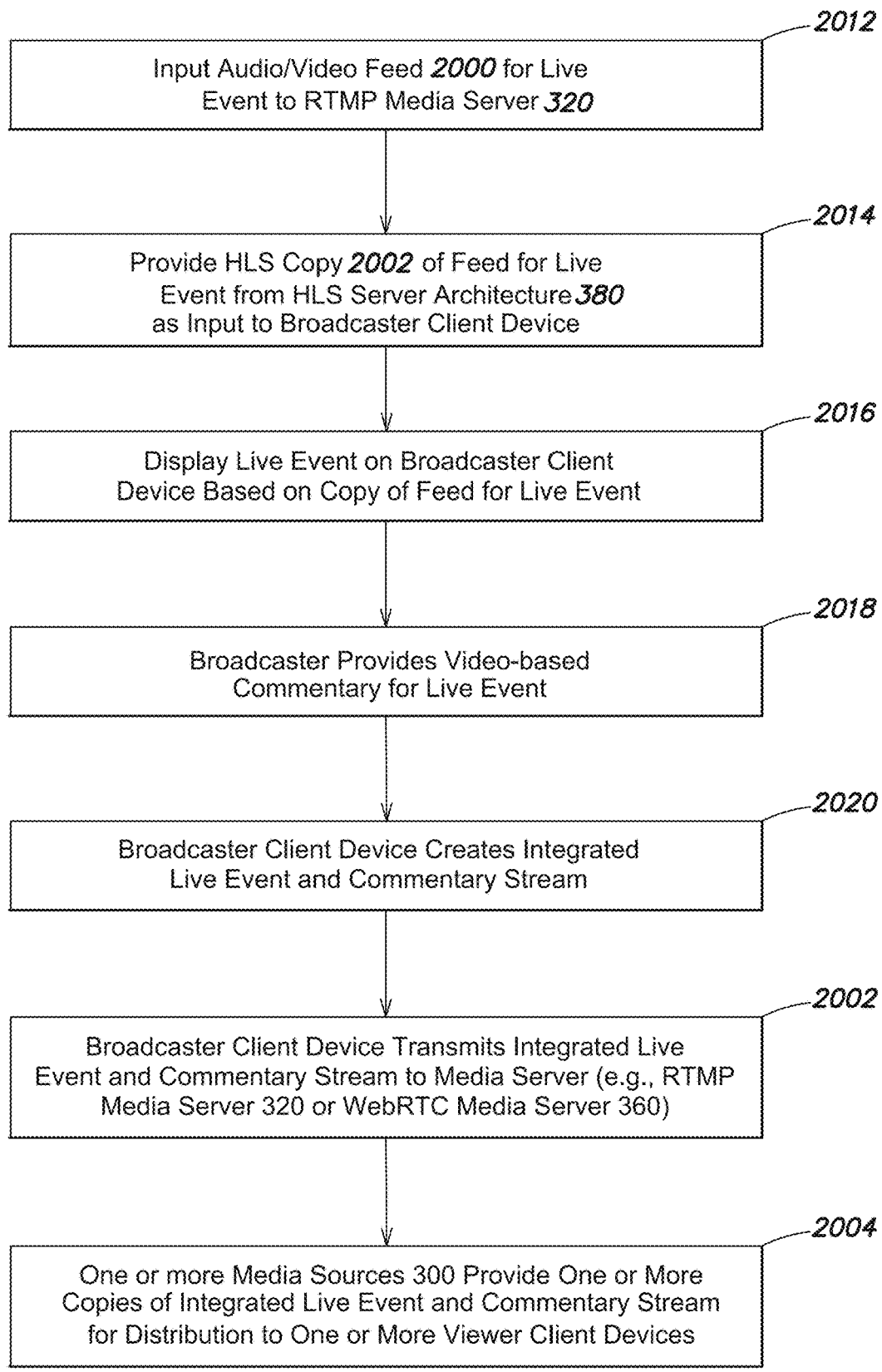
FIG. 30 is a flow chart illustrating a process implemented by the various devices shown in FIG. 29, according to one inventive implementation.

FIG. 30 is a flow chart illustrating a process implemented by the various devices discussed above in connection with FIG. 29. In block 2012 of FIG. 30, the audio/video feed 2000 for the live event is input to the RTMP media server 320. A first HLS copy of the audio/video feed is provided by the RTMP server to the HLS server architecture 380. In block 2013, the server architecture 380 provides a second HLS copy of the audio/video feed as input to a given broadcaster client device. In block 2016, the broadcaster client device displays the live event based on the HLS copy of the audio/video feed received from the HLS server architecture. In block 2018, the broadcaster provides video-based commentary for the live event based on the video rendered in the display of the client device, and in block 2020 the broadcaster client device generates the integrated live event and commentary stream 1002A. In block 2022, the client device transmits the integrated live event and commentary stream 1002A to a media server of the media sources 300, and one or more of the media sources 300 provide one or more copies of the integrated live event and commentary stream for distribution to one or more viewer client devices (e.g., via a content delivery network that accesses the integrated live stream from a first media server endpoint according to a first live stream Internet URL corresponding to the integrated live stream).

With reference again to FIG. 29, and in a manner similar to that discussed above in connection with FIG. 2, respective viewer devices (e.g., 200A, 200C) receiving copies of a given broadcaster's integrated live event and commentator stream 1002A also connect to an event socket of a socket server 600 (e.g., according to a first event socket Internet URL) to receive synchronized event information (e.g., real time scores) relating to the event. Based on the received copy of the integrated live event and commentator stream and the synchronized event information, a given viewer device displays the broadcaster's video-based commentary together with the audio/video of the live event itself as well as the event information (e.g., as a "scorebug").

Although the context and use-case for the concepts outlined in FIGS. 29 and 30 are directed generally to live events, it should be appreciated that, in other use-cases, these concepts similarly may be applied to rebroadcast or timeshifted events (e.g, for which the source audio/video feed 2000 for the event is not necessarily contemporaneous with the live event itself, but delayed in time by some amount with respect to the live event, or is a rebroadcasting of a previously recorded event).

In one aspect of single screen implementations, the event socket corresponding to a particular live event also may provide event broadcaster information relating to different broadcasters offering video-based commentary about the same live event. In this manner, a given viewer of the live event may select amongst different broadcasters for the same live event, based on the event broadcaster information provided by the event socket, to access a different but synchronized integrated live event and commentator stream (e.g., according to a second live stream Internet URL associated with a different broadcaster). Thus, a seamless transition is provided to a different broadcaster's commentary integrated with the audio/video of the live event. The viewer device may remain connected to the event socket to continue to receive the synchronized event information which is displayed together with the different broadcaster's commentary and the audio/video of the live event, as well as ongoing updates to event broadcaster information to keep abreast of different broadcasters that are providing video-based commentary about the event.

The innovative HLS server architecture 380 ensures that all broadcasters providing commentary on the same live event are synchronized to each other. More specifically, respective copies of the audio/video feed of the live event provided by the HLS server architecture 380 to multiple broadcaster client devices fall within a single HLS segment length of synchronization—this single HLS segment length of synchronization of copies of the audio/video feed of the live event is referred to herein as "broadcaster segment concurrency," akin to the viewer segment concurrency discussed above in connection with the HLS server architecture 380.

More specifically, and with reference again to section VII of this document (i.e., in connection with FIG. 8), HLS copies of a live stream of digital content include a number of segments, each containing a short segment of video (encoded as a .ts file). An HLS buffer (also referred to as a window or "chunklist") contains a list of some number of pointers to the .ts files that represent respective segments. The media source providing the HLS files typically does not make the HLS copy of the live stream available to a viewer until the HLS buffer is full of pointers. When a client device receives an HLS copy of a live stream, the client device begins displaying the video segment (the .ts file) at the start of the HLS buffer (the first pointer in the chunklist); thus, the viewer of the HLS copy is "behind real time" (offset in time from the original video source that is being segmented) by the length of the buffer. In one inventive implementation discussed above, the HLS buffer includes 4-6 pointers to .ts files of video segments, wherein each segment includes 2 seconds of video (accordingly, the offset in time between the original video source and a viewer's HLS copy is 8 seconds for a 4 pointer HLS buffer and 12 seconds for a 6 pointer HLS buffer).

According to the HLS caching server architecture 380 shown in FIG. 8, all viewers of HLS copies of live streams are known to be inside the same single segment, with an effective maximum desynchronization between respective viewers of the HLS copies of the same live stream being the duration of a single HLS video segment; this maximum desynchronization was referred to herein earlier in connection with HLS viewers as "viewer segment concurrency" (e.g., 2 seconds in the example described above). However, in the context of the HLS server architecture providing copies of audio/video feeds of live events to broadcaster client devices to facilitate single screen experience implementations, this concept in this context also may be referred to as "broadcaster segment concurrency."

The broadcaster segment concurrency provide by the HLS server architecture in single screen experience implementations thereby allows for a given viewer of a copy of a first broadcaster's integrated live event and commentary stream to smoothly transition to a copy of a second broadcaster's integrated live event and commentary stream relating to the same event, without any significant interruption of the displayed live event as part of the viewer's single screen experience. Generally speaking, in single-screen experience implementations, all broadcasters providing video-based commentary on a particular event provide respective integrated live event and commentary streams that are substantially synchronized (e.g., with a delay relative to the original audio/video feed of the live event of approximately one HLS window/buffer length, e.g., 8 to 12 seconds for 4 or 6 pointers, respectively), and all viewers of a given broadcaster receive respective copies of the integrated live event and commentary stream from the broadcaster that are substantially synchronized (e.g., with a delay relative to the original audio/video feed of the live event of approximately two HLS windows/buffer lengths, e.g., 16 to 24 seconds for 4 or 6 pointers, respectively).

Another technological problem that is addressed in the inventive solutions provided herein for the single-screen experience takes into account the HLS-induced latency with respect to the synchronized event information that is provided to all viewers of broadcasters relating to the same event (via a dedicated event socket of the socket server(s) 600), as well as chat messages and system event messages (provided via a dedicated chat/system event socket of the socket server(s) 600).

Recall that, in connection with implementations relating to a second screen experience, the socket server(s) 600 provide event information updates in essentially real-time and simultaneously to all broadcasters commenting about the same live event, and all viewers that are viewing broadcaster commentary about the same live event. The essentially real-time and simultaneous delivery of event information (and updates to same) to all broadcasters and viewers concerned with the same event is a salient consideration for the second screen experience, as both the broadcaster(s) and viewer(s) likely are viewing the event either live or on a primary screen in essentially real time with the live event (so it is important to the viewer experience to receive event information updates as they occur).

In alternative implementations relating to a single screen experience, however, event information updates are synchronized not to the live event itself, but rather to the broadcaster's integrated live event and commentary stream (which is delayed relative to the original audio/video feed of the live event due to the HLS techniques employed). In some examples, this alternative synchronization is achieved via event buffering and clock synchronization techniques involving a privatized Network Time Protocol (NTP) (for which a synchronized time for all client devices may be acquired via additional socket connections).

Regarding chat messages and system event messages (conveyed to client devices via a dedicated chat/system event socket of the socket server(s)), in single screen experience implementations these messages are "double delayed" relative to the original audio/video feed 2000 of the live event to which they pertain. In particular, as noted above, viewers in the single screen experience implementations are seeing the audio/video related to a live event (as part of the integrated broadcaster commentary and audio/video of the live event) with a delay relative to the original audio/video feed 2000 of the live event of two times the HLS window/buffer length. Thus, the broadcaster of the integrated live stream sees chat messages that are responding to audio/video that occurred one HLS window in the past. However, because the broadcaster does not necessarily participate in chat messages in some implementations, this broadcaster-perceived delay generally is of no significant consequence; from the viewers' perspective, all viewers are experiencing chat messages in a synchronized manner, irrespective of delays arising from the HLS techniques employed.

For example, assume the HLS window is 12 seconds (e.g., six pointers to respective segments each having two seconds in duration). The broadcaster receives their copy of the audio/video feed of the live event from the HLS server architecture 380 with a 12 second delay relative to the original audio/video feed 2000 of the live event. Also assume that one or more viewers have connected to the HLS server architecture 380 as soon as copies of the broadcaster's integrated live event and commentary stream are made available at the HLS server (i.e., after two HLS windows or 24 seconds delayed from the original audio/video feed 2000 of the live event. If the viewers begin chatting immediately about what they are viewing in their copies of the integrated live event and commentary stream, this chat relates to what the broadcaster was viewing and commenting on 12 seconds prior; i.e., the broadcaster will see this viewer chat on the broadcaster client device with a 12 second delay relative to the content they generated (any chat messages that are displayed on the broadcaster's screen are in response to what the broadcaster did 12 seconds ago).

With reference again to FIG. 29, in single screen experience implementations, the control server 500 of the server and memory storage architecture 1000 implements additional functionality to monitor for live events and audio/video feeds relating to these live events from a variety of available Internet sources (e.g., Leaguepass, MLB networks, EPL live feeds, etc.). The control server 500 then stores access endpoints (source URLs) for respective audio/video feeds of live events in the database 420 of the server and memory storage architecture 1000. In one implementation, with reference again to FIG. 10 and FIGS. 16A and 16B, the live event data monitor service implemented by the control server 500 is modified for these purposes.

Figure 31A:
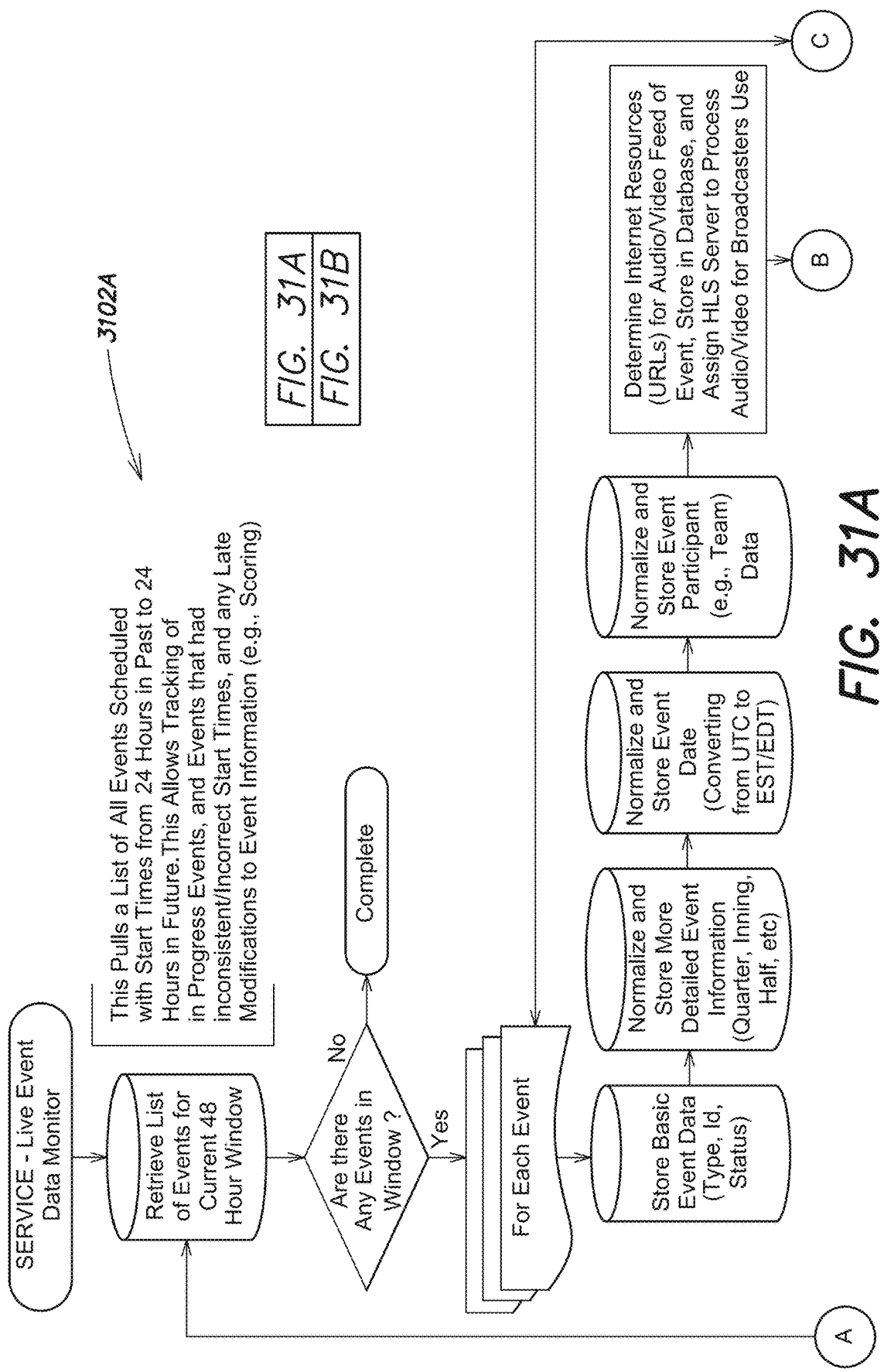
FIGS. 31A and 31B show a process flow diagram, similar to that shown in FIGS. 16A and 16B, illustrating a modified live event data monitor service method performed by the control server of FIG. 29, according to one inventive implementation.
Figure 31B:
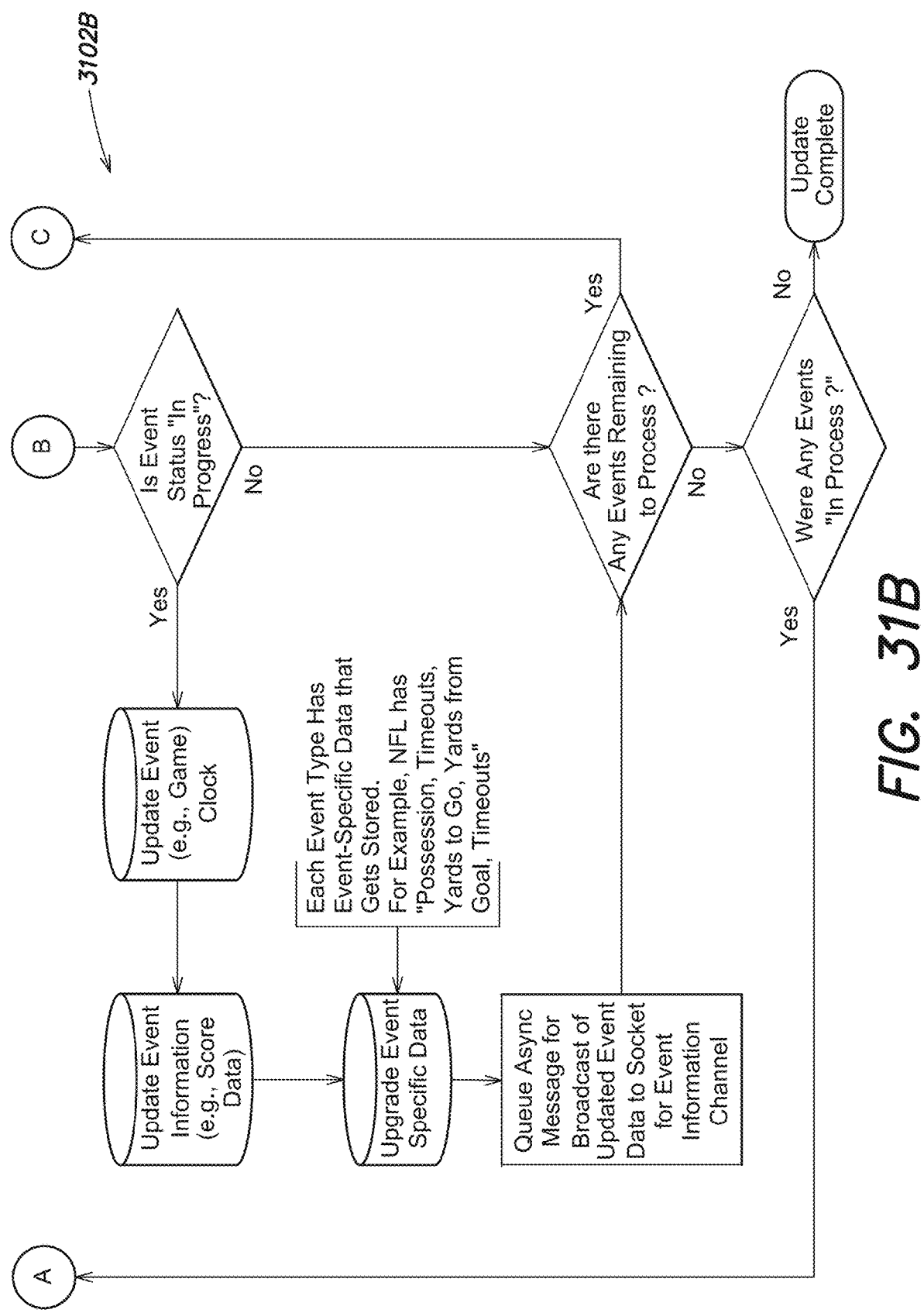

More specifically, FIGS. 31A and 31B show a process flow diagram, similar to that shown in FIGS. 16A and 16B, illustrating a modified live event data monitor service method performed by the control server of FIG. 29, according to one inventive implementation. In one example relating to sporting events, via the modified live event data monitor service method, the control server may monitor existing game data retrieved from event information provider 55 (e.g., STATS) to detect "start of game" events, determine the Internet resources corresponding to audio/video feeds 2000 for such events, and store the URLs for these Internet resources in the database 420.

Once an audio/video feed 2000 relating to an event is identified (and is about to commence), the control server assigns a media server of the media sources 300 (e.g., the HLS mother 382 of the HLS server architecture 380 to process the audio/video feed 2000 to create an HLS copy 2002 of the audio/video feed, that is in turn passed on to one or more broadcaster client devices. In particular, the control server 500 may signal to the assigned media server that a new game is started, and provide the URL for the audio/video feed 2000 of the game, pursuant to which the server connects to the source of the audio/video feed 20000 (e.g., Leaguepass, MLB networks, EPL live feeds, etc.).

After the HLS window time has been reached (e.g., 12 seconds) the control server "unlocks" the HLS copy 2002 corresponding to the live event and allows broadcaster devices to begin accessing the HLS copy 2002 from the HLS server architecture 380. In one aspect, the HLS CDN 388 (see FIG. 8) may provide a relay point that a broadcaster client device connects to (in some implementations this may be an obfuscated/encrypted endpoint provided to valid broadcasters to prevent non-broadcasters from accessing the copy of the audio/video feed of the live event).

The broadcaster client device in turn combines broadcaster video-based commentary with the HLS copy 2002 of the audio/video feed of the live event and, as shown in FIG. 29, provides to a media server of the media source 300 (as selected by the Web Server 700) an RTMP H.264 integrated live event and commentator stream 1002A. The media server processes this incoming stream from the broadcaster client device (as discussed earlier in this disclosure) to provide at least one copy of the incoming integrated live event and commentary stream from the broadcaster to at least one viewer client device (via the media sources 300). In one implementation in which viewers access copies of the broadcaster's integrated stream from the HLS server architecture, the control server 500 unlocks the viewer copies after twice the HLS window time has been reached (e.g., at least 24 seconds after the audio/video feed 2000 of the live event commences, and 12 seconds after the broadcaster begins broadcasting).

With respect to the functionality of the broadcaster client device to create an integrated live event and commentary stream 1002A, the processes previously outlined above in connection with FIGS. 20A and 20B, as well as FIGS. 21A, 21B, 21D, and 21E, are modified in some respects to accommodate the inclusion of the HLS copy 2002 of the audio/video feed of the live event.

In connection with the mobile broadcaster stream create process outlined in FIGS. 20A and 20B, during stream creation the broadcaster client device may synchronize an application timer via an NTP system (e.g., private NTP pool) that may be accessed via a designated socket of the socket server(s) 600. For example, in the penultimate block of FIG. 20B, the "Stream Created" portion of the process may be modified in that the web server 700 may provide a designated socket as part of the validation process for the broadcaster client device to synchronize an application timer, referred to hereafter as "server_time." Alternatively, in another implementation, the broadcaster client device need not access an NTP system directly, but rather may synchronize its application timer "server_time" via an initial timestamp generated and provided by the web server 700 (via a private NTP pool); in this manner, the broadcaster client device may use its internal clock and a calculated offset based on the initial syncing timestamp provided by the web server 700 (e.g., with a granularity of about one second provided via the timestamps). In any event, it should be appreciated that given the delay time corresponding to an HLS window between the original audio/video feed of the live event and the HLS copy of the audio/video feed, a portion of the live event displayed on the broadcaster client device at "server_time" actually appeared in the original audio/video feed of the live event approximately one HLS window earlier.

Figure 32A:
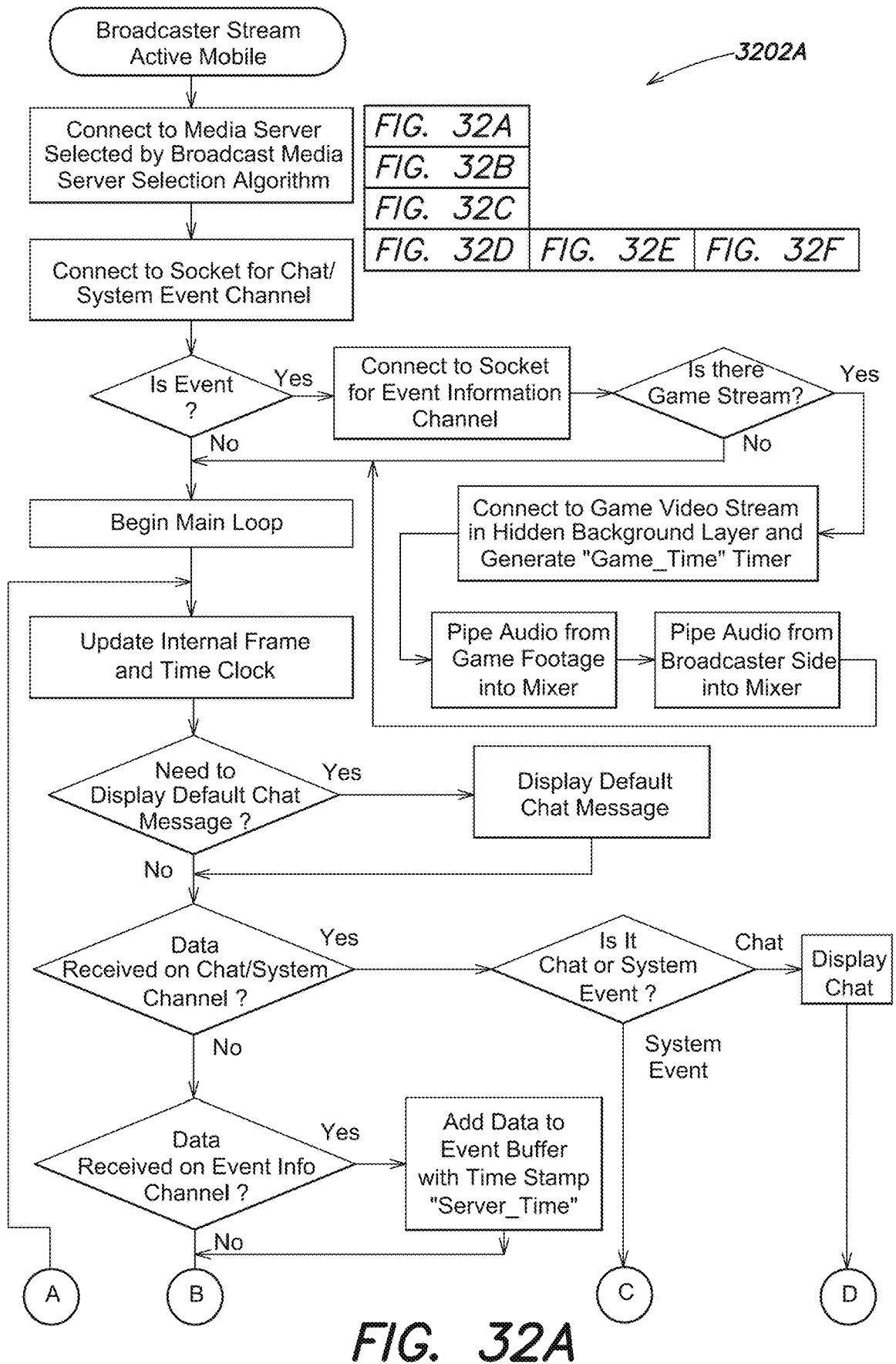
FIGS. 32A, 32B, 32C, 32D, 32E and 32F show a process flow, similar to that shown in FIGS. 21A, 21B, 21C, 21D, and 21E, illustrating a modified mobile broadcaster active stream process according to one inventive implementation relating to the single screen experience.
Figure 32B:
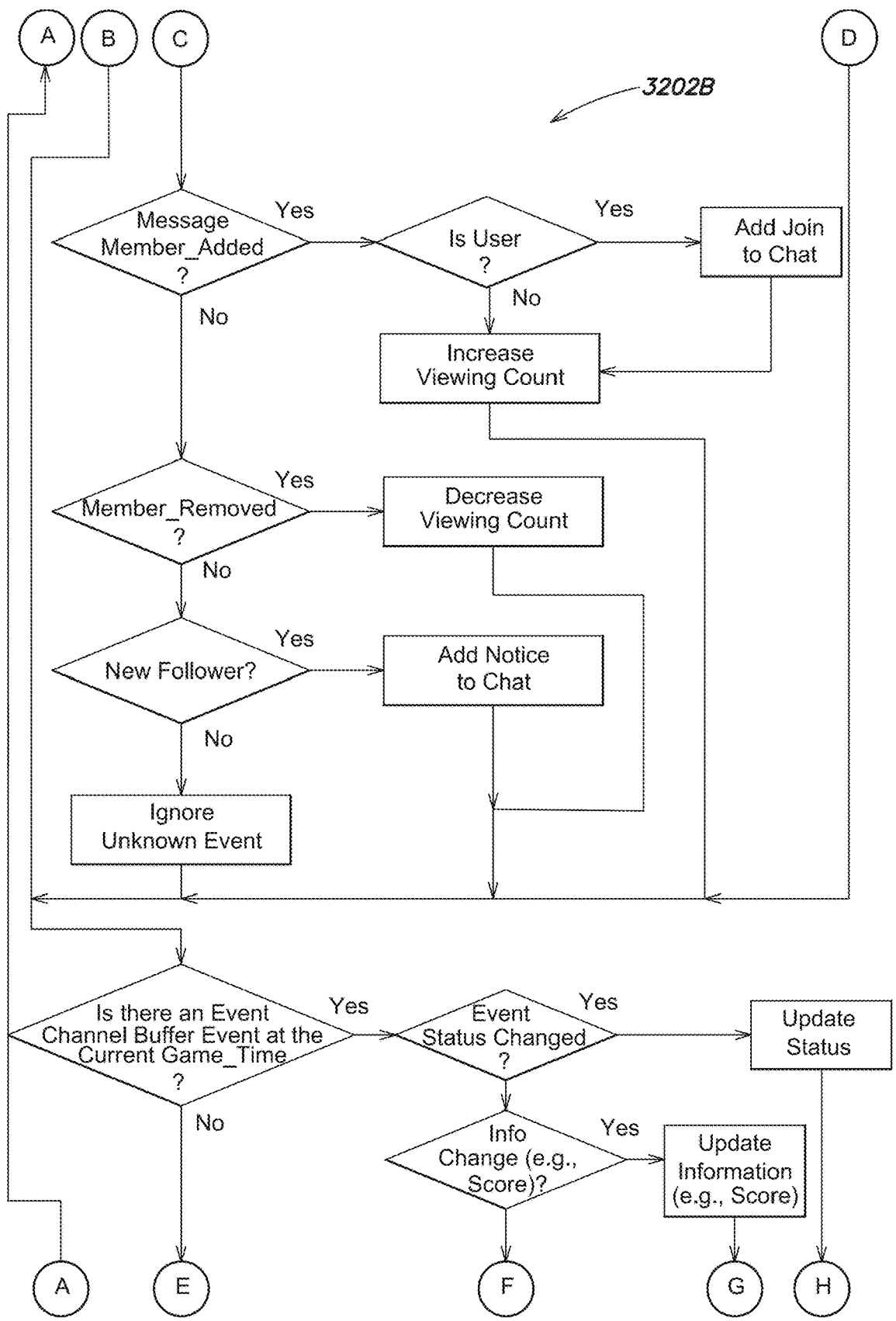

FIGS. 32A, 32B, 32C, 32D, 32E and 32F show a process flow, similar to that shown in FIGS. 21A, 21B, 21C, 21D, and 21E, illustrating a modified mobile broadcaster active stream process according to one inventive implementation relating to the single screen experience, following creation of the broadcaster stream (e.g., pursuant to FIGS. 20A and 20B and appropriate modifications thereto relating to the application timer "server_time"). As shown in FIG. 32A, if the stream relates to an event, the broadcast client device not only connects to the appropriate socket of the socket server(s) for the event information channel based on the appropriate EventID, but also connects to the appropriate endpoint of the HLS server architecture 380 to access an HLS copy 2002 of the audio/video feed of the live event. As discussed above relating to broadcaster segment concurrency, any broadcaster client device is within a segment duration (e.g., 2 seconds) upon connection to the HLS server architecture endpoint to receive the HLS copy.

In the modified broadcaster active stream process, a second timer, referred to as "game_time," is created (see FIG. 32A) according to server_time—the max latency of the HLS stream (i.e., the duration of the HLS window)+1.5 seconds. This second timer "game_time" approximately represents the actual time in the original audio/video feed of the live event the portions of the live event displayed on the broadcaster client device pursuant to the HLS copy actually occurred in the original audio/video feed. By including a 1.5 second offset in the game_time calculation relative to server_time (given the 2 second segment length), the game_time is on average accurate (again, since the broadcaster is somewhere in the 2 second window of a segment when it connects). By linking game_time to the upper bound of the HLS window duration, event information updates (e.g., scorebug updates) will display anywhere from 0.5 seconds early (if they are at the end of the HLS window) to 1.5 seconds late (if they are at the start of the HLS window; and practically speaking 1.5 seconds is a negligible delay).

When new data is received by the broadcaster client device on the event information channel (e.g., a score update), instead of instantly being displayed, the broadcaster client device adds the new event data into an event buffer with the timestamp server_time (which is ahead of game_time by approximately the length of the HLS window; see FIG. 32A). Since game_time is behind server_time, the event information updates need to be delayed until the game_time timer has "caught up" to the server_time; stated differently, any updated new event data present in the event buffer is only used to update the displayed event information on the broadcaster client device when the current value of game_timer matches the timestamp of the new event data (see FIG. 32B). In this manner, a broadcaster sees the event information displayed on their device update in synchronization with the portion of the live event being displayed on the client device (i.e., both delayed approximately by the duration of an HLS window).

Figure 32C:
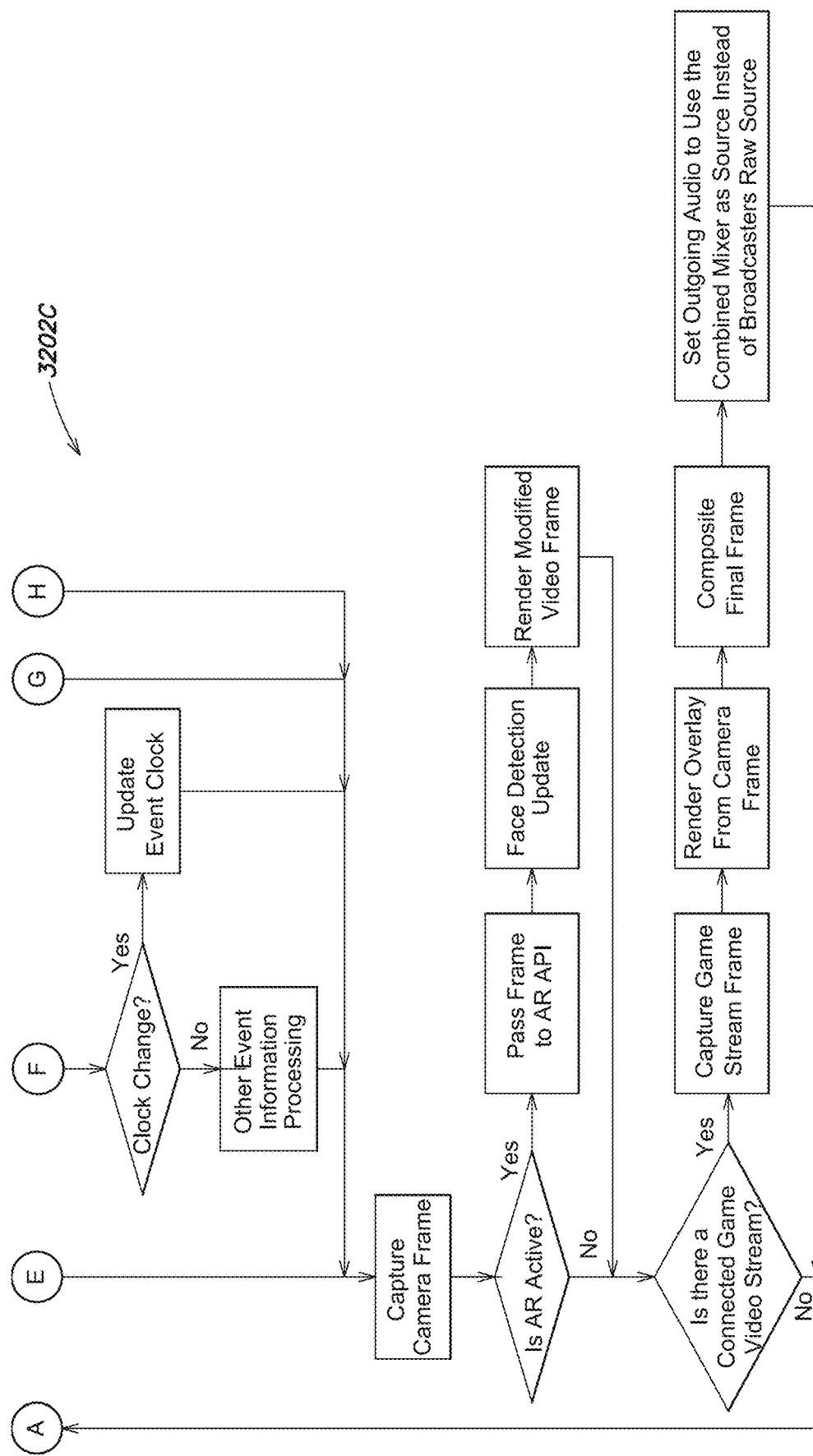
Figure 32D:
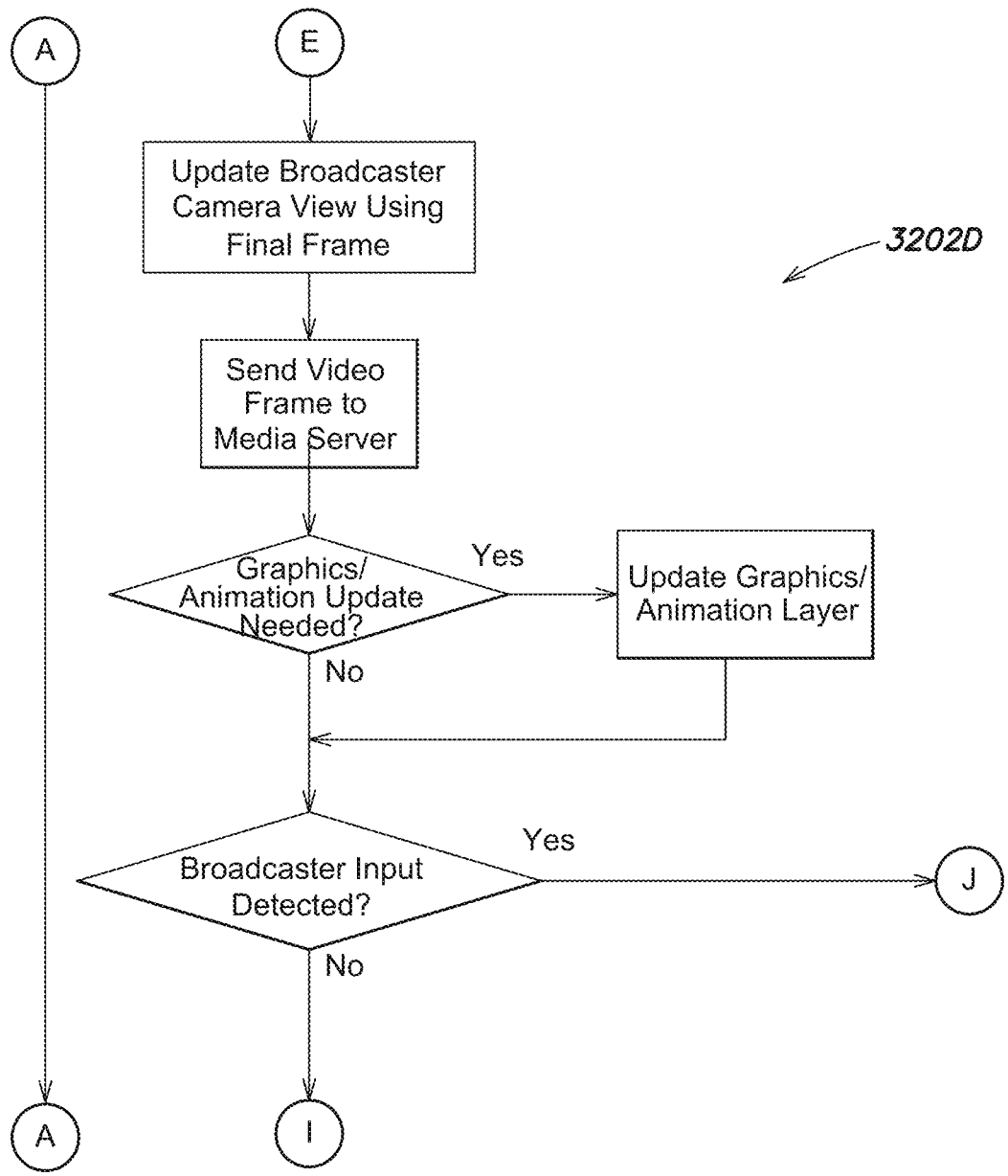
Figure 32E:
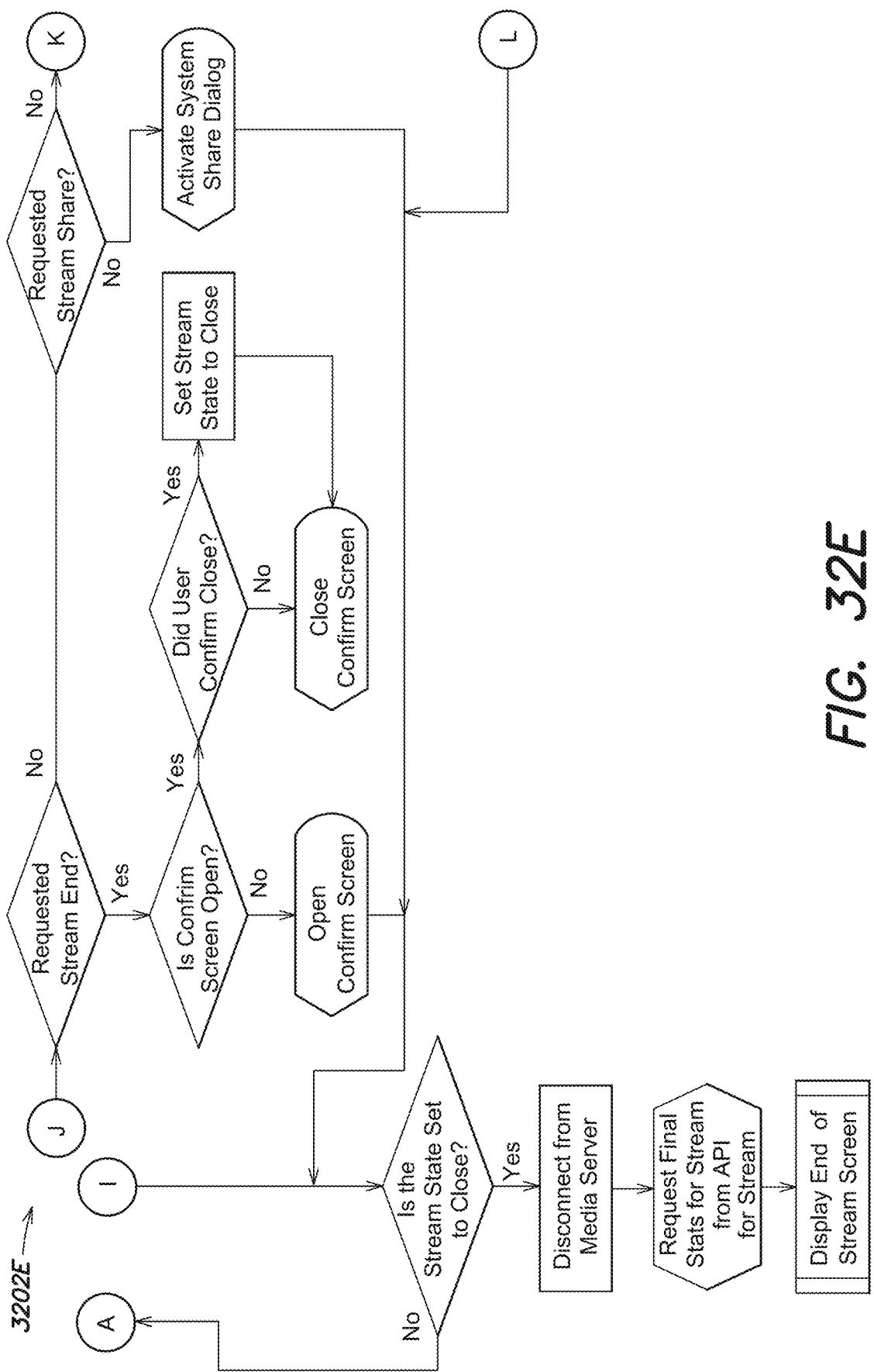
Figure 32F:
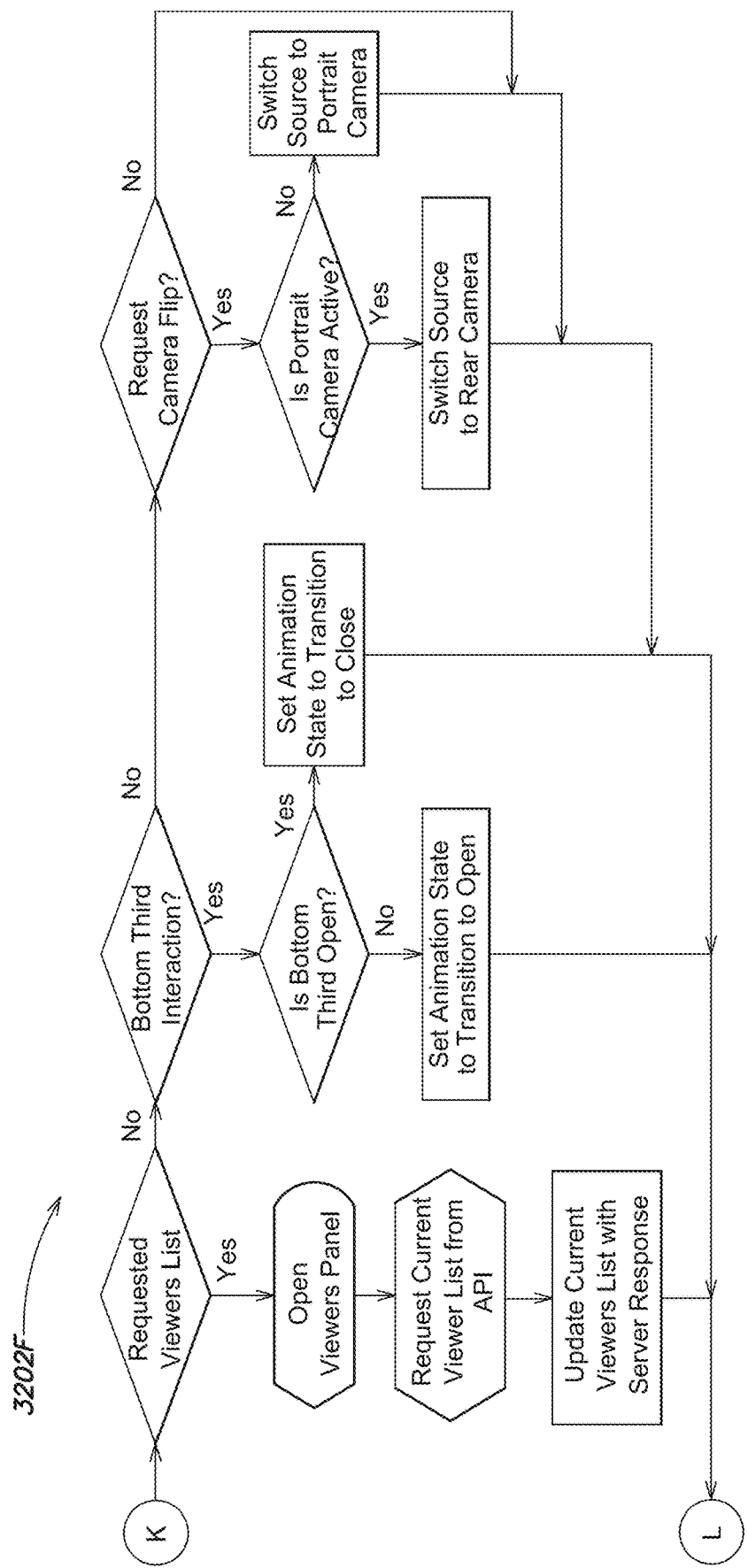

At this point in the process, as shown in FIG. 32C, an optional augmented reality (AR) process is invoked by passing a captured camera frame to an AR API to facilitate face detection of the broadcaster and render a modified video frame. Also, after a camera frame of the broadcaster is captured, a concurrent frame of the live event from the HLS copy of the audio/video feed is captured, an overly is rendered on the frame of the live event from the captured camera frame of the broadcaster, and a composite frame is thereby generated for display on the broadcaster client device and transmission to the designated media server. The latency introduced in this step is negligible (e.g., approximately ½oth of a second).

In a manner similar to the broadcaster viewing device, a viewer client device creates an internal timer server_time (e.g., using a private NTP pool). Unlike the broadcaster client device, however, the viewer client device synchronizes its timer server_time at the start of consuming a copy of the broadcaster's integrated live event and commentator stream. This allows a given viewer client device's server_time to be accurate despite any network latency issues. When a viewer client device begins watching the copy of a broadcaster's integrated live event and commentator stream, the viewer client device creates a second internal timer that is equal to the server_time—2× the HLS window+3 seconds, referred to as "broadcast_time." As with the broadcaster client device, any incoming new event data on the event information channel to which the viewer client device is coupled is placed in an event buffer with a timestamp equal to server_time. The viewer client device experiences event information updates that are within −0.5 seconds to 1.5 seconds relative to the integrated live event and commentary displayed on the viewer client device. The viewer client device compares the timestamp of buffered new event data (which was recorded in server_time, which will be roughly 2×HLS Window ahead of the broadcast_time) against the current broadcast_time, and if there is a match, then the new event data will be displayed on the viewer client device at that point.

As noted above, one salient feature of the single screen experience implementations is the ability to switch between different broadcasters during a live event. Because all broadcaster client devices ingesting respective HLS copies of the audio/video feed for the same live event are within the same HLS segment time ("broadcaster segment concurrency"), when a viewer client device switches between different broadcasters integrated live event and commentary streams, the viewer client device will display a stream that is within a single HLS segment of where it was just before the switch, resulting in effectively no perceptible loss or repeat of displayed live event coverage. The existing buffer of new event data that was generated during the viewer client device displaying the previous broadcaster's integrated stream is preserved. Because a new server_time is requested on connection, and the broadcast_time is adjusted to account for network latency in connecting to the new video stream, the new broadcast will be able to reuse the previously buffered events and there will be no invalidation of previous new event data updates.

If the network latency in connecting to the new stream exceeds 1 second, there will be a gap in the buffered new event data and the viewer client device will request the missing events from the API directly. Due to the fact that the broadcast_time is two HLS windows in the past, even if there is a multisecond gap in buffered new event data, the event buffer is more than large enough to allow the viewer client device to request the missing events without there ever being a period of time in which the displayed event information is not accurate to the displayed portion of the live event.

In some implementations, the audio and/or video feed of the live sporting event may be provided with just the "game audio," e.g., background and foreground sound from the venue of the event itself (crowd cheering, local announcers at the venue over loudspeaker, etc.), and without any native commercial/network broadcaster commentary. For example, in one implementation, the video of the live sporting event and background/foreground sound from the event venue itself may be provided, and the event video and audio may be integrated with (mixed with) the broadcaster's video and audio. In another implementation, just the audio from the live sporting event may be provided and mixed with the broadcaster's video and audio. In yet another implementation, just the video from the live sporting event may be provided and mixed with the broadcaster's video and audio. More specifically, in implementations in which the audio/video feed of the live event already includes significant commentary (e.g., from a network source) and/or other undesirable audio content, the original event audio may be filtered or omitted from the integrated live event and commentary stream (e.g., only the video portion of the copy of the audio/video feed of the live event is utilized) to mitigate or significantly reduce undesirable audio content that may otherwise obfuscate or interfere with the broadcaster's commentary.

To make use of the native game audio if desired, the "broadcaster stream active" process may be modified as shown in FIG. 32A to use a virtual mixer, "pipe audio from game footage into mixer" and "pipe audio from broadcaster side into mixer." In FIG. 32C, after the composite final frame is generated, the outgoing audio may be set to use the combined mixer as the audio source instead of the broadcasters "raw" audio source. In this manner, the addition of a virtual "mixer" allows the audio from the game itself to be piped into and combined with the audio from the broadcaster microphone to create a mixed combined audio track that is attached to the outgoing video stream to the media server.

CONCLUSION

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters and configurations described herein are meant to be exemplary inventive features and that other equivalents to the specific inventive implementations described herein may be realized. It is, therefore, to be understood that the foregoing implementations are presented by way of example and that, within the scope of the appended claims and equivalents thereto, inventive implementations may be practiced otherwise than as specifically described and claimed. Inventive implementations of the present disclosure are directed to each individual feature, system, article, and/or method described herein. In addition, any combination of two or more such features, systems, articles, and/or methods, if such features, systems, articles, and/or methods are not mutually inconsistent, is included within the inventive scope of the present disclosure.

The above-described implementations can be implemented in multiple ways. For example, implementations may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. Such computers may be interconnected by one or more networks such as Internet. The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable memory or storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various implementations of the invention discussed above. The computer readable medium or media can be transportable, such that the program or programs stored thereon can be loaded onto one or more different computers or other processors to implement various aspects of the present invention as discussed above.

Unless otherwise indicated, the terms "program" or "software" are used herein in a generic sense to refer to any type of computer code or set of computer-executable instructions that can be employed to program a computer or other processor to implement various aspects of implementations as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various implementations.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements. In some implementations, a schema-minimal storage system may be implemented in a relational database environment using key-value storage versus defined data structures.

With the foregoing in mind, each of the client devices described herein, as well as various servers and other computing devices of the broadcast/viewing servers and memory storage devices shown for example in FIGS. 2 and 3, may comprise one or more processors, one or more memory devices or systems communicatively coupled to the one or more processors (e.g., to store software code and other data), and one or more communication interfaces communicatively coupled to the one or more processors so as to implement the various specific and inventive functionality described herein.

Also, various inventive concepts may be embodied as one or more methods, of which an example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system, comprising:
at least one media source to receive an audio/video feed of a live event and provide a first copy of the audio/video feed of the live event from a first media server endpoint of the at least one media source; and
a webserver configured to:
transmit first instructions to a first client device that includes at least one first display, the first instructions transmitted by the webserver enabling the at least one first display of the first client device to render a first video relating to the live event and render first event information relating to the live event, wherein the first instructions transmitted by the webserver cause the first client device to:
connect to the first media server endpoint of the at least one media source to receive, on a first communication channel between the first media server endpoint and the first client device, the first copy of the audio/video feed of the live event;
connect to a first socket of a socket server to receive, on a second communication channel between the first socket and the first client device, first digital content corresponding to the first event information;

render, on the at least one first display of the first client device, at least some of the first event information as at least one first user-interactive feature overlaid on or adjacent to the first video relating to the live event; and obtain access to first additional information relating to the live event and/or redirect to a first web site or first app when a first user selects at least a portion of the rendered at least one first user-interactive feature; and transmit second instructions to a second client device that includes at least one second display, the second instructions transmitted by the webserver enabling the at least one second display of the second client device to also render the first event information relating to the live event, wherein the second instructions transmitted by the webserver cause the second client device to:

connect to the first socket of the socket server to receive, on a third communication channel between the first socket and the second client device, the first digital content corresponding to the first event information so that the first digital content received at the first client device and the second client device is synchronized and client-by-client latency between the first client device and second client device to render the first event information is thereby mitigated or significantly reduced;

render, on the at least one second display of the second client device, at least some of the first event information as at least one second user-interactive feature; and obtain access to the first additional information or second additional information relating to the live event and/or redirect to the first web site, the first app, a second web site or a second app when a second user selects at least a portion of the rendered at least one second user-interactive feature.

2. The system of claim 1, wherein:
the at least one media source is configured to:
receive the audio/video feed of the live event;
provide the first copy of the audio/video feed of the live event from the first media server endpoint;
receive from the first client device a composite outgoing stream of the audio/video feed and additional video content; and
provide a first copy of the composite outgoing stream of the audio/video feed and the additional video content from a second media server endpoint of the at least one media source; and
the webserver is configured to transmit the second instructions to the second client device to cause the second client device to:
connect to the second media server endpoint to receive, on a fourth communication channel between the second media server endpoint and the second client device, the first copy of the composite outgoing stream.

3. The system of claim 2, wherein:
the at least one media source comprises at least one RTMP media server and at least one HLS server;
the first media server endpoint is coupled to the at least one HLS server;
the at least one RTMP media server is configured to receive the audio/video feed of the live event and transmit a first HLS copy of the audio/video feed of the live event from the at least one RTMP media server to the at least one HLS server; and
the at least one HLS server is configured to provide the first copy of the audio/video feed of the live event as another HLS copy from the first media server endpoint.

4. The system of claim 1, further comprising the socket server.

5. The system of claim 4, further comprising:
a control server, coupled to the socket server, to provide the first digital content corresponding to the first event information to the socket server.

6. The system of claim 1, wherein:
the live event is a sporting or gaming event; and
the first event information is online gaming information.

7. The system of claim 1, wherein:
the live event is a sporting or gaming event; and
the first event information is score information.

8. A method, comprising:
A) receiving, by at least one media source, an audio/video feed of a live event;
B) providing a first copy of the audio/video feed of the live event from a first media server endpoint of the at least one media source;
C) transmitting first instructions to a first client device that includes at least one first display to enable the at least one first display of the first client device to render a first video relating to the live event and render first event information relating to the live event, wherein the first instructions transmitted in C) cause the first client device to:
connect to the first media server endpoint of the at least one media source to receive, on a first communication channel between the first media server endpoint and the first client device, the first copy of the audio/video feed of the live event;
connect to a first socket of a socket server to receive, on a second communication channel between the first socket and the first client device, first digital content corresponding to the first event information;
render, on the at least one first display of the first client device, at least some of the first event information as at least one first user-interactive feature overlaid on or adjacent to the first video relating to the live event; and
obtain access to first additional information relating to the live event and/or redirect to a first web site or first app when a first user selects at least a portion of the rendered at least one first user-interactive feature; and
D) transmitting second instructions to a second client device that includes at least one second display to enable the at least one second display of the second client device to render the first event information relating to the live event, wherein the second instructions transmitted in D) cause the second client device to:
connect to the first socket of the socket server to receive, on a third communication channel between the first socket and the second client device, the first digital content corresponding to the first event information so that the first digital content received at the first client device and the second client device is synchronized and client-by-client latency between the first client device and second client device to render the first event information is thereby mitigated or significantly reduced;

render, on the at least one second display of the second client device, at least some of the first event information as at least one second user-interactive feature; and obtain access to the first additional information or second additional information relating to the live event and/or redirect to the first web site, the first app, a second web site or a second app related to the live event when a second user selects at least a portion of the rendered at least one second user-interactive feature.

9. The method of claim 8, further comprising:
E) receiving, by the at least one media source from the first client device, a composite outgoing stream of the audio/video feed and additional video content; and
F) providing a first copy of the composite outgoing stream of the audio/video feed and the additional video content from a second media server endpoint of the at least one media source,
wherein D) further comprises transmitting the second instructions to the second client device to cause the second client device to:
connect to the second media server endpoint to receive, on a fourth communication channel between the second media server endpoint and the second client device, the first copy of the composite outgoing stream.

10. The method of claim 9, wherein:
the at least one media source comprises at least one RTMP media server and at least one HLS server;
the first media server endpoint is coupled to the at least one HLS server;
A) comprises receiving, by the at least one RTMP media server, the audio/video feed of the live event and transmitting a first HLS copy of the audio/video feed of the live event from the at least one RTMP media server to the at least one HLS server; and
B) comprises providing the first copy of the audio/video feed of the live event as another HLS copy from the first media server endpoint of the at least one HLS server to the first client device.

11. The method of claim 8, wherein:
the live event is a sporting or gaming event; and
the first event information is online gaming information.

12. The method of claim 8, wherein:
the live event is a sporting or gaming event; and
the first event information is score information.

13. A method, comprising:
A) receiving, by at least one media source, an audio/video feed of a live event;
B) providing a first copy of the audio/video feed of the live event from a first media server endpoint of the at least one media source to a first client device;
C) receiving, by the at least one media source from the first client device, a composite outgoing stream of the audio/video feed and additional video content;
D) providing a first copy of the composite outgoing stream of the audio/video feed and additional video content from a second media server endpoint of the at least one media source; and
E) transmitting first instructions to a second client device that includes at least one first display to cause the at least one first display of the second client device to render a first video relating to the live event and render first event information relating to the live event, wherein the first instructions transmitted in E) cause the second client device to:

connect to the second media server endpoint of the at least one media source to receive, on a first communication channel, the first copy of the composite outgoing stream;
render, on the at least one first display of the first client device, the first video relating to the live event based on the first copy of the composite outgoing stream;
connect to a socket of a socket server to receive, on a second communication channel different from the first communication channel, first digital content corresponding to the first event information; and
render, on the at least one first display of the first client device, at least some of the first event information based on the first digital content received on the second communication channel.

14. The method of claim 13, wherein:
the at least one media source comprises at least one RTMP media server and at least one HLS server;
A) comprises receiving, by the at least one RTMP media server, the audio/video feed of the live event and transmitting a first HLS copy of the audio/video feed of the live event from the at least one RTMP media server to the at least one HLS server; and
B) comprises providing the first copy of the audio/video feed of the live event as another HLS copy from the first media server endpoint of the at least one HLS server to the first client device.

15. The method of claim 13, wherein the first instructions transmitted in E) cause the second client device to:
obtain access to first additional information relating to the live event and/or redirect to a first web site or first app when a first user selects at least a portion of the rendered at least some of the first event information.

16. The method of claim 15, wherein:
the live event is a sporting or gaming event; and
the first event information is online gaming information.

17. The method of claim 15, wherein:
the live event is a sporting or gaming event; and
the first event information is score information.

18. The method of claim 13, further comprising:
F) transmitting second instructions to a third client device that includes at least one second display to enable the at least one second display of the second client device to render the first event information relating to the live event, wherein the second instructions transmitted in F) cause the third client device to:
connect to the socket of the socket server to receive, on a third communication channel between the socket and the third client device, the first digital content corresponding to the first event information.

19. The method of claim 18, wherein F) further comprises transmitting the second instructions to the third client device to enable the at least one second display of the third client device to render the first video relating to the live event and render the first event information relating to the live event, wherein the second instructions transmitted in F) cause the third client device to:
connect to the second media server endpoint to receive, on a fourth communication channel between the second media server endpoint and the third client device, the first copy of the composite outgoing stream.

20. The method of claim 19, wherein:
the second instructions transmitted in F) further cause the third client device to:
render, on the at least one second display of the third client device, the first video relating to the live event based on the first copy of the composite outgoing stream received on the fourth communication channel; and render, on the at least one second display of the third client device, at least some of the first event information based on the first digital content received on the third communication channel.

21. The method of claim 20, wherein:
the first instructions transmitted in E) cause the second client device to obtain access to first additional information relating to the live event and/or redirect to a first web site or first app when a first user selects at least a portion of the rendered at least some of the first event information; and
the second instructions transmitted in F) cause the third client device to obtain access to the first additional information or second additional information relating to the live event and/or redirect to the first web site, the first app, a second web site or a second app related to the live event when a second user selects at least a portion of the rendered at least some of the first event information.

22. The method of claim 21, wherein:
the live event is a sporting or gaming event; and
the first event information is online gaming information.

23. The method of claim 21, wherein:
the live event is a sporting or gaming event; and
the first event information is score information.

24. A system, comprising:
at least one media source to:
  receive an audio/video feed of a live event;
  provide a first copy of the audio/video feed of the live event from a first media server endpoint of the at least one media source to a first client device;
  receive from the first client device a composite outgoing stream of the audio/video feed and additional video content; and
  provide a first copy of the composite outgoing stream of the audio/video feed and additional video content from a second media server endpoint of the at least one media source; and
a webserver to transmit first instructions to a second client device that includes at least one first display to cause the at least one first display of the second client device to render a first video relating to the live event and render first event information relating to the live event, wherein the first instructions transmitted by the webserver cause the second client device to:
  connect to the second media server endpoint of the at least one media source to receive, on a first communication channel, the first copy of the composite outgoing stream;
  render, on the at least one first display of the first client device, the first video relating to the live event based on the first copy of the composite outgoing stream;
  connect to a socket of a socket server to receive, on a second communication channel different from the first communication channel, first digital content corresponding to the first event information; and
  render, on the at least one first display of the first client device, at least some of the first event information based on the first digital content received on the second communication channel.

25. The system of claim 24, wherein the first instructions transmitted by the webserver cause the second client device to:
obtain access to first additional information relating to the live event and/or redirect to a first web site or first app when a first user selects at least a portion of the rendered at least some of the first event information.

26. The system of claim 24, wherein:
the live event is a sporting or gaming event; and
the first event information is online gaming information.

27. The system of claim 24, wherein:
the live event is a sporting or gaming event; and
the first event information is score information.

28. The system of claim 24, further comprising the socket server.

29. The system of claim 28, further comprising:
a control server, coupled to the socket server, to provide the first digital content corresponding to the first event information to the socket server.

30. The system of claim 24, wherein the webserver is configured to transmit second instructions to a third client device that includes at least one second display to enable the at least one second display of the third client device to render the first event information relating to the live event, wherein the second instructions transmitted by the webserver cause the third client device to:
connect to the socket of the socket server to receive, on a third communication channel between the socket and the third client device, the first digital content corresponding to the first event information.

31. The system of claim 30, wherein the webserver is configured to transmit the second instructions to the third client device to further enable the at least one second display of the third client device to render the first video relating to the live event and render the first event information relating to the live event, wherein the second instructions transmitted by the webserver cause the third client device to:
connect to the second media server endpoint to receive, on a fourth communication channel between the first media server endpoint and the third client device, the first copy of the composite outgoing stream.

32. The system of claim 31, wherein:
the first instructions transmitted by the webserver cause the second client device to obtain access to first additional information relating to the live event and/or redirect to a first web site or first app when a first user selects at least a portion of the rendered at least some of the first event information; and
the second instructions transmitted by the webserver cause the third client device to obtain access to the first additional information or second additional information relating to the live event and/or redirect to the first web site, the first app, a second web site or a second app related to the live event when a second user selects at least a portion of the rendered at least some of the first event information.

33. The system of claim 30, wherein:
the live event is a sporting or gaming event; and
the first event information is online gaming information.

34. The system of claim 30, wherein:
the live event is a sporting or gaming event; and
the first event information is score information.

* * * * *

UNITED STATES PATENT AND TRADEMARK OFFICE
CERTIFICATE OF CORRECTION

| | |
|---|---|
| PATENT NO. | : 11,871,088 B2 |
| APPLICATION NO. | : 17/833188 |
| DATED | : January 9, 2024 |
| INVENTOR(S) | : Peter Azuolas et al. |

It is certified that error appears in the above-identified patent and that said Letters Patent is hereby corrected as shown below:

On the Title Page

At Item (*), Notice: Subject to any disclaimer, the term of this patent is extended or adjusted under 35 U.S.C. 154(b) by 0 days. add -- This patent is subject to a terminal disclaimer. --

At Item (45), Date of Patent, replace "Jan. 9, 2024" with -- *Jan. 9, 2024 --

Signed and Sealed this
Thirteenth Day of February, 2024

Katherine Kelly Vidal
*Director of the United States Patent and Trademark Office*